US011937074B2

(12) United States Patent
Mason et al.

(10) Patent No.: US 11,937,074 B2
(45) Date of Patent: *Mar. 19, 2024

(54) RENDERING OF IMMERSIVE AUDIO CONTENT

(71) Applicants: DOLBY INTERNATIONAL AB, Amsterdam Zuidoost (NL); DOLBY LABORATORIES LICENSING CORPORATION, San Francisco, CA (US)

(72) Inventors: Michael William Mason, Wahroonga (AU); Juan Felix Torres, Darlinghurst (AU); Antonio Mateos Sole, Barcelona (ES); Daniel Arteaga, Barcelona (ES); Adam J. Mills, Oran Park (AU); Mark David de Burgh, Mount Colah (AU); Andrew Robert Owen, Hornsby (AU)

(73) Assignees: Dolby Laboratories Licensing Corporation, San Francisco, CA (US); Dolby International AB, Dublin (IE)

( * ) Notice: Subject to any disclaimer, the term of this patent is extended or adjusted under 35 U.S.C. 154(b) by 507 days.

This patent is subject to a terminal disclaimer.

(21) Appl. No.: 17/161,569

(22) Filed: Jan. 28, 2021

(65) Prior Publication Data

US 2021/0235215 A1 Jul. 29, 2021

Related U.S. Application Data

(63) Continuation of application No. 15/776,460, filed as application No. PCT/IB2016/001831 on Nov. 18, 2016, now Pat. No. 11,128,978.

(Continued)

(51) Int. Cl.

*H04R 3/04* (2006.01)
*H04R 3/12* (2006.01)

(Continued)

(52) U.S. Cl.

CPC ............... *H04S 7/307* (2013.01); *H04R 3/04* (2013.01); *H04R 3/12* (2013.01); *H04R 5/04* (2013.01);

(Continued)

(58) Field of Classification Search

CPC ............ H04R 5/04; H04R 3/12; H04R 3/007; H04R 3/04; H04R 27/00; H04R 29/007;

(Continued)

(56) References Cited

U.S. PATENT DOCUMENTS 8,073,160 B1 12/2011 Classen
2002/0150254 A1 10/2002 Wilcock (Continued)

FOREIGN PATENT DOCUMENTS

BR 122017004541 A2 * 9/2019 ............. H04S 3/008
EP 3270375 A1 * 1/2018 ............. G10L 19/00

(Continued)

OTHER PUBLICATIONS

ITU-R "Audio Definition Model" Recommendation ITU-R BS.2076-0, Jun. 2015.

(Continued)

*Primary Examiner* — Melur Ramakrishnaiah

(57) ABSTRACT

The present document relates to methods and apparatus for rendering input audio for playback in a playback environment. The input audio includes at least one audio object and associated metadata, and the associated metadata indicates at least a location of the audio object. A method for rendering input audio including divergence metadata for playback in a playback environment comprises creating two additional audio objects associated with the audio object such that respective locations of the two additional audio objects are evenly spaced from the location of the audio object, on opposite sides of the location of the audio object when seen (Continued)

from an intended listener's position in the playback environment, determining respective weight factors for application to the audio object and the two additional audio objects, and rendering the audio object and the two additional audio objects to one or more speaker feeds in accordance with the determined weight factors. The present document further relates to methods and apparatus for rendering audio input including extent metadata and/or diffuseness metadata for playback in a playback environment.

3 Claims, 30 Drawing Sheets

Related U.S. Application Data

(60) Provisional application No. 62/267,832, filed on Dec. 15, 2015, provisional application No. 62/257,994, filed on Nov. 20, 2015.

(51) Int. Cl.
*H04R 5/04* (2006.01)
*H04S 7/00* (2006.01)

(52) U.S. Cl.
CPC .......... *H04S 7/303* (2013.01); *H04S 2400/07* (2013.01); *H04S 2420/11* (2013.01)

(58) Field of Classification Search
CPC ............ H04S 7/307; H04S 7/30; H04S 7/303; H04S 2400/11; H04S 2420/03; H04S 2420/11
USPC ............................................................ 700/94
See application file for complete search history.

(56) References Cited

U.S. PATENT DOCUMENTS

| | | | | |
|---|---|---|---|---|
| 2006/0120534 | A1 | 6/2006 | Seo | |
| 2008/0130904 | A1 | 6/2008 | Faller | |
| 2015/0170657 | A1 | 6/2015 | Thompson | |
| 2015/0341736 | A1 | 11/2015 | Peters | |
| 2016/0007133 | A1* | 1/2016 | Mateos Sole | H04S 7/30 381/18 |
| 2016/0044434 | A1 | 2/2016 | Chon | |
| 2016/0050508 | A1 | 2/2016 | Redmann | |
| 2016/0104491 | A1 | 4/2016 | Lee | |
| 2016/0112819 | A1 | 4/2016 | Mehnert | |
| 2017/0251323 | A1 | 8/2017 | Jo | |
| 2018/0192225 | A1 | 7/2018 | Herre | |

FOREIGN PATENT DOCUMENTS

| | | |
|---|---|---|
| WO | 2008113427 | 9/2008 |
| WO | 2010122441 | 10/2010 |
| WO | 2013006330 | 1/2013 |
| WO | 2015017235 | 2/2015 |
| WO | 2015062649 | 5/2015 |

OTHER PUBLICATIONS

ITU-R Radiocommunication Sector of ITU-R BS.2088-0 “Long-form File Format for the International Exchange of Audio Programme Materials with Metadata” Oct. 2015.
ITU-R Recommendation ITU-R BS.1116-3, “Methods for the Subjective Assessment of Small Impairments in Audio Systems” Feb. 2015.
ITU-R Recommendation ITU-R BS.2051-0 “Advanced Sound System for Programme Production” Feb. 2014.
ITU-R Recommendation ITU-R BS.775-3 “Multichannel Stereophonic Sound System with and without Accompanying Picture” Aug. 2012.

* cited by examiner

| BWF File .chna chunk | | | |
|---|---|---|---|
| Track Num | audioTrackUID | audioTrackFormatID | audioPackFormatID |
| 1<br>2<br>3<br>.<br>.<br>N | .<br>.<br>.<br>.<br>.<br>. | .<br>.<br>.<br>.<br>.<br>. | .<br>.<br>.<br>.<br>.<br>. |
| (Non-repeating list of tracks 1 through N) | (Non-repeating list of UIDs) | (Possibly repeating list of audioTrackFormatIDs) | (Possibly repreating list of audioPackFormatIDs) |

| BWF File .chna chunk | | | |
|---|---|---|---|
| Track Num | audioTrackUID | audioTrackFormatID | audioPackFormatID |
| 1<br>2<br>3<br>.<br>.<br>N | .<br>.<br>.<br>.<br>.<br>. | .<br>.<br>.<br>.<br>.<br>. | .<br>.<br>.<br>.<br>.<br>. |
| (Non-repeating list of tracks 1 through N) | (Non-repeating list of UIDs) | (non-repeating list of audioTrackFormatIDs, referencing common tracks) | (all tracks reference the same common audioPack) |

RENDERING OF IMMERSIVE AUDIO CONTENT

CROSS-REFERENCE TO RELATED APPLICATIONS

This application is a continuation of U.S. patent application Ser. No. 15/776,460, filed May 16, 2018, which is the 371 national phase of PCT Application No. PCT/IB2016/001831, filed Nov. 18, 2016, which claims priority to U.S. Provisional Patent Application No. 62/267,832, filed Dec. 15, 2015 and U.S. Provisional Patent Application No. 62/257,994, filed Nov. 20, 2015, each of which is hereby incorporated by reference in its entirety.

TECHNICAL FIELD OF THE INVENTION

The present document relates to methods and apparatus for rendering of object-based audio content. In particular, the present document relates to methods and apparatus for improved immersive rendering of audio objects having associated metadata specifying extent (e.g., size) of the audio objects, diffusion, and/or divergence. These methods and apparatus are applicable to cinema sound reproduction systems and home cinema sound reproduction systems, for example.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

As used herein, the term “audio object” may refer to a stream of audio object signals and associated audio object metadata. The metadata may indicate at least the position of the audio object. However, the metadata also may indicate decorrelation data, rendering constraint data, content type data (e.g. dialog, effects, etc.), gain data, trajectory data, etc. Some audio objects may be static, whereas others may have time-varying metadata: such audio objects may move, may change extent (e.g., size) and/or may have other properties that change over time. For example, audio objects may be humans, animals or any other elements serving as sound sources.

Recommendation ITU-R BS.2076 The Audio Definition Model (ADM) formalizes the description of the structure of metadata that can be applied in the rendering of audio data to one of the loudspeaker configurations specified in Recommendation ITU-R BS.2051. The ADM specifies a metadata model that describes the relationship between a group or groups of raw audio data and how they should be interpreted so that when reproduced, the original or authored audio experience is recreated. Importantly there is not a single audio format dictated by ADM, instead an emphasis on flexibility provides multiple ways to describe the variety of immersive experiences which may be on offer. Whereas the present document frequently makes reference to the ADM, the subject matter described therein is equally applicable to other specifications of metadata and other metadata models.

In order to reproduce an immersive audio experience, the description must be interpreted in the context of a playback environment to create speaker specific feeds. This process can typically be split into two steps, of which the second step is sometimes referred to as B-chain processing or playback system:

1. Rendering the immersive content to ideal speakers, and
2. Processing the ideal speaker signals to match a reproduction system (i.e. corrections for the room, actual speaker placement, DACs, Amplifiers and other equipment used during playback).

The renderer (rendering apparatus, e.g., baseline renderer) described in the present document addresses the first step of interpreting the description of the audio, e.g., in ADM, to create ideal speaker feeds—which can themselves be captured as a simpler ADM that does not require further rendering before reproduction.

In creating those ideal speaker feeds, it is desirable to have an improved treatment of the features extent (e.g., size), diffusion, and/or divergence that may be specified by the metadata for associated audio objects.

The present document addresses the above issues related to treatment of metadata and describes methods and apparatus for improved rendering of object-based audio content for playback, in particular of object-based audio content including audio objects for which one or more of extent, diffusion, and divergence are specified by the associated metadata.

SUMMARY OF THE INVENTION

According to an aspect of the disclosure, a method of rendering input audio for playback in a playback environment is described. The input audio may include at least one audio object and associated metadata. The associated metadata may indicate at least a location (e.g., position) of the audio object. The method may optionally comprise referring to the metadata for the audio object and determining whether a phantom object at the location of the audio object is to be created. The method may comprise creating two additional audio objects associated with the audio object such that respective locations of the two additional audio objects are evenly spaced from the location of the audio object, on opposite sides of the location of the audio object when seen from an intended listener’s position in the playback environment. The additional audio objects may be located in the horizontal plane in which the audio object is located. The additional audio objects’ locations may be fixed with respect to the location of the audio object. The additional audio objects may be evenly spaced from the intended listener’s position, e.g., at equal radius. The additional audio objects may be referred to as virtual audio objects. The method may further comprise determining respective weight factors for application to the audio object and the two additional audio objects. The weight factors may be mixing gains. The weight factors (e.g., mixing gains) may impose a desired relative importance (e.g., relative weight) across the three objects. The two additional audio objects may have equal weight factors. The method may yet further comprise rendering the audio object and the two additional audio objects to one or more speaker feeds in accordance with the determined weight factors. The rendering of the audio object and the two additional audio objects to the one or more speaker feeds may result in a gain coefficient for each of the one or more speaker feeds (e.g., for an audio object signal of the audio object).

Configured as above, the proposed method allows efficient and accurate generation of a phantom object for the audio object at the location of the audio object. Thereby, audio power may be more equally distributed among speakers of a speaker layout, thus avoiding overload at particular speakers of the speaker layout.

In embodiments, the associated metadata may further indicate a distance measure indicative of a distance between the two additional audio objects. For example, the distance measure may be indicative of a distance between each of the additional audio objects and the audio object, such as an angular distance, or a Euclidean distance. Alternatively, the distance may be indicative of the distance between the two additional audio objects themselves, such as an angular distance or a Euclidean distance.

In embodiments, the associated metadata may further indicate a measure of relative importance (e.g., relative weight) of the two additional audio objects compared to the audio object. The measure of relative importance may be referred to as divergence, and be defined by a divergence parameter (divergence value), for example a divergence parameter $d \in [0, 1]$, with 0 indicating zero relative importance of the additional audio objects and 1 indicating zero relative importance of the audio object—i.e., full relative importance of the additional audio objects. The weight factors may be determined based on said measure of relative importance.

In embodiments, the method may further comprise normalizing the weight factors based on said distance measure. For example, the weight factors may be normalized (e.g., scaled) such that a function $f(g_1,g_2,D)$ of the weight factors $g_1,g_2$ and the distance measure D attains a predetermined value, e.g., 1. For example, the weight factors may be normalized such that $f(g_1,g_2,D)=1$.

By normalizing the weight factors (e.g., mixing gains) based on the distance measure, it can be ensured that the perceptible loudness (signal power) for the audio object matches the artistic intent of the content creator. Moreover, for an audio object that is moving across the reproduction environment along a trajectory, consistent perceived loudness can be achieved by the proposed method, even if the speaker feeds to which the audio object and the additional audio objects are primarily rendered, respectively, changes along the trajectory. For example, for the additional audio objects being spaced close to each other, the normalization may represent an amplitude preserving pan to account for coherent summation of the signals of the additional audio objects. On the other hand, for the additional audio objects being sufficiently spaced from each other, the normalization may represent a power preserving pan.

In embodiments, the weight factors may be normalized such that a sum of equal powers of the normalized weight factors is equal to a predetermined value. An exponent of the normalized weight factors in said sum may be determined based on the distance measure. The weight factors may be mixing gains. The predetermined value may be 1, for example. The weight factors (e.g., mixing gains) may be normalized to satisfy $(g_1)^{p(D)}+2(g_2)^{p(D)}=1$, where $g_1$ is the weight factor (e.g., mixing gain) to be applied to the audio object (e.g., multiplying the audio object signal of the (original) audio object), $g_2$ is the weight factor (e.g., mixing gain) to be applied to each of the two additional audio objects (e.g., multiplying the audio object signal of the (original) audio object), D is the distance measure, and p is a (smooth) monotonic function that yields $p(D)=1$ for the distance measure below a first threshold and that yields $p(D)=2$ for the distance measure above a second threshold.

In embodiments, normalization of the weight factors may be performed on a (frequency) sub-band basis, in dependence on frequency. That is, normalization may be performed for each of a plurality of sub-bands. The exponent of the normalized weight factors in said sum may be determined on the basis of a frequency of the respective sub-band. The exponent may be a function of the distance measure and the frequency, $p(D,f)$. For example, for higher frequencies, the aforementioned first and second thresholds may be lower than for lower frequencies. That is, the first threshold may be a monotonically decreasing function of frequency, and the second threshold may be a monotonically decreasing function of frequency. The frequency may be the center frequency of a respective sub-band or may be any other frequency suitably chosen within the respective sub-band.

Thereby, different characteristics of audio signals at different frequencies with respect to the perception of their summation can be accounted for. In particular, different distance thresholds within which signals of audio objects sum coherently can be taken into account, to thereby achieve a desired or intended loudness of the audio object in each frequency sub-band.

In embodiments, the method may further comprise determining a set of rendering gains for mapping (e.g., panning) the audio object and the two additional audio objects to the one or more speaker feeds. The method may yet further comprise normalizing the rendering gains based on said distance measure.

By normalizing the rendering gains based on the distance measure, it can be ensured that the perceptible loudness (level, signal power) for the audio object matches the artistic intent of the content creator, even if two or more of the audio object and the additional audio object are located close to each other and/or would be rendered to the same speaker feed. For this case, the normalization of the rendering gains may represent an amplitude preserving pan. Otherwise, for sufficient distance between the additional audio objects, the normalization may represent a power preserving pan.

In embodiments, the rendering gains may be normalized such that a sum of equal powers of the normalized rendering gains for all of the one or more speaker feeds and for all of the audio objects and the two additional audio objects is equal to a predetermined value. An exponent of the normalized rendering gains in said sum may be determined based on said distance measure. The predetermined value may be 1, for example. The rendering gains may be normalized to satisfy $\Sigma_i\Sigma_j(G_{ij})^{p(D)}=1$, where index i indicates a respective one among the audio object and the two additional audio objects, j indicates a respective one among the speaker feeds, $G_{ij}$ are the rendering gains, D is the distance measure, and p is a (smooth) monotonic function that yields $p(D)=1$ for the distance measure below a first threshold and that yields $p(D)=2$ for the distance measure above a second threshold.

In embodiments, normalization of the rendering gains may be performed on a (frequency) sub-band basis and in dependence on frequency. That is, normalization may be performed for each of a plurality of sub-bands. The exponent of the rendering gains in said sum may be determined on the basis of a frequency of the respective sub-band. The exponent may be a function of the distance measure and the frequency, $p(D,f)$. For example, for higher frequencies, the aforementioned first and second thresholds may be lower than for lower frequencies. That is, the first threshold may be a monotonically decreasing function of frequency, and the second threshold may be a monotonically decreasing function of frequency. The frequency may be the center frequency of a respective sub-band or may be any other frequency suitably chosen within the respective sub-band.

According to another aspect of the disclosure, a method of rendering input audio for playback in a playback environment is described. The input audio may include at least one audio object and associated metadata. The associated metadata may indicate at least a location (e.g., position) of the at least one audio object and a three-dimensional extent (e.g., size) of the at least one audio object. The method may comprise rendering the audio object to one or more speaker feeds in accordance with its three-dimensional extent. Said rendering of the audio object to one or more speaker feeds in accordance with its three-dimensional extent may be performed by determining locations of a plurality of virtual audio objects within a three-dimensional volume defined by the location of the audio object and its three-dimensional extent. The virtual audio objects may be referred to as virtual sources. Candidates for the virtual audio objects may be arranged in a grid (e.g., a three-dimensional rectangular grid) across the playback environment. Determining said locations may involve imposing a respective minimum extent for the audio object in each of the three dimensions (e.g., $\{x,y,z\}$ or $\{r,\theta,\varphi\}$). Said rendering of the audio object to one or more speaker feeds in accordance with its three-dimensional extent may be performed by further, for each virtual audio object, determining a weight factor that specifies the relative importance of the respective virtual audio object. Said rendering of the audio object to one or more speaker feeds in accordance with its three-dimensional extent may be performed by further rendering the audio object and the plurality of virtual audio objects to the one or more speaker feeds in accordance with the determined weight factors. The rendering of the audio object and the virtual audio objects to the one or more speaker feeds may be performed by a so-called point panner, i.e., the audio object and the plurality of virtual audio objects may be treated as respective point sources. The rendering of the audio object and the virtual audio objects to the one or more speaker feeds may result in a gain coefficient for each of the one or more speaker feeds (e.g., for an audio object signal of the audio object).

Configured as above, the proposed method allows for efficient and accurate rendering of audio objects having extent, e.g., a three-dimensional size. In other words, the proposed method allows for efficient and accurate rendering of audio objects that take a three-dimensional volume in the reproduction environment. When seen from the intended listener's position, the audio object thus not only features width and height, but can additionally feature depth. The proposed method provides for independent control of each of the three spatial dimensions of extent (e.g., $\{x,y,z\}$ or $\{r,\theta,\varphi\}$), and thus provides for a rendering framework that allows for greater flexibility at the time of content creation. In consequence, the proposed method provides the rendering framework for more immersive, more realistic rendering of audio objects with extent.

In embodiments, the method may further comprise, for each virtual audio object and for each of the one or more speaker feeds, determining a gain for mapping the respective virtual audio object to the respective speaker feed. The gains may be point gains. The gains may be determined based on the location of the respective virtual audio object and the location of the respective speaker feed (i.e., the location of a speaker for playback of the respective speaker feed). The method may yet further comprise, for each virtual object and for each of the one or more speaker feeds, scaling the respective gain with the weight factor of the respective virtual audio object.

In embodiments, the method may further comprise, for each speaker feed, determining a first combined gain depending on the gains of those virtual audio objects that lie within a boundary of the playback environment. The method may further comprise, for each speaker feed, determining a second combined gain depending on the gains of those virtual audio objects that lie on said boundary. The first and second combined gains may be normalized. The method may yet further comprise, for each speaker feed, determining a resulting gain for the plurality of virtual audio objects based on the first combined gain, the second combined gain, and a fade-out factor indicative of the relative importance of the first combined gain and the second combined gain. The fade-out factor may depend on the three-dimensional extent (e.g., size) of the audio object and the location of the audio object. For example, the fade-out factor may depend on a fraction of the overall extent (e.g., of the overall three-dimensional volume) of the audio object that is within the boundary of the playback environment.

In embodiments, the method may further comprise, for each speaker feed, determining a final gain based on the resulting gain for the plurality of virtual audio objects, a respective gain for the audio object, and a cross-fade factor depending on the three-dimensional extent (e.g. size) of the audio object.

In embodiments, the associated metadata may indicate a first three-dimensional extent (e.g., size) of the audio object in a spherical coordinate system by respective ranges of values for a radius, an azimuth angle, and an elevation angle. The method may further comprise determining a second three-dimensional extent (e.g., size) in a Cartesian coordinate system as dimensions of a cuboid that circumscribes the part of a sphere that is defined by said respective ranges of the values for the radius, the azimuth angle, and the elevation angle. The method may yet further comprise using the second three-dimensional extent as the three-dimensional extent of the audio object.

In embodiments, the associated metadata may further indicate a measure of a fraction of the audio object that is to be rendered isotropically (e.g., from all directions with equal powers) with respect to an intended listener's position in the playback environment. The method may further comprise creating an additional audio object at a center of the playback environment and assigning a three-dimensional extent (e.g. size) to the additional audio object such that a three-dimensional volume defined by the three-dimensional extent of the additional audio object fills out the entire playback environment. The method may further comprise determining respective overall weight factors for the audio object and the additional audio object based on the measure of said fraction. The method may yet further comprise rendering the audio object and the additional audio object, weighted by their respective overall weight factors, to the one or more speaker feeds in accordance with their respective three-dimensional extents. Each speaker feed may be obtained by summing respective contributions from the audio object and the additional audio object.

Configured as above, the proposed method provides for perceptually appealing de-localization of part or all of an audio object. In particular, by panning the additional audio object to the center of the reproduction environment (e.g., room) and letting it fill out the entire reproduction environment, the proposed method enables to achieve diffuseness of the audio object regardless of actual speaker layout of the reproduction environment. Further, by employing the rendering of extent for the additional audio object, diffuseness can be realized in an efficient manner, essentially without introducing new components/modules into a renderer for performing the proposed method.

In embodiments, the method may further comprise applying decorrelation to the contribution from the additional audio object to the one or more speaker feeds It should be noted that the methods described in the present document may be applied to renderers (e.g., rendering apparatus). Such rendering apparatus may be configured to perform the methods described in the present document and/or may comprise respective modules (or blocks, units) for performing one or more of the processing steps of the methods described in the present document. Any statements made above with respect to such methods are understood to likewise apply to apparatus for rendering input audio for playback in a playback environment.

Consequently, according to another aspect of the disclosure, an apparatus (e.g., renderer, rendering apparatus) for rendering input audio for playback in a playback environment is described. The input audio may include at least one audio object and associated metadata. The associated metadata may indicate at least a location (e.g., position) of the audio object. The apparatus may comprise a metadata processing unit (e.g., a metadata pre-processor). The metadata processing unit may be configured to create two additional audio objects associated with the audio object such that respective locations of the two additional audio objects are evenly spaced from the location of the audio object, on opposite sides of the location of the audio object when seen from an intended listener's position in the playback environment. The metadata processing unit may be further configured to determine respective weight factors for application to the audio object and the two additional audio objects. The apparatus may further comprise a rendering unit configured to render the audio object and the two additional audio objects to one or more speaker feeds in accordance with the determined weight factors. The rendering unit may comprise a panning unit (e.g., point panner) and may further comprise a mixer.

In embodiments, the associated metadata may further indicate a distance measure indicative of a distance between the two additional audio objects.

In embodiments, the associated metadata may further indicate a measure of relative importance of the two additional audio objects compared to the audio object. The weight factors may be determined based on said measure of relative importance.

In embodiments, the metadata processing unit may be further configured to normalize the weight factors based on said distance measure.

In embodiments, the weight factors may be normalized such that a sum of equal powers of the normalized weight factors is equal to a predetermined value. An exponent of the normalized weight factors in said sum may be determined based on the distance measure (e.g., the metadata processing unit may be configured to determine said exponent based on the distance measure).

In embodiments, normalization of the weight factors may be performed on a sub-band basis, in dependence on frequency.

In embodiments, the rendering unit may be further configured to determine a set of rendering gains for mapping the audio object and the two additional audio objects to the one or more speaker feeds. The rendering unit may be yet further configured to normalize the rendering gains based on said distance measure.

In embodiments, the rendering gains may be normalized such that a sum of equal powers of the normalized rendering gains for all of the one or more speaker feeds and for all of the audio objects and the two additional audio objects is equal to a predetermined value. An exponent of the normalized rendering gains in said sum may be determined based on said distance measure (e.g., the metadata processing unit may be configured to determine said exponent based on the distance measure).

In embodiments, normalization of the rendering gains may be performed on a sub-band basis, in dependence on frequency.

According to another aspect of the disclosure, an apparatus (e.g., renderer, rendering apparatus) for rendering input audio for playback in a playback environment is described. The input audio may include at least one audio object and associated metadata. The associated metadata may indicate at least a location (e.g., position) of the at least one audio object and a three-dimensional extent (e.g., size) of the at least one audio object. The apparatus may comprise a rendering unit for rendering the audio object to one or more speaker feeds in accordance with its three-dimensional extent. The rendering unit may be configured to determine locations of a plurality of virtual audio objects within a three-dimensional volume defined by the location of the audio object and its three-dimensional extent. The rendering unit may be further configured to for each virtual audio object, determine a weight factor that specifies the relative importance of the respective virtual audio object. The rendering unit may be further configured to render the audio object and the plurality of virtual audio objects to the one or more speaker feeds in accordance with the determined weight factors. The rendering unit may comprise a panning unit (e.g., extent panner, or size panner) and may further comprise a mixer.

In embodiments, the rendering unit may be further configured to, for each virtual audio object and for each of the one or more speaker feeds, determine a gain for mapping the respective virtual audio object to the respective speaker feed. The rendering unit may be yet further configured to, for each virtual object and for each of the one or more speaker feeds, scale the respective gain with the weight factor of the respective virtual audio object.

In embodiments, the rendering unit may be further configured to, for each speaker feed, determine a first combined gain depending on the gains of those virtual audio objects that lie within a boundary of the playback environment. The rendering unit may be further configured to, for each speaker feed, determine a second combined gain depending on the gains of those virtual audio objects that lie on said boundary. The rendering unit may be yet further configured to, for each speaker feed, determine a resulting gain for the plurality of virtual audio objects based on the first combined gain, the second combined gain, and a fade-out factor indicative of the relative importance of the first combined gain and the second combined gain.

In embodiments, the rendering unit may be further configured to, for each speaker feed, determine a final gain based on the resulting gain for the plurality of virtual audio objects, a respective gain for the audio object, and a cross-fade factor depending on the three-dimensional extent (e.g., size) of the audio object.

In embodiments, the associated metadata may indicate a first three-dimensional extent (e.g., size) of the audio object in a spherical coordinate system by respective ranges of values for a radius, an azimuth angle, and an elevation angle. The apparatus may further comprise a metadata processing unit (e.g., a metadata pre-processor) configured to determine a second three-dimensional extent (e.g., size) in a Cartesian coordinate system as dimensions of a cuboid that circumscribes the part of a sphere that is defined by said respective ranges of the values for the radius, the azimuth angle, and the elevation angle. The rendering unit may be configured to use the second three-dimensional extent as the three-dimensional extent of the audio object.

In embodiments, the associated metadata may further indicate a measure of a fraction of the audio object that is to be rendered isotropically with respect to an intended listener's position in the playback environment. The apparatus may further comprise a metadata processing unit (e.g., a metadata pre-processor) configured to create an additional audio object at a center of the playback environment and assigning a three-dimensional extent (e.g., size) to the additional audio object such that a three-dimensional volume defined by the three-dimensional extent of the additional audio object fills out the entire playback environment. The metadata processing unit may be further configured to determine respective overall weight factors for the audio object and the additional audio object based on the measure of said fraction. The metadata processing unit may be yet further configured to output the audio object and the additional audio object, weighted by their respective overall weight factors, to the rendering unit for rendering the audio object and the additional audio object to the one or more speaker feeds in accordance with their respective three-dimensional extents. The rendering unit may be configured to obtain each speaker feed by summing respective contributions from the audio object and the additional audio object.

In embodiments, the rendering unit may be further configured to apply decorrelation to the contribution from the additional audio object to the one or more speaker feeds.

According to another aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and apparatus including its preferred embodiments as outlined in the present document may be used stand-alone or in combination with the other methods and systems disclosed in this document. Furthermore, all aspects of the methods and apparatus outlined in the present document may be arbitrarily combined. In particular, the features of the claims may be combined with one another in an arbitrary manner.

DESCRIPTION OF THE DRAWINGS

Example embodiments are explained below with reference to the accompanying drawings, wherein.

DETAILED DESCRIPTION

The present document describes several schemes (methods) and corresponding apparatus for addressing the above issues. These schemes, directed to rendering of audio objects with extent, diffusion, and divergence (e.g., audio objects having extent metadata, diffuseness metadata, and divergence metadata), respectively, may be employed individually or in conjunction with each other.

1. Introduction

1.1 Baseline Renderer Scope

The renderer (e.g., baseline renderer) described in this document may be suitable to (see, e.g., ITU-R Document 6C/511-E (annex 10) to chairman's report for continuation of the RG):

- Be used during production of advanced sound programs
- Be used for monitoring, e.g. content authoring and quality assessment
- Be used, in listening experiments and evaluations, for
  - Making assessment of different audio systems independent of the renderer component
- Be used as a renderer to evaluate other renderers.

Within the itemized scope above, the renderer specifies algorithms for rendering a subset of ADM and is not meant as a complete product. The algorithms and architecture described in the baseline renderer is designed to be easily extended to completely cover the ADM specification. Moreover, the renderer described in this document is not to be understood to be limited to ADM and may likewise be applied to other specifications of object-based audio content.

ADM allows for the grouping of audio elements into programs and can capture multiple programs in a single ADM tree. This ability to capture multiple ways of compositing audio primarily addresses content management aspects for the broadcast ecosystem, and has little influence on how individual elements are rendered. With this in mind the renderer does not address the logic components required to select the input audio to the rendering process, and assumes a production system using the renderer would provide this functionality.

1.2 Spatial Audio Description

The ADM supports several formats to represent a spatial audio description (SAD). In all cases, a fundamental component of the SAD is the means to specify the nominal locations of sounds. This requires establishing a frame of reference.

1.2.1 Frame of Reference

In order to specify locations in a space (e.g., in a playback environment), a frame of reference (FoR) is required. There are many ways to classify reference frames, but one fundamental consideration is the distinction between allocentric (or environmental) and egocentric (observer) reference.

- An egocentric frame of reference encodes an object location relative to the position (location and orientation) of the observer or "self" (e.g., relative to an intended listener's position).
- An allocentric frame of reference encodes an object location using reference locations and directions relative to other objects in the environment.

Figure 1:
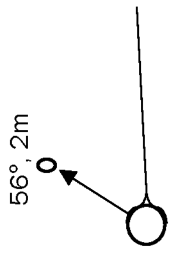
FIG. 1 and FIG. 2 illustrate examples of different frames of references for playback environments.
Figure 2:
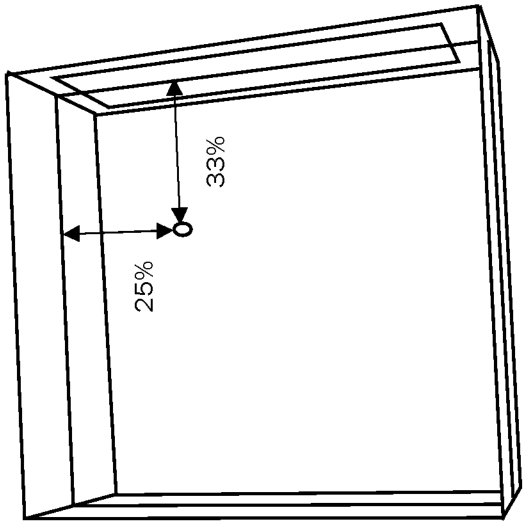

FIG. 1 and FIG. 2 schematically illustrate examples of an egocentric frame of reference and an allocentric frame of reference, respectively. In the illustrated examples, the egocentric location is 560 azimuth and 2 m from the listener. The allocentric location is ¼ of the way from left to right wall, ⅓ of the way from front to back wall.

Figure 3:
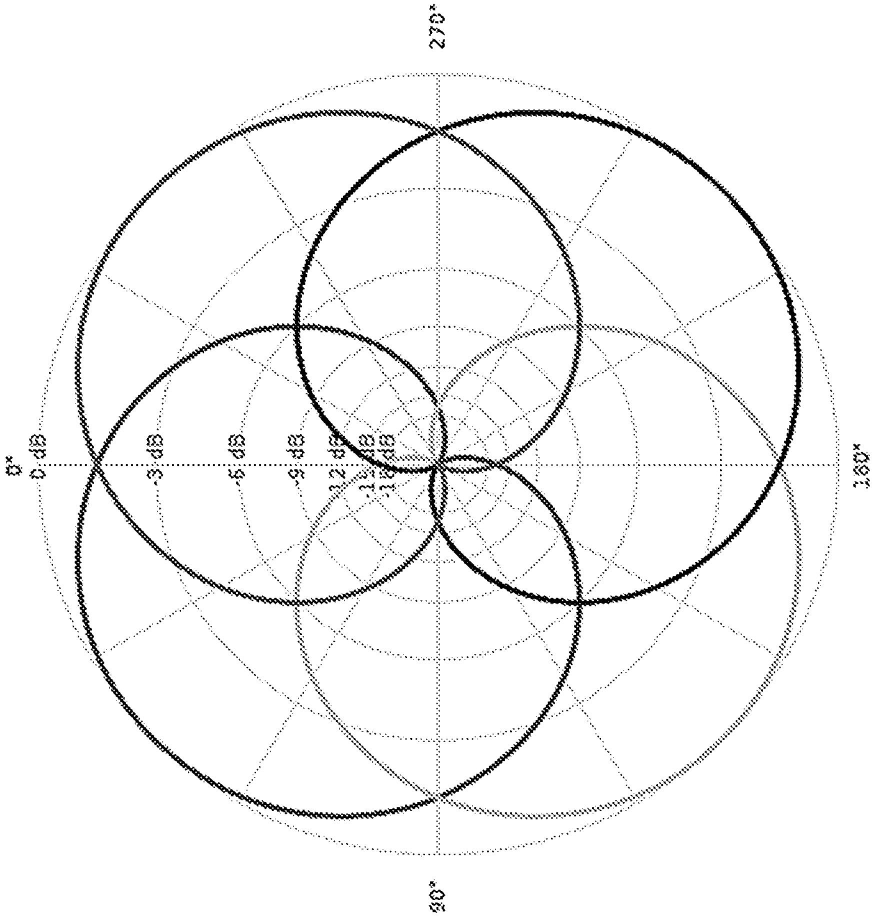
FIG. 3 illustrates an example of a sound field decomposition in a spherical coordinate system.

An egocentric reference is commonly used for the study and description of perception; the underlying physiological and neurological processes of acquisition and coding most directly relate to the egocentric reference. For audio scene description, an egocentric representation is appropriate in scenarios when the sound scene is captured from a single point (such as with an Ambisonics microphone array, or other "scene-based" models), or when the sound scene is intended for a single, isolated listener (such as listening to music over headphones). As suggested in FIG. 1A above, a spherical coordinate system is often well suited for specifying locations when using an egocentric frame of reference. Furthermore, most scene-based spatial audio descriptions are based on a decomposition that utilizes circular or spherical coordinates, as in the example of FIG. 3, which illustrates a simplified single-band in-phase B-format decoder for a square loudspeaker layout. Notably, FIG. 3 illustrates a naive example which does not fulfil the psychoacoustic criteria for Ambisonics decoding. The ADM supports scene-based, egocentric representations and spherical coordinates.

An allocentric reference is well suited for audio scene descriptions that are independent of a single observer position, and when the relationship between elements in the playback environment is of interest. A rectangular or Cartesian coordinate system is often used for specifying locations when using an allocentric frame of reference. The ADM supports specifying location using an allocentric frame of reference, and Cartesian coordinates.

1.2.2 Coordinate Systems

All direct speaker and dynamic object channels are accompanied by metadata (associated metadata) that specifies at least a location.

Spherical coordinates indicate the location of an object, as a direction of arrival, in terms of azimuth and elevation, relative to one listening position. In addition, a (relative) distance parameter (e.g., in the range 0 . . . 1) may be used to place an object at a point between the listener and the boundary of the speaker array.

Cartesian coordinates indicate the location of an object, as a position relative to a normalized listening space, in terms of X, Y and Z coordinates of a unit cube (the "Cartesian cube", defined by $|X|<1$, $|Y|<1$ and $|Z|<1$). The X index corresponds to the left-right dimension; the Y index corresponds to the rear-front dimension; and the Z index corresponds to the down-up dimension. As we will see, the cornerstones for the allocentric model are the corners of the unit cube and the loudspeakers that define these corners.

Note that the use of spherical coordinates, as the means for specifying object locations, does not imply that the loudspeakers in the playback environment must also lie on a sphere. Similarly, the use of Cartesian coordinates, as the means for specifying object locations, does not imply that the loudspeakers in the playback environment must also lie on a rectangular surface. It is safer to assume that different listening environments will contain loudspeakers that are placed so as to satisfy a variety of acoustic, aesthetic and practical constraints.

The ADM supports both egocentric spherical coordinates and allocentric Cartesian coordinates. The panning function defined in section 3.2.1 "Rendering Point Objects" below may be based on Cartesian coordinates to specify the location of audio sources in space. Thus in order to render a scene described using egocentric spherical coordinates, a translation is required. A change of coordinate systems could be achieved using simple trigonometry. However, translation of the frame of reference is more complicated, and requires that the space be "warped" to preserve the artistic intent. In the following sections we provide more details on the allocentric frame of reference used, and the means to translate location metadata.

1.2.3 Mapping from Egocentric Spherical to Allocentric Cartesian Coordinates

For each ITU channel configuration, an allocentric frame of reference is constructed based on key channel locations. That is, the object location is defined relative to landmark channels. This ensures that the relative location of channels and objects remains consistent, and that the most important spatial aspects of an audio program (from the mixer's perspective) are preserved. For example, an object that moves across the front sound stage from "full left" to "full right" will do so in every playback environment.

In defining the mapping function, from spherical to Cartesian, the following principles will generally be adhered to:

1. For any channel configuration with 2 or more speakers, there will always be a channel located at (X,Y,Z)=(−1,1,0) (the front-left corner of the cube) and there will always be a speaker located at (X,Y,Z)=(1,1,0) (the front-right corner of the cube).
2. For any channel configuration with 4 or more speakers in the middle layer, there will always be a speaker located at (X,Y,Z)=(−1,−1,0) (the back-left corner of the cube) and there will always be a channel located at (X,Y,Z)=(1,−1,0) (the back-right corner of the cube).
3. For any channel configuration with 2 or more elevated channels, there will always be a speaker located at (X,Y,Z)=(−1,1,1) (the top-front-left corner of the cube) and there will always be a speaker located at (X,Y,Z)=(1,1,1) (the top-front-right corner of the cube).
4. For any channel configuration with 4 or more elevated speakers, there will always be a speaker located at (X,Y,Z)=(−1,−1,1) (the top-back-left corner of the cube) and there will always be a speaker located at (X,Y,Z)=(1,−1,1) (the top-back-right corner of the cube).
5. For any channel configuration with 2 or more bottom speakers, there will always be a speaker located at (X,Y,Z)=(−1,1,−1) (the bottom-front-left corner of the cube) and there will always be a speaker located at (X,Y,Z)=(1,1,−1) (the bottom-front-right corner of the cube).

These rules ensure that, within each layer (middle, upper and bottom layers) channels are assigned to the extremes of each axis (the corners of the unit cube), with highest priority being given to the front corners of the cube.

1.2.3.1 Reference Rendering Environment

When an audio scene is authored, the author will generally have a specific playback environment in mind. This will generally coincide with the playback environment used by the author during the content-creation process.

The playback environment that is deemed, by the author, to be preferred for playback of the audio file, will be referred to as the reference rendering environment. By inspection of the audioPackFormat in the file, the renderer will, if possible, determine the identity of the reference rendering environment, and in particular, it will determine $Az_{max}$, the largest azimuth angle of all speakers at elevation=0 in the reference rending environment.

Most often, $Az_{max}$ will be equal to 110° or 135° (although it may also be 30°, if the reference rendering environment was Stereo, or 180°, if the reference rendering environment included a rear-center speaker). If the identity of the reference rendering environment can be determined by the renderer, and $Az_{max}$=110°, then we assign the attribute $Flag_{110}$=true. Otherwise, we assign $Flag_{110}$=false.

$Flag_{110}$ is therefore an attribute that, when true, tells us that the author created this audio content in an environment where the rear-most surround channel was located at $Az_{max}$=110° (and this will generally occur when there are 5 channels in the elevation=0 plane).

1.2.3.2 Rules for Mapping Spherical to Cartesian Coordinates

If a dynamic audio object (or direct speaker signal) has its location specified in terms of Spherical Coordinates, a mapping function, $Map_{SC}( )$, will be used to map egocentric spherical coordinates to allocentric Cartesian coordinates as follows:

$$(X,Y,Z)=\mathrm{Map}_{SC}(Az,El,R,\mathrm{Flag}_{110})$$

The following rules are used to define the behavior of this mapping function:

1. An object that is located in Spherical coordinates at (Az,El)=(30°,0°) will be mapped to Cartesian coordinates at (X,Y,Z)=(−1,1,0).
2. If $Flag_{110}$=true,
   An audio object located in Spherical coordinates at (Az,El)=(110°,0°) will be mapped to Cartesian coordinates at (X,Y,Z)=(−1,−1,0). This rule ensures that any sounds that were intended, by the content creator, to be played from the left surround speaker, will play correctly from the rear-most left surround speaker in the playback environment.
   Otherwise (if $Flag_{110}$=false),
   An audio object located in Spherical coordinates at (Az,El)=(135°,0°) will be mapped to Cartesian coordinates at (X,Y,Z)=(−1,−1,0). This rule ensures that any sounds that were intended, by the content creator, to be played from the rear-most left surround speaker, will play correctly from the rear-most left surround speaker in the playback environment.
3. An object that is located in Spherical coordinates at El=30° will be mapped to Cartesian coordinates at Z=1.
4. An object that is located in Spherical coordinates at El=−30° will be mapped to Cartesian coordinates at Z=−1.

The definition of the $Map_{SC}( )$ function can be found in section 3.3.2 "Object and Channel Location Transformations" below.

2. System Overview 2.1 Inputs

Primary inputs to the baseline renderer are:

1. Audio described in accordance to ADM (ITU-R BS.2076-0), contained in a BW64 file in accordance to ITU-R BS.2088-0, and
2. A speaker layout selected from one specified in Recommendation ITU-R BS.2051-0, Advanced sound systems for programme production (Annex 1, ITU-R BS.2051-0). Notably, ITU-R BS.2051-0 Systems A through H may be referred to simply as Systems A through H in the remainder of this document, occasionally omitting the qualifier "ITU-R BS.2051-0".

Additional secondary inputs can be incorporated in the rendering algorithm to modify its behavior:

1. Importance—The renderer importance is used as a threshold for selecting which elements are excluded from the rendering process. The importance is nominally specified as a pair of integer values from 0 to 10 one expressing the importance threshold for audioPacks (referred to simply as <importance>) the second expressed the threshold applied to individual Object elements (<obj_importance>). If only one input value is provided both <importance> and <obj_importance> are set to that value. See section 3.3.9 "Importance" below for details how these importance values are used in the renderer.
2. Screen position—The renderer accepts a screen position defined using the same elements that the audioProgrammeReferenceScreen is specified in ADM, referred to as <playback_screen>. When an audioProgrammeReferenceScreen is present in the content and <playback_screen> is defined the renderer will use these definitions when interpreting the screenEdgeLock and screenRef metadata features. See section 3.3.7 "Screen Scaling" for details of the valid range of screen positions in the baseline rendering algorithm, and how the screenRef metadata is applied. Section 3.3.8 "Screen Edge Lock" below describes the application of the screenEdgeLock flag.
3. Screen Speaker locations—The renderer accepts two speaker locations which are used to define the M+SC and M-SC speaker azimuths (for use in System G).

2.1.1 Limitations and Exclusions on Inputs

The renderer (e.g., baseline renderer) supports a subset of the formats and features specified by ADM. In limiting the ADM input format the focus has been on defining new Object, DirectSpeaker and HOA behavior as these represent the core of the new experiences enabled by ADM. Matrix content and Binaural content are not addressed by the baseline renderer.

Additionally, structures in ADM aimed at supporting the cataloguing and compositing of multiple elements are also set aside in the baseline renderer, in favor of describing the rendering process for the programme elements themselves.

Figure 4:
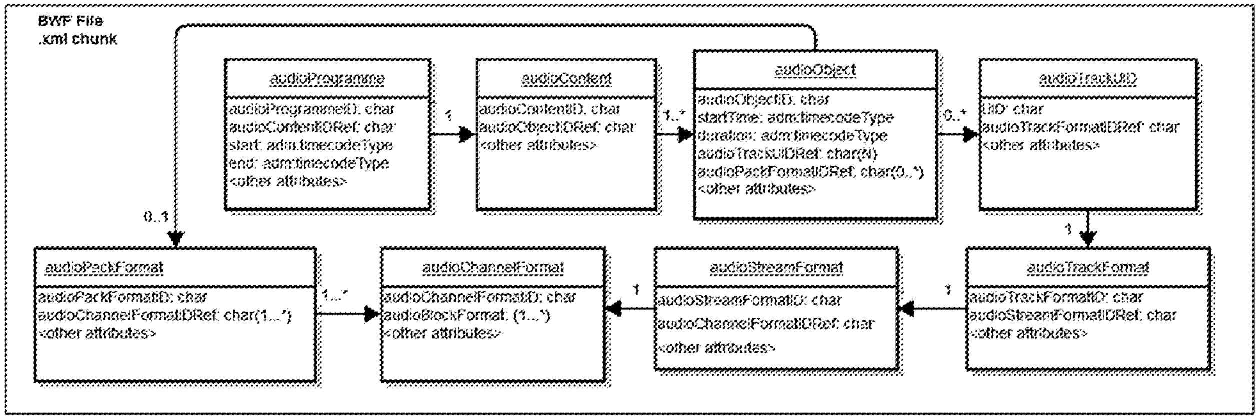
FIG. 4 illustrates an example of an input ADM format.

The ADM input content and format must conform to the reduced UML model illustrated in FIG. 4, which an example of an input ADM format. This subset of the full model is sufficient to express all the features supported in the renderer (e.g., baseline renderer). If the input metadata contains objects and references between objects beyond those depicted in the UML diagram above, such metadata shall be ignored by the renderer.

For simplicity, the renderer will only attempt to parse the first audioPackFormatIDRef that it encounters inside an audioObject. Therefore, it is recommended that an audioObject only reference a single audioPackFormat. The renderer will also assume that audioObjects persist throughout the duration of the audioProgramme (i.e., audioObject start time will be assumed to be 0 and duration attributes shall be ignored). This implies that the list of Track Numbers in the BWF File .chna chunk must be non-repeating, as shown in FIG. 4.

A common audioPackFormat reference in an audioObject instance shall be interpreted by the renderer to indicate the speaker layout that was used during content creation. Only one reference to an audioPackFormat from the common definitions is therefore allowed to exist in the file. However, multiple instances of non-common audioPackFormats may be present.

It is worth noting that, as specified in BS.2076, an audioStreamFormat instance may refer to either an audioPackFormat or audioChannelFormat instance, but not both. However, if an audioStreamFormat instance refers to audioPackFormat, but not audioTrackFormat, the renderer loses the ability to link an audio track to the specific audioChannelFormat instance containing its metadata. Therefore, while audioPackFormat instances may be present in the .xml chunk, they shall not be referenced from audioStreamFormat instances. The renderer shall associate audio tracks to their corresponding audioPackFormat (if any) through the audioPackFormat reference in the .chna chunk.

Finally all audio data is assumed to be presented as un-encoded PCM waveform data for the purpose of describing the rendering algorithms. It is recommended that encoded sources are decoded and aligned as a pre-step to the rendering stage in order to avoid timing complexities introduced when combining decoding and rendering into a single stage of processing.

2.2 Outputs

Figure 5:
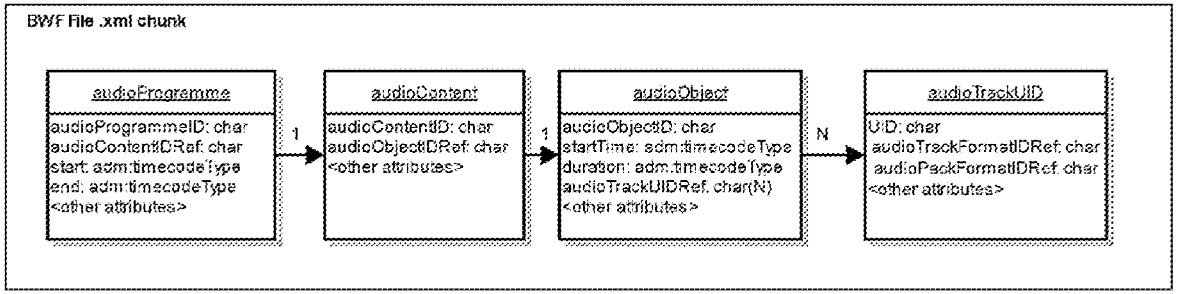
FIG. 5 illustrates an example of an output ADM format.

The output from the renderer (e.g., baseline renderer) may be passed through a B-chain for reproduction in a studio environment. Alternatively, the output could be captured as new ADM content, however before writing to a file the signal overload protection (i.e., peak limiting) which the B-chain would provide in a studio environment may need to be simulated in software. If the output is captured as ADM, it is recommended that it should only contain common audioObjectIDs, matching the waveform information to the BS.2051-0 speaker configuration specified. FIG. 5 illustrates the reduced model which the output of the renderer may conform to as an example of the output ADM format. This output may be ready for presentation to a reproduction system which conforms to what is specified in Recommendation ITU-R BS.1116. It is recommended that reproduction systems used to evaluate rendered ADM content are calibrated to provide level and time alignment within 0.25 dB and 100 μs respectively at the listening position.

2.3 Renderer Architecture

Figure 6:
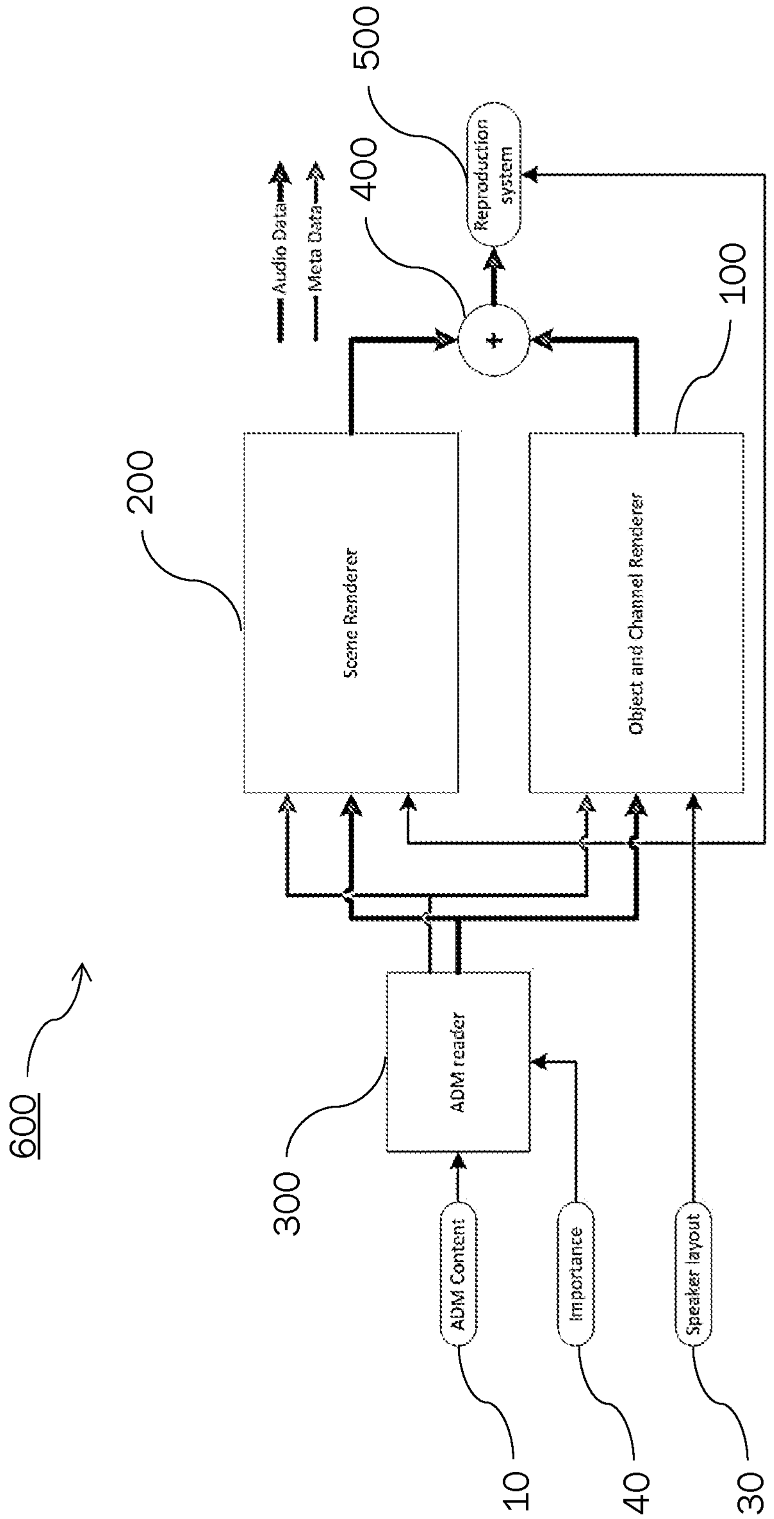
FIG. 6 schematically illustrates an example of an architecture of a renderer according to embodiments of the disclosure.

An example of the system architecture of the renderer (e.g., baseline renderer) 600 is schematically illustrated in FIG. 6.

The renderer 600 is constructed in three major blocks:

ADM reader 300

Scene Renderer 200

Object and Channel Renderer 100

The ADM reader 300 parses ADM content 10 to extract the metadata 25 into an internal representation and aligns the metadata 25 with associated audio data 20 to feed, in blocks, to the rendering engines. The ADM reader 300 also validates the metadata 25 to ensure a consistent and complete set of metadata is present, for example the ADM reader 300 ensures all components of an HOA scene are present before attempting to render the scene.

The scene renderer 200 consumes scene-based channels and renders them to the desired speaker layout. Details of the scene formats supported by the renderer and the rendering methods are detailed in section 4 "Scene Renderer" below.

The object and channel renderer 100 consumes DirectSpeaker channels and Object channels and renders them to the desired speaker layout. Details of the metadata features supported by the baseline renderer and the rendering methods are detailed in section 3 "Channel and Object Renderer" below. The speaker renders created by the two render stages are mixed (summed) at mixing stage 400 and the resulting speaker feeds are passed to the reproduction system 500.

2.4 System Characteristics 2.4.1 Latency

The renderer algorithm (e.g., baseline renderer algorithm) adds no latency to the audio signal path.

When integrated into an environment where metadata is being fed into the renderer through a console, or other control surface, the maximum delay between the time when the metadata is presented to the rendering algorithm, and when its effect is represented on the output may be 64 samples.

The delay incurred between the control surface and the renderer depends on the hardware/software integration encapsulating the baseline renderer, and the delay incurred after the output is updated before it is reproduced by the speakers depends on the latency of the B-chain processing and the software/hardware interfaces linking the system to the speakers. These delays should be minimized when integrating the renderer into a studio environment.

2.4.2 Sampling Rates

The renderer algorithm (e.g., baseline renderer algorithm) described in this document supports ADM content with homogenous sampling rates. It is recommended that content with mixed sampling rates be converted to the highest common sampling rate and aligned as a pre-step to the rendering stage in order to avoid timing complexities introduced when combining sample rate conversion and rendering into a single stage of processing.

2.4.3 Metadata Update Rate

In order to manage the computational and algorithm complexity which would otherwise come with arbitrary metadata update times, all changes to metadata may be applied at 32 sample-spaced boundaries. Updates to the mixing matrices are not limited to the 32 sample boundaries and may be updated on a per-sample basis-section 3.4 "Ramping Mixer" below details how the mixing matrices may be updated and applied in the channel and object renderer.

3. Channel and Object Renderer 3.1 Architecture

Figure 7:
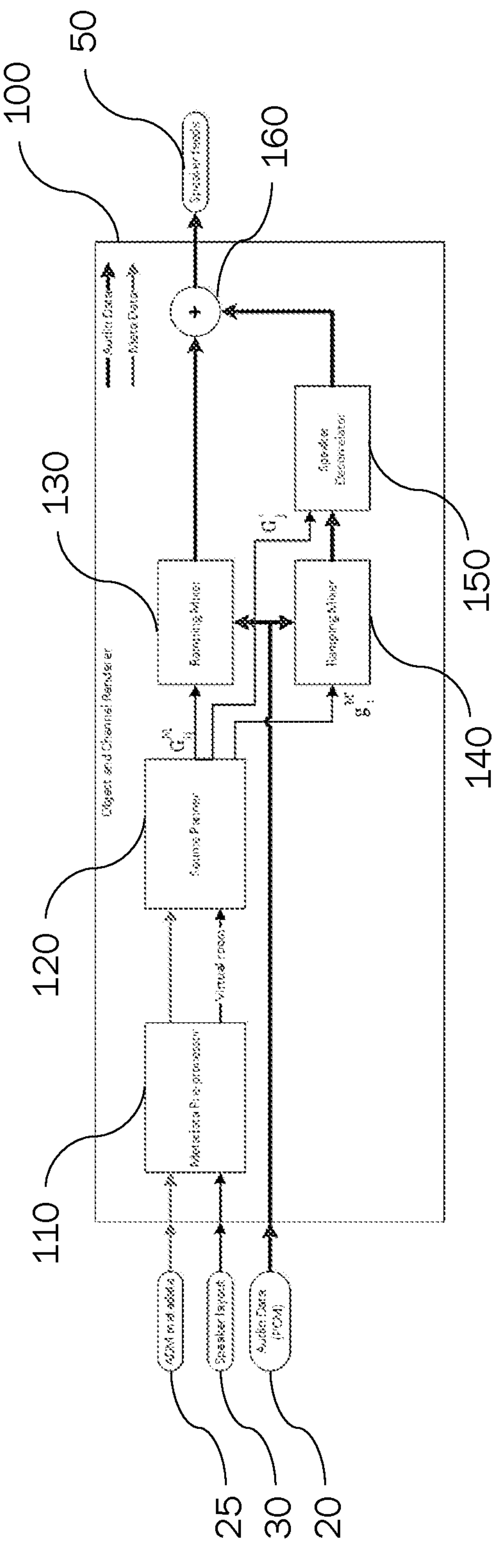
FIG. 7 schematically illustrates an example of an architecture of an object and channel renderer of the renderer according to embodiments of the disclosure.

An example of the system architecture of the object and channel renderer (embodying an example of an apparatus for rendering input audio for playback in a playback environment) 100 is schematically illustrated in FIG. 7. The object and channel renderer 100 comprises a metadata pre-processor (embodying an example of a metadata processing unit) 110, a source panner 120, a ramping mixer 130, a diffuse ramping mixer 140, a speaker decorrelator 150, and a mixing stage 160. The object and channel renderer 100 may receive metadata (e.g., ADM metadata) 25, audio data (e.g., PCM audio data) 20, and optionally a speaker layout 30 of the reproduction environment as inputs. The object and channel renderer 100 may output one or more speaker feeds 50.

The metadata pre-processor 110 converts existing direct speaker and dynamic object metadata, implementing the channelLock, divergence and screenEdgeLock features. It also takes the speaker layout 30 and implements the zoneExclusion metadata features to create a virtual room.

The Source Panner 120 takes the new virtual source metadata, and virtual room metadata and pans the sources to create speaker gains, and diffuse speaker gains. The source panner 120 may implement the extent and diffuseness features respectively described in section 3.2.2 "Rendering Object Locations with Extents" and section 3.2.5 "Diffuse" below.

The Ramping Mixer 130 mixes the audio data 20 with the speaker gains to create the speaker feeds 50. The ramping mixer 130 may implement the jumpPosition feature. There are two ramping mixer paths. The first path implements the direct speaker feeds, while the second path implements the diffuse speaker feeds.

In the case of the Diffuse Ramping Mixer 140, the per-object gains are speaker independent, so the diffuse ramping mixer 140 produces a mono downmix. This downmix feeds the Speaker Decorrelator 150 where the diffuse speaker dependent gains are applied. Finally the two paths are mixed together at the mixing stage 160 to produce the final speaker feeds.

The source panner 120 and the ramping mixer(s) 130, 140, and optionally the speaker decorrelator 150 may be said to form a rendering unit.

3.2 Source Panning

Figure 8:
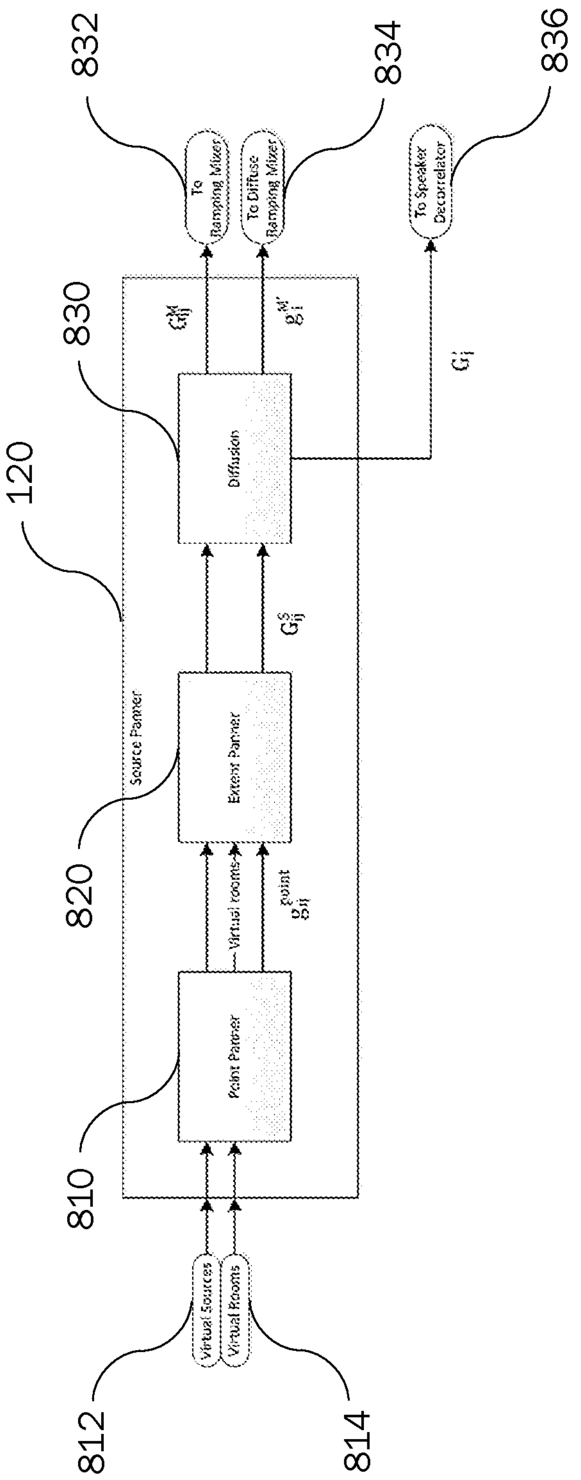
FIG. 8 schematically illustrates an example of an architecture of source panner of the object and channel renderer.

An example of the system architecture of the source panner 120 is schematically illustrated in FIG. 8. The source panner 120 comprises a point panner 810, an extent panner (size panner) 820 and a diffusion block (diffusion unit) 830. The source panner 120 may receive the virtual sources 812 and virtual rooms 814 as inputs. Outputs 832, 834, 836 of the source panner 120 may be provided to the ramping mixer 130, the diffuse ramping mixer 140, and the speaker decorrelator 150, respectively.

In more detail, the source panner 120 receives the pre-processed objects, and virtual room metadata from the metadata pre-processor 110, and first pans them to speaker gains, assuming no extent or diffusion using the point panner 810. The resulting speaker gains are then processed by the extent panner 820, adding source extent and producing a new set of speaker gains. Finally these speaker gains pass to the diffusion block 830. The diffusion block 830 maps these gains to speaker gains for the ramping mixer 130, the diffuse ramping mixer 140 and the speaker decorrelator 150.

3.2.1 Rendering Point Objects

The purpose of the point panner 810 is to calculate a gain coefficient for each speaker in the output speaker layout, given an object position. The point panning algorithm may consist of a 3D extension of the 'dual-balance' panner concept that is widely used in 5.1- and 7.1-channel surround sound production. One of the main requirements of the point panner 810 is that it is able to create the impression of an auditory event at any point inside the room. The advantage of using this approach is that it provides a logical extension to the current surround sound production tools used today.

The inputs to the point panner 810 comprise (e.g., consist of) an object's position $[p_{ox},p_{oy},p_{oz}]$ and the positions of the output speakers, all in Cartesian coordinates, for example. Let $[p_{sx}(\ ),p_{sy}(j),p_{sz}(j)]$ denote the position of the j-th speaker. Let N denote the number of speakers in the layout.

With regards to speaker layout, the point panner 810 requires that the following conditions are satisfied in order to be able to accurately place a phantom image of the object anywhere in the room (i.e., in the playback environment):

The speakers must be grouped into one or more discrete planes in the z-dimension.

The speakers on each plane must be grouped into one or more discrete rows in the y-dimension.

There must be two or more speakers on every row and there must be speakers at x=1 and x=−1.

Every speaker location must lie on the surface of the room cube, that is, either on the floor, ceiling, or walls.

The coordinate transformations described in section 3.3.2 "Object and Channel Location Transformations" below result in mapping all the ITU-R BS.2051 speaker layouts of interest to meet these requirements—the resulting speaker locations are set out in Appendix A.

The point panner 810 works with any number of speaker planes, but for simplicity and without loss of generality, the algorithm will be described using an output layout consisting of three speaker planes: the bottom or floor speaker plane at z=−1, the middle plane at z=0, and the upper or ceiling plane at z=1.

Step 1: Determine the two planes that will be used to pan the object.

```
/* assumptions: -1<=p_oz<=1 */
if (p_oz<0)
{
z(1)=-1;
z(2)=0;
} else if (p_oz>=0) {
z(1)=0;
z(2)=1;
}
```

Step 2: Group speakers by plane, applying the object's zone exclusion mask (see section 3.3.3 "Zone Exclusion" below).

Let j={1, 2, . . . , N} be the set of speaker indices.

Construct a set of speaker indices for each plane:

For i=1 to 2

$$k_i=\{j:p_{sz}(j)=z(i)\,\hat{}\,\text{mask}_o(j)=1\}$$

Step 3: For each plane i, find the speakers lying in rows just in front of the object and just behind the object.

For i=1 to 2

$$k_i^+=\{k_i:p_{sy}(k_i)-p_{oy}\geq 0\}$$

$$k_i^-=\{k_i:p_{sy}(k_i)-p_{oy}<0\}$$

$$r_i^+=\{\arg\min_{k_i^+}(p_{sy}(k_i^+)-p_{oy})\}$$

$$r_i^-=\{\arg\max_{k_i^-}(p_{sy}(k_i^-)-p_{oy})\}$$

Observe that for each plane i, $|r_i^+|+|r_i^-|$ is either 1 or 2. In other words, an object is either between two rows of speakers, exactly over a row of speakers, or between one row of speakers and a wall.

Step 4: For each row found in step 3, find the closest speakers to the left and right of the object.

For i=1 to 2

$$idx(i,1)=\arg\min_{r_i^+}(p_{sx}(\{r_i^+: p_{sx}(r_i^+)-p_{ox}\geq 0\})-p_{ox})$$

$$idx(i,2)=\arg\max_{r_i^+}(p_{sx}(\{r_i^+: p_{sx}(r_i^+)-p_{ox}<0\})-p_{ox})$$

$$idx(i,3)=\arg\min_{r_i^-}(p_{sx}(\{r_i^-:p_{sx}(r_i^-)-p_{ox}\geq 0))-p_{ox})$$

$$idx(i,4)=\arg\max_{r_i^-}(p_{sx}(\{r_i^-:p_{sx}(r_i^-)-p_{ox}<0\})-p_{ox})$$

Observe that $1\leq\Sigma_n|idx(i,n)|\leq 4$, meaning that for each speaker plane, at most four speakers will be selected for panning.

Step 5: Compute the gains G(j) for each speaker j.

```
/* initialise gain for each speaker */
for j=1 to N
{
G(j)=0.0
}
/* for each plane */
for i=1 to 2
{
z_this=z(i)
z_other=z(2-i+1)
Gz=cos((p_oz-z_this)/(z_other-z_this)*pi/2)
/* for each active speaker */
for m=1 to 4
{
  if not_empty(idx(i, m))
  {
    x_this=p_sx(idx(i,m))
    /* index to speaker on other side of object */
    m_other=m+1-2* mod(m-1, 2)
    if not_empty(idx(i,m_other))
    {
      x_other=p_sx(idx(i,m_other))
      Gx=cos((p_ox-x_this)/(x_other-x_this)
        *pi/2
    }
    else
    {
      Gx=1.0
    }
    y_this=p_sy(idx(i,m))
/* index to speaker on the other row */
    m_other=1+mod(m+1, 4)
    if not_empty(idx(i,m_other))
    {
      y_other=p_sy(idx(i,m_other))
      Gy=cos((p_oy-y_this)/(y_other-y_this)
        *pi/2
    }
    else
    {
      Gy=1.0
    }
    g^point(idx,i,m))=Gx*Gy*Gz
  }
}
}
```

It is worth noting that the sum of the squares of the speaker gains will always be 1, i.e., the panning operation is energy preserving.

3.2.2 Rendering Object Locations with Extents

The purpose of the extent panner 820 is to calculate a gain coefficient for each speaker in the output speaker layout, given an object position and object extent (e.g., object size). The intention of extent (e.g., size) is to make the object appear larger so that when the extent is at the maximum the object fills the room, while when it is set to zero the object is rendered as a point object.

To achieve this, the extent panner 820 considers a grid (e.g., a three-dimensional rectangular grid) of many virtual sources in the room. Each virtual source fires speakers exactly in the same way any object rendered with the point panner 810 would. The extent panner 820, when given an object position and object extent, determines which (and how many) of those virtual sources will contribute. That is, candidates for the contributing virtual sources may be arranged in a grid (e.g., a three-dimensional rectangular grid) across the playback environment (e.g., room).

3.2.2.1 Algorithm Overview

Figure 24:
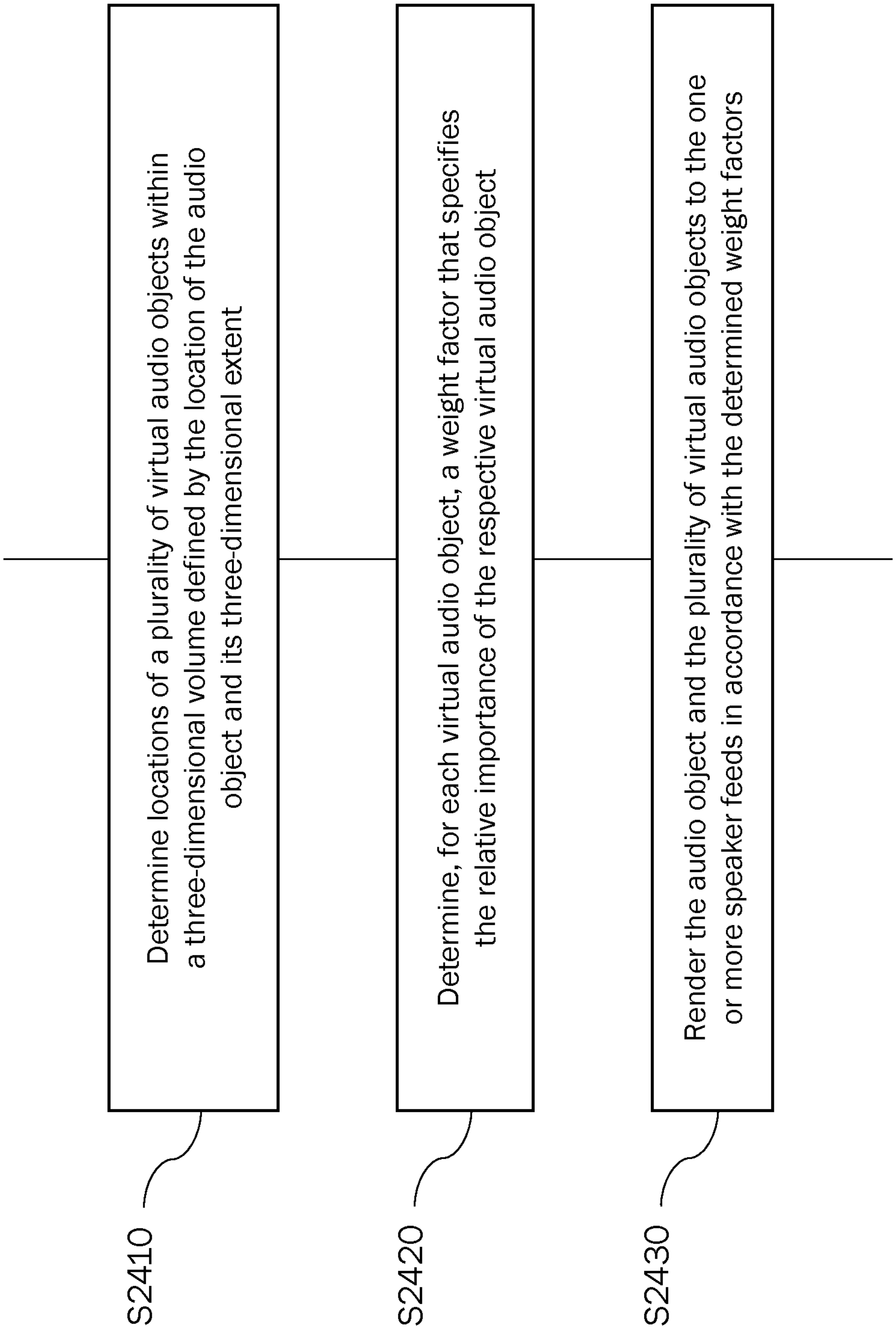
FIG. 24 is a flowchart schematically illustrating a method (e.g., algorithm) for rendering audio objects with extent according to embodiments of the disclosure.

FIG. 24 is a flowchart schematically illustrating an example of a method (e.g., algorithm) for rendering object locations with extents as an example for a method of rendering input audio for playback in a playback environment. The input audio includes at least one audio object and associated metadata. The associated metadata indicates (e.g., specifies) at least a location (e.g., position) of the at least one audio object and a three-dimensional extent (e.g., size) of the at least one audio object. The method comprises rendering the audio object to one or more speaker feeds in accordance with its three-dimensional extent. This may be achieved by the following steps:

At step S2410, locations of a plurality of virtual audio objects (virtual sources) within a three-dimensional volume defined by the location of the audio object and its three-dimensional extent are determined. Determining said locations may involve imposing a respective minimum extent for the audio object in each of the three dimensions (e.g., {x,y,z} or {θ,φ,r}). Further, said determining may involve selecting a subset of locations of (active) virtual audio objects among a predetermined set of fixed potential locations of virtual audio objects in the reproduction environment. The fixed potential positions may be arranged in a three-dimensional grid, as explained below. At step S2420, a weight factor is determined for each virtual audio object that specifies the relative importance (e.g., relative weight) of the respective virtual audio object. Notably, the "relative importance" dealt with in this section is not to be confused with the metadata feature relating to <importance> and <obj_importance> described in section 3.3.9 "Importance" below. At step S2430, the audio object and the plurality of virtual audio objects are rendered to the one or more speaker feeds in accordance with the determined weight factors. Performing step S2430 results in a gain coefficient for each of the one or more speaker feeds that may be applied to (e.g., mixed with) the audio data for the audio object. The audio data for the audio object may be the audio data (e.g., audio signal) of the original audio object. Step S2430 may comprise the following further steps:

Step 1: Calculate point gains for all virtual sources

Step 2: Combine all the gains from virtual sources within the room to produce inside extent gains (e.g., inside size gains).

Step 3: Combine all the gains from virtual sources on the boundaries of the room to produce boundary extent gains (e.g., boundary size gains).

Step 4: Combine the inside and boundary extent gains to produce the final extent gains (e.g., final size gains).

Step 5: Combine the final extent gains with the gains (e.g., point gains) for the object (e.g., the gains for the object that would result when assuming zero extent for the object).

An apparatus (rendering apparatus, renderer) for rendering input audio for playback in a playback environment (e.g., for performing the method of FIG. 24) may comprise a rendering unit. The rendering unit may comprise a panning unit and a mixer (e.g., the source panner 120 and either or both of the ramping mixer(s) 130, 140). Step S2410, step S2420 and step S2430 may be performed by the rendering unit.

Figure 25:
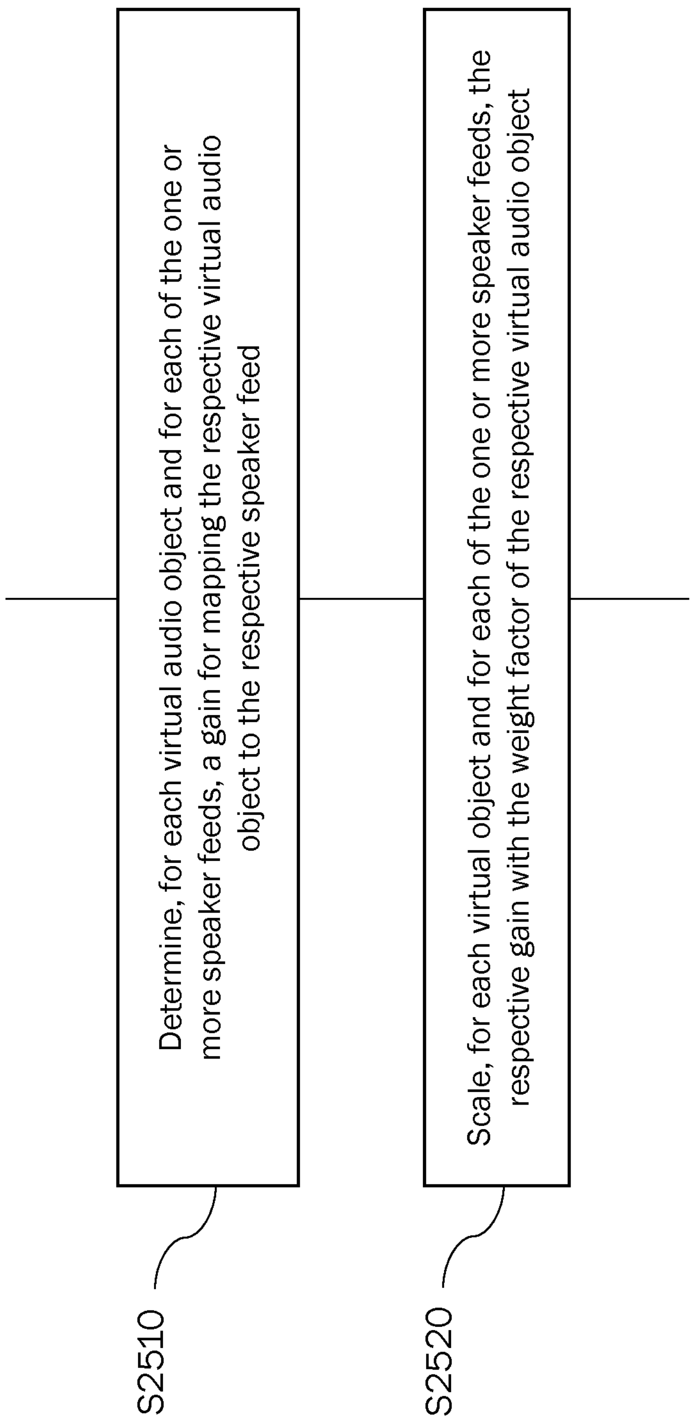
FIG. 25 and FIG. 26 are flowcharts schematically illustrating details of the method of FIG. 24.
Figure 26:
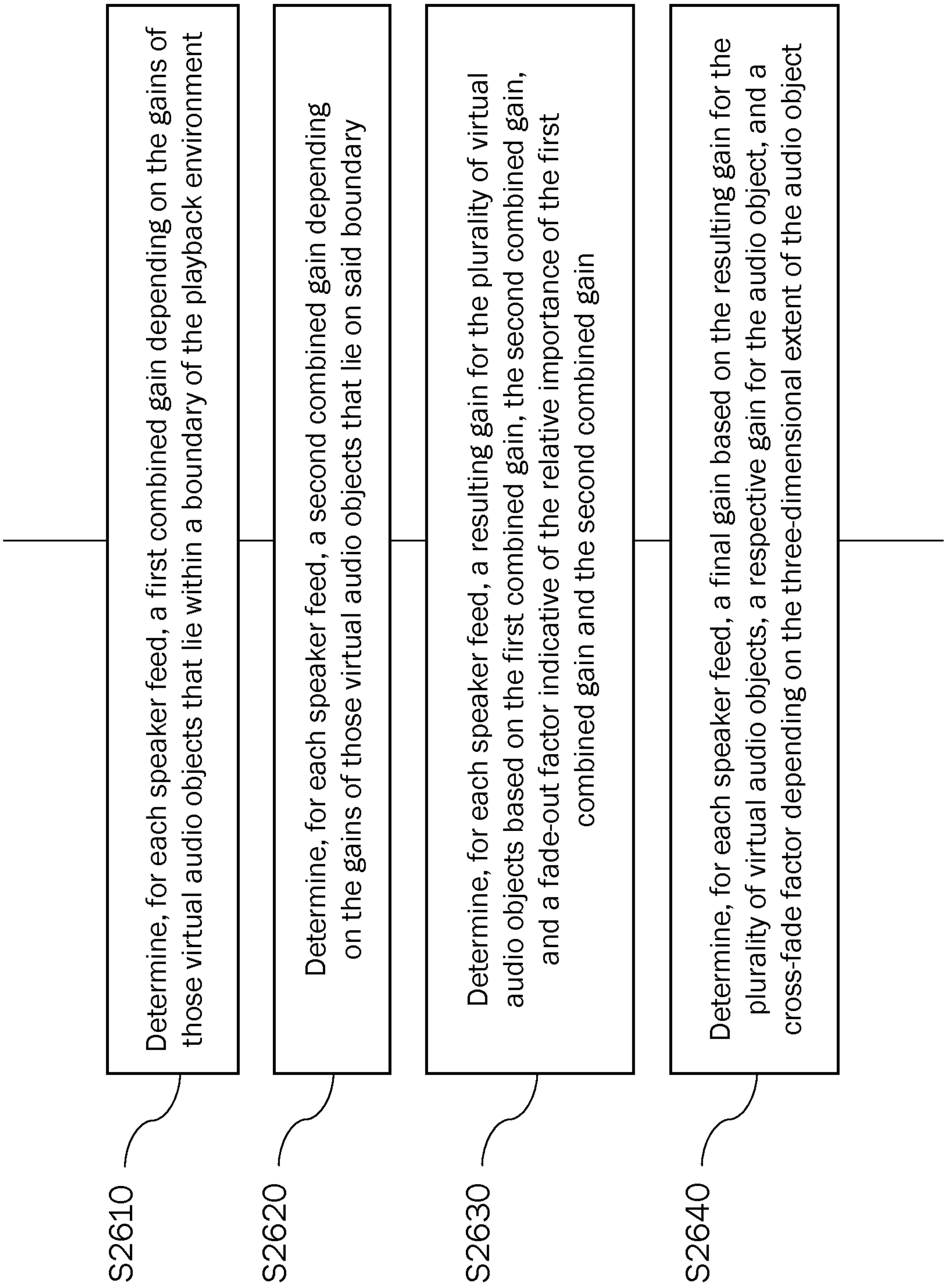

In general, the method may comprise steps S2510 and S2520 illustrated in the flowchart of FIG. 25 and steps S2610 to S2640 illustrated in the flowchart of FIG. 26. Said steps may be said to be sub-steps of step S2430. Accordingly, steps S2510 and S2520 as well as steps S2610 to S2640 may be performed by the aforementioned rendering unit.

At step S2510, a gain is determined, for each virtual audio object and for each of the one or more speaker feeds, for mapping the respective virtual audio object to the respective speaker feed. These gains may be the point gains referred to above. At step S2520, respective gains determined at step S2510 are scaled, for each virtual object and for each of the one or more speaker feeds, with the weight factor of the respective virtual audio object.

At step S2610, a first combined gain is determined for each speaker feed depending on the gains of those virtual audio objects that lie within a boundary of the playback environment (e.g., room). The first combined gains determined at step S2610 may be the inside extent gains (one for each speaker feed) referred to above. At step S2620, a second combined gain is determined for each speaker feed depending on the gains of those virtual audio objects that lie on said boundary. The second combined gains determined at step S2620 may be the boundary extent gains (one for each speaker feed) referred to above. Then, at step S2630, a resulting gain for the plurality of virtual audio objects is determined for each speaker feed based on the first combined gain, the second combined gain, and a fade-out factor indicative of the relative importance of the first combined gain and the second combined gain. The resulting gains determined at step S2630 may be the final extent gains (one for each speaker feed) referred to above. The fade-out factor may depend on the three-dimensional extent of the audio object and the location of the audio object. For example, the fade-out factor may depend on a fraction of the overall extent of the audio object that is within the boundary of the playback environment (e.g., the fraction of the overall three-dimensional volume of the audio object that is that is within the boundary of the playback environment). The first and second combined gains may be normalized before performing step S2630. Finally, at step S2640, a final gain is determined for each speaker feed based on the resulting gain for the plurality of virtual audio objects, a respective gain for the audio object, and a cross-fade factor depending on the three-dimensional extent of the audio object. This may relate to combining the final extent gains with the point gains for the object.

3.2.2.2 Algorithm Detail

Next, details of the algorithm described with reference to FIG. 24, FIG. 25, and FIG. 26 will be described.

Figure 9:
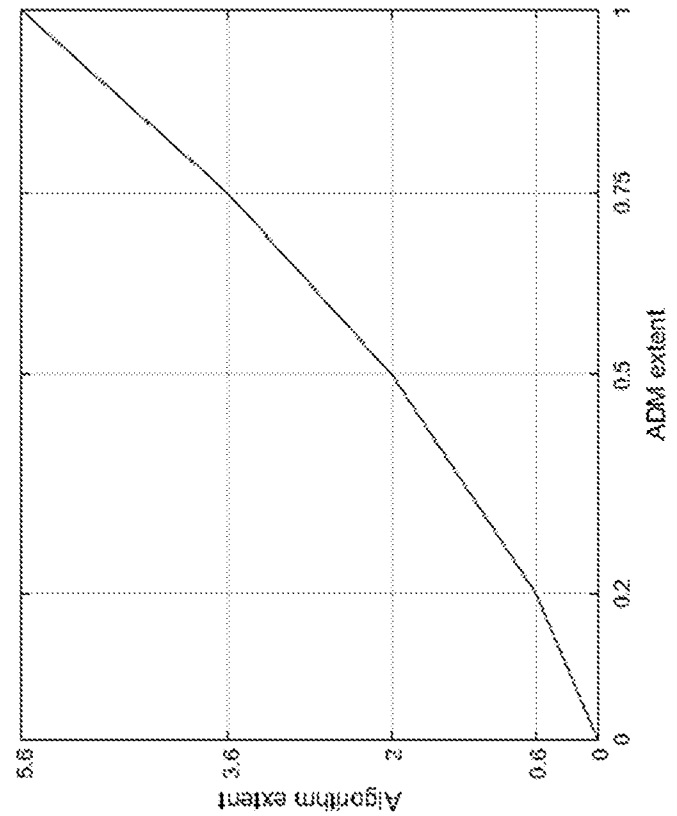
FIG. 9 illustrates an example of a piece-wise linear mapping between extent values.

As a first step, which is an optional step, the extent value (e.g., size value) may be scaled up to a larger range. That is, the first step may be to scale up the ADM extent value to a larger range. The user is exposed to extent values $s \in [0,1]$, which may be mapped into the actual extent used by the algorithm to the range [0,5.6]. The mapping may be done by a piecewise linear function, for example a piecewise linear function defined by the value pairs (0, 0), (0.2, 0.6), (0.5, 2.0), (0.75, 3.6), (1, 5.6), as shown in FIG. 9. The maximum value of 5.6 ensures that when extent is set to maximum, it truly occupies the whole room. In what follows, the variables $\hat{s_x}$, $\hat{s_y}$, $\hat{s_z}$, refer to the extent values after conversion. Notably, each of the three dimensions of the extent may be independently controlled when employing the presently described method.

To maintain desired behavior, extent should only be applied if $$\hat{s_x} \geq \frac{2}{N_X - 1} \wedge \hat{s_y} \geq \frac{2}{N_y - 1} \wedge \hat{s_z} \geq \frac{2}{N_z - 1}.$$

Accordingly, the renderer may clip (i.e., increase) small, non-zero extent values to respective minimum values as needed. That is, determining said locations at step S2410 may involve imposing a respective minimum extent for the audio object in each of the three dimensions (e.g., {x,y,z} or {θ,φ,r}). For example, minimum values may be enforced on $\hat{s}_x$, $\hat{s}_y$, $\hat{s}_z$ $$s_x = \max\left(\hat{s}_x, \frac{2}{N_x - 1}\right), s_y = \max\left(\hat{s}_y, \frac{2}{N_y - 1}\right),$$

$$s_z = \max\left(\hat{s}_z, \frac{2}{N_z - 1}\right).$$

These restricted values $s_x$, $s_y$, $s_z$ may be used throughout the algorithm, except for the computation of effective size $s_{eff}$ below, which uses the unrestricted values $\hat{s}_x$, $\hat{s}_y$, $\hat{s}_z$.

The grid of virtual sources referred to in step S2410 may be defined as a static rectangular uniform grid of $N_x \times N_y \times N_z$ points. The grid may span the range of positions [−1, 1] in each dimension. That is, the grid may span the entire reproduction environment (e.g., room). The density may be set in a manner that includes a few sources between loudspeakers in a typical layout. Empirical testing showed that $N_x=N_y=20$, $N_z=8$ or $N_x=N_y=20$, $N_z=16$ created an appropriate grid of virtual sources. For loudspeaker layouts where there are no bottom layer loudspeakers (all layouts except Systems E and H), the range of virtual sources in the z dimension may be limited to [0, 1], and the recommended value of $N_z$ is 8. The notation ($x_s$, $y_s$, $z_s$) will be used to denote the possible coordinates of the virtual sources. Each virtual source creates a set of gains $g_j^{point}(x_s,y_s,z_s)$ to each speaker j=1, . . . , $N_j$ of the layout (i.e., each speaker in the reproduction environment).

The object position and extent ($x_o,y_o,z_o,s_x,s_y,s_z$) may be used to calculate a set of weights that determine how much each virtual source will contribute to the final gains. Accordingly, the set of weights may be determined based on the object position (location) and extent. This calculation may be performed at step S2420. For loudspeaker layouts where there are no loudspeakers in the bottom layer (e.g., all loudspeaker layouts listed in ITU-R BS.2051-0, except for System E and System H), the extent algorithm may use $z_o=\max(p_{oz}, 0)$ as the object's position in the z dimension. Otherwise, $z_o=p_{oz}$. For all loudspeaker layouts, the extent algorithm may use the same x and y position as the point source panner (i.e., $y_o=p_{oy}$, $x_o=p_{ox}$). The weights for each virtual source are denoted $w(x_s,y_s,z_s,x_o,y_o,z_o,s_x,s_y,s_z)$ and may be used to scale the gains (e.g., point gains) for each virtual source at step S2520. The gains (e.g., point gains) may have been determined at step S2510. Virtual sources with zero weight may be considered as not having been selected at step S2410, i.e., their locations are not among the locations determined at step S2410.

After being weighted, all the virtual source gains are summed together at step S2610 which produces the inside extent gains (first combined gains):

$$g_j^{inside}(x_o, y_o, z_o, s_{xr}, s_y, s_z) = \sum_{x_s,y_s,z_s} w(x_s, y_s, z_s, x_o, y_o, z_o, s_x, s_y, s_z) \times g_j^{point}(x_s, y_s, z_s)$$

where index j indicates respective speaker feeds.

However, the extent algorithm may alternatively combine virtual source gains in a way that varies depending on the extent of the object. In general, this can be described as:

$$g_j^{inside}(x_o, y_o, z_o, s_{xr}, s_y, s_z) = \left[\sum_{x_s,y_s,z_s} \left[w(x_s, y_s, z_s, x_o, y_o, z_o, s_x, s_y, s_z) \times g_j^{point}(x_s, y_s, z_s)\right]^p\right]^{\frac{1}{p}}$$

The extent-dependent exponent p controls the smoothness of the gains across loudspeakers. It ensures homogeneous growth of the object at small extent value s, and correct energy distribution across all directions at large extent value s. The extent-dependent exponent p may be determined (e.g., calculated) as follows: First sort {$\hat{s}_x$, $\hat{s}_y$, $\hat{s}_z$} in descending order, and label the resulting ordered triad as {$s_1$,$s_2$,$s_3$}. The triad can then be combined to give an effective extent (e.g., effective size), for example via:

$$s_{eff} = \frac{6}{9}s_1 + \frac{2}{9}s_2 + \frac{1}{9}s_3$$

For layouts with a single plane of loudspeakers, such as ITU-R BS.2051-0 System B, first sort, {$\hat{s}_x$, $\hat{s}_y$} in descending order, and label the resulting ordered pair as {$s_1$,$s_2$}. The effective $\hat{s}_y$ extent in this case is for example given by:

$$s_{eff} = \frac{3}{4}s_1 + \frac{1}{4}s_2.$$

For loudspeaker layouts with only two loudspeakers, such as ITU-R BS.2051-0 System A, $s_{eff}=\hat{s}_x$, for example.

The effective extent may then be used to calculate a piecewise defined exponent, for example via:

$$p = 6 \quad \text{if } s_{eff} \le 1.0$$

$$p = 6 + \frac{s_{eff} - 1.0}{s_{max} - 1.0}(-4), \quad \text{if } s_{eff} > 1.0$$

where $s_{max}$=5.6, such that when s is at its maximum, p=2.

In the above, some simplifications can be made. The first is that gains (e.g., point gains) can be separated into gains in each axis (i.e., one for each of the x axis, y axis, and z axis), for example via:

$$g_j^{point}(x,y,z)=g_j^{point}(x)\times g_j^{point}(y)\times g_j^{point}(z)$$

The weight function can also treat each axis separately and the whole extent computation simplifies. For example, the weight functions can be separated via:

$$w(x_s,y_s,z_s,x_o,y_o,z_o,s_x,s_y,s_z)=w(x_s,x_o,s_x)w(y_s,y_o,s_y)w(z_s,z_o,s_z)$$

The chosen weight functions may look like something between circles and squares (or spheres and cubes, in 3D). For example, the weight functions may be given by:

$$w(x_s, x_o, s_x) = 10^{-\left[\frac{3}{2}\left(\frac{x_s - x_o}{s_x}\right)\right]^4}$$

$$w(y_s, y_o, s_y) = 10^{-\left[\frac{3}{2}\left(\frac{y_s - y_o}{s_y}\right)\right]^4}$$

$$w(z_s, z_o, s_z) = 10^{-\left[\frac{3}{2}\left(\frac{z_s - z_o}{s_z}\right)\right]^4}$$

Using the above simplifications, the inside extent gains $g_j^{inside}$ (first combined gains) can be simplified to $$g_j^{inside}(x_o,y_o,z_o,s_x,s_y,s_z)=f_j^x(x_o,s_x)f_j^y(y_o,s_y)f_j^z(z_o,s_z)$$

where $$f_j^x(x_o, s_x) = \sum_{x_s}\left[g_j^{point}(x_s)w(x_s, x_o, s_x)\right]^p$$

$$f_j^y(y_o, s_y) = \sum_{y_s}\left[g_j^{point}(y_s)w(y_s, y_o, s_y)\right]^p$$

$$f_j^z(z_o, s_z) = \sum_{z_s}\left[g_j^{point}(z_s)w(z_s, z_o, s_z)\right]^p$$

For layouts with a single plane of loudspeakers, such as ITU-R BS.2051-0 System B, $f_j^z(z_o,s_z)=1$ may be used. For loudspeaker layouts with only two loudspeakers, such as ITU-R BS.2051-0 System A, $f_j^y(y_o,s_y)=f_j^z(z_o,s_z)=1$ may be used.

Further, a normalization step may be applied to $g_j^{inside}$ i.e., the first combined gains may be normalized. For example, said normalization may be performed according to:

$$g_j^{\sim inside} = \frac{g_j^{inside}}{\sqrt{\sum_n\left[g_n^{inside}\right]^2}}, \quad \text{if } \sqrt{\sum_n\left[g_n^{inside}\right]^2} > tol$$

$$g_j^{\sim inside} = \frac{g_j^{inside}}{tol}, \quad \text{otherwise,}$$

where indices j and n indicate respective speaker feeds, and tol is a small number preventing division by zero, e.g., $tol=10^{-5}$.

One further modification that may be made is that, for aesthetic reasons, it is important to have a mode where there is no opposite loudspeaker firing. This is accomplished by using virtual sources located only on the boundary. To handle certain loudspeaker layouts as special cases, we set dim=1 for ITU-R BS.2051-0 System A, dim=2 for System B, dim=4 for Systems E and H, and dim=3 otherwise in the calculations below.

Accordingly, at step S2620 boundary extent gains $g_j^{bound}$ (second combined gains) may be determined depending on the gains of those virtual sources that lie on the boundary of the reproduction environment (e.g., room). For example, the boundary extent gains may be determined via:

$$g_j^{bound}(x_o,y_o,z_o,s_x,s_y,s_z)=b_j^{floor}(z_o,s_z)f_j^x(x_o,s_x)f_j^y(y_o,s_y)+b_j^{ceil}(z_o,s_z)f_j^x(x_o,s_x)f_j^y(y_o,s_y)+b_j^{left}(x_o,s_x)f_j^y(y_o,s_y)f_j^z(z_o,s_z)+b_j^{right}(x_o,s_x)f_j^y(y_o,s_y)f_j^z(z_o,s_z)+b_j^{front}(y_o,s_y)f_j^x(x_o,s_x)f_j^z(z_o,s_z)+b_j^{back}(y_o,s_y)f_j^x(x_o,s_x)f_j^z(z_o,s_z)$$

where $$b_j^{floor}(z_o, s_z) = \begin{cases}\left[g_j^{point}(z_s=-1.0)w(z_s=-1.0, z_o, s_z)\right]^p, & \text{if dim} = 4\\ 0 & \text{otherwise}\end{cases}$$

$$b_j^{ceil}(z_o, s_z) = \begin{cases}\left[g_j^{point}(z_s=1.0)w(z_s=1.0, z_o, s_z)\right]^p, & \text{if dim} \geq 3\\ 0, & \text{otherwise}\end{cases}$$

$$b_j^{left}(x_o, s_x) = \left[g_j^{point}(x_s=-1.0)w(x_s=-1.0, x_o, s_x)\right]^p$$

$$b_j^{right}(x_o, s_x) = \left[g_j^{point}(x_s=1.0)w(x_s=1.0, x_o, s_x)\right]^p$$

$$b_j^{front}(y_o, s_y) = \begin{cases}\left[g_j^{point}(y_s=-1.0)w(y_s=1.0, y_o, s_y)\right]^p, & \text{if dim} > 1\\ 0, & \text{otherwise}\end{cases}$$

-continued $$b_j^{back}(y_o, s_y) = \begin{cases}\left[g_j^{point}(y_s=-1.0)w(y_s=-1.0, y_o, s_y)\right]^p, & \text{if dim} > 1\\ 0, & \text{otherwise}\end{cases}$$

Further, a normalization step may be applied to the boundary extent gains $g_j^{bound}$, i.e., the second combined gains may be normalized. For example, said normalization may be performed according to:

$$g_j^{\sim bound} = \frac{g_j^{bound}}{\sqrt{\sum_n\left[g_n^{bound}\right]^2}}, \quad \text{if } \sqrt{\sum_n\left[g_n^{bound}\right]^2} > tol$$

$$g_j^{\sim bound} = \frac{g_j^{bound}}{tol}, \quad \text{otherwise.}$$

The boundary extent gains (second combined gains) may now be combined with the inside extent gains (first combined gains). To do so, a fade-out factor may be introduced for all virtual sources inside the room, with fade-out amount='fraction of object outside the room'. In general, the fade-out factor may indicate a relative importance of the inside extent gains and boundary extent gains. The fade-out factor may depend on the location and extent of the audio object. Combination of the inside extent gains and boundary extent gains may be performed at step S2630. For example, the combination may be performed via:

$$g_j^{size} = \left[g_j^{\sim bound} + \left(\mu \times g_j^{\sim inside}\right)\right]^{\frac{1}{p}}$$

where $g_j^{size}$ denotes the final extent gains (resulting gains), $$d_{bound} = \begin{cases}\min(x_o+1, 1-x_o), & \text{if dim} = 1\\ \min(x_o+1, 1-x_o, y_o+1, 1-y_o), & \text{if dim} = 2\\ \min(x_o+1, 1-x_o, y_o+1, 1-y_o, z_o+1, 1-z_o), & \text{otherwise}\end{cases}$$

$$\mu = \begin{cases}h(x_o, s_x)^3, & \text{if dim} = 1\\ h(x_o, s_x)h(y_o, s_y)^{\frac{3}{2}}, & \text{if dim} = 2\\ h(x_o, s_x)h(y_o, s_y)h(z_o, s_z), & \text{otherwise}\end{cases}$$

and h(c,s) is a fade out function for a single dimension. For example, h(c,s) may be given by:

$$h(c, s) = \left[\frac{\max(s, 0.4)^3}{0.16s}\right]^{\frac{1}{3}}, \quad \text{if } d_{bound} \geq s \text{ and } d_{bound} \geq 0.4$$

$$h(c, s) = \left[d_{bound}\left(\frac{d_{bound}}{0.4}\right)^2\right]^{\frac{1}{3}}, \quad \text{otherwise}$$

In general, the fade-out factor may be determined such that, as part of the sized object starts moving outside the room, all virtual sources inside the object start fading out, except for those at the boundaries. When an object reaches a boundary only the boundary gains will be contributing to the extent gains. In the above, $d_{bound}$ may be the minimum distance to a boundary.

Further, a normalization step may be applied to the final extent gains $g_j^{size}$ (resulting gains). For example, said normalization may be performed according to:

$$g_j^{\sim size} = \frac{g_j^{size}}{\sqrt{\sum_n [g_n^{size}]^2}}, \text{ if } \sqrt{\sum_n [g_n^{size}]^2} > tol$$

$$g_j^{\sim size} = \frac{g_j^{size}}{tol}, \quad \text{otherwise.}$$

The extent contributions (i.e., final extent gains) may then be combined with the gains for the audio object (e.g., point gains of the audio object—assuming zero extent for the audio object), and a crossfade between them may be applied as a function of extent. Combination of the final extent gains and the gains of the audio object may be performed at step S2640 and may result in a set of final gains (total gains), one for each speaker feed. For example, the combination may be performed via:

$$g_j^{total} = (\alpha \times g_j^{point}(x_o, y_o, z_o)) + (\beta \times g_j^{\sim size})$$

where $$\text{for } s_{eff} < s_{fade}, \ \alpha = \cos\left(\frac{s_{eff}}{s_{fade}} \times \frac{\pi}{2}\right), \beta = \sin\left(\frac{s_{eff}}{s_{fade}} \times \frac{\pi}{2}\right)$$

$$\text{for } s_{eff} \geq s_{fade}, \ \alpha = 0, \beta = 1$$

and $s_{fade}=0.4$. In general, the cross-fade factor may depend on the extent (e.g., effective extent) of the audio object. This ensures smooth panning and smooth growth of the object, providing a nice transition all the way between the smallest and the largest possible extents.

Finally, a last normalization may be applied to the final gains. For example, said normalization may be performed according to:

$$G_j^S = \frac{g_j^{total}}{\sqrt{\sum_n [g_n^{total}]^2}}, \text{ if } \sqrt{\sum_n [g_n^{total}]^2} > tol$$

$$G_j^S = \frac{g_j^{total}}{tol}, \quad \text{otherwise.}$$

The final gains $G_j^S$ may be provided to the diffusion block 830 if present, or otherwise directly to the ramping mixer 130. The final gains may be the outcome of the rendering at step S2430.

3.2.2.3 Spherical Coordinate System

For an object with position metadata specified in spherical coordinates, its location may be transformed to Cartesian coordinates using the mapping function $\text{Map}_{SC}(\ )$, described in section 3.3.2 "Object and Channel Location Transformations" below. Before transforming the location, any associated extent metadata given in spherical coordinates (i.e., width, height, and depth ADM parameters, in degrees) may be first converted into appropriate Cartesian extent metadata (i.e., X-width, Y-width, Z-width ADM parameters, e.g., in the range [0, 1]) that can be used by the extent panner described in section 3.2.2 "Rendering Object Locations with Extents".

Figure 10B:
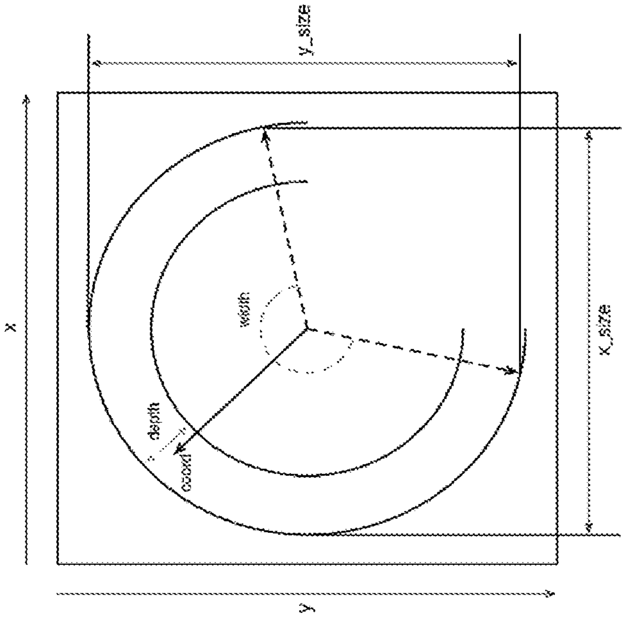
FIG. 10A and FIG. 10B illustrate examples of extents in a spherical coordinate system.
Figure 10A:
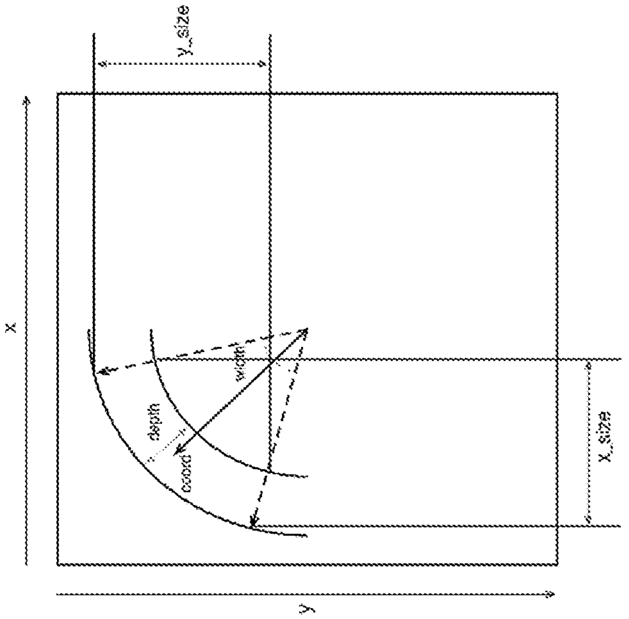

Extent metadata may be converted from spherical to Cartesian coordinates by finding the size of a cuboid that encompasses the angular extents. The Cartesian cuboid can be found by determining the extremities in each dimension of the shape described by the spherical extent angles and depth. Two examples are shown in FIG. 10A and FIG. 10B, limited to the x and y plane, for simplicity. FIG. 10A illustrates the case of an extent defined by acute angles, and FIG. 10B illustrates the case of an extent defined by obtuse angles. The distance will be halved to match the range of extent given in the Cartesian coordinate system and these parameters can then be used by the extent panner to render an object.

Figure 27:
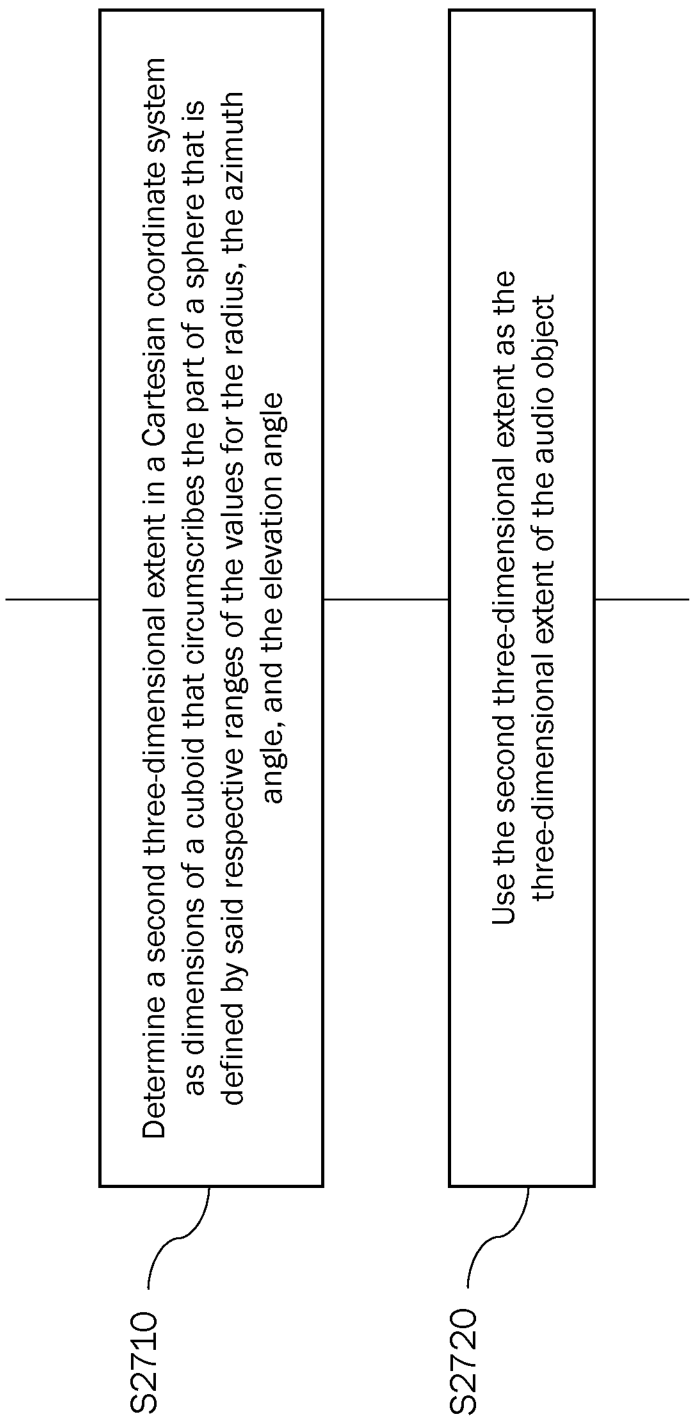
FIG. 27 is a flowchart schematically illustrating a method for transforming an extent of the audio object from spherical coordinates to Cartesian coordinates according to embodiments of the disclosure.

In general terms, a method for converting the extent from spherical coordinates to Cartesian coordinates may comprise the steps illustrated in the flowchart of FIG. 27. This method is applicable to any audio object whose associated metadata indicates a first three-dimensional extent (e.g., size) of the audio object in a spherical coordinate system by respective ranges of values for a radius, an azimuth angle, and an elevation angle. At step S2710, a second three-dimensional extent (e.g., size) in a Cartesian coordinate system is determined as dimensions (e.g., lengths along the X, Y, and Z coordinate axes, i.e., X-width, Y-width, and Z-width) of a cuboid that circumscribes the part of a sphere that is defined by said respective ranges of the values for the radius, the azimuth angle, and the elevation angle. At step S2720, the second three-dimensional extent is used as the three-dimensional extent of the audio object in the above method for rendering object locations with extents as an example for a method of rendering input audio for playback in a playback environment.

The aforementioned apparatus (rendering apparatus, renderer) for rendering input audio for playback in a playback environment (e.g., for performing the method of FIG. 24) may further comprise a metadata processing unit (e.g., metadata pre-processor 110). Step S2710 may be performed by the metadata processing unit. Step S2720 may be performed by the rendering unit.

The following pseudocode defines an example of an algorithm for calculating X-width, Y-width, and Z-width from spherical width, height, and depth:

```
function (x_width, y_width, z_width)
=extent_spher2cart(r, az, el, width, height, depth)
{
  r_min=max(0, r–depth)
  r_max=min(1, r+depth)
  el_min=el–height/2
  el_max=el+height/2
  az_min=az–width/2
  az_max=az+width/2
//z_width: find max width of spherical elevation arc
  el_min_z=el_min
  el_max_z=el_max
  if(el_min_z<–90 && el_max_z>–90)
  {
    el_min_z=–90
  }
  if(el_max_z>90 && el_min_z<90)
  {
    el_max_z=90
  }
  (~, ~, z1)=s_to_c(r_max, 0, el_min_z)
  (~, ~, z2)=s_to_c(r_min, 0, el_min_z)
  (~, ~, z3)=s_to_c(r_max, 0, el_max_z)
  (~, ~, z4)=s_to_c(r_min, 0, el_max_z)
  z_width=absrange(z1, z2, z3, z4)/2
//x_width: find maximum x-width of spherical width arcs
//(consider one width arc at each elevation and depth extremity)
  (az_min_x, az_max_x)=clip_angles(az_min, az_max,
    –90)
  (az_min_x, az_max_x)=clip_angles(az_min_x,
    az_max_x, 90)
```

```
    (az_min_x, az_max_x)=clip_angles(az_min_x,
      az_max_x, 270)
    (az_min_x, az_max_x)=clip_angles(az_min_x,
      az_max_x, -270)
    x1=s_to_c(r_max, az_min_x,el_max)
    x2=s_to_c(r_max, az_max_x,el_max)
    x3=s_to_c(r_min, az_min_x,el_max)
    x4=s_to_c(r_min, az_max_x,el_max)
    x5=s_to_c(r_max, az_min_x,el_min)
    x6=s_to_c(r_max, az_max_x,el_min)
    x7=s_to_c(r_min, az_min_x,el_min)
    x8=s_to_c(r_min, az_max_x,el_min)
    x9=s_to_c(r_max, az_min_x,el)
    x10=s_to_c(r_max, az_max_x,el)
    x11=s_to_c(r_min, az_min_x,el)
    x12=s_to_c(r_min, az_max_x,el)
    x_width=absrange(x1, x2, x3, x4, x5, x6,
      x7, x8, x9, x10, x11, x12)/2
  //y_width: find maximum y-width of spherical width arcs
    (az_min_y, az_max_y)=clip_angles(az_min, az_max,
      0)
    (az_min_y, az_max_y)=clip_angles(az_min_y,
      az_max_y, 180)
    (az_min_y, az_max_y)=clip_angles(az_min_y,
      az_max_y, -180)
    (~,y1)=s_to_c(r_max, az_min_y,el_max)
    (~,y2)=s_to_c(r_max, az_max_y,el_max)
    (~,y3)=s_to_c(r_min, az_min_y,el_max)
    (~,y4)=s_to_c(r_min, az_max_y,el_max)
    (~,y5)=s_to_c(r_max, az_min_y,el_min)
    (~,y6)=s_to_c(r_max, az_max_y,el_min)
    (~,y7)=s_to_c(r_min, az_min_y,el_min)
    (~,y8)=s_to_c(r_min, az_max_y,el_min)
    (~,y9)=s_to_c(r_max, az_min_y,el)
    (~,y10)=s_to_c(r_max, az_max_y,el)
    (~,y11)=s_to_c(r_min, az_min_y,el)
    (~,y12)=s_to_c(r_min, az_max_y,el)
    y_width=absrange(y1, y2, y3, y4, y5, y6,
      y7, y8, y9, y10, y11, y12)/2
  }
  function (mintheta, maxtheta)
  =clip_angles(mintheta, maxtheta, thresh)
  {
    if (mintheta<=thresh && maxtheta>=thresh)
    {
      if(abs(mintheta-thresh)<abs(maxtheta-thresh)
    {
    }else {
        maxtheta=thresh
    }
  }
  }
  function y=absrange(x)
  {
  y=max(x)-min(x)
  }
  function (x, y, z)=s_to_c(r, az, el)
  {
  x=r*cos(el)*cos(az+90)
  y=r*cos(el)*sin(az+90)
  z=r*sin(el)
  }
```

3.2.3 Rendering Direct Speakers

When processing channel-based content (i.e., audioChannelFormat instances of type 'DirectSpeakers'), a renderer must strive to achieve two potentially conflicting outcomes:

The audio is panned entirely to a single output speaker.

The audio is reproduced at a position that is similar to the position that was auditioned during content creation.

These outcomes are especially difficult to achieve because the renderer might be configured to use an output speaker layout that differs from the layout that was used to create the content.

To find a reasonable balance between the above two criteria over possibly mismatched speaker layouts, the renderer takes the following strategy to render channel-based content:

- If the channel's ID matches one of the common audioChannelFormat definitions, the channel is assigned a position equal to the nominal position of that speaker channel as per the ITU-R BS.2051-0 specification.
- If the channel's position is specified in Cartesian coordinates, the position is not modified, and passed directly to the renderer in Cartesian coordinates.
- If the channel's ID does not match one of the common channel definitions, and its position inside the active audioBlockFormat sub-element is specified in spherical coordinates, the metadata pre-processor 110 (see section 3.1 "Architecture") will:
  - Inspect the channel conversion table (Table 1 through Table 4) corresponding to the current output speaker configuration. If the channel's azimuth and elevation falls within one of the ranges listed, change the channel's position to be the nominal position given on the table. Otherwise, leave the channel's position as is.
  - Convert the channel's position from spherical to Cartesian coordinates, using the conversion function $Map_{SC}(\ )$ specified in section 3.3.2 "Object and Channel Location Transformations" below.
- The channel is panned to its (possibly modified) position using the point panner 810.

The position ranges specified in the Tables 1 to 4 below were derived from the ranges specified in ITU-R BS.2051-0 for Sound Systems B, F, G, and H. Because the specification gives no ranges to the speakers in Systems A, C, D, and E, the ranges for the System B surround speakers are used for all these systems, but the upper-layer speakers in systems C, D, and E are given no ranges (i.e., they will always be panned to the position specified in the metadata). In the case of System F, the M+/−90 and M+/−135 speakers overlap in azimuth range, so a boundary between them was set at the midpoint of +/−112.5 degrees azimuth.

The position adjustment strategy defined herein ensures that channel-based content that was authored using a Sound System conformant to ITU-R BS.2051-0 will be sent entirely to the correct loudspeaker when rendered to the same system, even when there is not an exact match between the speaker positions used during content creation and during playback (because different positions were chosen within the ranges allowed by the BS.2051 specification).

In the case of mismatched output speaker configurations (i.e., System X was used in content creation, System Y is being used in the renderer), channel-based content will still be sent to a single loudspeaker if the position specified in metadata is within the allowed range for a speaker in the output layout. Otherwise, in order to preserve the approximate position of the sound during content creation, the channel-based content will be panned to the location specified in its metadata.

TABLE 1

Channel Position Conversion for Systems A through E

| speaker-Label | Azimuth range | Elevation range | Nominal azimuth | Nominal elevation |
|---|---|---|---|---|
| M + 000 | 0 | 0 | 0 | 0 |
| M + 030 | 30 | 0 | 30 | 0 |
| M − 030 | −30 | 0 | −30 | 0 |
| M + 110 | [100, 120] | [0, 15] | 110 | 0 |
| M − 110 | [−120, −100] | [0, 15] | −110 | 0 |
| U + 030 | 30 | 30 | 30 | 30 |
| U − 030 | −30 | 30 | −30 | 30 |
| U + 110 | 110 | 30 | 110 | 30 |
| U − 110 | −110 | 30 | −110 | 30 |
| B + 000 | 0 | −30 | 0 | −30 |

TABLE 2

Channel Position Conversion for System F

| speaker-Label | Azimuth range | Elevation range | Nominal azimuth | Nominal elevation |
|---|---|---|---|---|
| M + 000 | 0 | 0 | 0 | 0 |
| M + 030 | 30 | 0 | 30 | 0 |
| M − 030 | 30 | 0 | −30 | 0 |
| M + 090 | [60, 112.5] | 0 | 90 | 0 |
| M − 090 | [−112.5, −60] | 0 | −90 | 0 |
| M + 135 | (112.5, 150] | | 135 | 0 |
| M − 135 | [−150, −112.5) | | −135 | 0 |
| U + 045 | [30, 45] | [30, 45] | 45 | 30 |
| U − 045 | [−45, −30] | [30, 45] | −45 | 30 |
| UH + 180 | 180 | [45, 90] | 180 | 45 |

TABLE 3

Channel Position Conversion for System G

| speaker-Label | Azimuth range | Elevation range | Nominal azimuth | Nominal elevation |
|---|---|---|---|---|
| M + 000 | 0 | 0 | 0 | 0 |
| M + 030 | [30, 45] | 0 | 30 | 0 |
| M − 030 | [−45, −30] | 0 | −30 | 0 |
| M + 090 | [90, 110] | 0 | 90 | 0 |
| M − 090 | [−110, −90] | 0 | −90 | 0 |
| M + 135 | [135, 150] | 0 | 135 | 0 |
| M − 135 | [−150, −135] | 0 | −135 | 0 |
| M + SC | N/A | 0 | Left screen edge (or 25 if unknown) | 0 |
| M − SC | N/A | 0 | Right screen edge (or −25 if unknown) | 0 |
| U + 045 | [30, 45] | [30, 45] | 45 | 30 |
| U − 045 | [−45, −30] | [30, 45] | −45 | 30 |
| U + 110 | [110, 135] | [30, 45] | 110 | 30 |
| U − 110 | [−135, −110] | [30, 45] | −110 | 30 |

TABLE 4

Channel Position Conversion for System H

| speaker Label | Azimuth range | Elevation range | Nominal azimuth | Nominal elevation |
|---|---|---|---|---|
| M + 000 | 0 | [0, 5] | 0 | 0 |
| M + 030 | [22.5, 30] | [0, 5] | 30 | 0 |
| M − 030 | [−30, −22.5] | [0, 5] | −30 | 0 |
| M + 060 | [45, 60] | [0, 5] | 60 | 0 |
| M − 060 | [−60, −45] | [0, 5] | −60 | 0 |
| M + 090 | 90 | [0, 15] | 90 | 0 |
| M − 090 | −90 | [0, 15] | −90 | 0 |
| M + 135 | [110, 135] | [0, 15] | 135 | 0 |
| M − 135 | [−135, −110] | [0, 15] | −135 | 0 |
| M + 180 | 180 | [0, 15] | 180 | 0 |
| M + SC | N/A | 0 | Left screen edge (or 25 if unknown) | 0 |
| M − SC | N/A | 0 | Right screen edge (or −25 if unknown) | 0 |
| U + 000 | 0 | [30, 45] | 0 | 30 |
| U + 045 | [45, 60] | [30, 45] | 45 | 30 |
| U − 045 | [−60, −45] | [30, 45] | −45 | 30 |
| U + 090 | 90 | [30, 45] | 90 | 30 |
| U − 090 | −90 | [30, 45] | −90 | 30 |
| U + 135 | [110, 135] | [30, 45] | 135 | 30 |
| U − 135 | [−135, −110] | [30, 45] | −135 | 30 |
| U + 180 | 180 | [30, 45] | 180 | 30 |
| B + 000 | 0 | [−30, −15] | 0 | −30 |
| B + 045 | [45, 60] | [−30, −15] | 45 | −30 |
| B − 045 | [−60, −45] | [−30, − 15] | −45 | −30 |
| T + 000 | N/A | 90 | N/A | 90 |

3.2.4 LFE Channels and Sub-Woofer Speakers

The distinction between Low Frequency Effects (LFE) channels and sub-woofer speaker feeds is subtle, and understanding this with respect to how the renderer (e.g., baseline renderer) treats LFE content requires some clarification. Recommendation ITU-R BS.775-3 has more detail and recommended use of the LFE channel.

Sub-woofer speakers are specialized speakers in a reproduction system with the purpose of reproducing low-frequency signals or content. They may require other signal processing (e.g. bass management, overload protection) in the B-chain of a reproduction system. As such the renderer (e.g., baseline renderer) does not include any effort to perform these functions.

ITU-R BS.2051-0 includes speakers labelled as LFE, which are intended to carry the audio expected to be output by sub-woofers. Similarly, ADM may contain DirectSpeaker content labelled as LFE. The baseline renderer ensures input LFE content is directed to the LFE output channels, with minimal processing. The following cases are described explicitly:

- Speaker configuration A
  - all LFE inputs are discarded, typical for stereo downmix.
- Speaker configurations B through E and G (1 output LFE)
  - all LFE inputs are mixed with unity gain to create the output LFE1.
- Speaker configurations F and H (2 output LFEs)
  - all LFE inputs with (Azimuth <0) or (X<0) are mixed with unity gain to LFE1
  - all LFE inputs with (Azimuth >0) or (X >0) are mixed with unity gain to LFE2
  - all LFE inputs with (Azimuth=0) or (X=0) are mixed equally into LFE1 and LFE2

$$LFE1=0.5*LFE_{in}$$

$$LFE2=0.5*LFE_{in}$$

The renderer shall consider LFE input content to be either any common audioChannelFormat with an ID equal to AC_00010004 (LFE), AC_00010020 (LFEL), or AC_00010021 (LFER), or any input audioChannelFormat of type DirectSpeakers with an active audioBlockFormat sub-element containing 'LFE' as the first three characters in its speakerLabel element.

3.2.5 Diffuse

The associated metadata of the audio object may further or alternatively indicate (e.g., specify) a degree of diffuseness for the audio object. In other words, the associated metadata may indicate a measure of a fraction of the audio object that is to be rendered isotropically (i.e., with equal energies from all directions) with respect to the intended listener's position in the playback environment. The degree of diffuseness (or equivalently, said measure of a fraction) may be indicated by a diffuseness parameter p, for example ranging from 0 (no diffuseness, full directionality) to 1 (full diffuseness, no directionality). For example, the ADM audioChannelFormat.diffuse metadata field ranging from $\rho=0$ to $\rho=1$ may describe the diffuseness of a sound.

In the source panner 120, $\rho$ may be used to determine the fraction of signal power sent to the direct path and to the decorrelated paths. When $\rho=1$, an object is mixed completely to the diffuse path. When $\rho=0$, an object is mixed completely to the direct path.

In the source panner 120, objects are processed by the extent panner 820 to produce the direct gains $G_{ij}^S$.

The gains sent to the ramping mixer 130 and diffuse ramping mixer 140 are, $$G_{ij}^M = G_{ij}^S \cdot \sqrt{(1-\rho)}$$

and $$g_i^{M'} = \sqrt{\rho}$$

respectively.

During initialization of a new room configuration, an object is panned to the center of the room and fed to the extent panner 820, with Cartesian extent width=depth=height=1 (i.e., with an extent filling out the entire reproduction environment), to calculate the diffuse speaker gains $G_j'$ necessary to produce as uniform a sound field as possible for the given room configuration. These are the gains passed to the speaker decorrelator 150.

In other words, the diffuse ramping mixer 140 pans a fraction of the audio object (the fraction being determined by the diffuseness of the audio object) to the center of the reproduction environment (e.g., room). This fraction may be considered as an additional audio object. Further, the ramping mixer assigns an extent (e.g., three-dimensional size) to the additional object such that the three-dimensional volume of the additional object (located at the center of the reproduction environment) fills the entire reproduction environment.

Figure 28:
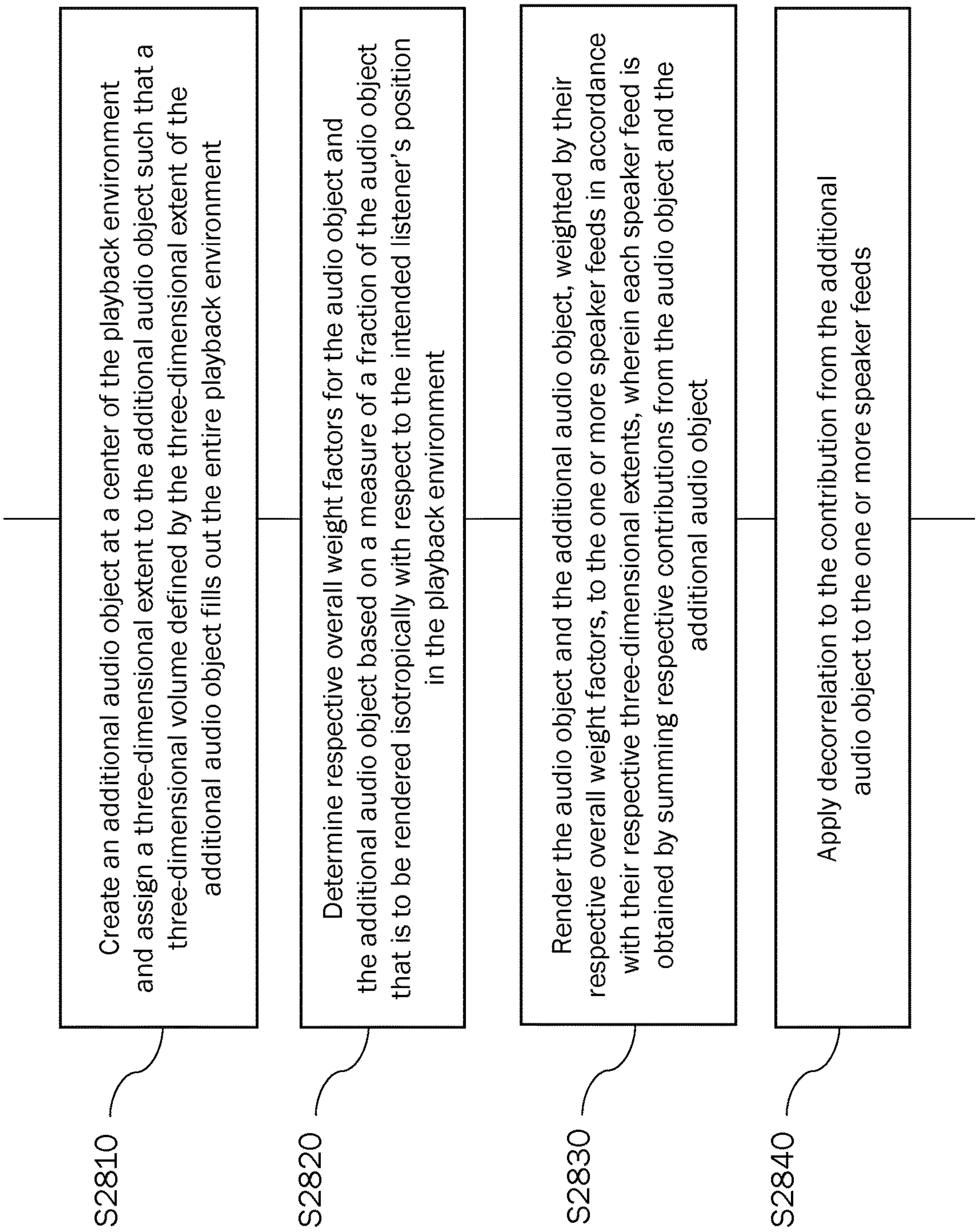
FIG. 28 is a flowchart schematically illustrating a method (e.g., algorithm) for rendering audio objects with diffusion according to embodiments of the disclosure.

A summary of an example of a method for rendering an audio object with diffuseness is illustrated in the flowchart of FIG. 28. The method may comprise the steps of FIG. 28 either as stand-alone or in combination with the method illustrated in FIG. 24, FIG. 25, and FIG. 26.

At step S2810, an additional audio object is created at a center of the playback environment (e.g., room). Further, an extent (e.g., three-dimensional size) is assigned to the additional audio object such that a three-dimensional volume defined by the extent of the additional audio object fills out the entire playback environment. At step S2820, respective overall weight factors are determined for the audio object and the additional audio object based on a measure of a fraction of the audio object that is to be rendered isotropically with respect to the intended listener's position in the playback environment. That is, said two overall weight factors may be determined based on the diffuseness of the audio object, e.g., based on the diffuseness parameter p. For example, the overall weight factor for the direct fraction (direct part) of the audio object may be given by $\sqrt{(1-\rho)}$, and the overall weight factor for the diffuse fraction (diffuse part) of the audio object (i.e., for the additional audio object) may be given by $\sqrt{\rho}$. At step S2830, the audio object and the additional audio object, weighted by their respective overall weight factors, are rendered to the one or more speaker feeds in accordance with their respective three-dimensional extents. Rendering of an object in accordance with its extent may be performed as described above in section 3.2.2 "Rendering Object Locations with Extents", and may be performed by the size panner 820 in conjunction with the diffuse ramping mixer 140, for example. The direct fraction of the audio object is rendered at its actual location with its actual extent. The diffuse fraction of the audio object is rendered at the center of the room, with an extent chosen such that it fills the entire room. As indicated above, the resulting gains for the diffuse fraction of the audio object may be determined beforehand, when initializing a new room configuration (reproduction environment). Each speaker feed may be obtained by summing respective contributions from the direct and diffuse fractions of the audio object (i.e., from the audio object and the additional audio object). At step S2840, decorrelation is applied to the contribution from the additional audio object to the one or more speaker feeds. That is, the contributions to the speaker feeds stemming from the additional audio object are decorrelated from each other.

An apparatus (rendering apparatus, renderer) for rendering input audio for playback in a playback environment (e.g., for performing the method of FIG. 27) may comprise a metadata processing unit (e.g., metadata pre-processor 110) and a rendering unit. The rendering unit may comprise a panning unit and a mixer (e.g., the source panner 120 and either or both of the ramping mixer(s) 130, 140), and optionally, a decorrelation unit (e.g., the speaker decorrelator 150). Steps S2810 and S2820 may be performed by the metadata processing unit. Steps S2830 and S2840 may be performed by the rendering unit. The apparatus may be the further configured to perform the method of FIG. 24 (optionally, with the sub-steps illustrated in FIG. 25 and FIG. 26), and optionally, the method of FIG. 27.

3.3 Metadata Pre-Processing

Much of the metadata (e.g., ADM metadata) can be simplified once the playback system is known. The metadata pre-processor 110 is the component that achieves this for the renderer by either reducing the number of speakers available for render or modifying the positional metadata.

3.3.1 Metadata Processing Order

Figure 11:
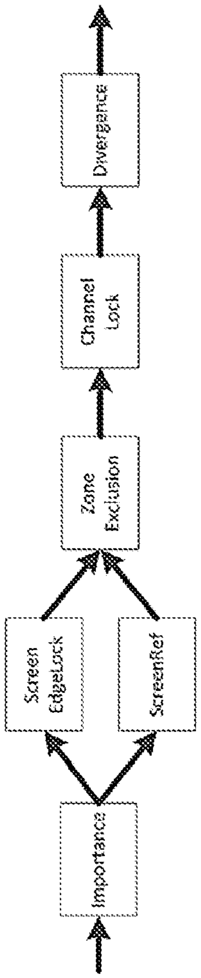
FIG. 11 schematically illustrates an example of a processing order of metadata processing in the renderer according to embodiments of the disclosure.

An example for the processing order of metadata (metadata features) is schematically illustrated in FIG. 11. To prevent undesirable interactions between features, metadata parameters are processed in a very specific order. Importance is processed first for efficiency reasons as it may result in fewer sources to process. screenEdgeLock and screenRef are mutually exclusive. zoneExclusion must happen prior to channelLock to prevent locking to speakers that will not be part of the panning layout. Finally divergence is placed after channelLock to allow the mixer to produce a phantom image that remains centered at the location of the locked channel.

3.3.2 Object and Channel Location Transformations

The mapping function, $Map_{SC}(\ )$ takes inputs ($-180°\leq Az\leq 180°$, $-90°\leq El\leq 90°$, $0\leq R\leq 1$) and the system attribute ($Flag_{110}$=true|false) and may operate as follows:

1. Warp the elevation angles, so that ±30° maps to ±45°, as follows:

$$\text{if } |El| > 30$$

$$El' = \text{sgn}(El) \times \left(90 - (90 - |El|) \times \frac{45}{60}\right)$$

$$\text{else}$$

$$El' = El \times \frac{45}{30}$$

where we define $$\text{sgn}(x) = \begin{cases} 1 & \text{if } x \geq 0 \\ -1 & \text{if } x < 0 \end{cases}$$

2. Warp the azimuth angles, according to the $\text{Flag}_{110}$ attribute:
   a. If $\text{Flag}_{110}$=true, $$Az' = \text{sgn}(Az) \times \left(\frac{3 \times |Az|}{2} - \frac{3 \times \max(0, |Az| - 30)}{8} - \frac{27 \times \max(0, |Az| - 110)}{56}\right)$$

b. Else (if $\text{Flag}_{110}$=false)

$$Az' = \text{sgn}(Az) \times \left(\frac{3 \times |Az|}{2} - \frac{3 \times \max(0, |Az| - 30)}{4} + \frac{\max(0, |Az| - 90)}{4}\right)$$

3. Map the Az', El' pair to a point on the unit sphere (x',y',z'):

$$x' = -\sin(Az') \times \cos(El')$$

$$y' = \cos(Az') \times \cos(El')$$

$$z' = \sin(El')$$

4. Now, distort the sphere into a cylinder:

$$\text{scale}_{cyl} = \frac{1}{\max\left(|z'|, \sqrt{x'^2 + y'^2}\right)}$$

$$x'' = x' \times \text{scale}_{cyl}$$

$$y'' = y' \times \text{scale}_{cyl}$$

$$z'' = z' \times \text{scale}_{cyl}$$

5. And finally, 'stretch' the cylinder into a cube, and then scale the coordinates according to R:

$$\text{scale}_{cube} = \frac{1}{\max(|\sin(Az')|, |\cos(Az')|)}$$

$$X = x'' \times R \times \text{scale}_{cube}$$

$$Y = y'' \times R \times \text{scale}_{cube}$$

$$Z = z'' \times R$$

Hence, the outputs of the $\text{Map}_{SC}(\ )$ function will be the (X,Y,Z) values, as produced by the procedure above. The inverse function, $\text{Map}_{CS}(\ )$, converts an (X,Y,Z) position to (θ,φ,r) and may be achieved through a step-by-step inversion of $\text{Map}_{SC}(\ )$.

3.3.3 Zone Exclusion zoneExclusion is an ADM metadata parameter that allows an object to specify a spatial region of speakers that should not be used to pan the object. An audioChannelFormat of type "Objects" may include a set of "zoneExclusion" sub-elements to describe a set of cuboids. Speakers inside this set of cuboids shall not be used by the renderer to pan the object.

The metadata pre-processor 110 may handle zone exclusion by removing speakers from the virtual room layout that is generated for each object. Exclusion zones are applied to speakers before spherical speaker coordinates are transformed to Cartesian coordinates by the warping function described in section 3.3.2 "Object and Channel Location Transformations".

The algorithm that processes zone exclusion metadata to remove speakers from the object's virtual speaker layout is described below.

Step 1: For each of the N speakers in the virtual speaker layout, check if the speaker lies inside any of the M exclusion zone rectangular cuboids. If so, remove it from the layout by setting its mask value to zero.

```
for j=1 to N
{
/*get cartesian position (without warping)*/
  x=distance(j)*cos(elevation(j))*cos(azimuth(j));
y=distance(j)*cos(elevation(j))*sin(azimuth(j));
z=distance(j)*sin(elevation(j));
mask(j)=1;
for k=1 to M
{
  if(zone(k)·minX≤x≤zone(k)·maxX
  & zone(k)·minY≤y≤zone(k)·maxY
  & zone(k)·minZ≤y≤zone(k)·maxZ
  {
    mask(j)=0;
  }
}
}
```

Step 2: Remove additional speakers to ensure that the resulting layout is valid for the triple-balance panner, as described in section 3.2.1 "Rendering Point Objects".

The following speaker layout rule is enforced on the speaker rows: every speaker row, except for the front and back rows, must have a speaker at x=1 and another speaker at x=−1. This rule is applied after the speaker coordinates have been transformed using the warping function described in section 3.3.2 "Object and Channel Location Transformations".

```
for j=1 to N
{
/*if a side wall speaker is disabled
if (mask(j)=0 && abs(p_sx(j))==1 && abs(p_sy(j)) !=1);
for k=1 to N
{
/* remove all row speakers */
  if(p_sy(j)==p_sy(k))
  {
    mask(k)=0;
  }
}
}
```

The mask values will then be used by the point panner 810 to select which speakers are considered part of the output layout for the object, as described in section 3.2.1 "Rendering Point Objects".

The enforcement of the rule in Step 2 ensures that the resulting speaker layout does not lead to undesired panning behavior. For example, consider the System F layout from ITU-R BS.2051, where only the M-90 speaker has been removed. If we then pan an object from the front right to the back right of the room, the panner will pan the object entirely to the left (speaker M+90) as the object crosses the middle of the room. To correct this, we also remove the M+90 speaker, and now the object renders correctly from front to back on the right side, by panning between the M-30 and M-135 speakers.

3.3.4 Gain

Support for the gain metadata in the audioBlockFormat is implemented by the source panner 120 and scales the gains of each object provided to the ramping mixers 130, 140. Gain metadata thus receives the same cross-fade defined by the objects jumpPosition metadata.

3.3.5 Channel Lock

Support for channelLock metadata is implemented inside the metadata pre-processor 110 component described in section 3.1 "Architecture". If the channelLock flag is set to 1 in an audioBlockFormat element contained by an audioChannelFormat instance of type Objects, the virtual source renderer component will modify the position sub-elements of the audioBlockFormat to ensure that the object's audio is panned entirely to a single output channel.

The optional maxDistance attribute controls whether the channelLock effect is applied to the object, based on the unweighted Euclidean distance between an object's position and the output speaker closest to it. If maxDistance is undefined, the renderer assumes a default value of infinity, meaning that the object always "snaps" to the closest speaker.

For objects with position metadata specified in spherical coordinates, channelLock processing is performed after the object's position has been transformed into Cartesian coordinates, as described in section 3.3.2 "Object and Channel Location Transformations". Similarly, the distances between the object and the speakers are calculated using the speaker positions after they have been transformed from spherical to Cartesian coordinates, as described in section 3.3.2 "Object and Channel Location Transformations".

For determining which speaker to "lock" the object to, a weighted Euclidean distance measure has been designed to yield rectangular cuboid "lock" regions around each speaker in Cartesian space. Dividing the snap regions in this way improves the intuitiveness of the snap feature during content creation in a mixing studio, and is consistent with the allocentric rendering philosophy behind the point panner 810.

For example, Channel Lock may be applied as follows:

```
min_dist_u=Inf;
min_dist=Inf;
wx=1/16; wy=4; wz=32;
/* find the closest speaker */
for j=1 to N /* for each speaker */
{
/* weighted Euclidean distance using Cartesian object
   * and speaker positions*/
dist=wx*(p_ox−p_sx(j))^2
     +wy*(p_ox−p_sy(j))^2
     +wz*(p_ox−p_sz(j))^2;
dist_u=(p_ox−p_sx(j))^2
     +(p_ox−p_sy(j))^2
     +(p_ox−p_sz(j))^2;
 if (dist<min_dist)
 {
   min_dist=dist;
   min_dist_u=dist_u;
   idx_min=j;
 }
 }
 /* apply maxDistance attribute using unweighted distance
*/
 if (min_dist_u<=maxDistance)
 {
 p_oz=p_sx(idx_min);
 p_oz=p_sy(idx_min);
 p_oz=p_sy(idx_min);
 }
```

It should be noted that in the above pseudocode, the speakers 1 to N are pre-sorted as follows: center is always placed at the head of the list if it is present. The remaining speakers are then ordered first by decreasing z-value, then by increasing y-value and finally by increasing x-value, such that when there are multiple speakers with exactly the same weighted distance to the object, the object is locked to the speaker that is closest to the top-front-left of the room.

3.3.6 Divergence

This section relates to a method for controlling constraints when rendering audio objects with divergence.

Within traditional mixing, the idea of creating phantom sources by panning a coherent source to adjacent speakers has been used for some time-most commonly in the context of creating a phantom center source in a stereo system where only a left and right speaker exist. To do this, a power preserving pan is used to distribute a source to the left and right channels, based on the expectation that this power preserving pan will cause an acoustic summing in the room to create a source of the correct level at the correct location.

This assumption is reasonable when the left and right speakers are spaced relatively sparsely, as is the case in cinemas, but if speakers are too close together, the apparent level of the phantom source may increase noticeably.

When considering contemporary immersive audio, the idea of creating a phantom source using adjacent audio objects persists with content creators. In the new idiom of object based audio, the efficient way of expressing this intent in the content is to use metadata to note that a source is intended to be rendered as a phantom source. This metadata feature is labeled 'Divergence' in the ITU-R BS.2076 ADM standard.

Section 9.6 of the ADM standard specifies a way to express the concept of divergence in metadata and provides what could be considered an obvious approach to phantom source panning in an effort to provide the same functionality as legacy mixing through objects. One detail provided within the ADM specification is that in order to create a phantom image, a power preserving pan should be created between two virtual objects (additional audio objects) and an original audio object—as would be expected when using left and right speakers to create a phantom center channel. Needless to say, the phantom image to be created is located at the position of the original audio object.

Figure 12:
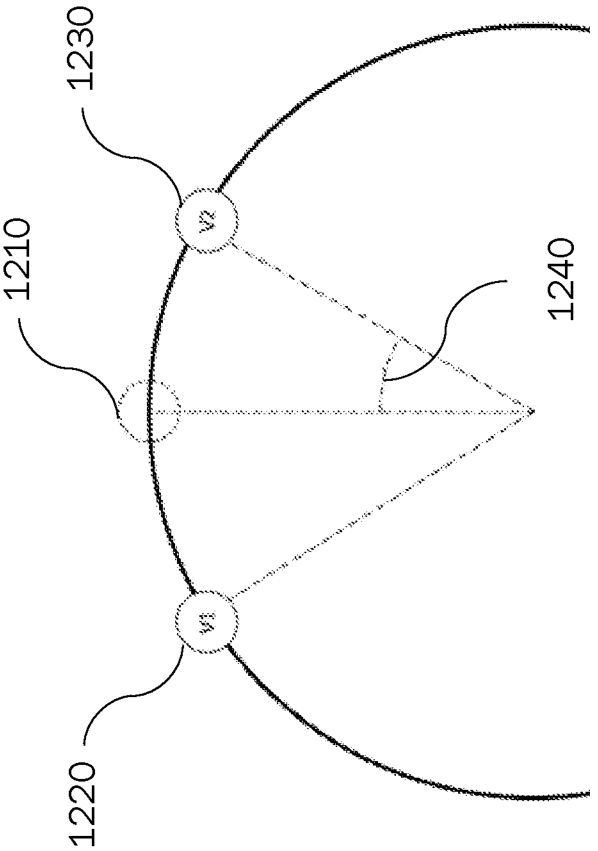
FIG. 12 schematically illustrates an example of an audio object and two virtual objects for phantom source panning in the renderer according to embodiments of the disclosure.

FIG. 12 illustrates an example of two virtual objects (additional audio objects) 1220, 1230 that are provided for an (original) audio object 1210 for purposes of phantom source panning. In this example, each virtual object 1220, 1230 is spaced from the audio object 1210 by an angular distance 1240. Evidently, the two virtual objects 1220, 1230 are spaced from each other by twice the angular distance 1240. This angular distance 1240 may be referred to as an angle of divergence.

As has been realized, there are two direct problems in this naïve adaption of the legacy approach to object based audio content. The first problem comes from the ability to specify the angle of divergence, and the second problem from how objects are rendered to speakers in an object audio renderer.

The freedom (e.g., in ADM) for object based divergence to specify an angle that dictates where the new pair of virtual objects are created relative to the desired phantom image location means that the new virtual objects can be located very close to the phantom location. The location of these virtual objects close to the phantom location is analogous to placing speakers close together when rendering a phantom center—if this is realized in practice, a power preserving pan would result in inappropriate level of the phantom image (e.g., increased loudness), due to the coherent summation of the new sources.

To playback object audio content, it must first be rendered to speaker feeds that map to the reproduction system's speaker locations, and this is when the second issue present in the naïve formulation of divergence is exposed. For sparse speaker arrangements (as are common, e.g., in home theatre playback scenarios) multiple audio objects in the content space are mapped (rendered) to the same speaker—in fact each individual object will typically play back through multiple speakers with a variety of gains designed to create phantom images in the playback environment. In the context of the divergence feature this means that the virtual objects created to simulate the phantom source will themselves be subject to the rendering process, and may be mapped to the same speakers in such a way that the power preserving gains intended to create a phantom image when summed acoustically will instead be summed in the renderer, coherently—which again will cause level differences.

Ultimately the naïve formulation of divergence (e.g., in ADM) that relies on simple power preserving panning will suffer notable level issues given (i) the added flexibility of virtual source locations, and (ii) the potential for the rendering process to cause the virtual sources to be summed electrically (coherently) instead of acoustically. Embodiments of the present disclosure address both these issues.

Section 9.6 of the ADM standard (ITR-R BS.2076) provides a definition of the divergence metadata's behavior in terms of two parameters: objectDivergence (0, 1) and azimuthRange. While this is not the only way such a behavior could be described, it will be used to help explain the context and formulation of this invention. In general, the metadata may be said to indicate (e.g., specify), apart from a location of the audio object, a distance measure (e.g., the azimuthRange) indicative of a distance between the virtual sources. The distance measure may be expressed by a distance parameter D. The distance measure may indicate an angular distance or a Euclidean distance. In the examples below, the distance measure indicates an angular distance. Further, the distance measure may directly indicate a distance between the virtual sources themselves, or a distance between each of the virtual sources and the original audio object. As will be appreciated by the person of skill in the art, such distance measures can be easily converted into each other. Further, the metadata may indicate (e.g., specify) a measure of relative importance of the virtual sources and the original audio object (e.g., the objectDivergence). This measure of relative importance may be referred to as divergence and may be expressed by a divergence parameter (divergence value) d. The divergence parameter d may range from 0 to 1, with 0 indicating zero divergence (i.e., no power is provided to the virtual sources—zero relative importance of the virtual sources), and 1 indicating full divergence (i.e., no power is provided to the original audio object—full relative importance of the virtual sources).

For each object $O_i$ with divergence (e.g., objectDivergence) d, the renderer (e.g., virtual object renderer) creates two additional audio objects $O_{i+}$, $O_{i-}$ at the locations controlled by the distance measure D (e.g., by the azimuthRange element) and calculates three gains $g_{di}$, $g_{di+}$, $g_{di-}$ to ensure the power across the three new objects is equivalent to the original object.

If the location of $O_i$ is specified in spherical coordinates $(\theta_i,\varphi_i,r_i)$, locations for the virtual objects (additional audio objects) may be defined as:

$$\theta_{i\pm}=\theta_{i\pm}0.5\times\text{azimuthRange}$$

$$\varphi_{i\pm}=\varphi_i$$

$$r_{i\pm}=r_i$$

That is, the additional audio objects may be located in the same horizontal plane (i.e., at the same elevation, or at the same z coordinate) as the original audio object, at equal (angular) distances from the original audio object, on opposite sides of the original audio object when seen from the intended listener's position, and at the same (radial) distance from the intended listener's position as the original audio object. In general, the locations for the virtual objects (additional audio objects) are determined by the location of the original audio object and the distance measure D.

If one or both of the resulting virtual objects fall outside the rendering region, the distance measure (e.g., azimuthRange) value may be reduced to ensure both virtual objects are within the rendering region (e.g., within the reproduction environment). The need to recalculate the position of both virtual objects is to ensure the phantom image created remains at the correct location.

For objects with locations specified in Cartesian coordinates $(x_i,y_i,z_i)$, locations for the virtual objects may be determined first by transforming the Cartesian location to spherical coordinates using the mapping function $\text{Map}_{SC}(\,)$, described in section 3.3.2 "Object and Channel Location Transformations". Then the spherical locations of $O_{i+}$ and $O_{i-}$ are determined, e.g., in accordance with the above formula, and finally the locations may be transformed to Cartesian coordinates with the inverse transformation function $\text{Map}_{CS}(\,)$.

The content played at the virtual locations may have a simple gain relationship with the original object audio. If x[n] is the original object audio (the audio signal of the original object), the divergence metadata allows for three new audio objects: y[n] (the signal from the original location), and $y_{v1}[n]$ and $y_{v2}[n]$ (the signals from the two virtual object locations). Then, $$y[n]=g_d x[n] \qquad [1]$$

$$y_{V1}[n]=y_{V2}[n]=g_v x[n] \qquad [2]$$

where $g_d$ and $g_v$ are weight factors (e.g., mixing gains) to be applied to the (original) audio object and the virtual (additional) audio objects.

The power preserving dictate of ADM implies that $$g_d^2+2g_v^2=1 \qquad [3]$$

The ADM specification also provides a specification for how these gains vary as the objectDivergence changes.

Example: With an LCR loudspeaker configuration and the object positioned directly at the C position, and the LR virtual objects specified by using an azimuthRange of 30 degrees. An objectDivergence value of 0 indicating no divergence, only the center speaker would be firing. A value of 0.5 would have all three (LCR) loudspeakers firing equally, and a value of 1 would have the L and R loudspeakers firing equally.

In more detail, according to the ADM specification, the gains to be applied to the original object and the two new virtual objects provide a power preserving spread across the three sources with the divergence (e.g., objectDivergence value) d controlling the distribution of the power between the sources. As indicated above, the divergence (e.g., objectDivergence value) d varies between 0 and 1, where a value of 1 represents all the power coming from the virtual objects, and the original object made silent. The following equations specify the weight factors (e.g., mixing gains) for the objects as functions of d in the ADM specification:

$$g_{di} = \begin{cases} \sqrt{\frac{1}{4d+1}} & 0 < d \le 0.5 \\ \sqrt{\frac{1-d}{2-d}} & 0.5 < d \le 1 \end{cases} \qquad g_{di\pm} = \begin{cases} \sqrt{\frac{2d}{4d+1}} & 0 < d \le 0.5 \\ \sqrt{\frac{1}{4-2d}} & 0.5 < d \le 1 \end{cases}$$

While panning according to the above equations works for the simple case of phantom center channels in legacy systems, it has been realized to fail for more general applications. Namely, it has been realized that for phantom source panning for audio objects, the following general rules should be applied:

1. If signals will be summed coherently, use amplitude preserving panning functions
2. If signals will sum incoherently, use power preserving panning functions.

In view thereof, the present disclosure describes divergence processing that accounts for the following guiding principles:

1. The perceived effect created by playing back coherent signals from spatially separated speakers varies as a function of distance between the speakers, and varies across frequencies.
2. All frequencies tend towards adding incoherently when the distance between speakers is large.
3. Low frequency components tend to add coherently over greater distances than high frequency components.
4. As the distance between speakers decreases the transition between which frequencies add coherently versus incoherently begins at higher frequencies.

These guiding principles are accounted for by the frequency and angle dependent aspects of the present disclosure.

Figure 13:
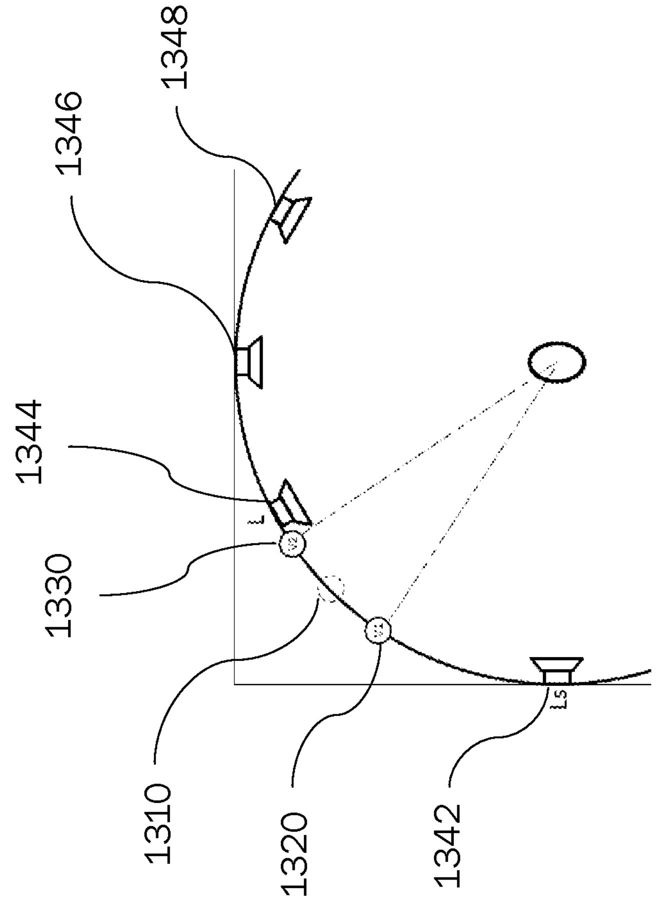
FIG. 13 schematically illustrates an example of a speaker layout in which phantom source panning can be performed.

The second issue which compounds the loudness issues described above is the effect that the rendering algorithm has on the combination of the virtual objects when rendering them to speaker feeds. FIG. 13 schematically illustrates a speaker layout comprising plural speakers 1342, 1344, 1346, 1348, among them a Left-surround speaker (Ls) 1342 and a front-left speaker (L) 1344. The figure further illustrates an audio object 1310 and two virtual objects 1320, 1330 for phantom source rendering. The virtual objects 1320, 1330 are created based on divergence metadata. The rendering algorithm is to determine how to mix these objects in order to create the speaker feeds. Intuitively, any rendering algorithm will mix these two objects into the speakers 1342, 1344 labelled L and Ls, essentially calculating gains in accordance with:

$$L[n]=g_{V1L}*x_{V1}[n]+g_{V2L}*x_{V2}[n] \quad [4]$$

$$Ls[n]=g_{V1Ls}*x_{V1}[n]+g_{V2Ls}*x_{V2}[n] \quad [5]$$

As both virtual objects 1320, 1330 in the example of FIG. 13 are closer to the L speaker 1342 than to the Ls speaker 1344 it is expected that the gains for creating the speaker feed L[n] for the L speaker 1342 would direct the majority of each of their power to the L speaker 1342. Since the mixing is done in the renderer, the virtual objects 1320, 1330 will be summed coherently—hence the power preserving gains generated as part of creating the virtual objects will be summed inappropriately.

Figure 14A:
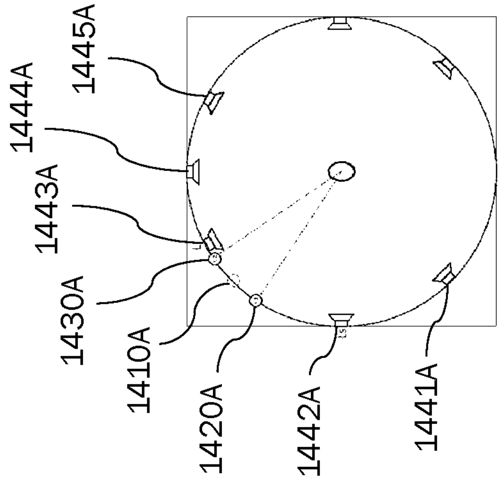
FIG. 14A, FIG. 14B, and FIG. 14C illustrate examples of relative arrangements of virtual object locations and speaker locations for a given speaker layout.
Figure 14B:
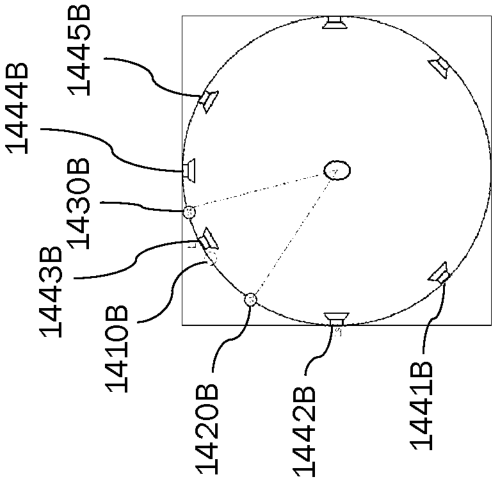
Figure 14C:
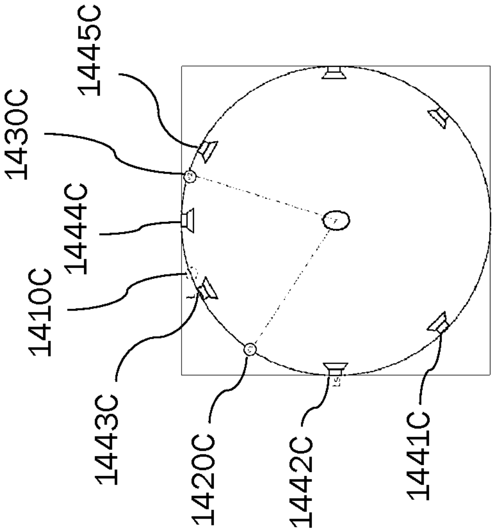

This phenomenon is again dependent on the distance measure (e.g., azimuthRange) of the divergence, and it is possible to have the situation where the virtual objects are both panned to the same set of speakers, or to entirely distinct sets of speakers, depending on how their locations sit within the renderer's speaker layout. FIG. 14A, FIG. 14B, and FIG. 14C illustrate examples of relative arrangements of object locations 1410*x*, virtual object locations 1420*x*, 1430*x* and speaker locations 1441*x*, 1442*x*, 1443*x*, 1445*x* (x=A, B, C) for a given speaker layout. As can be seen from these examples, which speakers the virtual objects get mixed to depends on the distance measure (e.g., azimuthRange) and the speaker layout.

In view of the issues described above, the present disclosure describes methods for controlling the constraints applied to render objects with divergence in order to tune their signal power or perceived loudness. In particular, the present disclosure describes two methods for rendering audio objects with divergence metadata that address the aforementioned issues and that could be applied independently or in combination with each other.

Figure 15:
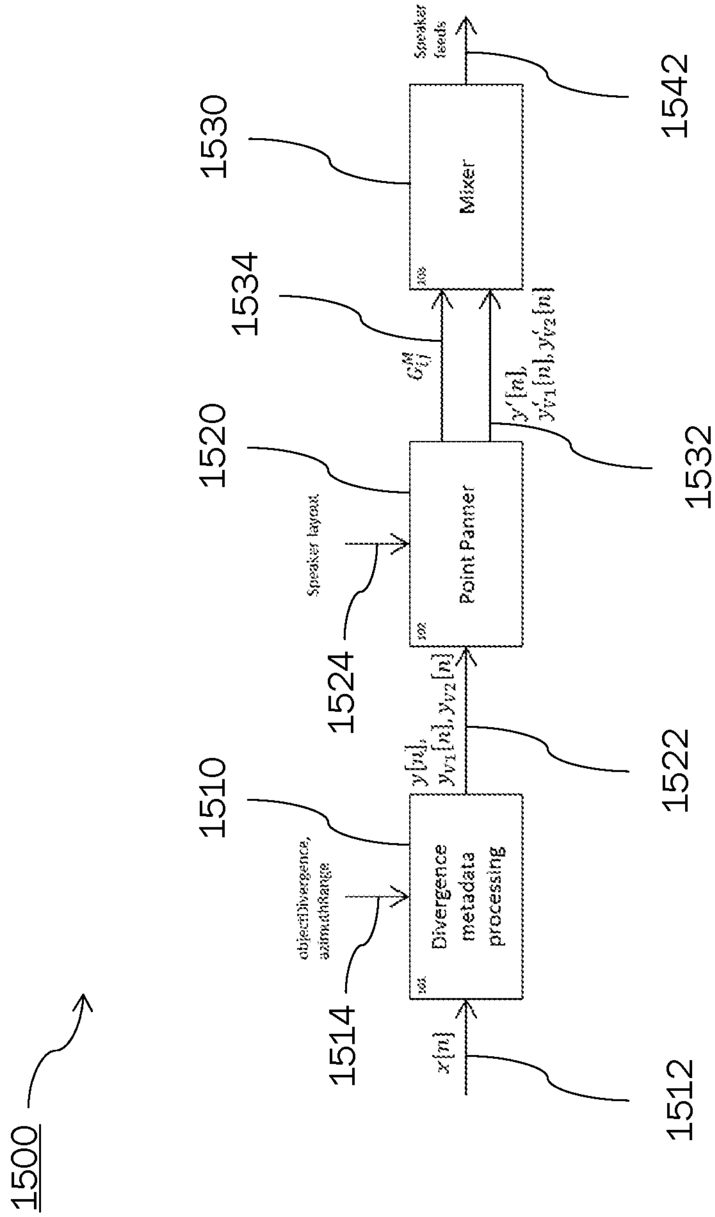
FIG. 15 schematically illustrates an example of an architecture of a renderer that is capable of rendering audio objects with divergence metadata according to embodiments of the disclosure.

FIG. 15 illustrates, as a general overview, a block diagram of an example of a renderer (rendering apparatus) 1500 according to embodiments of the disclosure that is capable of rendering audio objects with divergence metadata. Some or all of the functional blocks illustrated in FIG. 15 may correspond to functional blocks illustrated in FIG. 6, FIG. 7, or FIG. 8. The renderer 1500 comprises a divergence metadata processing block (metadata processing unit) 1510, a point panner 1520, and a mixer block (mixer unit) 1530. The divergence metadata processing block 1510 may correspond to, or be included in, the metadata pre-processor 110 in FIG. 7. The point panner 1520 may correspond to the point panner 810 in FIG. 8. The mixer block 1530 may correspond to the ramping mixer 130 in FIG. 7. The renderer 1500 receives an object (x[n]) 1512 and associated (divergence) metadata 1514 as input. The metadata 1514 may include an indication of divergence d and the distance measure D. Further, the renderer 1500 may receive the speaker layout 1524 as an input. If the object 1512 has divergence metadata 1514 (e.g., divergence d and distance measure D) associated with it, first the divergence metadata preprocessing block 1510 will interpret that metadata 1514 to create three audio objects 1522, namely virtual object sources ($y_{V1}[n]$ and $y_{V2}[n]$) and the modified original object (y[n]). The point panner 1520 then will calculate the gain matrix ($G_{ij}^{M}$) 1534 which contains the gain applied to object i to create the signal for speaker j. The point panner 1520 may further modify the signals associated with the three audio objects to thereby create three modified audio objects 1532, namely y'[n], $y'_{V1}[n]$, and $y'_{V2}[n]$. The final stage of rendering is to apply the gain matrix created in the point panner 1520 to object signals in order create the speaker feeds 1542—this is the function of the mixer block 1530.

Both the aforementioned methods for rendering audio objects with divergence metadata can be performed by the renderer 1500, for example. The first method describes a control function which can be added during the creation of the virtual objects, which compensates for the variation in how these virtual sources would be summed acoustically if rendered to speakers at their virtual locations. This could be integrated within the divergence metadata processing block 1510 of the renderer 1500. The second method describes how the rendering gains can be normalized (for example in the point panner 1520) to ensure that a desired signal level is produced from the speakers in a specific layout. Both methods will now be described in detail.

3.3.6.1 Controlled Method for Creation of Virtual Sources (First Method)

The naïve method for creating a set of power preserving divergence gains follows $g_d^2+2g_v^2=1$, regardless of the distance (e.g., angle) separating the virtual sources. The first element of the present method is to incorporate a distance (e.g., an angle of separation) into the calculation of the gains to allow for the effective panning to vary between an amplitude preserving pan and a power preserving pan. For example, an angle of separation (θ) may be defined as the angle between the two virtual sources (more generally, as the distance, or distance measure). Typically, the virtual sources will be located symmetrically about the original source, and in such cases, the angle of separation may easily be derived from the angle between the original source and either of the virtual sources (for example, the angle of separation of the virtual sources may be equal to twice the angle between the original source and either of the virtual sources). By introducing a control function p(θ), the naïve prescription for creating the set of power preserving divergence gains can be revised to:

$$g_d^{p(\theta)}+2g_v^{p(\theta)}=1 \quad [6]$$

In general, the control function p is a function of the distance measure D, p(D). Without intended limitation, reference will be made to the control function p being a function of the angle of separation θ, p(θ).

The range of p(θ) may vary from 1, where the above equation represents the constraints of an amplitude preserving pan, to 2 where the above equation is equivalent to enforcing constraints of a power preserving pan.

Figure 29:
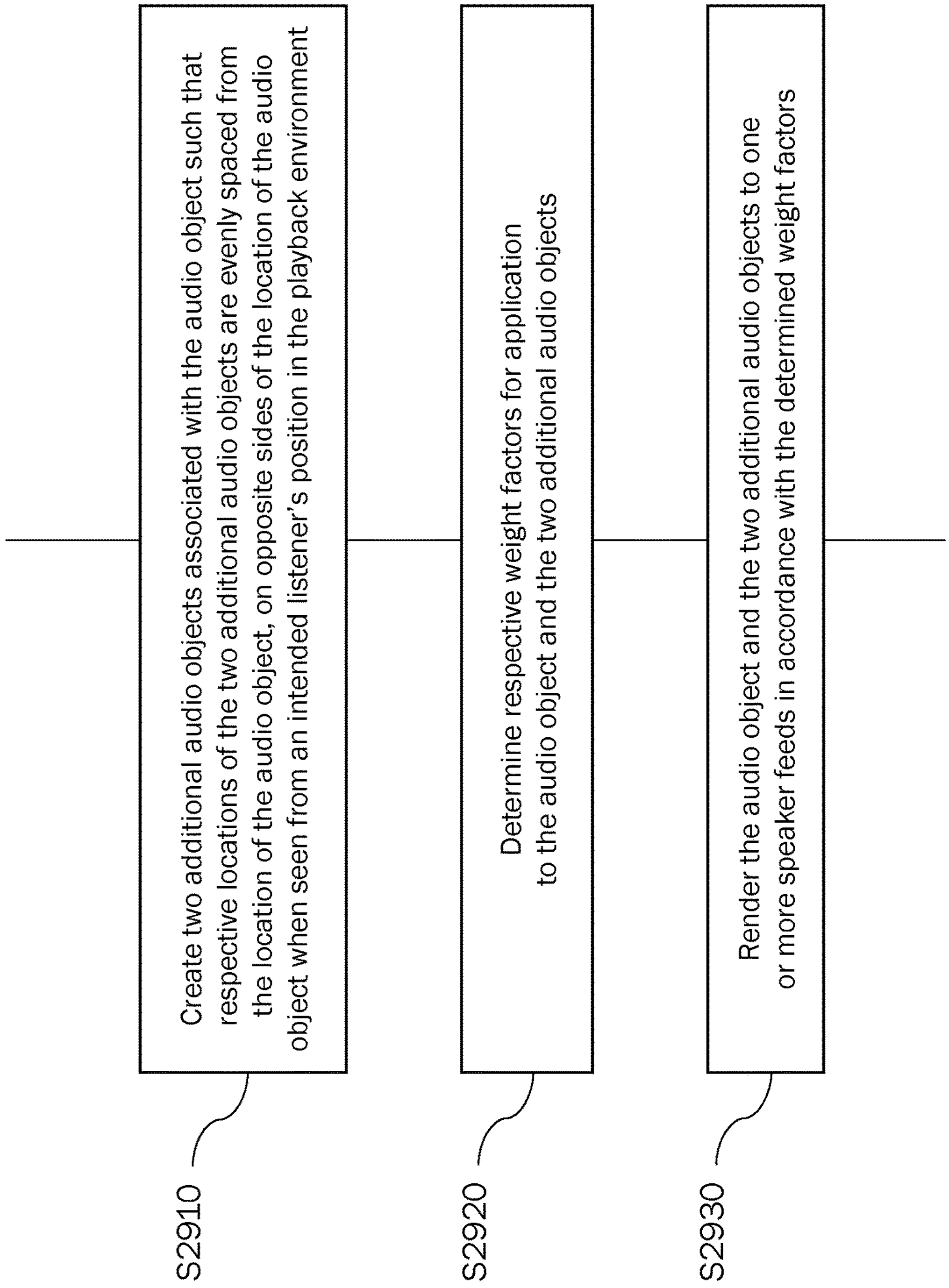
FIG. 29 is a flowchart schematically illustrating a method (e.g., algorithm) for rendering audio objects with divergence according to embodiments of the disclosure.

FIG. 29 is a flowchart illustrating an overview of the first method of rendering audio objects with divergence as an example of method of rendering input audio for playback in a playback environment. Input audio received by the method includes at least one audio object and associated metadata. The associated metadata indicates at least a location of the audio object. The metadata further indicates that the audio object is to be rendered with divergence, and may also indicate a degree of divergence (divergence parameter, divergence value) d and a distance measure D. The degree of divergence may be said to be a measure of relative importance of virtual objects (additional audio objects) compared to the audio object.

The method comprises steps S2910 to S2930 described below. Optionally, the method may comprise, as an initial step, referring to the metadata for the audio object and determining whether a phantom object at the location of the audio object is to be created. If so, steps S2910 to S2930 may be executed. Otherwise, the method may end.

At step S2910, two additional audio objects associated with the audio object are created such that respective locations of the two additional audio objects are evenly spaced from the location of the audio object, on opposite sides of the location of the audio object when seen from an intended listener's position in the playback environment. The additional audio objects may be referred to as virtual audio objects.

At step S2920, respective weight factors for application to the audio object and the two additional audio objects are determined. The weight factors may be the mixing gains $g_d$ and $g_v$ described above. The weight factors gains may impose a desired relative importance across the three objects. The two additional audio objects may have equal weight factors. In general, the weight factors (e.g., mixing gains $g_d$ and $g_v$; without intended limitation, reference may be made to the mixing gains $g_d$ and gv in the following) may depend on the measure of relative importance (e.g., divergence parameter d; without intended limitation, reference may be made to the divergence parameter d in the following) indicated by the metadata. For small values of the divergence parameter, the majority of energy may be provided by the original object, while for high values of the divergence parameter, the majority of energy may be provided by the virtual objects. In one example, the values of the divergence parameter may vary between 0 and 1. A divergence value of 0 indicates that all energy will be provided by the original object, so that $g_d$ will be equal to 1. Conversely, a divergence value of 1 indicates that all energy will be provided by the virtual objects. In this case, $g_d$ will be 0. Further, the weight factors may depend on the distance measure D. Examples of this dependence will be provided below.

At step S2930, the audio object and the two additional audio objects are rendered to one or more speaker feeds in accordance with the determined weight factors. For example, application of the weight factors to the audio object and the additional audio objects may yield the three new audio objects y[n], $y_{V1}$[n], and $y_{V2}$[n] described above, which may be rendered to the speaker feeds, for example by the point panner 1520 and the mixer block 1530 of the renderer 1500. The rendering of the audio object and the two additional audio objects to the one or more speaker feeds may result in a gain coefficient for each of the one or more speaker feeds (e.g., for an audio object signal x[n] of the original audio object).

An apparatus (rendering apparatus, renderer) for rendering input audio for playback in a playback environment (e.g., for performing the method of FIG. 29) may comprise a metadata processing unit (e.g., metadata pre-processor 110) and a rendering unit. The rendering unit may comprise a panning unit and a mixer (e.g., the source panner 120 and either or both of the ramping mixer(s) 130, 140). Step S2910 and step S2920 may be performed by the aforementioned metadata processing unit (e.g., metadata pre-processor 110). Step S2930 may be performed by the rendering unit.

The method may further comprise normalizing the weight factors based on the distance measure D. That is, initial weight factors may be determined, for example in accordance with the divergence parameter d, and the initial weight factors may subsequently be normalized based on the distance measure D. An example of such a method is illustrated in the flowchart of FIG. 30.

Figure 30:
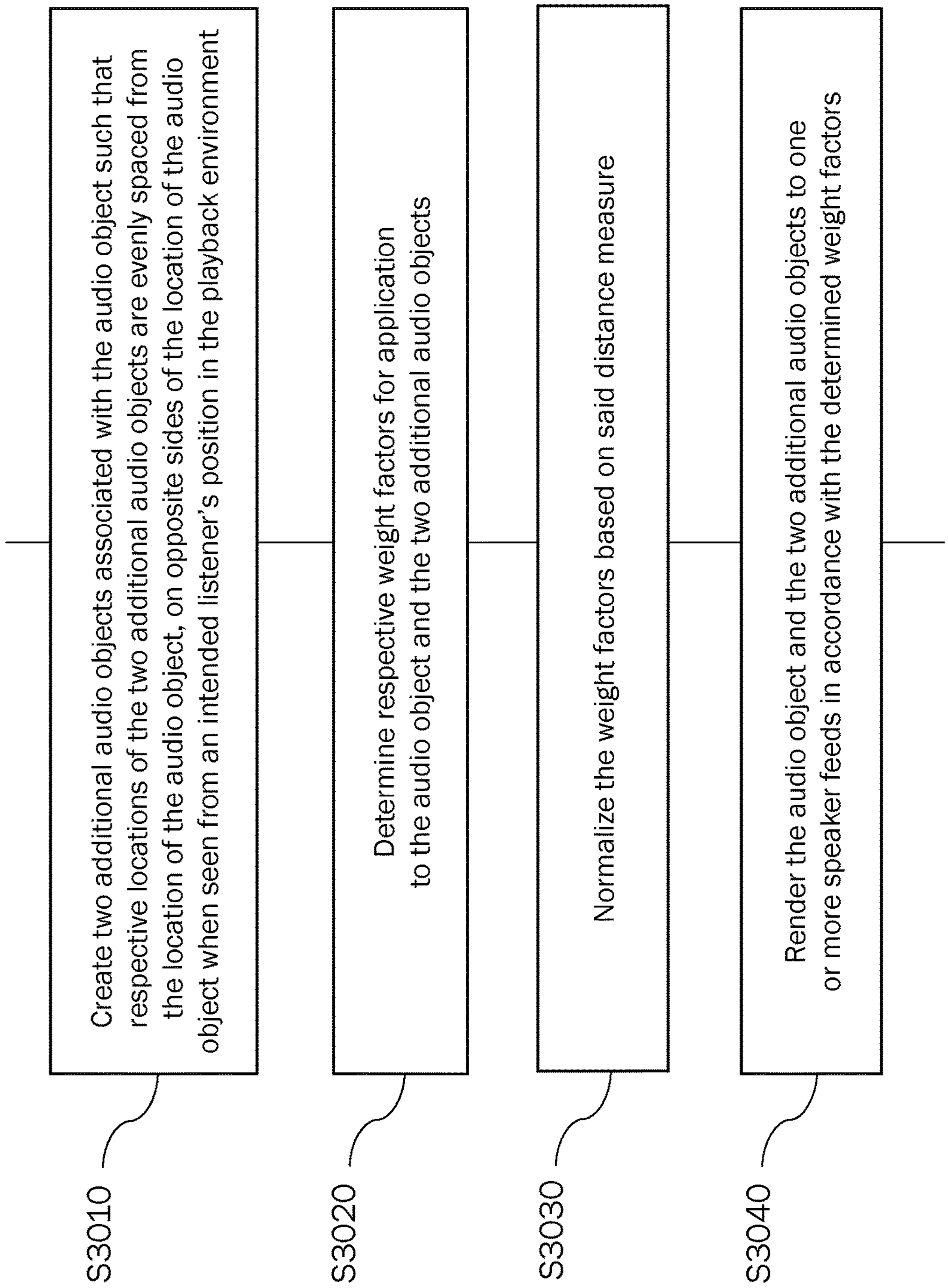
FIG. 30 is a flowchart schematically illustrating a modification of the method of FIG. 29.

Step S3010, step S3020, and step S3040 in FIG. 30 may correspond to steps S2910, S2920, and S2930, respectively, in FIG. 29, wherein the weight factors determined at step S3020 may be referred to as initial weight factors. At step S3030, the (initial) weight factors determined at step S3020 are normalized based on the distance measure. In general, the weight factors may be normalized such that a function $f(g_1,g_2,D)$ of the weight factors $g_1$, $g_2$ and the distance measure D attains a predetermined value, such as 1, for example. In this case, $f(g_1,g_2,D)=1$ would need to hold. Step S3030 may be performed by the metadata processing unit.

For example, the weight factors may be normalized such that a sum of equal powers of the normalized weight factors is equal to a predetermined value (e.g., 1). Here, an exponent of the normalized weight factors in said sum may be determined based on the distance measure. As indicated above, this normalization may be performed in accordance with the control function p(θ). The control function p(θ) may be used as said exponent. The weight factors may be the mixing gains, as indicated above, so that $g_1=g_d$ and $g_2=g_v$. In other words, the mixing gains may be normalized to satisfy equation [6]. Here and in the remainder of this disclosure, normalizing a set of quantities is understood to relate to uniformly scaling an initial set of quantities (i.e., using the same scaling factor for each quantity of the set) so that the set of scaled quantities satisfies a normalization condition, such as equation [6].

Figure 16A:
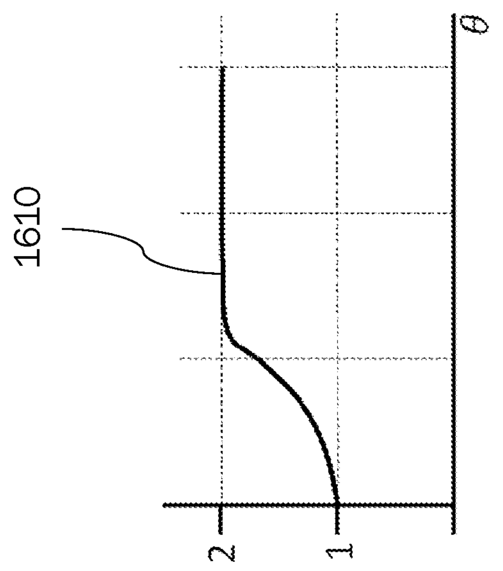
FIG. 16A and FIG. 16B show examples of control functions for gain normalization.

The control function p(θ) may be a smooth monotonic function of the distance measure (e.g., angle of separation θ; without intended limitation, reference may be made to the angle of separation θ in the following). The function p(θ) may yield 1 for the distance measure below a first threshold value and may yield 2 for the distance measure above a second threshold value. Thus, the image range of p(θ) extends from 1, where equation [6] represents the constraints of an amplitude preserving pan, to 2 where equation [6] is equivalent to enforcing constraints of a power preserving pan, as in equation [3]. For values of the distance measure between the first and second threshold values, p(θ) varies between 1 and 2 (i.e., takes on intermediate values) as the distance measure (e.g., the angle of separation θ) increases. p(θ) may have zero slope at the first and second threshold values. Further, p(θ) may have an inflection point at an intermediate value between the first and second threshold values. FIG. 16A illustrates an example of the general characteristic expected of p(θ). Notably, the control function p(θ) follows the guiding principles that the panning function should tend to favor amplitude preservation if the virtual sources are close to the phantom image location, and should provide for power preservation once the sources become sufficiently separated.

In addition to the distance measure (e.g., angle of separation), the values of the weight factors (e.g., $g_d$ and gv) may also depend on the divergence parameter. For small values of the divergence parameter, the majority of energy will be provided by the original object, while for high values of the divergence parameter, the majority of energy will be provided by the virtual objects. In one example, the values of the divergence parameter may vary between 0 and 1. A divergence value of 0 indicates that all energy will be provided by the original object. In this case, gv will be equal to 0 and $g_d$ will be equal to 1, regardless of the value of p(θ). Conversely, a divergence value of 1 indicates that all energy will be provided by the virtual objects. In this case, $g_d$ will be 0, the value $2g_v^{p(\theta)}$ will be equal to 1, and the value of $g_v$ will vary between ½ and $$\frac{\sqrt{2}}{2}$$

as p(θ) varies between 1 and 2.

The introduction of the control function p(θ) as a pure function of the distance measure (e.g., angle of separation) still constrains the weight factors (e.g., mixing gains) generated to be wideband—i.e. they apply the same gain to all frequencies. This may not fully agree with the guiding principle that the perception of phantom images varies across frequencies. To address this frequency dependency, the control function can be extended to include frequency as a control parameter. That is, the control function p can be extended to be a function of the distance measure (e.g., the angle of separation) and frequency, p(θ,f). Modifying equation [6], this yields:

$$g_d^{p(\theta,f)}+2g_v^{p(\theta,f)}=1 \qquad [7]$$

Figure 16B:
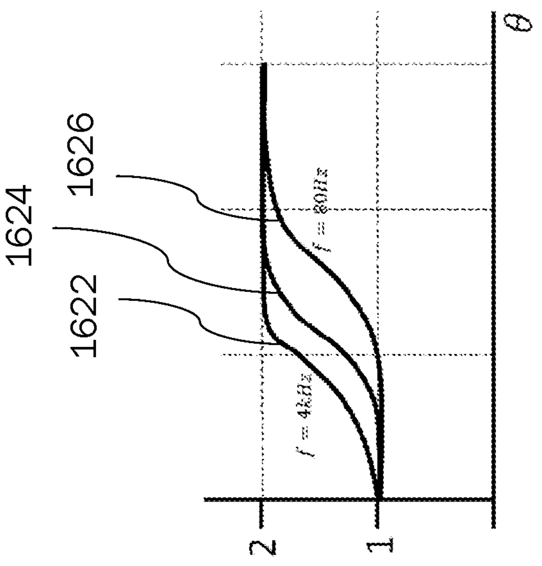

The extended control function, p(θ,f), still conforms to the same range as p(θ), however the inclusion of frequency, f, allows for the recognition that low frequency signals will continue to sum coherently over a larger angle of separation than higher frequency signals. FIG. 16B illustrates an example of the general characteristic expected of p(θ,f), i.e., how the control function p(θ,f) varies across frequencies. As can be seen from FIG. 16B, for low frequencies the amplitude panning constraint is preserved for larger distances (e.g., larger angles of separation) than for high frequencies. That is, for lower frequencies, the aforementioned first and second thresholds may be higher than for higher frequencies. That is, the first threshold may be a monotonically decreasing function of frequency, and the second threshold may be a monotonically decreasing function of frequency. In general, regardless of frequency, it may be assumed that for values of θ greater than or equal to 120 degrees, two sources are sufficiently far apart that they should be reproduced using power preserving panning (i.e., p(θ,f)=2).

In accordance with the above, normalization of the weight factors (e.g., mixing gains) may be performed on a sub-band basis, depending on frequency. That is, normalization of the weight factors may be performed for each of a plurality of sub-bands. Then, said exponent of the normalized weight factors in said sum mentioned above may be determined on the basis of a frequency of the frequency sub-band, so that the exponent is a function of the distance measure (e.g., angle of separation) and the frequency. The frequency that is used for determining said exponent may be the center frequency of a respective sub-band or may be any other frequency suitably chosen within the respective sub-band. The exponent may be the control function p(θ,f).

3.3.6.2 Method for Constraining Speaker Rendering of Virtual Sources(Second Method)

By employing a control function in the method for creating virtual sources, the method described in the foregoing section addresses the issues that would arise through blindly applying a power preserving set of gains (weight factors) prior to rendering. However it does not address the issues which may arise within an object renderer where divergence is allowed to be applied to an object located anywhere in the immersive space. These issues arise primarily because rendering of the final speaker feeds occurs in the playback environment, rather than in the controlled environment of the content creator, and are intrinsic to the object renderer paradigm of immersive audio. Thus, under certain conditions, using the second method that will now be described in more detail may be of advantage. As noted above, the second method may be employed either as a stand alone or in combination with the first method that has been described in the foregoing section.

Figure 31:
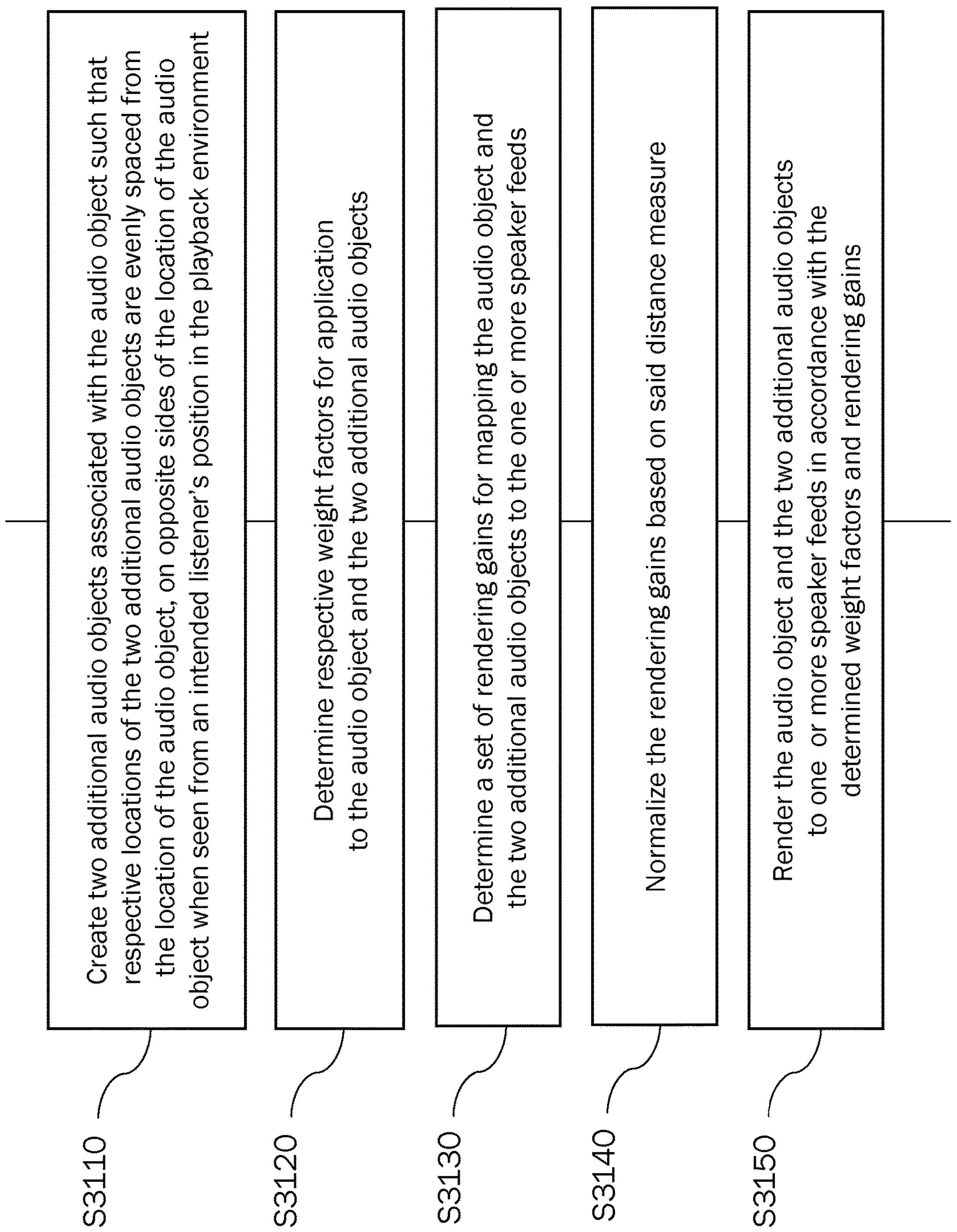
FIG. 31 is a flowchart schematically illustrating another method (e.g., algorithm) for rendering audio objects with divergence according to embodiments of the disclosure.

FIG. 31 is a flowchart illustrating an overview of the second method of rendering audio objects with divergence as an example of method of rendering input audio for playback in a playback environment. Input audio received by the method includes at least one audio object and associated metadata. The associated metadata indicates at least a location of the audio object. The metadata further indicates that the audio object is to be rendered with divergence, and may also indicate a degree of divergence (divergence parameter, divergence value) d and a distance measure D. The degree of divergence may be said to be a measure of relative importance of virtual objects (additional audio objects) compared to the audio object.

The method comprises steps S3110 to S3150 described below. Optionally, the method may comprise, as an initial step, referring to the metadata for the audio object and determining whether a phantom object at the location of the audio object is to be created. If so, steps S3110 to S3150 may be executed. Otherwise, the method may end. Step S3110 and step S3120 in FIG. 31 may correspond to step S2910 and step S2920, respectively, in FIG. 29.

At step S3130, a set of rendering gains for mapping (e.g., panning) the audio object and the two additional audio objects to the one or more speaker feeds is determined. This step may be performed by the point panner 1520, for example. Setting aside the details of the internal algorithms used by the point panner 1520, its purpose is to determine how to steer an audio object, given the audio object's location, to the set of speakers it is currently rendering for. So for a set of {i} object locations, and knowing the locations of the set of {j} speakers, step S3130 (for example performed by the point panner 1520) determines a rendering matrix $G_{ij}^{M}$ (i.e., a set of rendering gains) which dictates the gains (rendering gains) applied to each object's content when mixing it into each speaker signal.

At step S3140, the rendering gains are normalized based on the distance measure (e.g., angle of separation). Step S3140 may be performed by the point panner 1520, for example. In general, the rendering gains may be normalized so that, when inspecting the gains for a single object (i=I) over all speakers, the normalization condition is given by:

$$\forall\, i\left(\sum_{j=1}^{J}\left(G_{ij}^{M}\right)^{p}=1\right) \quad [8]$$

If equation [8] is enforced for p=1, the panning would be categorized as an amplitude preserving panning. If equation [8] is enforced for p=2, the panning would be power preserving panning. Generally, there is no inherent need for an object panner to meet either of these criteria, and it is possible to build a panner where equation [8] is satisfied for no value of p.

This method of inspection is useful when evaluating the panner's behavior when rendering objects (and virtual objects) created through divergence. If equation [8] is evaluated over a limited set of objects Ψ, which includes only the audio object and the additional audio objects (virtual objects) created from a single original object through the application of divergence metadata, a rendering constraint of the following form can be constructed:

$$\forall\, i\in\Psi\left(\sum_{j=1}^{J}\sum_{i=1}^{3}\left(G_{ij}^{M}\right)^{p}=1\right) \quad [9]$$

Equation [9], if true, would imply panning of all objects and virtual objects associated with an object with divergence so that the objects are actually reproduced in the speaker feeds in accordance with either an amplitude preserving pan (p=1) or a power preserving pan (p=2). Further, if it was found that this constraint did not hold naturally, it could be enforced by re-scaling the gains (rendering gains) associated with the set Ψ of divergence objects.

Additionally, when the normalization condition is formulated in this manner, the control functions p(θ) and p(θ,*f*) can be introduced, for example to replace p in equation [9]. Yet further, if we extend the concept of a wideband point panner to a panner which may also create frequency dependent panning functions $G_{ij}^{M}(f)$, then the speaker panning constraint (normalization condition) can be expressed as:

$$\forall\, i\in\Psi\left(\sum_{j=1}^{J}\sum_{i=1}^{3}\left(G_{ij}^{M}(f)\right)^{p(\theta,f)}=1\right) \quad [10]$$

In general, the rendering gains may be normalized (e.g., re-scaled) such that a sum of equal powers of the normalized rendering gains for all of the one or more speaker feeds and for all of the audio objects and the two additional audio objects is equal to a predetermined value (such as 1, for example). An exponent of the normalized rendering gains in said sum may be determined based on said distance measure. Said exponent may be the control function p(θ) described above. In analogy to the normalization of weight factors described in the foregoing section, the normalization of the rendering gains may be performed on a sub-band basis and in dependence on frequency.

At step S3150, the audio object and the two additional audio objects are rendered to the one or more speaker feeds in accordance with the determined weight factors and the (normalized) rendering gains.

In this way, a method of enforcing separation angle and frequency dependent panning constraints on the speaker outputs created when applying the divergence metadata is obtained.

It should be noted that the method of FIG. 31 may additionally include a step of normalizing the weight factors, in analogy to step S3030 in FIG. 30.

Finally, it should be noted that both equations [7] and [10] recite a function p(θ,*f*). While these functions may typically be the same, in some cases they may be defined independently of one another, such that p(θ,*f*) in equation [7] may not necessarily be equivalent to p(θ,*f*) in equation [10].

An apparatus (rendering apparatus, renderer) for rendering input audio for playback in a playback environment (e.g., for performing the method of FIG. 31) may comprise a metadata processing unit (e.g., metadata pre-processor 110) and a rendering unit. The rendering unit may comprise a panning unit and a mixer (e.g., the source panner 120 and either or both of the ramping mixer(s) 130, 140). Step S3110 and step S3120 may be performed by the aforementioned metadata processing unit (e.g., metadata pre-processor 110). Step S3130, step S3140, and step S3150 may be performed by the rendering unit.

3.3.7 Screen Scaling

The screenScaling feature allows objects in the front half of the room (e.g., the playback environment) to be panned relative to the screen. The screenRef flag in the object's metadata is used to indicate whether the object is screen related. If the flag is set to 1, the renderer will use metadata about the reference screen that was used during authoring (e.g., contained in the audioProgramme element) and the playback screen (e.g., given to the renderer as configuration parameters) to warp the azimuth and elevation of the objects in order to account for differences in the location and size of the screens. ITU-R BS.2076-0 provides default screen specification for the reference screen for use when such information is not contained in the input file. The renderer shall use default values for the playback screen, e.g., these same default values, when no configuration data is provided.

To maintain sensible behavior in the screen scaling feature, the following conditions should be satisfied by the attributes of the audioProgrammeReferenceScreen sub-element of the audioProgramme element. The same conditions apply to the corresponding renderer configuration parameters that specify the properties of the playback screen.

- It is assumed that the normal vector facing outward from the center of the screen intersects the center of the room (i.e., the screen is facing the center of the room).
- The distance from the center of the room to the screen must be greater than 0.01.
- The azimuth angle of the center of the screen must be between −40 to +40 degrees.
- The elevation angle of the center of the screen must be between −40 to +40 degrees.
- When the center of the screen is projected to the front wall, the entire screen surface must lie entirely on the front wall.
- The azimuth and elevation at every corner of the screen must be between −45 and 45 degrees.

These limitations may be enforced in the metadata and in the renderer configuration by the following procedure:

Step 1. If the screen position and size values are given in Cartesian coordinates, convert to spherical coordinates using the warping function described in section 3.3.2 "Object and Channel Location Transformations".

Step 2. Apply limits to the screen position and size metadata, as follows:

```
/*limit screen position*/
screenCentrePosition·distance= . . .
max(screenCentrePosition·distance, 0.01);
screenCentrePosition·azimuth= . . .
min(max(screenCentrePosition·azimuth, −40), 40);
screenCentrePosition·elevation= . . .
min(max(screenCentrePosition·elevation, =40), 40);
/* screen width and height at distance=1*/
width=2*tan(screenWidth·azimuth/2);
height=width/aspectRatio;
height_elevation=2*arctan(height/2);
/* limit screen size azimuth */
max_az=90−abs(screenCentrePosition·azimuth);
if (screenWidth·azimuth>max_az)
{
screenWidth·azimuth=max_az;
width=2*tan(screenWidth·azimuth/2);
aspectRatio=width/height;
}
/* limit aspect ratio */
max_el=90−abs(screenCentrePosition·elevation);
if (height_elevation>max_el)
{
height=2*tan(max_el/2);
aspectRatio=width/height;
}
```

Once appropriate limits have been applied to the screens, screen scaling is applied to objects with screenRef=1 as follows:

Step 1. If the object's position is given in Cartesian coordinates, it is converted to spherical coordinates using the $Map_{SC}$( ) function (section 3.3.2 "Object and Channel Location Transformations").

Step 2. Apply a warping function to the object's direction az and el that maps the azimuth and elevation range of the reference screen to the range of the playback screen.

```
ref·screenWidth·elevation=2
*arctan(tan(ref·screenWidth·azimuth/2)/ref·aspectRatio);
ref_az_1=ref·screenCentrePosition·azimuth
−ref·screenWidth·azimuth/2;
ref_az_2=ref·screenCentrePosition·azimuth
+ref·screenWidth·azimuth/2;
ref_el_1=ref·screenCentrePosition·elevation
−ref·screenWidth·elevation/2;
ref_el_2=ref·screenCentrePosition·elevation
+ref·screenWidth·elevation/2;
play·screenWidth·elevation=2
*arctan(tan(play·screenWidth·azimuth/2)/
  play·aspectRatio);
play_az_1=play·screenCentrePosition·azimuth
−play·screenWidth·azimuth/2;
play_az_2=play·screenCentrePosition·azimuth
+play·screenWidth·azimuth/2;
play_az_1=play·screenCentrePosition·elevation
−play·screenWidth·elevation/2;
play_az_2=play·screenCentrePosition·elevation
+play·screenWidth·elevation/2;
/* finally, warp the object's azimuth and elevation */
az=warp(ref_az_1, ref_az_2, play_az_1, play_az_2, az);
el=warp(ref_el_1, ref_el_2, play_el_1, play_el_2, el);
/* piecewise linear warp function */
function theta=warp(alpha1, alpha2, beta1, beta2, theta)
{
/* line slopes */
m1=(−50−beta1)/(−50−alpha1);
m2=(beta2−beta1)/(alpha2−alpha1);
m3=(50−beta2)/(50−alpha2);
/* line offsets */
b1=−50−m1*(−50);
b2=beta1−m2*alpha1;
b3=beta2−m3*alpha2;
if (theta>−50 & theta<alpha1)
{
  theta=m1* theta+b1;
} else if (theta>=alpha1 & theta<alpha2){
  theta=m2*theta+b2;
} else if (theta>=alpha2 & theta <50){
  theta=m3* theta+b3;
}
}
```

It is worth noting that the warp function begins to warp angles at +/−50 degrees. This is because the screen edges are allowed to be at +/−45 degrees, and there needs to be a bit of "slack" space to prevent the warping function from producing line segments with zero slope, which would result in panning "dead zones".

Figure 17:
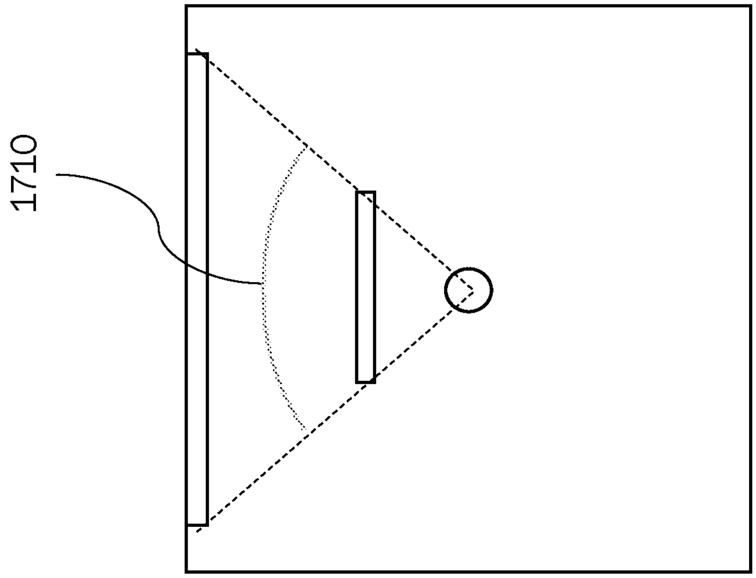
FIG. 17 schematically illustrates an example of projecting a screen to the front wall of a room.

The angle-warping strategy naturally causes the displacement of objects due to screen scaling to be greater near the front of the room than in the center of the room. The screen distance is purposely not considered in this strategy, as this allows a small screen near the center of the room to be treated the same as a larger screen near the front wall—i.e., the algorithm always considers the projection of the screen to the front wall of the room. This is schematically illustrated in FIG. 17 in which the screen is projected to the front wall of the room in accordance with its width azimuth angle 1710 (screenWidth.azimuth).

Figure 18A:
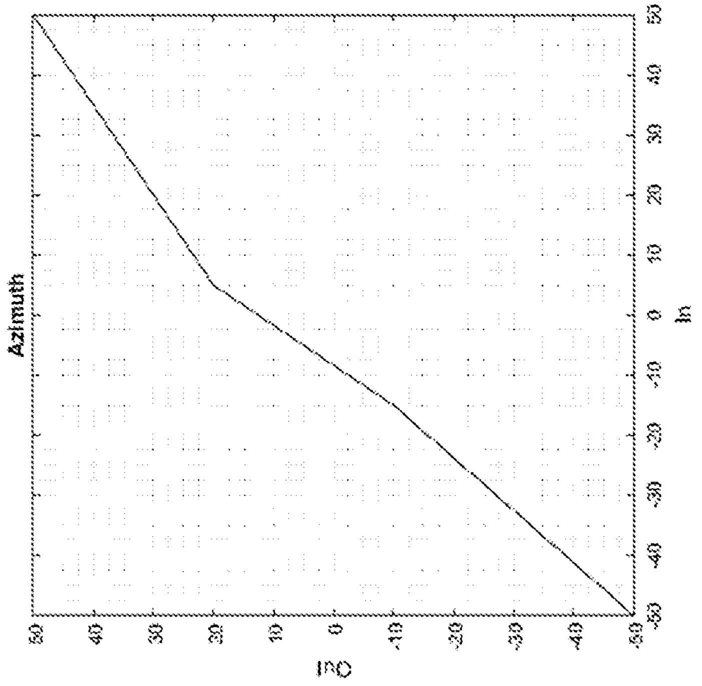
FIG. 18A and FIG. 18B show examples of screen scaling warping functions for azimuth and elevation, respectively.
Figure 18B:
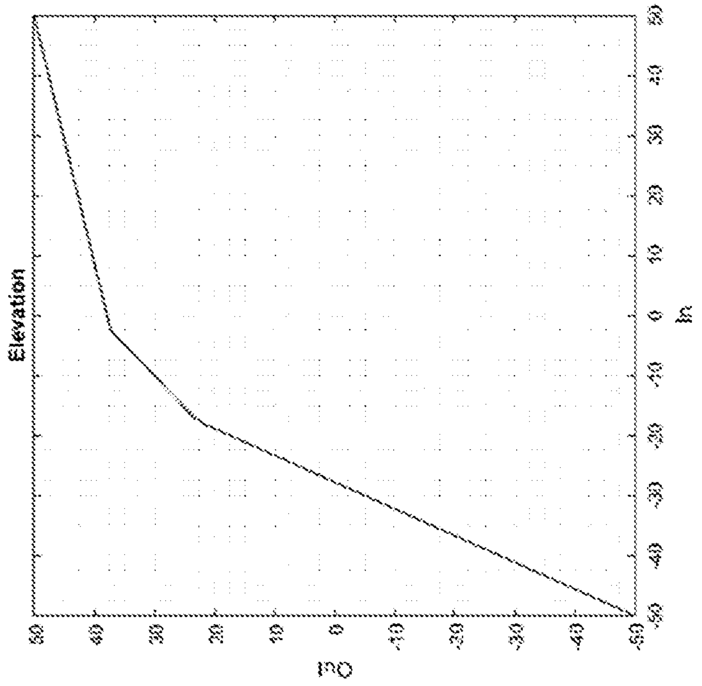

FIG. 18A and FIG. 18B schematically show the resulting warping functions for azimuth and elevation for the following screen configurations:

ref·screenCentrePosition·azimuth=−5;
ref·screenWidth·azimuth=20;
ref·screenCentrePosition·elevation=−10;
ref·aspectRatio=1.33;
play·screenCentrePosition·azimuth=5;
play·screenWidth·azimuth=30;
play·screenCentrePosition·elevation=30;
play·aspectRatio=2.11;

3.3.8 Screen Edge Lock

ADM specifies screenEdgeLock for both channels and objects. screenEdgeLock ensures that an audioObject is rendered at the edge of a playback screen. The playback screen size will be an input to the command line of the renderer and will be in the audioProgrammeReferenceScreen format.

Step 1. Check if the playback screen information is available. If it is not available then screenEdgeLock will be ignored and no further processing will be done with this parameter.

Step 2. Ensure that screenEdgeLock has been specified for a valid dimension. Left/Right is only valid for azimuth and x, Top/Bottom is only valid for elevation and z. If it is not specified for a valid dimension, screenEdgeLock will be ignored and no further processing will be done with this parameter.

Step 3. If the audioBlockFormat has been specified in Cartesian coordinates these will be converted to spherical coordinates using the function described in section 3.3.2 "Object and Channel Location Transformations".

Step 4. The audioObject must be in the front half of the room. Elevation must be in the range [−90, 90] and azimuth must be in the range [−90, 90]. If the coordinates are outside of this range then screenEdgeLock will be ignored and no further processing will be done with this parameter Step 5. The playback screen information will be used to determine the spherical coordinates of the four corners of the screen. The method to calculate this information is described in section 3.3.2 "Object and Channel Location Transformations.

Step 6. Clip the azimuth and elevation coordinates so that they fall within the range of the screen edges and set the distance to be 1.0.

Figure 19B:
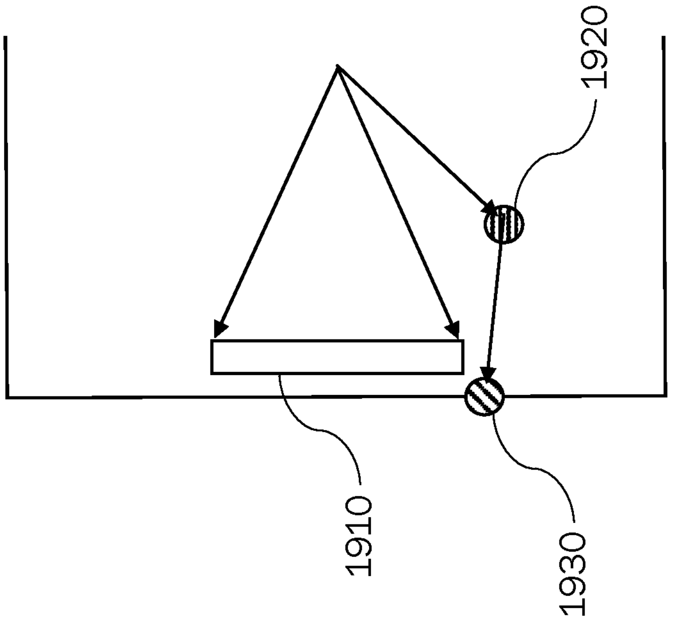
FIG. 19A and FIG. 19B show examples of audio objects to which the screen edge lock feature is applied.
Figure 19A:
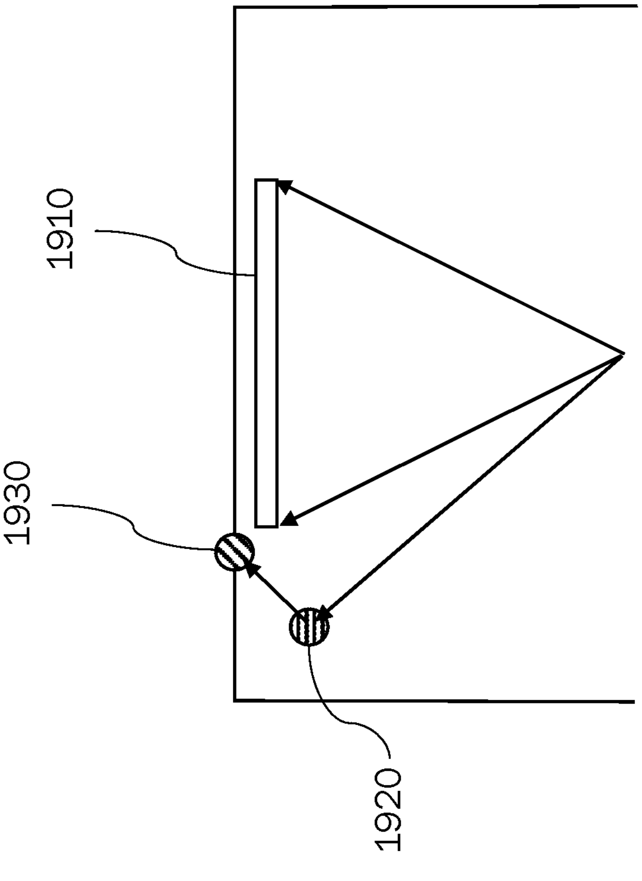

For example if the playback screen 1910 of FIG. 19A and FIG. 19B has four spherical coordinates (−30,20,0.9), (30,20,0.9), (30,20,0.9) and (−30,20,0.9) and an object is specified at (−45,0,0.8) with screenEdgeLock set to "Left", its coordinates will be modified so that it sits at (−30,0,1.0). If an object is specified at (45,45,0.5) with screenEdgeLock set to "Right", its coordinates will be modified so that it sits at (30, 20,1.0). Here, coordinates are given as (azimuth, elevation, distance). FIG. 19A and FIG. 19B show examples of this behavior in two dimensions. FIG. 19A is an example of a top view of the room illustrating the clipping of the coordinates of an audio object 1920 at −45 azimuth and 0.8 distance with screenEdgeLock set to "Left". In this example, the left screen edge of the playback screen 1910 is located at −30 azimuth and 0.9 distance, and the right screen edge is located at 30 azimuth and 0.9 distance. The coordinates of the screen-edge-locked object 1930 after clipping are −30 azimuth and 1.0 distance. In FIG. 19A, the coordinates are given as (azimuth, distance). FIG. 19B is an example of a side view of the room illustrating the clipping of the coordinates of an audio object 1920 at −45 elevation and 0.5 distance with screenEdgeLock set to "Bottom". In this example, the bottom screen edge of the playback screen 1910 is located at −20 elevation and 0.9 distance, and the top screen edge is located at 20 elevation and 0.9 distance. The coordinates of the screen-edge-locked object 1930 after clipping are −20 elevation and 1.0 distance. In FIG. 19B, the coordinates are given as (elevation, distance).

Step 7. Convert spherical coordinates to Cartesian coordinates and modify the audioBlockFormat to these new coordinates. The audioObject can now be rendered.

3.3.9 Importance

The ADM metadata provides for the specification of importance both of an audioPackFormat and an audioObject. The ADM baseline renderer takes inputs related to importance called <importance> and <obj_importance>, both ranging from 0 to 10. audioPackFormats with an importance value less than the <importance> parameter will be ignored by the metadata pre-processor 110. Within audio packs that will be rendered, objects with audioObject.importance less than <obj_importance> will be ignored by the metadata pre-processor 110.

3.3.10 Frequency

ADM allows audioChannelFormat elements to contain optional frequency parameters specifying frequency ranges of audio data. The baseline renderer treats this element of ADM as purely informational as has no direct influence on the renderer output. Explicitly no frequency information is required for LFE channels and no low pass characteristic is enforced on sub-woofer speaker outputs. However, because future processing stages in the playback system may choose to do something with this information, frequency metadata shall be passed through to the output LFE channels. See section 3.2.4 "LFE Channels and Sub-Woofer Speakers" for more details regarding LFE channels and sub-woofer speaker rendering.

3.4 Ramping Mixer

The ramping mixer combines the input object audio PCM samples to create speaker feeds using the gains calculated in the source panner 120. The gains are crossfaded from their previous values over a length of time determined by the object's metadata.

For efficiency, the ramping mixer operates on time slot intervals of SL=32 samples. For each slot sn, the metadata update for object i is represented by a new vector of speaker gains, $G_{ij}^{M}$, and the number of slots remaining before the metadata update should be completed, $\Omega_i$, whose calculation is described in the next section.

If $\Omega_i=0$, the speaker gains are updated immediately via $G_{ij}^{R}=G_{ij}^{M}$ and the ramp delta is zeroed ($R_{ij}^{\Delta}=0$). Otherwise a new ramp delta for each object is calculated via $$R_{ij}^{\Delta}=(G_{ij}^{M}-G_{ij}^{R})/\Omega_i.$$

For each slot sn, each active object's PCM data is mixed into the speaker feeds $y_j$.

$$y_j(sn*SL+n)=\sum_i x_i(sn*SL+n)\left(G_{ij}^{R}+R_{ij}^{\Delta}\left(\frac{n}{SL}\right)\right),\ n=0..(SL-1)$$

The slots remaining and current gains are also updated:

$$G_{ij}^{R}=G_{ij}^{R}+R_{ij}^{\Delta}$$

$$\Omega_i=\max(0,\Omega_i-1)$$

These are stored in state for the next slot.

3.4.1 JumpPosition

This metadata feature controls the cross-fade of an object's position from its previous position. The crossfade length is determined by the object's metadata. For efficiency reasons, the crossfade length is rounded to a whole number of SL=32 sample slots, denoted $\Omega_i$. The cross-fade is implemented directly by the ramping mixers 130, 140. This section details the calculation of $\Omega_i$.

To simplify notation, the following symbols are used to refer to ADM metadata fields:

$t_1$ audioObject.start, $t_2$ audioBlockFormat.rtime, $t_B$, audioBlockFormat.duration, $t_I$ audioBlockFormat.interpolationLength.

$j_p$ audioBlockFormat.jumpPosition.

Let $F_s$ denote the sample rate. For each time slot sn, updates due to audioBlockFormat metadata are applied in time sequential order—i.e., for the last audioBlockFormat for which $(t_1+t_2)$. Fs<(sn+1). SL, the new gains $G_{ij}^{M}$ are calculated using the audioBlockFormat metadata by the source panner 120.

The cross-fade duration is $\Omega_i$=round $$\left(t_B\cdot\frac{F_s}{SL}\right)$$

when $$j_p=0 \text{ or } \Omega_i=\text{round}\left(t_I\cdot\frac{F_s}{SL}\right),$$

otherwise. In either case $\Omega_i$ is forced to be at least 1, to ensure no audio glitches occur.

The new gains calculated from an audioBlockFormat metadata item will not be reached until time $t_1+t_2$ plus the cross-fade duration.

The newly calculated gains $G_{ij}^{M}$ and slots-remaining $\Omega_i$ will be used by the ramping mixers 130, 140.

3.5 Diffuse Ramping Mixer

The diffuse ramping mixer 140 combines the input object audio PCM samples using the gains calculated in the source panner 120 to feed the speaker decorrelator 150. The gains may be crossfaded from their previous values over a length of time determined by the object's metadata.

On the diffuse path, all objects are panned to the center of the room, so the speaker gains have the property $G_{ij}^{M'}=g_i^{M'}G_j'$. The speaker-dependent part of the gain $G_j'$ is fixed by the speaker layout and so is applied directly in the decorrelator block. The diffuse ramping mixer 140 thus down-mixes all the objects to a single mono channel $y_D$ using the gains $g_i^{M'}$.

The equations for the diffuse ramping mixer 140 are identical to the ramping mixer 130 except there is no-longer any speaker dependence.

3.6 Speaker Decorrelator

The Speaker Decorrelator 150 takes the down-mixed channel $y_D$ from the diffuse ramping mixer 140, and the diffuse speaker gains $G_j'$ and creates the diffuse speaker feeds $y_j'$.

To create the effect of diffuseness, and prevent collapse, it is necessary to introduce decorrelation. The core decorrelation will first be described, followed by improvements to the transient response, and finally distribution to speakers.

3.6.1 Core Decorrelator

The design makes use of one decorrelation filter per speaker pair. A large number of orthogonal decorrelation filters may lead to audible decorrelation artefacts. Therefore, a maximum of four unique decorrelation filters are implemented. For larger numbers of speakers the decorrelation filter outputs are re-used.

Figure 20:
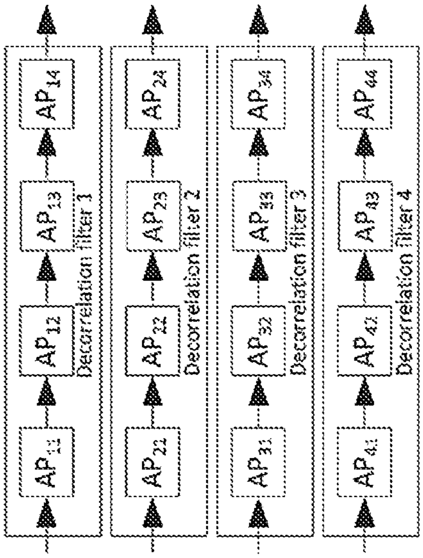
FIG. 20 schematically illustrates an example of a core decorrelator in the renderer according to embodiments of the disclosure.
Figure 21:
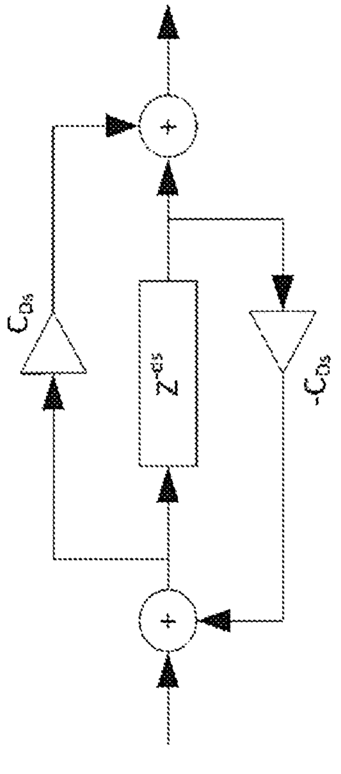
FIG. 21 schematically illustrates an example of an all-pass filter structure in the renderer according to embodiments of the disclosure.

Each decorrelation filter consists of four all-pass filter sections $AP_{ns}$ in series, where n indexes over the decorrelation filters, and s indexes over the all-pass sections within a decorrelation filter. FIG. 20 illustrates an example of the four decorrelation filters and their respective all-pass filter sections. Each all-pass filter section consists of a single parameter $C_{Ds}$ and a delay line with delay $d_s$. An example of the all-pass section is illustrated in FIG. 21 and implements the difference equation $$y(n)=C_{Ds}x(n)+x(n-d_s)-C_{Ds}y(n-d_s).$$

The delay for the all-pass section is calculated via $$R_s=3^{(s-1)/4}$$

$$d_s=\text{ceil}\left(\tau\cdot F_s\cdot R_S/\left(\sum_{s=0}^{3}R_s\right)\right),$$

where $F_s$ is the sample rate, and $\tau$ is chosen to be 20 ms and does not vary across decorrelation filters n. The coefficient $C_{Ds}$ is given by $C_{Ds}$=0.4*Hadamard4(n,s).

3.6.2 Improving the Transient Response

Figure 22:
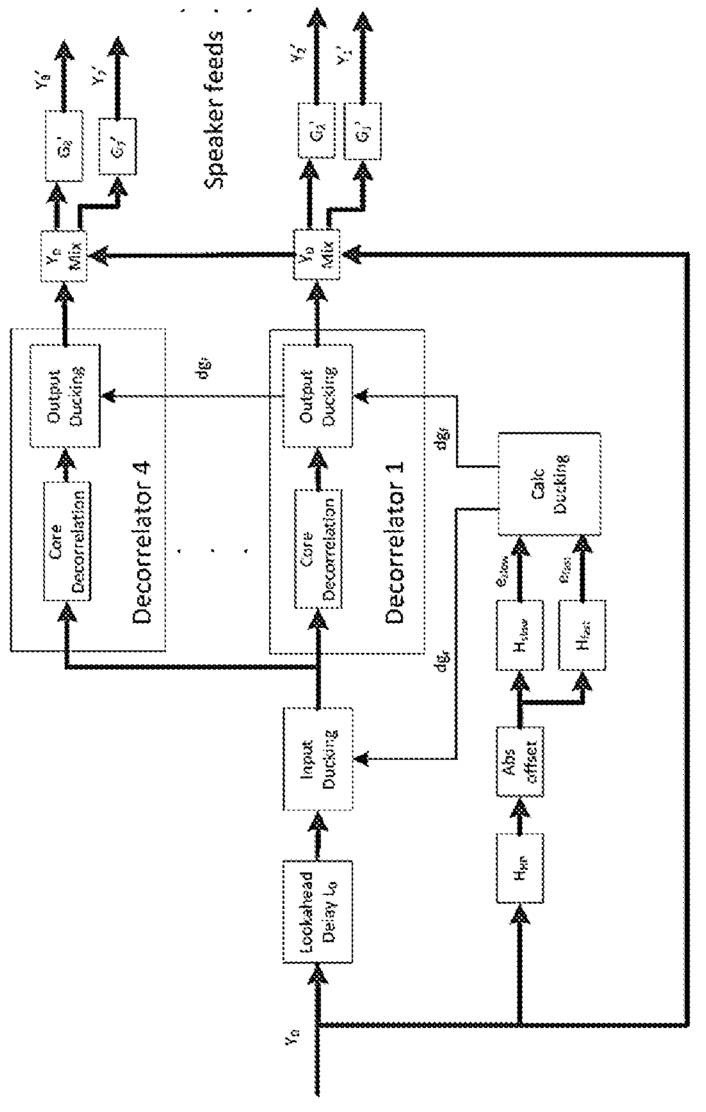
FIG. 22 schematically illustrates an example of an architecture of a transient-compensated decorrelator in the renderer according to embodiments of the disclosure.

The transient response of the decorrelators is improved by ducking the input upon detecting a quick rise in the signal envelope, and ducking the output upon detecting a quick fall in envelope. An example of the full decorrelator structure is shown in FIG. 22.

The decorrelator blocks are fed by a look-ahead delay to compensate for the ducking calculation latency. The look-ahead delay is 2 ms.

The ducking calculation first works by creating fast and slow smoothed envelope estimates. The input $y_D$ is high-pass filtered with a single-pole filter having cut-off frequency of 3 kHz, then the absolute value is taken and an offset of $\varepsilon=1\times10^{-5}$ is added. The result is then smoothed with a single-pole smoother with slow time constant of 80 ms, and a fast time constant of 5 ms to produce $e_{slow}$ and $e_{fast}$, respectively.

The rise transient ducking gain is smoothed towards 1 using $$dg_r(n)=[dg_r((n-1)-1]c_{dr}+1,$$

where $c_{dr}$ is chosen to give a time constant of 50 ms and follows the transient during a rise via $$dg_r(n)=1.1*\frac{e_{slow}}{e_{fast}},\ \text{if}\ 1.1*e_{slow}<dg_r(n)*e_{fast}.$$

Similarly the fall transient ducking gain is also smoothed towards 1 using $$dg_f((n)=[dg_f(n-1)-1]c_{df}+1,$$

where $c_{df}$ is also chosen to give a time constant of 50 ms and follows the transient during a fall via $$dg_f(n) = 1.1 * \frac{e_{fast}}{e_{slow}}, \text{ if } 1.1 * e_{fast} < dg_f(n) * e_{slow}.$$

In the $y_D$ mix block, the original downmix signal $y_D$ is mixed with the ducked decorrelation filter signal, with $y_D$ receiving a mix coefficient of 0.9 and the ducked decorrelation filter signal receiving a mix coefficient of 0.3.

The negation of each $y_D$ mix block gives another decorrelated output. These decorrelated outputs are then multiplied by the appropriate speaker gain $G_j'$ and distributed to the speakers.

3.6.3 Speaker Distribution

The section describes how the decorrelated outputs will map to speakers for specific speaker layouts. Symbol 'D1' will denote the output of the decorrelator 1 block and '–D1' the negated output of the decorrelator 1 block. Since there are only up to 8 outputs from the decorrelator blocks, some outputs are re-used on the larger speaker layouts. On the smaller speaker layouts some decorrelator blocks will not be required.

Layouts are described in the notation U+M+L. Where U is the number of speakers on the upper ring, M is the number of speakers on the middle ring, and L is the number of speakers on the lower ring. The particular speaker on a ring is represented in the format by its azimuth angle measured counter clockwise from center.

TABLE 5

Decorrelator speaker distribution for Layout A (0 + 2 + 0)

| Speaker | Decorrelation |
|---|---|
| M – 030 | D1 |
| M + 030 | –D1 |

TABLE 6

Decorrelator speaker distribution for Layout B (0 + 5 + 0)

| Speaker | Decorrelation |
|---|---|
| M + 000 | none |
| M – 030 | D1 |
| M + 030 | –D1 |
| M – 110 | D2 |
| M + 110 | –D2 |

TABLE 7

Decorrelator speaker distribution for Layout C (2 + 5 + 0)

| Speaker | Decorrelation |
|---|---|
| M + 000 | none |
| M – 030 | D1 |
| M + 030 | –D1 |
| M – 110 | D2 |
| M + 110 | –D2 |
| U – 030 | D3 |
| U + 030 | –D3 |

TABLE 8

Decorrelator speaker distribution for Layout D (4 + 5 + 0)

| Speaker | Decorrelation |
|---|---|
| M + 000 | none |
| M – 030 | D1 |
| M + 030 | –D1 |
| M – 110 | D2 |
| M + 110 | –D2 |
| U – 030 | D3 |
| U + 030 | –D3 |
| U – 110 | D4 |
| U + 110 | –D4 |

TABLE 9

Decorrelator speaker distribution for Layout E (4 + 5 + 1)

| Speaker | Decorrelation |
|---|---|
| M + 000 | none |
| M – 030 | D1 |
| M + 030 | –D1 |
| M – 110 | D2 |
| M + 110 | –D2 |
| U – 030 | D3 |
| U + 030 | –D3 |
| U – 110 | D4 |
| U + 110 | –D4 |
| B + 000 | none |

TABLE 10

Decorrelator speaker distribution for Layout F (3 + 7)

| Speaker | Decorrelation |
|---|---|
| M + 000 | none |
| M – 030 | D1 |
| M + 030 | –D1 |
| M – 90 | D2 |
| M + 90 | –D2 |
| M – 135 | D3 |
| M + 135 | –D3 |
| U – 045 | D4 |
| U + 045 | –D4 |
| U + 180 | none |

TABLE 11

Decorrelator speaker distribution for Layout G (4 + 9)

| Speaker | Decorrelation |
|---|---|
| M + 000 | none |
| M – SC | D1 |
| M + SC | –D1 |
| M – 030 | D1 |
| M + 030 | –D1 |
| M – 90 | D2 |
| M + 90 | –D2 |
| M – 135 | D3 |
| M + 135 | –D3 |
| U + 045 | D4 |
| U – 045 | –D4 |
| U + 110 | –D4 |
| U + 110 | D4 |

TABLE 12

Decorrelator speaker distribution for Layout H (9 + 10 + 3)

| Speaker | Decorrelation |
|---|---|
| M + 000 | none |
| M − 030 | D1 |
| M + 030 | −D1 |
| M − 060 | D1 |
| M + 060 | −D1 |
| M − 090 | D2 |
| M + 090 | −D2 |
| M − 135 | −D2 |
| M + 135 | +D2 |
| M − 180 | none |
| U + 000 | none |
| U − 045 | D3 |
| U + 045 | −D3 |
| U − 090 | D4 |
| U + 090 | −D4 |
| U − 135 | −D4 |
| U + 135 | +D4 |
| U + 180 | none |
| T + 000 | none |
| B + 000 | none |
| B − 045 | −D3 |
| B + 045 | +D3 |

4. Scene Renderer

Figure 23:
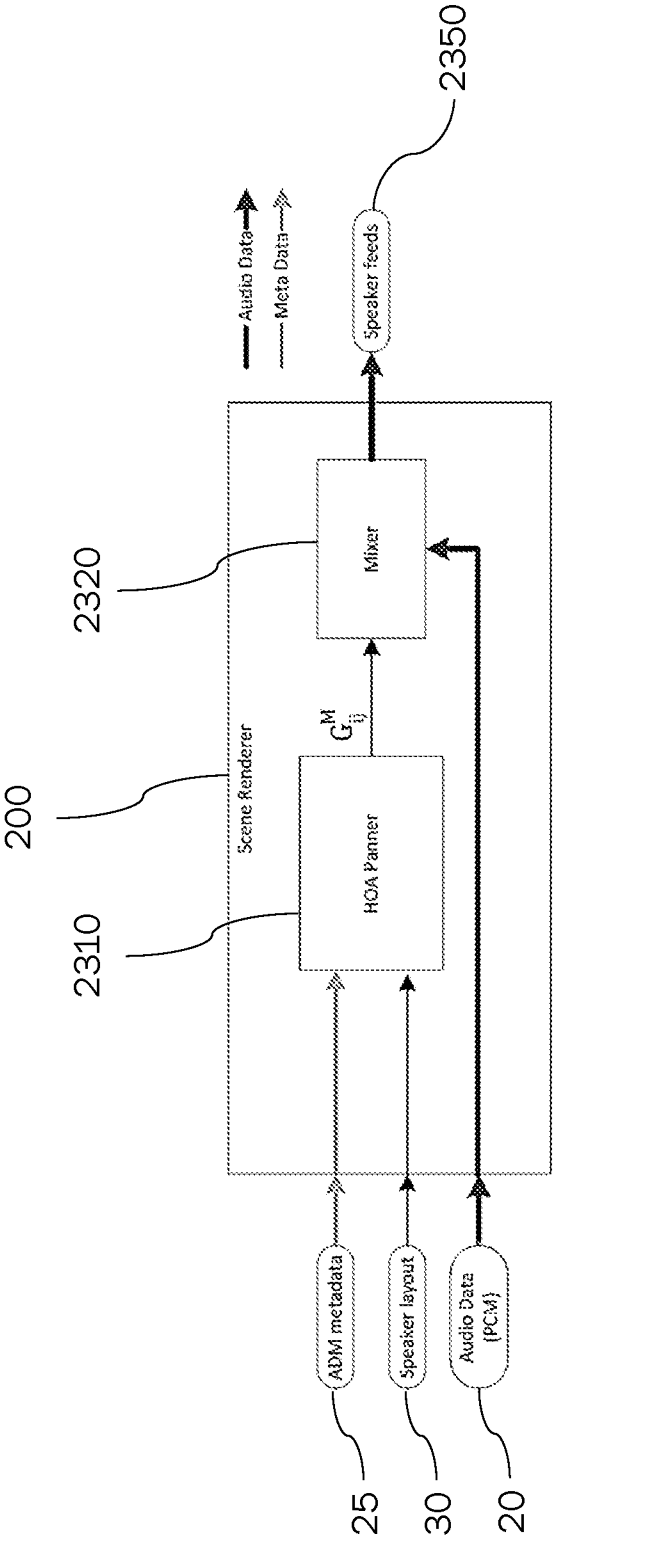
FIG. 23 schematically illustrates an example of a scene renderer of the renderer according to embodiments of the disclosure.

An example of the architecture of the scene renderer 200 is illustrated in FIG. 23. The scene renderer 200 comprises a HOA panner 2310 and a mixer (e.g., HOA mixer) 2320. The scene renderer 200 is presented with input audio objects, i.e., with metadata (e.g., ADM metadata) 25 and audio data (e.g., PCM audio data) 20, and with the speaker layout 30. The scene renderer 200 outputs speaker feeds 2350 that can be combined (e.g., by addition) with the speaker feeds output by the object and channel renderer 100 and provided to the reproduction system 500.

In more detail, the scene renderer 200 is presented with $(N+1)^2$ channels of HOA input audio, with the channels sorted in the standard ACN channel ordering, such that channel number c contains the HOA component of Order l and Degree m (where $-l \le m \le l$), such that $c=1+l(l+1)+m$. Any LFE inputs are passed through or mixed to output LFE channels following the same rules as the channel and object renderer uses as set out in section 3.2.4 "LFE Channels and Sub-Woofer Speakers".

4.1 HOA Panner

The scene renderer 200 may contain a Higher Order Ambisonics (HOA) Panner, which is supplied with the following metadata:

$$N=\text{HOA Order}\in[1,2,3,4,5]$$

$$\text{Scale}=\text{ScalingMode}\in\{N3D,SN3D,\text{FuMa})$$

$$\text{SprkConfig}=\text{SpeakerConfig}\in[1\ \ldots\ 0.8]$$

The HOA Panner is responsible for generating a $(N+1)^2 \times N_S$ matrix of gain coefficients, in the matrix $G_{ij}^M$, where $N_S$ is the number of speakers in the playback system (excluding LFE channels):

$$G_{ij}^M\text{: } 1\le i\le(N+1)^2\ 1\le j\le N_S$$

This panner matrix is computed by first selecting the Reference HOA Matrix from the set of predefined matrices described in Appendix B. For example, for N=3 ($3^{rd}$ order HOA) and SprkConfig=4 (4+5+0 configuration), array HOA_Ref_HOA3_Cfg4 is chosen:

$$\text{RefMatrix}=\text{HOA\_Ref\_HOA3\_}Cfg4$$

Each row of this matrix is scaled by a scale factor that depends on the HOA Scaling Mode. This scaling is performed by the following procedure:

1. Define the HOAScale[ ] array, of length $(N+1)^2$.
2. For c=1 . . . $(N+1)^2$ {
   define $l=\text{floor}(\sqrt{c-1})$
   if ScalingMode==N3D,
      HOAScale[c]=1.0
   elseif ScalingMode==SN3D,
      HOAScale[c]=$\sqrt{2l+1}$
   else
      HOAScale[c]=FuMaScale[c]
   }

In this procedure the FuMaScale[c] is derived from the Furse-Malham scaling table, as provided in Appendix B The $G_{i,j}^M$ coefficients are then created by the following process:

1. $G^M$ is created as a $(N+1)^2 \times N_S$ matrix (where $N_S$ is the number of speakers)
2. The coefficients are then defined by scaling the coefficients in the RefMatrix array:

$$G_{i,j}^M=\text{RefMatrix}_{i,j}\times\text{HOAScale}[i]\ 1\le i\le(N+1)^2\ 1\le j\le N_S$$

4.2 HOA Mixer

The HOA mixer processes the $(N+1)^2$ input channels to produce Ns output channels, by a linear mixing operation:

$$\text{Out}_j(n)=\sum_{i=1}^{(N+1)^2} G_{i,j}^M\times HOA_i(n)$$

It should be noted that the description and drawings merely illustrate the principles of the proposed methods and apparatus. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and apparatus and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The methods and apparatus described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and apparatus may be stored on media such as random access memory or optical storage media. They may be transferred via networks, such as radio networks, satellite networks, wireless networks or wireline networks, e.g. the Internet.

APPENDIX A—CARTESIAN COORDINATES FOR SPEAKER LAYOUTS

TABLE 13

Cartesian coordinates for Speaker Layout A: 0 + 2 + 0

| SP Label | X | Y | Z | isLFE |
|---|---|---|---|---|
| M + 030 | −1.000000 | 1.000000 | 0.000000 | 0 |
| M − 030 | 1.000000 | 1.000000 | 0.000000 | 0 |

TABLE 14

Cartesian coordinates for Speaker Layout B: 0 + 5 + 0

| SP Label | X | Y | Z | isLFE |
|---|---|---|---|---|
| M + 000 | 0.000000 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 110 | −1.000000 | −1.000000 | 0.000000 | 0 |
| M − 110 | 1.000000 | −1.000000 | 0.000000 | 0 |
| LFE1 | 1.000000 | 1.000000 | −1.000000 | 1 |

TABLE 15

Cartesian coordinates for Speaker Layout C: 2 + 5 + 0

| SP Label | X | Y | Z | isLFE |
|---|---|---|---|---|
| M + 000 | 0.000000 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 110 | −1.000000 | −1.000000 | 0.000000 | 0 |
| M − 110 | 1.000000 | −1.000000 | 0.000000 | 0 |
| U + 030 | −1.000000 | 1.000000 | 1.000000 | 0 |
| U − 030 | 1.000000 | 1.000000 | 1.000000 | 0 |
| LFE1 | 1.000000 | 1.000000 | −1.000000 | 1 |

TABLE 16

Cartesian coordinates for Speaker Layout D: 4 + 5 + 0

| SP Label | X | Y | Z | isLFE |
|---|---|---|---|---|
| M + 000 | 0.000000 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 110 | −1.000000 | −1.000000 | 0.000000 | 0 |
| M − 110 | 1.000000 | −1.000000 | 0.000000 | 0 |
| U + 030 | −1.000000 | 1.000000 | 1.000000 | 0 |
| U − 030 | 1.000000 | 1.000000 | 1.000000 | 0 |
| U + 110 | −1.000000 | −1.000000 | 1.000000 | 0 |
| U − 110 | 1.000000 | −1.000000 | 1.000000 | 0 |
| LFE1 | 1.000000 | 1.000000 | −1.000000 | 1 |

TABLE 17

Cartesian coordinates for Speaker Layout E: 4 + 5 + 1

| SP Label | X | Y | Z | isLFE |
|---|---|---|---|---|
| M + 000 | 0.000000 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 110 | −1.000000 | −1.000000 | 0.000000 | 0 |

TABLE 17-continued

Cartesian coordinates for Speaker Layout E: 4 + 5 + 1

| SP Label | X | Y | Z | isLFE |
|---|---|---|---|---|
| M − 110 | 1.000000 | −1.000000 | 0.000000 | 0 |
| U + 030 | −1.000000 | 1.000000 | 1.000000 | 0 |
| U − 030 | 1.000000 | 1.000000 | 1.000000 | 0 |
| U + 110 | −1.000000 | −1.000000 | 1.000000 | 0 |
| U − 110 | 1.000000 | −1.000000 | 1.000000 | 0 |
| B + 000 | 0.000000 | 1.000000 | −1.000000 | 0 |
| LFE1 | 1.000000 | 1.000000 | −1.000000 | 1 |

TABLE 18

Cartesian coordinates for Speaker Layout F: 3 + 7 + 0

| SP Label | X | Y | Z | isLFE |
|---|---|---|---|---|
| M + 000 | 0.000000 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 090 | −1.000000 | 0.000000 | 0.000000 | 0 |
| M − 090 | 1.000000 | 0.000000 | 0.000000 | 0 |
| M + 135 | −1.000000 | −1.000000 | 0.000000 | 0 |
| M − 135 | 1.000000 | −1.000000 | 0.000000 | 0 |
| U + 045 | −1.000000 | 1.000000 | 1.000000 | 0 |
| U − 045 | 1.000000 | 1.000000 | 1.000000 | 0 |
| U + 180 | 0.000000 | −1.000000 | 1.000000 | 0 |
| LFE1 | 1.000000 | 1.000000 | −1.000000 | 1 |

TABLE 19

Cartesian coordinates for Speaker Layout G: 4 + 9 + 0

| SP Label | X | Y | Z | isLFE |
|---|---|---|---|---|
| M + 000 | 0.000000 | 1.000000 | 0.000000 | 0 |
| M + SC | −0.414214 | 1.000000 | 0.000000 | 0 |
| M − SC | 0.414214 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 090 | −1.000000 | 0.000000 | 0.000000 | 0 |
| M − 090 | 1.000000 | 0.000000 | 0.000000 | 0 |
| M + 135 | −1.000000 | −1.000000 | 0.000000 | 0 |
| M − 135 | 1.000000 | −1.000000 | 0.000000 | 0 |
| U + 045 | −1.000000 | 1.000000 | 1.000000 | 0 |
| U − 045 | 1.000000 | 1.000000 | 1.000000 | 0 |
| U + 110 | −1.000000 | −1.000000 | 1.000000 | 0 |
| U − 110 | 1.000000 | −1.000000 | 1.000000 | 0 |
| LFE2 | 1.000000 | 1.000000 | −1.000000 | 1 |
| LFE1 | −1.000000 | 1.000000 | −1.000000 | 1 |

TABLE 20

Cartesian coordinates for Speaker Layout H: 9 + 10 + 3

| SP Label | X | Y | Z | isLFE |
|---|---|---|---|---|
| M + 000 | 0.000000 | 1.000000 | 0.000000 | 0 |
| M + 030 | −1.000000 | 1.000000 | 0.000000 | 0 |
| M − 030 | 1.000000 | 1.000000 | 0.000000 | 0 |
| M + 060 | −1.000000 | 0.414214 | 0.000000 | 0 |
| M − 060 | 1.000000 | 0.414214 | 0.000000 | 0 |
| M + 090 | −1.000000 | 0.000000 | 0.000000 | 0 |
| M − 090 | 1.000000 | 0.000000 | 0.000000 | 0 |
| M + 135 | −1.000000 | −1.000000 | 0.000000 | 0 |
| M − 135 | 1.000000 | −1.000000 | 0.000000 | 0 |
| M + 180 | 0.000000 | −1.000000 | 0.000000 | 0 |
| U + 000 | 0.000000 | 1.000000 | 1.000000 | 0 |
| U + 045 | −1.000000 | 1.000000 | 1.000000 | 0 |
| U − 045 | 1.000000 | 1.000000 | 1.000000 | 0 |
| U + 090 | −1.000000 | 0.000000 | 1.000000 | 0 |
| U − 090 | 1.000000 | 0.000000 | 1.000000 | 0 |

TABLE 20-continued

| Cartesian coordinates for Speaker Layout H: 9 + 10 + 3 | | | | |
|---|---|---|---|---|
| SP Label | X | Y | Z | isLFE |
| U + 135 | −1.000000 | −1.000000 | 1.000000 | 0 |
| U − 135 | 1.000000 | −1.000000 | 1.000000 | 0 |
| U + 180 | 0.000000 | −1.000000 | 1.000000 | 0 |
| T + 000 | 0.000000 | 0.000000 | 1.000000 | 0 |
| B + 000 | 0.000000 | 1.000000 | −1.000000 | 0 |
| B + 045 | −1.000000 | 1.000000 | −1.000000 | 0 |
| B − 045 | 1.000000 | 1.000000 | −1.000000 | 0 |
| LFE2 | 1.000000 | 1.000000 | −1.000000 | 1 |
| LFE1 | −1.000000 | 1.000000 | −1.000000 | 1 |

APPENDIX B—HOA REFERENCE MATRICES

Furse-Malham Scaling Table

FuMaScale= . . .
[1.414214, 1.732051, 1.732051, 1.732051, 1.936492, 1.936492, 2.236068, 1.936492, 1.936492, . . .
2.091650, 1.972027, 2.231093, 2.645751, 2.231093, 1.972027, 2.091650, 2.218530, 2.037850, . . .
2.156208, 2.504586, 3.000000, 2.504586, 2.156208, 2.037850, 2.218530, 2.326814, 2.105991, . . .
2.161591, 2.346516, 2.755409, 3.316625, 2.755409, 2.346516, 2.161591, 2.105991, 2.326814, . . .
2.421825, 2.171224, 2.189943, 2.304826, 2.529531, 2.987184, 3.605551, 2.987184, 2.529531, . . .
2.304826, 2.189943, 2.171224, 2.421825];

HOA Reference Decode Matrix for HOA Order 1, ACN Channel Ordering, N3D Scaling, for Rendering to Speaker Configuration A: 0+2+0

HOA_Ref_HOA1_Cfg1=[ . . .
[0.568518; 0.318792; −0.000000; −0.014226], . . .
[0.568518; −0.318792; 0.000000; −0.014226] . . .
];

HOA Reference Decode Matrix for HOA Order 2, ACN Channel Ordering, N3D Scaling, for Rendering to Speaker Configuration A: 0+2+0

HOA_Ref_HOA2_Cfg1=[ . . .
[0.565988; 0.323721; 0.000000; −0.017640; 0.072165; −0.000000; 0.021249; −0.000000; . . .
0.029711], . . .
[0.565988; −0.323721; 0.000000; −0.017640; −0.072165; −0.000000; 0.021249; 0.000000; . . .
0.029711] . . .
];

HOA Reference Decode Matrix for HOA Order 3, ACN Channel Ordering, N3D Scaling, for Rendering to Speaker Configuration A: 0+2+0

HOA_Ref_HOA3_Cfg1=[ . . .
[0.564704; 0.325743; −0.000000; −0.019550; 0.076072; −0.000000; 0.022250; −0.000000; . . .
0.028254; 0.024953; −0.000000; 0.005516; −0.000000; 0.003570; −0.000000; 0.010380], . . .
[0.564704; −0.325743; 0.000000; −0.019550; −0.076072; −0.000000; 0.022250; 0.000000; . . .
0.028254; −0.024953; 0.000000; −0.005516; −0.000000; 0.003570; −0.000000; 0.010380] . . .
];

HOA Reference Decode Matrix for HOA Order 4, ACN Channel Ordering, N3D Scaling, for Rendering to Speaker Configuration A: 0+2+0

HOA_Ref_HOA4_Cfg1=[ . . .
[0.564143; 0.326493; −0.000000; −0.020424; 0.077588; −0.000000; 0.022749; −0.000000; . . .
0.027503; 0.027080; −0.000000; 0.005048; 0.000000; 0.004123; −0.000000; 0.009891; . . .
0.036369; 0.000000; 0.012439; 0.000000; 0.001831; 0.000000; 0.002742; −0.000000;
0.003839], . . .
[0.564143; −0.326493; 0.000000; −0.020424; −0.077588; −0.000000; 0.022749; 0.000000; . . .
0.027503; −0.027080; 0.000000; −0.005048; −0.000000; 0.004123; −0.000000; 0.009891; . . .
−0.036369; 0.000000; −0.012439; 0.000000; 0.001831; 0.000000; 0.002742; 0.000000;
0.003839] . . .
];

HOA Reference Decode Matrix for HOA Order 5, ACN Channel Ordering, N3D Scaling, for Rendering to Speaker Configuration A: 0+2+0

HOA_Ref_HOA5_Cfg1=[ . . .
[0.563634; 0.327071; −0.000000; −0.021236; 0.078785; −0.000000; 0.023233; −0.000000; . . .
0.026761; 0.028813; −0.000000; 0.004636; −0.000000; 0.004700; −0.000000; 0.009338; . . .
0.038478; 0.000000; 0.011737; 0.000000; 0.001512; 0.000000; 0.003184; −0.000000; . . .
0.003554; 0.017522; −0.000000; −0.002896; 0.000000; −0.011054; −0.000000; 0.001974; . . .
−0.000000; 0.005352; 0.000000; 0.008627], . . .
[0.563634; −0.327071; 0.000000; −0.021236; −0.078785; −0.000000; 0.023233; 0.000000; . . .
0.026761; −0.028813; 0.000000; −0.004636; −0.000000; 0.004700; −0.000000; 0.009338; . . .
−0.038478; 0.000000; −0.011737; 0.000000; 0.001512; 0.000000; 0.003184; 0.000000; . . .
0.003554; −0.017522; −0.000000; 0.002896; −0.000000; 0.011054; −0.000000; 0.001974; . . .
0.000000; 0.005352; −0.000000; 0.008627] . . .
];

HOA Reference Decode Matrix for HOA Order 6, ACN Channel Ordering, N3D Scaling, for Rendering to Speaker Configuration A: 0+2+0

HOA_Ref_HOA6_Cfg1=[ . . .
[0.563435; 0.327265; −0.000000; −0.021562; 0.079195; −0.000000; 0.023437; −0.000000; . . .
0.026448; 0.029423; −0.000000; 0.004480; −0.000000; 0.004963; −0.000000; 0.009080; . . .
0.039249; 0.000000; 0.011450; 0.000000; 0.001347; 0.000000; 0.003404; −0.000000; . . .
0.003384; 0.018396; −0.000000; −0.003281; 0.000000; −0.010938; −0.000000; 0.001779; . . .
−0.000000; 0.005517; 0.000000; 0.008566; 0.008365; 0.000000; −0.003987; 0.000000; . . .
−0.004985; −0.000000; −0.002476; −0.000000; −0.002004; −0.000000; 0.001481; −0.000000; . . .
0.005655], . . .

[0.563435; −0.327265; 0.000000; −0.021562; −0.079195; −0.000000; 0.023437; 0.000000; . . .
0.026448; −0.029423; 0.000000; −0.004480; −0.000000; 0.004963; −0.000000; 0.009080; . . .
−0.039249; 0.000000; −0.011450; 0.000000; 0.001347; 0.000000; 0.003404; 0.000000; . . .
0.003384; −0.018396; −0.000000; 0.003281; −0.000000; 0.010938; −0.000000; 0.001779; . . .
0.000000; 0.005517; 0.000000; 0.008566; −0.008365; −0.000000; 0.003987; 0.000000; . . .
0.004985; 0.000000; −0.002476; −0.000000; −0.002004; −0.000000; 0.001481; −0.000000; . . .
0.005655] . . .
];

HOA Reference Decode Matrix for HOA Order 1, ACN Channel Ordering, N3D Scaling, for Rendering to Speaker Configuration B: 0+5+0

HOA_Ref_HOA1_Cfg2=[ . . .
[0.183910; −0.000000; −0.000000; 0.196104], . . .
[0.183480; 0.136003; −0.000000; 0.125054], . . .
[0.183480; −0.136003; −0.000000; 0.125054], . . .
[0.357821; 0.269263; 0.000000; −0.191523], . . .
10 [0.357821; −0.269263; −0.000000; −0.191523] . . .
];

HOA Reference Decode Matrix for HOA Order 2, ACN Channel Ordering, N3D Scaling, for Rendering to Speaker Configuration B: 0+5+0

HOA_Ref_HOA2_Cfg2=[ . . .
[0.152162; −0.000000; −0.000000; 0.163243; −0.000000; −0.000000; 0.017348; −0.000000; . . .
0.118865], . . .
[0.191976; 0.139880; −0.000000; 0.139892; 0.135204; 0.000000; 0.033797; 0.000000; . . .
0.002687], . . .
[0.191976; −0.139880; 0.000000; 0.139892; −0.135204; 0.000000; 0.033797; −0.000000; . . .
0.002687], . . .
[0.354219; 0.269274; −0.000000; −0.196200; −0.115800; −0.000000; 0.026757; −0.000000; . . .
−0.044176], . . .
[0.354219; −0.269274; −0.000000; −0.196200; 0.115800; 0.000000; 0.026757; −0.000000; . . .
−0.044176] . . .
];

HOA Reference Decode Matrix for HOA Order 3, ACN Channel Ordering, N3D Scaling, for Rendering to Speaker Configuration B: 0+5+0

HOA_Ref_HOA3_Cfg2=[ . . .
[0.150482; 0.000000; −0.000000; 0.162275; −0.000000; −0.000000; 0.018586; −0.000000; . . .
0.122444; −0.000000; −0.000000; 0.000000; 0.000000; 0.009452; −0.000000; 0.081564], . . .
[0.189016; 0.138599; −0.000000; 0.137782; 0.138728; −0.000000; 0.036249; −0.000000; . . .
0.001855; 0.061167; −0.000000; 0.017046; −0.000000; 0.017689; −0.000000; −0.062425], . . .
[0.189016; −0.138599; 0.000000; 0.137782; −0.138728; 0.000000; 0.036249; −0.000000; . . .
0.001855; −0.061167; 0.000000; −0.017046; 0.000000; 0.017689; −0.000000; −0.062425], . . .
[0.353278; 0.268497; −0.000000; −0.198202; −0.118981; −0.000000; 0.027558; 0.000000; . . .
−0.045346; −0.015947; −0.000000; 0.019711; 0.000000; −0.012746; 0.000000; −0.000431], . . .
[0.353278; −0.268497; −0.000000; −0.198202; 0.118981; 0.000000; 0.027558; 0.000000; . . .
−0.045346; 0.015947; −0.000000; −0.019711; −0.000000; −0.012746; 0.000000; −0.000431]];

HOA Reference Decode Matrix for HOA Order 4, ACN Channel Ordering, N3D Scaling, for Rendering to Speaker Configuration B: 0+5+0

HOA_Ref_HOA4_Cfg2=[ . . .
[0.142430; −0.000000; −0.000000; 0.151192; −0.000000; 0.000000; 0.024988; −0.000000; . . .
0.116404; −0.000000; −0.000000; 0.000000; 0.000000; 0.015749; −0.000000; 0.082732; . . .
−0.000000; −0.000000; 0.000000; −0.000000; 0.003006; 0.000000; 0.005805; −0.000000; 0.056268], . . .
[0.191222; 0.139993; 0.000000; 0.141584; 0.142839; −0.000000; 0.034628; 0.000000; . . .
0.005075; 0.066905; −0.000000; 0.016458; −0.000000; 0.015475; 0.000000; −0.062488; . . .
0.003248; −0.000000; 0.006819; −0.000000; 0.003658; −0.000000; 0.005491; −0.000000; . . .
−0.046321], . . .
[0.191222; −0.139993; −0.000000; 0.141584; −0.142839; 0.000000; 0.034628; −0.000000; . . .
0.005075; −0.066905; 0.000000; −0.016458; 0.000000; 0.015475; 0.000000; −0.062488; . . .
−0.003248; 0.000000; −0.006819; 0.000000; 0.003658; 0.000000; 0.005491; −0.000000; . . .
−0.046321], . . .
[0.352797; 0.267999; −0.000000; −0.198981; −0.120222; −0.000000; 0.027983; −0.000000; . . .
−0.045623; −0.017146; −0.000000; 0.020012; 0.000000; −0.012234; 0.000000; 0.000605; . . .
−0.010182; −0.000000; 0.001419; −0.000000; 0.008117; 0.000000; −0.002920; −0.000000; . . .
0.033384], . . .
[0.352797; −0.267999; −0.000000; −0.198981; 0.120222; 0.000000; 0.027983; −0.000000; . . .
−0.045623; 0.017146; −0.000000; −0.020012; −0.000000; −0.012234; 0.000000; 0.000605; . . .
0.010182; −0.000000; −0.001419; −0.000000; 0.008117; −0.000000; −0.002920; −0.000000; . . .
0.033384] . . . ];

HOA Reference Decode Matrix for HOA Order 5, ACN Channel Ordering, N3D Scaling, for Rendering to Speaker Configuration B: 0+5+0

HOA_Ref_HOA5_Cfg2=[ . . .
[0.133398; −0.000000; −0.000000; 0.138939; −0.000000; 0.000000; 0.029870; −0.000000; . . .
0.108524; −0.000000; −0.000000; 0.000000; 0.000000; 0.019515; −0.000000; 0.080988; . . .
−0.000000; 0.000000; 0.000000; 0.000000; 0.001416; 0.000000; 0.007127; −0.000000; . . .
0.060368; −0.000000; 0.000000; 0.000000; −0.000000; 0.000000; 0.000000; −0.006704; . . .
0.000000; −0.005435; −0.000000; 0.041382], . . .
[0.194012; 0.141383; −0.000000; 0.145774; 0.146289; −0.000000; 0.033622; −0.000000; . . .

0.008539; 0.071656; −0.000000; 0.016247; 0.000000; 0.014728; −0.000000; −0.061447; . . .
0.007131; 0.000000; 0.005997; 0.000000; 0.003582; 0.000000; 0.005126; −0.000000; . . .
−0.047698; −0.006672; 0.000000; 0.000005; −0.000000; −0.006825; −0.000000; −0.006804; . . .
0.000000; 0.000368; −0.000000; −0.015459], . . .
[0.194012; −0.141383; −0.000000; 0.145774; −0.146289; 0.000000; 0.033622; −0.000000; . . .
0.008539; −0.071656; 0.000000; −0.016247; 0.000000; 0.014728; −0.000000; −0.061447; . . .
−0.007131; 0.000000; −0.005997; 0.000000; 0.003582; 0.000000; 0.005126; −0.000000; . . .
−0.047698; 0.006672; 0.000000; −0.000005; 0.000000; 0.006825; −0.000000; −0.006804; . . .
0.000000; 0.000368; 0.000000; −0.015459], . . .
[0.352621; 0.267787; −0.000000; −0.199244; −0.120682; −0.000000; 0.028174; −0.000000; . . .
−0.045645; −0.017498; −0.000000; 0.020204; 0.000000; −0.012005; 0.000000; 0.001071; . . .
−0.009928; −0.000000; 0.001780; −0.000000; 0.007937; 0.000000; −0.002912; −0.000000; . . .
0.034010; 0.010410; −0.000000; −0.004392; 0.000000; −0.011214; −0.000000; 0.009563; . . .
0.000000; −0.004782; −0.000000; 0.005010], . . .
[0.352621; −0.267787; −0.000000; −0.199244; 0.120682; 0.000000; 0.028174; −0.000000; . . .
−0.045645; 0.017498; −0.000000; −0.020204; 0.000000; −0.012005; 0.000000; 0.001071; . . .
0.009928; −0.000000; −0.001780; −0.000000; 0.007937; −0.000000; −0.002912; −0.000000; . . .
0.034010; −0.010410; 0.000000; 0.004392; 0.000000; 0.011214; −0.000000; 0.009563; . . .
−0.000000; −0.004782; 0.000000; 0.005010] . . . ];

HOA Reference Decode Matrix for HOA Order 6, ACN Channel Ordering, N3D Scaling, for Rendering to Speaker Configuration B: 0+5+0

HOA_Ref_HOA6_Cfg2=[ . . .
[0.132964; −0.000000; −0.000000; 0.138371; −0.000000; 0.000000; 0.030279; −0.000000; . . .
0.108399; −0.000000; 0.000000; 0.000000; 0.000000; 0.019900; −0.000000; 0.081578; . . .
−0.000000; 0.000000; 0.000000; 0.000000; 0.001161; 0.000000; 0.007158; −0.000000; . . .
0.061747; −0.000000; 0.000000; 0.000000; −0.000000; −0.000000; 0.000000; −0.006876; . . .
−0.000000; −0.005803; 0.000000; 0.043404; −0.000000; −0.000000; 0.000000; −0.000000; . . .
0.000000; −0.000000; −0.005487; −0.000000; −0.008261; 0.000000; −0.004110; 0.000000; . . .
0.028001], . . .
[0.193841; 0.141496; −0.000000; 0.145442; 0.146494; −0.000000; 0.033801; 0.000000; . . .
0.008055; 0.071875; 0.000000; 0.016168; 0.000000; 0.015004; −0.000000; −0.062131; . . .
0.007264; −0.000000; 0.005886; 0.000000; 0.003425; 0.000000; 0.005465; −0.000000; . . .
−0.048588; −0.006725; −0.000000; −0.000082; 0.000000; −0.006788; −0.000000; −0.007024; . . .
0.000000; 0.000778; 0.000000; −0.016510; 0.002923; 0.000000; 0.001350; 0.000000; . . .
−0.014173; −0.000000; −0.004524; −0.000000; 0.001026; 0.000000; 0.008472; 0.000000; . . .
−0.005644], . . .
[0.193841; −0.141496; −0.000000; 0.145442; −0.146494; 0.000000; 0.033801; −0.000000; . . .
0.008055; −0.071875; 0.000000; −0.016168; −0.000000; 0.015004; −0.000000; −0.062131; . . .
−0.007264; 0.000000; −0.005886; 0.000000; 0.003425; 0.000000; 0.005465; 0.000000; . . .
−0.048588; 0.006725; 0.000000; 0.000082; 0.000000; 0.006788; −0.000000; −0.007024; . . .
0.000000; 0.000778; 0.000000; −0.016510; −0.002923; −0.000000; −0.001350; −0.000000; . . .
0.014173; −0.000000; −0.004524; −0.000000; 0.001026; −0.000000; 0.008472; 0.000000; . . .
−0.005644], . . .
[0.352621; 0.267787; −0.000000; −0.199244; −0.120682; −0.000000; 0.028174; 0.000000; . . .
−0.045645; −0.017498; −0.000000; 0.020204; 0.000000; −0.012005; 0.000000; 0.001071; . . .
−0.009928; −0.000000; 0.001780; −0.000000; 0.007937; −0.000000; −0.002912; −0.000000; . . .
0.034010; 0.010410; −0.000000; −0.004392; 0.000000; −0.011214; −0.000000; 0.009563; . . .
0.000000; −0.004782; −0.000000; 0.005010; 0.014376; 0.000000; 0.004405; 0.000000; . . .
0.009185; −0.000000; −0.001232; −0.000000; 0.002230; 0.000000; −0.002914; −0.000000; . . .
−0.002892], . . .
[0.352621; −0.267787; −0.000000; −0.199244; 0.120682; 0.000000; 0.028174; 0.000000; . . .
−0.045645; 0.017498; −0.000000; −0.020204; −0.000000; −0.012005; 0.000000; 0.001071; . . .
0.009928; −0.000000; −0.001780; −0.000000; 0.007937; 0.000000; −0.002912; −0.000000; . . .
0.034010; −0.010410; 0.000000; 0.004392; −0.000000; 0.011214; −0.000000; 0.009563; . . .
0.000000; −0.004782; 0.000000; 0.005010; −0.014376; 0.000000; −0.004405; 0.000000; . . .
−0.009185; 0.000000; −0.001232; −0.000000; 0.002230; 0.000000; −0.002914; −0.000000; . . .
−0.002892] . . .
];

HOA Reference Decode Matrix for HOA Order 1, ACN Channel Ordering, N3D Scaling, for Rendering to Speaker Configuration C: 2+5+0

HOA_Ref_HOA1_Cfg3=[ . . .
[0.142369; 0.000000; −0.050652; 0.167679], . . .
[0.118332; 0.095985; −0.072650; 0.089618], . . .
[0.118332; −0.095985; −0.072650; 0.089618], . . .
[0.332148; 0.259404; −0.034383; −0.195186], . . .
[0.332148; −0.259404; −0.034383; −0.195186], . . .
[0.124647; 0.073364; 0.131437; 0.061551], . . .
[0.124647; −0.073364; 0.131437; 0.061551] . . .
];

HOA Reference Decode Matrix for HOA Order 2, ACN Channel Ordering, N3D Scaling, for Rendering to Speaker Configuration C: 2+5+0

HOA_Ref_HOA2_Cfg3=[ . . .
[0.115893; −0.000000; −0.047758; 0.140533; −0.000000; 0.000000; −0.016612; −0.031841; . . .
0.108062], . . .
[0.120303; 0.096787; −0.080034; 0.095749; 0.099262; −0.047841; −0.002786; −0.048971; . . .
0.000175], . . .

[0.120303; −0.096787; −0.080034; 0.095749; −0.099262; 0.047841; −0.002786; −0.048971; . . . 0.000175], . . .
[0.327617; 0.258936; −0.036287; −0.200704; −0.120694; −0.013510; −0.001882; −0.007566; . . . −0.040480], . . .
[0.327617; −0.258936; −0.036287; −0.200704; 0.120694; 0.013510; −0.001882; −0.007566; . . . −0.040480], . . .
[0.123250; 0.073658; 0.134120; 0.063648; 0.056209; 0.077839; 0.059088; 0.062382; . . . 0.005105], . . .
[0.123250; −0.073658; 0.134120; 0.063648; −0.056209; −0.077839; 0.059088; 0.062382; . . . 0.005105] . . .
];

HOA Reference Decode Matrix for HOA Order 3, ACN Channel Ordering, N3D Scaling, for Rendering to Speaker Configuration C: 2+5+0

HOA_Ref_HOA3_Cfg3=[ . . .
[0.107619; −0.000000; −0.054078; 0.131088; −0.000000; −0.000000; −0.015579; −0.041748; . . . 0.105462; −0.000000; −0.000000; −0.000000; −0.008559; −0.019437; −0.022781; 0.073858], . . .
[0.117490; 0.095377; −0.081082; 0.093651; 0.101452; −0.049366; −0.001651; −0.050620; . . . −0.000600; 0.046515; −0.041949; −0.006751; 0.000297; −0.006321; −0.004453; −0.049310], . . .
[0.117490; −0.095377; −0.081082; 0.093651; −0.101452; 0.049366; −0.001651; −0.050620; . . . −0.000600; −0.046515; 0.041949; 0.006751; 0.000297; −0.006321; −0.004453; −0.049310], . . .
[0.325880; 0.257435; −0.037358; −0.203425; −0.124856; −0.014825; −0.001663; −0.008673; . . . −0.041519; −0.015326; −0.008894; 0.009664; −0.014923; −0.022454; 0.004847; 0.004748], . . .
[0.325880; −0.257435; −0.037358; −0.203425; 0.124856; 0.014825; −0.001663; −0.008673; . . . −0.041519; 0.015326; 0.008894; −0.009664; −0.014923; −0.022454; 0.004847; 0.004748], . . .
[0.123183; 0.073319; 0.136131; 0.065129; 0.058446; 0.081054; 0.060898; 0.066533; . . . 0.007987; 0.020963; 0.060753; 0.039518; 0.001872; 0.022133; 0.012048; −0.018341], . . .
[0.123183; −0.073319; 0.136131; 0.065129; −0.058446; −0.081054; 0.060898; 0.066533; . . . 0.007987; −0.020963; −0.060753; −0.039518; 0.001872; 0.022133; 0.012048; −0.018341] . . .
];

HOA Reference Decode Matrix for HOA Order 4, ACN Channel Ordering, N3D Scaling, for Rendering to Speaker Configuration C: 2+5+0

HOA_Ref_HOA4_Cfg3=[ . . .
[0.095323; −0.000000; −0.056706; 0.113826; −0.000000; 0.000000; −0.006721; −0.046579; . . . 0.094684; −0.000000; −0.000000; −0.000000; −0.004701; −0.011935; −0.027070; 0.072518; . . . −0.000000; −0.000000; 0.000000; −0.000000; 0.009314; −0.003198; −0.010070; −0.011583; . . . 0.052074], . . .
[0.119770; 0.096620; −0.081724; 0.097797; 0.105263; −0.050233; −0.004181; −0.051382; . . .

0.003225; 0.052042; −0.043417; −0.008219; 0.000703; −0.009946; −0.004323; −0.048334; . . . 0.002874; −0.018360; −0.013667; 0.002365; 0.014108; 0.003225; 0.000975; 0.014923; . . . −0.038416], . . .
[0.119770; −0.096620; −0.081724; 0.097797; −0.105263; 0.050233; −0.004181; −0.051382; . . . 0.003225; −0.052042; 0.043417; 0.008219; 0.000703; −0.009946; −0.004323; −0.048334; . . . −0.002874; 0.018360; 0.013667; −0.002365; 0.014108; 0.003225; 0.000975; 0.014923; . . . −0.038416], . . .
[0.324997; 0.256522; −0.037819; −0.204564; −0.126621; −0.015447; −0.001362; −0.009165; . . . −0.041695; −0.016720; −0.009717; 0.009534; −0.014605; −0.022239; 0.005064; 0.006269; . . . −0.007073; −0.000567; −0.007279; −0.001551; 0.005174; −0.008956; 0.000140; 0.008429; . . . 0.034281], . . .
[0.324997; −0.256522; −0.037819; −0.204564; 0.126621; 0.015447; −0.001362; −0.009165; . . . −0.041695; 0.016720; 0.009717; −0.009534; −0.014605; −0.022239; 0.005064; 0.006269; . . . 0.007073; 0.000567; 0.007279; 0.001551; 0.005174; −0.008956; 0.000140; 0.008429; . . . 0.034281], . . .
[0.123588; 0.073961; 0.136852; 0.066264; 0.060503; 0.082833; 0.060964; 0.067996; . . . 0.009599; 0.023944; 0.064433; 0.041001; 0.000627; 0.022171; 0.013213; −0.017611; . . . 0.001160; 0.026891; 0.028209; 0.002866; −0.008427; −0.011959; 0.007283; −0.014995; . . . −0.005121], . . .
[0.123588; −0.073961; 0.136852; 0.066264; −0.060503; −0.082833; 0.060964; 0.067996; . . . 0.009599; −0.023944; −0.064433; −0.041001; 0.000627; 0.022171; 0.013213; −0.017611; . . . −0.001160; −0.026891; −0.028209; −0.002866; −0.008427; −0.011959; 0.007283; −0.014995; . . . −0.005121] . . .
];

HOA Reference Decode Matrix for HOA Order 5, ACN Channel Ordering, N3D Scaling, for Rendering to Speaker Configuration C: 2+5+0

HOA_Ref_HOA5_Cfg3=[ . . .
[0.089721; −0.000000; −0.054982; 0.106409; 0.000000; 0.000000; −0.004022; −0.043991; . . . 0.090431; −0.000000; −0.000000; 0.000000; −0.006535; −0.010569; −0.025205; 0.072682; . . . −0.000000; 0.000000; 0.000000; −0.000000; 0.009261; −0.005694; −0.010620; −0.010812; . . . 0.056443; −0.000000; −0.000000; 0.000000; −0.000000; 0.000000; 0.007262; 0.002922; . . . −0.003134; −0.011368; −0.004969; 0.040225], . . .
[0.120486; 0.097020; −0.083465; 0.099136; 0.106968; −0.051495; −0.004623; −0.054155; . . . 0.004449; 0.054693; −0.045751; −0.008808; 0.002653; −0.010780; −0.006348; −0.048691; . . . 0.004707; −0.021019; −0.015441; 0.003254; 0.014956; 0.005301; 0.000583; 0.014120; . . . −0.040432; −0.007824; −0.004704; −0.010599; 0.006317; 0.004715; 0.002061; 0.006559; . . . −0.000474; 0.006928; 0.008443; −0.014406], . . .
[0.120486; −0.097020; −0.083465; 0.099136; −0.106968; 0.051495; −0.004623; −0.054155; . . .

0.004449; −0.054693; 0.045751; 0.008808; 0.002653; −0.010780; −0.006348; −0.048691; . . .
−0.004707; 0.021019; 0.015441; −0.003254; 0.014956; 0.005301; 0.000583; 0.014120; . . .
−0.040432; 0.007824; 0.004704; 0.010599; −0.006317; −0.004715; 0.002061; 0.006559; . . .
−0.000474; 0.006928; 0.008443; −0.014406], . . .
[0.324634; 0.256093; −0.037992; −0.205010; −0.127369; −0.015712; −0.001139; −0.009367; . . .
−0.041659; −0.017192; −0.010091; 0.009635; −0.014396; −0.022052; 0.005171; 0.007009; . . .
−0.006654; −0.000706; −0.007099; −0.001389; 0.005175; −0.008813; 0.000241; 0.008831; . . .
0.035148; 0.012352; 0.004333; −0.007046; −0.004772; −0.006002; 0.002644; 0.002421; . . .
−0.000089; 0.002627; 0.002651; 0.003749], . . .
[0.324634; −0.256093; −0.037992; −0.205010; 0.127369; 0.015712; −0.001139; −0.009367; . . .
−0.041659; 0.017192; 0.010091; −0.009635; −0.014396; −0.022052; 0.005171; 0.007009; . . .
0.006654; 0.000706; 0.007099; 0.001389; 0.005175; −0.008813; 0.000241; 0.008831; . . .
0.035148; −0.012352; −0.004333; 0.007046; 0.004772; 0.006002; 0.002644; 0.002421; . . .
−0.000089; 0.002627; 0.002651; 0.003749], . . .
[0.122163; 0.073637; 0.136814; 0.064344; 0.060332; 0.083804; 0.062468; 0.067994; . . .
0.008429; 0.024165; 0.066489; 0.042451; 0.000571; 0.023865; 0.013055; −0.018326; . . .
0.001539; 0.029441; 0.030738; 0.002559; −0.010034; −0.012122; 0.008054; −0.015743; . . .
−0.005470; 0.002650; 0.006393; 0.015316; −0.001715; −0.008568; 0.001536; −0.011660; . . .
−0.001280; −0.003039; −0.004130; 0.003204], . . .
[0.122163; −0.073637; 0.136814; 0.064344; −0.060332; −0.083804; 0.062468; 0.067994; . . .
0.008429; −0.024165; −0.066489; −0.042451; 0.000571; 0.023865; 0.013055; −0.018326; . . .
−0.001539; −0.029441; −0.030738; −0.002559; −0.010034; −0.012122; 0.008054; −0.015743; . . .
−0.005470; −0.002650; −0.006393; −0.015316; 0.001715; 0.008568; 0.001536; −0.011660; . . .
−0.001280; −0.003039; −0.004130; 0.003204] . . . ];

HOA Reference Decode Matrix for HOA Order 6, ACN Channel Ordering, N3D Scaling, for Rendering to Speaker Configuration C: 2+5+0

HOA_Ref_HOA6_Cfg3=[ . . .
[0.089050; −0.000000; −0.055284; 0.105542; −0.000000; 0.000000; −0.003697; −0.044512; . . .
0.090092; −0.000000; −0.000000; 0.000000; −0.006244; −0.010557; −0.025685; 0.073154; . . .
−0.000000; 0.000000; 0.000000; −0.000000; 0.009442; −0.005513; −0.011073; −0.011159; . . .
0.057801; −0.000000; 0.000000; 0.000000; −0.000000; 0.000000; 0.007379; 0.003367; . . .
−0.003182; −0.012186; −0.005129; 0.042318; −0.000000; 0.000000; 0.000000; 0.000000; . . .
0.000000; −0.000000; −0.004415; 0.010401; −0.001356; 0.001594; −0.006859; −0.001100; . . .
0.028359], . . .
[0.120123; 0.096974; −0.083745; 0.098593; 0.106950; −0.051795; −0.004483; −0.054607; . . .
0.003901; 0.054728; −0.046305; −0.009039; 0.003059; −0.010747; −0.006587; −0.049317; . . .
0.004727; −0.021612; −0.015961; 0.003514; 0.015216; 0.005714; 0.000742; 0.014210; . . .
−0.041215; −0.007946; −0.005130; −0.011210; 0.006625; 0.005158; 0.001876; 0.006966; . . .
−0.000300; 0.007437; 0.008790; −0.015349; −0.000396; −0.002188; −0.002493; 0.003413; . . .
0.001504; 0.005456; −0.008377; 0.004914; 0.002924; −0.001237; 0.012023; 0.003669; . . .
−0.005033], . . .
[0.120123; −0.096974; −0.083745; 0.098593; −0.106950; 0.051795; −0.004483; −0.054607; . . .
0.003901; −0.054728; 0.046305; 0.009039; 0.003059; −0.010747; −0.006587; −0.049317; . . .
−0.004727; 0.021612; 0.015961; −0.003514; 0.015216; 0.005714; 0.000742; 0.014210; . . .
−0.041215; 0.007946; 0.005130; 0.011210; −0.006625; −0.005158; 0.001876; 0.006966; . . .
−0.000300; 0.007437; 0.008790; −0.015349; 0.000396; 0.002188; 0.002493; −0.003413; . . .
−0.001504; −0.005456; −0.008377; 0.004914; 0.002924; −0.001237; 0.012023; 0.003669; . . .
−0.005033], . . .
[0.324624; 0.256080; −0.037999; −0.205021; −0.127387; −0.015723; −0.001133; −0.009376; . . .
−0.041656; −0.017201; −0.010108; 0.009638; −0.014384; −0.022050; 0.005174; 0.007025; . . .
−0.006648; −0.000716; −0.007099; −0.001376; 0.005178; −0.008802; 0.000241; 0.008849; . . .
0.035164; 0.012367; 0.004340; −0.007048; −0.004755; −0.005995; 0.002634; 0.002427; . . .
−0.000092; 0.002631; 0.002671; 0.003755; 0.014411; 0.003579; 0.007136; −0.004209; . . .
0.008167; 0.006791; 0.002509; −0.005503; 0.000097; 0.003282; 0.000940; −0.001128; . . .
−0.004652], . . .
[0.324624; −0.256080; −0.037999; −0.205021; 0.127387; 0.015723; −0.001133; −0.009376; . . .
−0.041656; 0.017201; 0.010108; −0.009638; −0.014384; −0.022050; 0.005174; 0.007025; . . .
0.006648; 0.000716; 0.007099; 0.001376; 0.005178; −0.008802; 0.000241; 0.008849; . . .
0.035164; −0.012367; −0.004340; 0.007048; 0.004755; 0.005995; 0.002634; 0.002427; . . .
−0.000092; 0.002631; 0.002671; 0.003755; −0.014411; −0.003579; −0.007136; 0.004209; . . .
−0.008167; −0.006791; 0.002509; −0.005503; 0.000097; 0.003282; 0.000940; −0.001128; . . .
−0.004652], . . .
[0.121788; 0.073630; 0.136813; 0.063760; 0.060273; 0.084128; 0.062880; 0.067987; . . .
0.007960; 0.024101; 0.067110; 0.042850; 0.000524; 0.024416; 0.012982; −0.018578; . . .
0.001573; 0.030216; 0.031598; 0.002427; −0.010548; −0.012166; 0.008410; −0.015914; . . .
−0.005514; 0.002855; 0.007175; 0.016430; −0.001756; −0.009101; 0.001539; −0.012373; . . .
−0.001243; −0.002995; −0.004386; 0.003251; 0.008337; 0.005516; 0.006982; −0.000217; . . .
−0.007211; −0.004824; 0.004675; 0.004021; −0.004668; 0.004862; 0.001254; 0.000165; . . .
0.002675], . . .
[0.121788; −0.073630; 0.136813; 0.063760; −0.060273; −0.084128; 0.062880; 0.067987; . . .
0.007960; −0.024101; −0.067110; −0.042850; 0.000524; 0.024416; 0.012982; −0.018578; . . .
−0.001573; −0.030216; −0.031598; −0.002427; −0.010548; −0.012166; 0.008410; −0.015914; . . .

−0.005514; −0.002855; −0.007175; −0.016430; 0.001756; 0.009101; 0.001539; −0.012373; . . .
−0.001243; −0.002995; −0.004386; 0.003251; −0.008337; −0.005516; −0.006982; 0.000217; . . .
0.007211; 0.004824; 0.004675; 0.004021; −0.004668; 0.004862; 0.001254; 0.000165; . . .
0.002675] . . .
];

HOA Reference Decode Matrix for HOA Order 1, ACN Channel Ordering, N3D Scaling, for Rendering to Speaker Configuration D: 4+5+0

HOA_Ref_HOA1_Cfg4=[ . . .
[0.142369; 0.000000; −0.050652; 0.167679], . . .
[0.118311; 0.095959; −0.072676; 0.089618], . . .
[0.118311; −0.095959; −0.072676; 0.089618], . . .
[0.231174; 0.191968; −0.130081; −0.130029], . . .
[0.231174; −0.191968; −0.130081; −0.130029], . . .
[0.095694; 0.059256; 0.094919; 0.069682], . . .
[0.095694; −0.059256; 0.094919; 0.069682], . . .
[0.158615; 0.113676; 0.137342; −0.089468], . . .
[0.158615; −0.113676; 0.137342; −0.089468] . . .
];

HOA Reference Decode Matrix for HOA Order 2, ACN Channel Ordering, N3D Scaling, for Rendering to Speaker Configuration D: 4+5+0

HOA_Ref_HOA2_Cfg4=[ . . .
[0.115893; −0.000000; −0.047758; 0.140533; −0.000000; −0.000000; −0.016612; −0.031841; . . .
0.108062], . . .
[0.120058; 0.096452; −0.080281; 0.095701; 0.099174; −0.048270; −0.002801; −0.049026; . . .
0.000465], . . .
[0.120058; −0.096452; −0.080281; 0.095701; −0.099174; 0.048270; −0.002801; −0.049026; . . .
0.000465], . . .
[0.226342; 0.190069; −0.134422; −0.132538; −0.086776; −0.086757; −0.025703; 0.061601; . . .
−0.038797], . . .
[0.226342; −0.190069; −0.134422; −0.132538; 0.086776; 0.086757; −0.025703; 0.061601; . . .
−0.038797], . . .
[0.093710; 0.059696; 0.095840; 0.072924; 0.055904; 0.059332; 0.032712; 0.077511; . . .
0.009495], . . .
[0.093710; −0.059696; 0.095840; 0.072924; −0.055904; −0.059332; 0.032712; 0.077511; . . .
0.009495], . . .
[0.152280; 0.112848; 0.136477; −0.091473; −0.049658; 0.110399; 0.026670; −0.074100; . . .
−0.006922], . . .
[0.152280; −0.112848; 0.136477; −0.091473; 0.049658; −0.110399; 0.026670; −0.074100; . . .
−0.006922] . . . ];

HOA Reference Decode Matrix for HOA Order 3, ACN Channel Ordering, N3D Scaling, for Rendering to Speaker Configuration D: 4+5+0

HOA_Ref_HOA3_Cfg4=[ . . .
[0.107619; −0.000000; −0.054078; 0.131088; −0.000000; −0.000000; −0.015579; −0.041748; . . .
0.105462; −0.000000; −0.000000; −0.000000; −0.008559; −0.019437; −0.022781; . . .
0.073858], . . .
[0.116950; 0.094604; −0.081574; 0.093522; 0.101212; −0.050260; −0.001570; −0.050764; . . .
0.000092; 0.047092; −0.042262; −0.007038; 0.000836; −0.006358; −0.003521; −0.048990], . . .
[0.116950; −0.094604; −0.081574; 0.093522; −0.101212; 0.050260; −0.001570; −0.050764; . . .
0.000092; −0.047092; 0.042262; 0.007038; 0.000836; −0.006358; −0.003521; −0.048990], . . .
[0.224058; 0.187837; −0.136944; −0.133868; −0.089281; −0.090866; −0.026033; 0.062997; . . .
−0.039069; −0.013018; 0.030788; −0.022384; 0.007381; 0.011830; 0.017430; 0.005577], . . .
[0.224058; −0.187837; −0.136944; −0.133868; 0.089281; 0.090866; −0.026033; 0.062997; . . .
−0.039069; 0.013018; −0.030788; 0.022384; 0.007381; 0.011830; 0.017430; 0.005577], . . .
[0.092976; 0.058733; 0.096689; 0.074982; 0.058613; 0.060985; 0.033491; 0.082612; . . .
0.013085; 0.025183; 0.062427; 0.024575; −0.007820; 0.038050; 0.019483; −0.015289], . . .
[0.092976; −0.058733; 0.096689; 0.074982; −0.058613; −0.060985; 0.033491; 0.082612; . . .
0.013085; −0.025183; −0.062427; −0.024575; −0.007820; 0.038050; 0.019483; −0.015289], . . .
[0.149644; 0.111050; 0.136336; −0.092359; −0.051165; 0.113640; 0.028390; −0.076806; . . .
−0.006287; −0.000476; −0.050293; 0.043731; −0.020604; −0.025120; −0.026180; −0.010521], . . .
[0.149644; −0.111050; 0.136336; −0.092359; 0.051165; −0.113640; 0.028390; −0.076806; . . .
−0.006287; 0.000476; 0.050293; −0.043731; −0.020604; −0.025120; −0.026180; −0.010521] . . . ];

HOA Reference Decode Matrix for HOA Order 4, ACN Channel Ordering, N3D Scaling, for Rendering to Speaker Configuration D: 4+5+0

HOA_Ref_HOA4_Cfg4=[ . . .
[0.095323; −0.000000; −0.056706; 0.113826; −0.000000; 0.000000; −0.006721; −0.046579; . . .
0.094684; −0.000000; −0.000000; −0.000000; −0.004701; −0.011935; −0.027070; 0.072518; . . .
−0.000000; −0.000000; 0.000000; −0.000000; 0.009314; −0.003198; −0.010070; −0.011583; . . .
0.052074], . . .
[0.119121; 0.095678; −0.082296; 0.097646; 0.104977; −0.051285; −0.004045; −0.051547; . . .
0.004082; 0.052772; −0.043780; −0.008491; 0.001366; −0.009981; −0.003209; −0.047948; . . .
0.003324; −0.017301; −0.013840; 0.003005; 0.014619; 0.003336; 0.001550; 0.015472; . . .
−0.039005], . . .
[0.119121; −0.095678; −0.082296; 0.097646; −0.104977; 0.051285; −0.004045; −0.051547; . . .
0.004082; −0.052772; 0.043780; 0.008491; 0.001366; −0.009981; −0.003209; −0.047948; . . .
−0.003324; 0.017301; 0.013840; −0.003005; 0.014619; 0.003336; 0.001550; 0.015472; . . .
−0.039005], . . .
[0.222827; 0.186494; −0.138192; −0.134256; −0.090093; −0.092962; −0.026047; 0.063796; . . .
−0.038862; −0.013962; 0.032156; −0.023583; 0.008872; 0.012827; 0.019047; 0.006502; . . .

−0.005957; 0.008133; 0.014842; 0.007080; 0.025201; −0.004138; 0.010790; −0.003014; . . .
0.024942], . . .
[0.222827; −0.186494; −0.138192; −0.134256; 0.090093; 0.092962; −0.026047; 0.063796; . . .
−0.038862; 0.013962; −0.032156; 0.023583; 0.008872; 0.012827; 0.019047; 0.006502; . . .
0.005957; −0.008133; −0.014842; −0.007080; 0.025201; −0.004138; 0.010790; −0.003014; . . .
0.024942], . . .
[0.092975; 0.058805; 0.096883; 0.076359; 0.060944; 0.061816; 0.033309; 0.084441; . . .
0.015313; 0.028797; 0.066599; 0.025258; −0.008814; 0.038406; 0.021796; −0.014697; . . .
0.003171; 0.033919; 0.031963; −0.002353; −0.005478; −0.001872; 0.015222; −0.012642; . . .
−0.009492], . . .
[0.092975; −0.058805; 0.096883; 0.076359; −0.060944; −0.061816; 0.033309; 0.084441; . . .
0.015313; −0.028797; −0.066599; −0.025258; −0.008814; 0.038406; 0.021796; −0.014697; . . .
−0.003171; −0.033919; −0.031963; 0.002353; −0.005478; −0.001872; 0.015222; −0.012642; . . .
−0.009492], . . .
[0.148428; 0.109599; 0.136344; −0.092858; −0.051551; 0.114289; 0.029520; −0.078286; . . .
−0.005768; −0.001051; −0.052724; 0.045531; −0.021047; −0.026378; −0.027605; −0.010884; . . .
−0.011873; −0.009137; −0.024331; −0.006379; −0.008246; −0.000226; −0.016501; 0.007670; . . .
0.019227], . . .
[0.148428; −0.109599; 0.136344; −0.092858; 0.051551; −0.114289; 0.029520; −0.078286; . . .
−0.005768; 0.001051; 0.052724; −0.045531; −0.021047; −0.026378; −0.027605; −0.010884; . . .
0.011873; 0.009137; 0.024331; 0.006379; −0.008246; −0.000226; −0.016501; 0.007670; . . .
0.019227] . . . ];

HOA Reference Decode Matrix for HOA Order 5, ACN Channel Ordering, N3D Scaling, for Rendering to Speaker Configuration D: 4+5+0

HOA_Ref_HOA5_Cfg4=[ . . .
[0.089721; −0.000000; −0.054982; 0.106409; 0.000000; 0.000000; −0.004022; −0.043991; . . .
0.090431; −0.000000; −0.000000; 0.000000; −0.006535; −0.010569; −0.025205; 0.072682; . . .
−0.000000; 0.000000; 0.000000; −0.000000; 0.009261; −0.005694; −0.010620; −0.010812; . . .
0.056443; −0.000000; −0.000000; 0.000000; −0.000000; 0.000000; 0.007262; 0.002922; . . .
−0.003134; −0.011368; −0.004969; 0.040225], . . .
[0.119837; 0.096079; −0.084037; 0.098984; 0.106682; −0.052546; −0.004487; −0.054320; . . .
0.005306; 0.055423; −0.046114; −0.009081; 0.003317; −0.010816; −0.005234; −0.048305; . . .
0.005156; −0.019959; −0.015614; 0.003894; 0.015467; 0.005411; 0.001158; 0.014668; . . .
−0.041020; −0.008272; −0.004008; −0.009865; 0.006441; 0.005553; 0.001974; 0.006694; . . .
−0.000781; 0.007286; 0.007512; −0.014886], . . .
[0.119837; −0.096079; −0.084037; 0.098984; −0.106682; 0.052546; −0.004487; −0.054320; . . .
0.005306; −0.055423; 0.046114; 0.009081; 0.003317; −0.010816; −0.005234; −0.048305; . . .
−0.005156; 0.019959; 0.015614; −0.003894; 0.015467; 0.005411; 0.001158; 0.014668; . . .
−0.041020; 0.008272; 0.004008; 0.009865; −0.006441; −0.005553; 0.001974; 0.006694; . . .
−0.000781; 0.007286; 0.007512; −0.014886], . . .
[0.222138; 0.185659; −0.139017; −0.134355; −0.090343; −0.094424; −0.026087; 0.064227; . . .
−0.038463; −0.014056; 0.032997; −0.024340; 0.009956; 0.013368; 0.020338; 0.006815; . . .
−0.005765; 0.008989; 0.016010; 0.008183; 0.026325; −0.004433; 0.011888; −0.004042; . . .
0.025389; 0.009063; −0.002414; 0.002912; −0.004791; 0.011780; 0.001723; −0.002108; . . .
−0.002390; −0.010198; −0.002718; 0.003065], . . .
[0.222138; −0.185659; −0.139017; −0.134355; 0.090343; 0.094424; −0.026087; 0.064227; . . .
−0.038463; 0.014056; −0.032997; 0.024340; 0.009956; 0.013368; 0.020338; 0.006815; . . .
0.005765; −0.008989; −0.016010; −0.008183; 0.026325; −0.004433; 0.011888; −0.004042; . . .
0.025389; −0.009063; 0.002414; −0.002912; 0.004791; −0.011780; 0.001723; −0.002108; . . .
−0.002390; −0.010198; −0.002718; 0.003065], . . .
[0.091087; 0.057798; 0.096360; 0.074587; 0.060956; 0.061878; 0.034752; 0.084656; . . .
0.014859; 0.029736; 0.068972; 0.026195; −0.008485; 0.040267; 0.022743; −0.015529; . . .
0.003544; 0.037696; 0.034820; −0.002470; −0.006608; −0.002003; 0.016885; −0.013634; . . .
−0.010505; 0.000122; 0.008094; 0.022158; 0.001601; −0.004903; 0.008394; −0.009661; . . .
0.004232; −0.004570; −0.011780; 0.002299], . . .
[0.091087; −0.057798; 0.096360; 0.074587; −0.060956; −0.061878; 0.034752; 0.084656; . . .
0.014859; −0.029736; −0.068972; −0.026195; −0.008485; 0.040267; 0.022743; −0.015529; . . .
−0.003544; −0.037696; −0.034820; 0.002470; −0.006608; −0.002003; 0.016885; −0.013634; . . .
−0.010505; −0.000122; −0.008094; −0.022158; −0.001601; 0.004903; 0.008394; −0.009661; . . .
0.004232; −0.004570; −0.011780; 0.002299], . . .
[0.147466; 0.108276; 0.136393; −0.093028; −0.051524; 0.114674; 0.030525; −0.079162; . . .
−0.005058; −0.001123; −0.054147; 0.047025; −0.021335; −0.027267; −0.028574; −0.011321; . . .
−0.012671; −0.010584; −0.026125; −0.006893; −0.009452; 0.000045; −0.018200; 0.009001; . . .
0.019909; 0.009419; −0.001202; −0.008787; −0.001131; −0.011071; 0.010911; 0.003754; . . .
0.003667; 0.007330; 0.011049; 0.002696], . . .
[0.147466; −0.108276; 0.136393; −0.093028; 0.051524; −0.114674; 0.030525; −0.079162; . . .
−0.005058; 0.001123; 0.054147; −0.047025; −0.021335; −0.027267; −0.028574; −0.011321; . . .
0.012671; 0.010584; 0.026125; 0.006893; −0.009452; 0.000045; −0.018200; 0.009001; . . .
0.019909; −0.009419; 0.001202; 0.008787; 0.001131; 0.011071; 0.010911; 0.003754; . . .
0.003667; 0.007330; 0.011049; 0.002696] . . . ];

HOA Reference Decode Matrix for HOA Order 6, ACN Channel Ordering, N3D Scaling, for Rendering to Speaker Configuration D: 4+5+0

HOA_Ref_HOA6_Cfg4=[ . . .
[0.089050; −0.000000; −0.055284; 0.105542; −0.000000; 0.000000; −0.003697; −0.044512; . . .

0.090092; −0.000000; −0.000000; 0.000000; −0.006244; −0.010557; −0.025685; 0.073154; . . .
−0.000000; 0.000000; 0.000000; −0.000000; 0.009442; −0.005513; −0.011073; −0.011159; . . .
0.057801; −0.000000; 0.000000; 0.000000; −0.000000; 0.000000; 0.007379; 0.003367; . . .
−0.003182; −0.012186; −0.005129; 0.042318; −0.000000; 0.000000; 0.000000; 0.000000; . . .
0.000000; −0.000000; −0.004415; 0.010401; −0.001356; 0.001594; −0.006859; −0.001100; . . .
0.028359], . . .
[0.119473; 0.096032; −0.084317; 0.098442; 0.106664; −0.052847; −0.004347; −0.054772; . . .
0.004758; 0.055458; −0.046669; −0.009312; 0.003722; −0.010782; −0.005473; −0.048931; . . .
0.005177; −0.020553; −0.016134; 0.004153; 0.015727; 0.005825; 0.001317; 0.014759; . . .
−0.041803; −0.008394; −0.004434; −0.010476; 0.006749; 0.005996; 0.001789; 0.007102; . . .
−0.000607; 0.007795; 0.007858; −0.015829; −0.000878; −0.002949; −0.001944; 0.003396; . . .
0.001764; 0.005715; −0.008871; 0.004947; 0.002172; −0.001284; 0.011250; 0.002873; . . .
−0.004716], . . .
[0.119473; −0.096032; −0.084317; 0.098442; −0.106664; 0.052847; −0.004347; −0.054772; . . .
0.004758; −0.055458; 0.046669; 0.009312; 0.003722; −0.010782; −0.005473; −0.048931; . . .
−0.005177; 0.020553; 0.016134; −0.004153; 0.015727; 0.005825; 0.001317; 0.014759; . . .
−0.041803; 0.008394; 0.004434; 0.010476; −0.006749; −0.005996; 0.001789; 0.007102; . . .
−0.000607; 0.007795; 0.007858; −0.015829; 0.000878; 0.002949; 0.001944; −0.003396; . . .
−0.001764; −0.005715; −0.008871; 0.004947; 0.002172; −0.001284; 0.011250; 0.002873; . . .
−0.004716], . . .
[0.221828; 0.185251; −0.139410; −0.134253; −0.090200; −0.095139; −0.026111; 0.064441; . . .
−0.038164; −0.013861; 0.033423; −0.024687; 0.010509; 0.013494; 0.020992; 0.006700; . . .
−0.005818; 0.009451; 0.016369; 0.008786; 0.026889; −0.004614; 0.012357; −0.004566; . . .
0.025252; 0.008933; −0.002896; 0.003302; −0.005005; 0.012737; 0.001521; −0.002424; . . .
−0.002724; −0.010750; −0.002974; 0.003064; 0.010733; 0.003571; −0.002111; −0.000075; . . .
−0.001640; 0.010370; −0.009285; −0.006686; −0.007871; 0.001202; −0.001865; −0.004052; . . .
−0.001721], . . .
[0.221828; −0.185251; −0.139410; −0.134253; 0.090200; 0.095139; −0.026111; 0.064441; . . .
−0.038164; 0.013861; −0.033423; 0.024687; 0.010509; 0.013494; 0.020992; 0.006700; . . .
0.005818; −0.009451; −0.016369; −0.008786; 0.026889; −0.004614; 0.012357; −0.004566; . . .
0.025252; −0.008933; 0.002896; −0.003302; 0.005005; −0.012737; 0.001521; −0.002424; . . .
−0.002724; −0.010750; −0.002974; 0.003064; −0.010733; −0.003571; 0.002111; 0.000075; . . .
0.001640; −0.010370; −0.009285; −0.006686; −0.007871; 0.001202; −0.001865; −0.004052; . . .
−0.001721], . . .
[0.090618; 0.057646; 0.096269; 0.074029; 0.060934; 0.062024; 0.035172; 0.084678; . . .
0.014548; 0.029839; 0.069641; 0.026523; −0.008431; 0.040824; 0.022896; −0.015812; . . .

0.003567; 0.038734; 0.035702; −0.002510; −0.007021; −0.002064; 0.017386; −0.013849; . . .
−0.010712; 0.000182; 0.008859; 0.023485; 0.001545; −0.005267; 0.008408; −0.010395; . . .
0.004232; −0.004554; −0.012316; 0.002336; 0.007132; 0.000984; 0.006657; 0.002576; . . .
−0.007086; 0.001836; 0.009395; 0.000222; −0.002557; −0.000054; −0.005362; −0.000251; . . .
0.003726], . . .
[0.090618; −0.057646; 0.096269; 0.074029; −0.060934; −0.062024; 0.035172; 0.084678; . . .
0.014548; −0.029839; −0.069641; −0.026523; −0.008431; 0.040824; 0.022896; −0.015812; . . .
−0.003567; −0.038734; −0.035702; 0.002510; −0.007021; −0.002064; 0.017386; −0.013849; . . .
−0.010712; −0.000182; −0.008859; −0.023485; −0.001545; 0.005267; 0.008408; −0.010395; . . .
0.004232; −0.004554; −0.012316; 0.002336; −0.007132; −0.000984; −0.006657; −0.002576; . . .
0.007086; −0.001836; 0.009395; 0.000222; −0.002557; −0.000054; −0.005362; −0.000251; . . .
0.003726], . . .
[0.147118; 0.107756; 0.136437; −0.093030; −0.051414; 0.114818; 0.030952; −0.079421; . . .
−0.004705; −0.001027; −0.054594; 0.047666; −0.021423; −0.027561; −0.028858; −0.011614; . . .
−0.013129; −0.010992; −0.026773; −0.007025; −0.009995; 0.000195; −0.018843; 0.009443; . . .
0.020053; 0.009708; −0.000940; −0.009366; −0.001013; −0.011897; 0.010936; 0.004206; . . .
0.003768; 0.008163; 0.011495; 0.003219; 0.006592; 0.003943; 0.003918; −0.000793; . . .
0.006339; 0.002981; 0.011523; 0.000820; 0.007242; −0.003503; 0.008740; 0.005431; . . .
−0.002586], . . .
[0.147118; −0.107756; 0.136437; −0.093030; 0.051414; −0.114818; 0.030952; −0.079421; . . .
−0.004705; 0.001027; 0.054594; −0.047666; −0.021423; −0.027561; −0.028858; −0.011614; . . .
0.013129; 0.010992; 0.026773; 0.007025; −0.009995; 0.000195; −0.018843; 0.009443; . . .
0.020053; −0.009708; 0.000940; 0.009366; 0.001013; 0.011897; 0.010936; 0.004206; . . .
0.003768; 0.008163; 0.011495; 0.003219; −0.006592; −0.003943; −0.003918; 0.000793; . . .
−0.006339; −0.002981; 0.011523; 0.000820; 0.007242; −0.003503; 0.008740; 0.005431; . . .
−0.002586] . . .
];

HOA Reference Decode Matrix for HOA Order 1, ACN Channel Ordering, N3D Scaling, for Rendering to Speaker Configuration E: 4+5+1

HOA_Ref_HOA1_Cfg5=[ . . .
[0.099521; −0.000000; 0.001811; 0.137162], . . .
[0.078091; 0.081095; −0.021346; 0.070070], . . .
[0.078091; −0.081095; −0.021346; 0.070070], . . .
[0.216512; 0.189541; −0.108725; −0.131905], . . .
[0.216512; −0.189541; −0.108725; −0.131905], . . .
[0.095694; 0.059256; 0.094919; 0.069682], . . .
[0.095694; −0.059256; 0.094919; 0.069682], . . .
[0.158611; 0.113676; 0.137349; −0.089465], . . .

[0.158611; −0.113676; 0.137349; −0.089465], . . .
[0.157520; −0.000000; −0.184275; 0.082584] . . .

HOA Reference Decode Matrix for HOA Order 2, ACN Channel Ordering, N3D Scaling, for Rendering to Speaker Configuration E: 4+5+1

HOA_Ref_HOA2_Cfg5=[ . . .
[0.070660; −0.000000; 0.007034; 0.105413; −0.000000; −0.000000; −0.048426; 0.011633; . . . 0.087305], . . .
[0.075035; 0.080444; −0.023289; 0.070217; 0.085590; −0.027346; −0.039973; −0.016351; . . . −0.009079], . . .
[0.075035; −0.080444; −0.023289; 0.070217; −0.085590; 0.027346; −0.039973; −0.016351; . . . −0.009079], . . .
[0.210976; 0.187613; −0.111878; −0.135242; −0.087717; −0.083017; −0.046149; 0.067102; . . . −0.039324], . . .
[0.210976; −0.187613; −0.111878; −0.135242; 0.087717; 0.083017; −0.046149; 0.067102; . . . −0.039324], . . .
[0.093710; 0.059696; 0.095840; 0.072924; 0.055904; 0.059332; 0.032712; 0.077511; . . . 0.009495], . . .
[0.093710; −0.059696; 0.095840; 0.072924; −0.055904; −0.059332; 0.032712; 0.077511; . . . 0.009495], . . .
[0.152276; 0.112848; 0.136485; −0.091471; −0.049658; 0.110399; 0.026661; −0.074104; . . . −0.006923], . . .
[0.152276; −0.112848; 0.136485; −0.091471; 0.049658; −0.110399; 0.026661; −0.074104; . . . −0.006923], . . .
[0.162052; −0.000000; −0.190608; 0.093767; −0.000000; 0.000000; 0.102614; −0.102422; . . . 0.040470] . . . ];

HOA Reference Decode Matrix for HOA Order 3, ACN Channel Ordering, N3D Scaling, for Rendering to Speaker Configuration E: 4+5+1

HOA_Ref_HOA3_Cfg5=[ . . .
[0.061696; −0.000000; 0.002177; 0.095176; −0.000000; −0.000000; −0.048445; 0.004219; . . . 0.083864; −0.000000; −0.000000; 0.000000; −0.002660; −0.048264; 0.004842; 0.062149], . . .
[0.071927; 0.078637; −0.023884; 0.068150; 0.087485; −0.028868; −0.039830; −0.017020; . . . −0.009511; 0.038278; −0.024168; −0.021422; 0.013129; −0.029376; 0.009923; −0.050434], . . .
[0.071927; −0.078637; −0.023884; 0.068150; −0.087485; 0.028868; −0.039830; −0.017020; . . . −0.009511; −0.038278; 0.024168; 0.021422; 0.013129; −0.029376; 0.009923; −0.050434], . . .
[0.208552; 0.185293; −0.114224; −0.136722; −0.090359; −0.086986; −0.046572; 0.068733; . . . −0.039654; −0.013591; 0.032796; −0.025597; 0.020546; 0.003825; 0.018725; 0.006210], . . .
[0.208552; −0.185293; −0.114224; −0.136722; 0.090359; 0.086986; −0.046572; 0.068733; . . . −0.039654; 0.013591; −0.032796; 0.025597; 0.020546; 0.003825; 0.018725; 0.006210], . . .
[0.092976; 0.058733; 0.096689; 0.074982; 0.058613; 0.060985; 0.033491; 0.082612; . . . 0.013085; 0.025183; 0.062427; 0.024575; −0.007820; 0.038050; 0.019483; −0.015289], . . .
[0.092976; −0.058733; 0.096689; 0.074982; −0.058613; −0.060985; 0.033491; 0.082612; . . . 0.013085; −0.025183; −0.062427; −0.024575; −0.007820; 0.038050; 0.019483; −0.015289], . . .
[0.149639; 0.111050; 0.136343; −0.092357; −0.051165; 0.113640; 0.028381; −0.076811; . . . −0.006288; −0.000476; −0.050293; 0.043731; −0.020595; −0.025113; −0.026179; −0.010521], . . .
[0.149639; −0.111050; 0.136343; −0.092357; 0.051165; −0.113640; 0.028381; −0.076811; . . . −0.006288; 0.000476; 0.050293; −0.043731; −0.020595; −0.025113; −0.026179; −0.010521], . . .
[0.159497; −0.000000; −0.191722; 0.090455; 0.000000; 0.000000; 0.107092; −0.104817; . . . 0.039595; −0.000000; 0.000000; −0.000000; −0.017218; 0.050924; −0.042920; 0.007799] . . . ];

HOA Reference Decode Matrix for HOA Order 4, ACN Channel Ordering, N3D Scaling, for Rendering to Speaker Configuration E: 4+5+1

HOA_Ref_HOA4_Cfg5=[ . . .
[0.049001; −0.000000; 0.000148; 0.077309; −0.000000; −0.000000; −0.039718; 0.000645; . . . 0.072462; −0.000000; 0.000000; 0.000000; 0.000316; −0.041630; 0.001996; 0.060172; . . . −0.000000; 0.000000; 0.000000; −0.000000; 0.016955; 0.000607; −0.028334; 0.003551; . . . 0.044519], . . .
[0.073874; 0.079648; −0.024002; 0.072142; 0.091184; −0.029559; −0.042944; −0.016950; . . . −0.005548; 0.043855; −0.025088; −0.023332; 0.013519; −0.034249; 0.010874; −0.049382; . . . −0.001709; −0.004928; −0.025975; 0.005533; 0.018117; 0.009546; −0.010056; 0.017877; . . . −0.039185], . . .
[0.073874; −0.079648; −0.024002; 0.072142; −0.091184; 0.029559; −0.042944; −0.016950; . . . −0.005548; −0.043855; 0.025088; 0.023332; 0.013519; −0.034249; 0.010874; −0.049382; . . . 0.001709; 0.004928; 0.025975; −0.005533; 0.018117; 0.009546; −0.010056; 0.017877; . . . −0.039185], . . .
[0.207321; 0.183950; −0.115473; −0.137110; −0.091171; −0.089081; −0.046586; 0.069532; . . . −0.039447; −0.014534; 0.034164; −0.026796; 0.022037; 0.004822; 0.020342; 0.007135; . . . −0.006099; 0.009473; 0.012480; 0.007892; 0.020417; 0.004732; 0.008738; −0.004011; . . . 0.024974], . . .
[0.207321; −0.183950; −0.115473; −0.137110; 0.091171; 0.089081; −0.046586; 0.069532; . . . −0.039447; 0.014534; −0.034164; 0.026796; 0.022037; 0.004822; 0.020342; 0.007135; . . . 0.006099; −0.009473; −0.012480; −0.007892; 0.020417; 0.004732; 0.008738; −0.004011; . . . 0.024974], . . .
[0.092975; 0.058805; 0.096883; 0.076359; 0.060944; 0.061816; 0.033309; 0.084441; . . . 0.015313; 0.028797; 0.066599; 0.025258; −0.008814; 0.038406; 0.021796; −0.014697; . . . 0.003171; 0.033919; 0.031963; −0.002353; −0.005478; −0.001872; 0.015222; −0.012642; . . . −0.009492], . . .

[0.092975; −0.058805; 0.096883; 0.076359; −0.060944; −0.061816; 0.033309; 0.084441; . . .
0.015313; −0.028797; −0.066599; −0.025258; −0.008814; 0.038406; 0.021796; −0.014697; . . .
−0.003171; −0.033919; −0.031963; 0.002353; −0.005478; −0.001872; 0.015222; −0.012642; . . .
−0.009492], . . .
[0.148424; 0.109599; 0.136352; −0.092856; −0.051551; 0.114289; 0.029511; −0.078291; . . .
−0.005769; −0.001051; −0.052724; 0.045531; −0.021038; −0.026371; −0.027603; −0.010884; . . .
−0.011873; −0.009137; −0.024331; −0.006379; −0.008255; −0.000235; −0.016503; 0.007669; . . .
0.019227], . . .
[0.148424; −0.109599; 0.136352; −0.092856; 0.051551; −0.114289; 0.029511; −0.078291; . . .
−0.005769; 0.001051; 0.052724; −0.045531; −0.021038; −0.026371; −0.027603; −0.010884; . . .
0.011873; 0.009137; 0.024331; 0.006379; −0.008255; −0.000235; −0.016503; 0.007669; . . .
0.019227], . . .
[0.158526; −0.000000; −0.192261; 0.088900; −0.000000; 0.000000; 0.109040; −0.105744; . . .
0.038688; −0.000000; 0.000000; −0.000000; −0.017079; 0.053962; −0.044054; 0.007857; . . .
−0.000000; 0.000000; −0.000000; −0.000000; −0.019627; 0.003721; 0.019641; −0.004926; . . .
0.004763] . . . ];

HOA Reference Decode Matrix for HOA Order 5, ACN Channel Ordering, N3D Scaling, for Rendering to Speaker Configuration E: 4+5+1

HOA_Ref_HOA5_Cfg5=[ . . .
[0.042491; −0.000000; 0.002680; 0.068528; −0.000000; 0.000000; −0.036478; 0.005062; . . .
0.067278; −0.000000; 0.000000; 0.000000; −0.003506; −0.040698; 0.005507; 0.059897; . . .
−0.000000; −0.000000; 0.000000; 0.000000; 0.018711; −0.003949; −0.029870; 0.005372; . . .
0.048772; −0.000000; 0.000000; 0.000000; −0.000000; −0.000000; 0.001399; 0.015669; . . .
−0.002652; −0.019684; 0.004821; 0.036113], . . .
[0.074539; 0.080111; −0.025302; 0.073630; 0.093063; −0.030665; −0.044103; −0.019258; . . .
−0.004120; 0.046720; −0.027210; −0.024294; 0.015689; −0.036184; 0.009104; −0.049597; . . .
0.000274; −0.007357; −0.028403; 0.006631; 0.019568; 0.012308; −0.011296; 0.017167; . . .
−0.041133; −0.011489; 0.003390; −0.019298; 0.007236; 0.011264; −0.004225; 0.012103; . . .
0.005290; 0.003994; 0.008609; −0.014229], . . .
[0.074539; −0.080111; −0.025302; 0.073630; −0.093063; 0.030665; −0.044103; −0.019258; . . .
−0.004120; −0.046720; 0.027210; 0.024294; 0.015689; −0.036184; 0.009104; −0.049597; . . .
−0.000274; 0.007357; 0.028403; −0.006631; 0.019568; 0.012308; −0.011296; 0.017167; . . .
−0.041133; 0.011489; −0.003390; 0.019298; −0.007236; −0.011264; −0.004225; 0.012103; . . .
0.005290; 0.003994; 0.008609; −0.014229], . . .
[0.206633; 0.183115; −0.116297; −0.137209; −0.091421; −0.090544; −0.046626; 0.069963; . . .
−0.039048; −0.014629; 0.035005; −0.027553; 0.023121; 0.005363; 0.021633; 0.007448; . . .
−0.005908; 0.010329; 0.013647; 0.008994; 0.021541; 0.004437; 0.009836; −0.005039; . . .
0.025421; 0.009023; −0.001888; 0.000788; −0.002917; 0.013764; 0.000329; −0.010129; . . .
0.000316; −0.009434; −0.002936; 0.003259], . . .
[0.206633; −0.183115; −0.116297; −0.137209; 0.091421; 0.090544; −0.046626; 0.069963; . . .
−0.039048; 0.014629; −0.035005; 0.027553; 0.023121; 0.005363; 0.021633; 0.007448; . . .
0.005908; −0.010329; −0.013647; −0.008994; 0.021541; 0.004437; 0.009836; −0.005039; . . .
0.025421; −0.009023; 0.001888; −0.000788; 0.002917; −0.013764; 0.000329; −0.010129; . . .
0.000316; −0.009434; −0.002936; 0.003259], . . .
[0.091087; 0.057798; 0.096360; 0.074587; 0.060956; 0.061878; 0.034752; 0.084656; . . .
0.014859; 0.029736; 0.068972; 0.026195; −0.008485; 0.040267; 0.022743; −0.015529; . . .
0.003544; 0.037696; 0.034820; −0.002470; −0.006608; −0.002003; 0.016885; −0.013634; . . .
−0.010505; 0.000122; 0.008094; 0.022158; 0.001601; −0.004903; 0.008394; −0.009661; . . .
0.004232; −0.004570; −0.011780; 0.002299], . . .
[0.091087; −0.057798; 0.096360; 0.074587; −0.060956; −0.061878; 0.034752; 0.084656; . . .
0.014859; −0.029736; −0.068972; −0.026195; −0.008485; 0.040267; 0.022743; −0.015529; . . .
−0.003544; −0.037696; −0.034820; 0.002470; −0.006608; −0.002003; 0.016885; −0.013634; . . .
−0.010505; −0.000122; −0.008094; −0.022158; −0.001601; 0.004903; 0.008394; −0.009661; . . .
0.004232; −0.004570; −0.011780; 0.002299], . . .
[0.147462; 0.108276; 0.136400; −0.093026; −0.051524; 0.114674; 0.030516; −0.079166; . . .
−0.005059; −0.001123; −0.054147; 0.047025; −0.021325; −0.027260; −0.028572; −0.011321; . . .
−0.012671; −0.010584; −0.026125; −0.006893; −0.009461; 0.000035; −0.018203; 0.009001; . . .
0.019909; 0.009419; −0.001202; −0.008787; −0.001131; −0.011071; 0.010918; 0.003766; . . .
0.003672; 0.007331; 0.011049; 0.002696], . . .
[0.147462; −0.108276; 0.136400; −0.093026; 0.051524; −0.114674; 0.030516; −0.079166; . . .
−0.005059; 0.001123; 0.054147; −0.047025; −0.021325; −0.027260; −0.028572; −0.011321; . . .
0.012671; 0.010584; 0.026125; 0.006893; −0.009461; 0.000035; −0.018203; 0.009001; . . .
0.019909; −0.009419; 0.001202; 0.008787; 0.001131; 0.011071; 0.010918; 0.003766; . . .
0.003672; 0.007331; 0.011049; 0.002696], . . .
[0.157107; −0.000000; −0.192521; 0.086668; −0.000000; −0.000000; 0.111189; −0.106193; . . .
0.037155; −0.000000; 0.000000; −0.000000; −0.017206; 0.057126; −0.044739; 0.007484; . . .
−0.000000; 0.000000; 0.000000; −0.000000; −0.022258; 0.003119; 0.022236; −0.005962; . . .
0.005394; −0.000000; 0.000000; −0.000000; −0.000000; 0.000000; 0.013207; −0.022059; . . .
0.004543; −0.001228; −0.005731; 0.002048] . . . ];

HOA Reference Decode Matrix for HOA Order 6, ACN Channel Ordering, N3D Scaling, for Rendering to Speaker Configuration E: 4+5+1

HOA_Ref_HOA6_Cfg5=[ . . .
[0.041748; −0.000000; 0.002578; 0.067594; −0.000000; −0.000000; −0.036326; 0.004895; . . .
0.066881; −0.000000; 0.000000; 0.000000; −0.003380; −0.041118; 0.005400; 0.060295; . . .

−0.000000; −0.000000; 0.000000; 0.000000; 0.019329; −0.003824; −0.030842; 0.005393; . . .
0.050025; −0.000000; −0.000000; 0.000000; −0.000000; −0.000000; 0.001328; 0.016736; . . .
−0.002602; −0.021026; 0.005009; 0.038078; −0.000000; 0.000000; 0.000000; 0.000000; . . .
−0.000000; −0.000000; −0.005481; 0.000289; 0.008706; −0.001408; −0.012511; 0.004352; . . .
0.026252], . . .
[0.074010; 0.080059; −0.025381; 0.072859; 0.093043; −0.030909; −0.044003; −0.019343; . . .
−0.004886; 0.046749; −0.027648; −0.024607; 0.015878; −0.036377; 0.009252; −0.050436; . . .
0.000270; −0.007781; −0.029119; 0.006894; 0.020128; 0.012545; −0.011444; 0.017628; . . .
−0.042122; −0.011661; 0.003177; −0.020209; 0.007613; 0.011813; −0.004467; 0.012972; . . .
0.005403; 0.004193; 0.009282; −0.015356; −0.003128; 0.002388; −0.008615; 0.005706; . . .
0.009096; −0.000754; −0.007223; −0.001625; 0.002222; 0.002099; 0.008255; 0.002630; . . .
−0.003884], . . .
[0.074010; −0.080059; −0.025381; 0.072859; −0.093043; 0.030909; −0.044003; −0.019343; . . .
−0.004886; −0.046749; 0.027648; 0.024607; 0.015878; −0.036377; 0.009252; −0.050436; . . .
−0.000270; 0.007781; 0.029119; −0.006894; 0.020128; 0.012545; −0.011444; 0.017628; . . .
−0.042122; 0.011661; −0.003177; 0.020209; −0.007613; −0.011813; −0.004467; 0.012972; . . .
0.005403; 0.004193; 0.009282; −0.015356; 0.003128; −0.002388; 0.008615; −0.005706; . . .
−0.009096; 0.000754; −0.007223; −0.001625; 0.002222; 0.002099; 0.008255; 0.002630; . . .
−0.003884], . . .
[0.206322; 0.182707; −0.116691; −0.137107; −0.091278; −0.091258; −0.046650; 0.070177; . . .
−0.038749; −0.014434; 0.035431; −0.027900; 0.023674; 0.005489; 0.022287; 0.007333; . . .
−0.005961; 0.010792; 0.014007; 0.009597; 0.022106; 0.004257; 0.010305; −0.005563; . . .
0.025284; 0.008893; −0.002370; 0.001178; −0.003131; 0.014721; 0.000128; −0.010445; . . .
−0.000018; −0.009986; −0.003191; 0.003258; 0.010785; 0.003688; −0.003304; 0.002506; . . .
−0.002385; 0.006648; −0.005150; −0.000882; −0.010970; 0.001288; −0.001305; −0.004497; . . .
−0.001745], . . .
[0.206322; −0.182707; −0.116691; −0.137107; 0.091278; 0.091258; −0.046650; 0.070177; . . .
−0.038749; 0.014434; −0.035431; 0.027900; 0.023674; 0.005489; 0.022287; 0.007333; . . .
0.005961; −0.010792; −0.014007; −0.009597; 0.022106; 0.004257; 0.010305; −0.005563; . . .
0.025284; −0.008893; 0.002370; −0.001178; 0.003131; −0.014721; 0.000128; −0.010445; . . .
−0.000018; −0.009986; −0.003191; 0.003258; −0.010785; −0.003688; 0.003304; −0.002506; . . .
0.002385; −0.006648; −0.005150; −0.000882; −0.010970; 0.001288; −0.001305; −0.004497; . . .
−0.001745], . . .
[0.090618; 0.057646; 0.096269; 0.074029; 0.060934; 0.062024; 0.035172; 0.084678; . . .
0.014548; 0.029839; 0.069641; 0.026523; −0.008431; 0.040824; 0.022896; −0.015812; . . .
0.003567; 0.038734; 0.035702; −0.002510; −0.007021; −0.002064; 0.017386; −0.013849; . . .
−0.010712; 0.000182; 0.008859; 0.023485; 0.001545; −0.005267; 0.008408; −0.010395; . . .
0.004232; −0.004554; −0.012316; 0.002336; 0.007132; 0.000984; 0.006657; 0.002576; . . .
−0.007086; 0.001836; 0.009395; 0.000222; −0.002557; −0.000054; −0.005362; −0.000251; . . .
0.003726], . . .
[0.090618; −0.057646; 0.096269; 0.074029; −0.060934; −0.062024; 0.035172; 0.084678; . . .
0.014548; −0.029839; −0.069641; −0.026523; −0.008431; 0.040824; 0.022896; −0.015812; . . .
−0.003567; −0.038734; −0.035702; 0.002510; −0.007021; −0.002064; 0.017386; −0.013849; . . .
−0.010712; −0.000182; −0.008859; −0.023485; −0.001545; 0.005267; 0.008408; −0.010395; . . .
0.004232; −0.004554; −0.012316; 0.002336; −0.007132; −0.000984; −0.006657; −0.002576; . . .
0.007086; −0.001836; 0.009395; 0.000222; −0.002557; −0.000054; −0.005362; −0.000251; . . .
0.003726], . . .
[0.147114; 0.107756; 0.136445; −0.093028; −0.051414; 0.114818; 0.030943; −0.079425; . . .
−0.004706; −0.001027; −0.054594; 0.047666; −0.021414; −0.027554; −0.028856; −0.011614; . . .
−0.013129; −0.010992; −0.026773; −0.007025; −0.010004; 0.000185; −0.018846; 0.009443; . . .
0.020053; 0.009708; −0.000940; −0.009366; −0.001013; −0.011897; 0.010944; 0.004218; . . .
0.003773; 0.008164; 0.011495; 0.003219; 0.006592; 0.003943; 0.003918; −0.000793; . . .
0.006339; 0.002981; 0.011517; 0.000807; 0.007236; −0.003505; 0.008739; 0.005431; . . .
−0.002586], . . .
[0.147114; −0.107756; 0.136445; −0.093028; 0.051414; −0.114818; 0.030943; −0.079425; . . .
−0.004706; 0.001027; 0.054594; −0.047666; −0.021414; −0.027554; −0.028856; −0.011614; . . .
0.013129; 0.010992; 0.026773; 0.007025; −0.010004; 0.000185; −0.018846; 0.009443; . . .
0.020053; −0.009708; 0.000940; 0.009366; 0.001013; 0.011897; 0.010944; 0.004218; . . .
0.003773; 0.008164; 0.011495; 0.003219; −0.006592; −0.003943; −0.003918; 0.000793; . . .
−0.006339; −0.002981; 0.011517; 0.000807; 0.007236; −0.003505; 0.008739; 0.005431; . . .
−0.002586], . . .
[0.156738; −0.000000; −0.192571; 0.086065; −0.000000; −0.000000; 0.111769; −0.106265; . . .
0.036689; −0.000000; 0.000000; −0.000000; −0.017306; 0.058017; −0.044861; 0.007292; . . .
−0.000000; −0.000000; 0.000000; −0.000000; −0.022991; 0.002812; 0.023038; −0.006188; . . .
0.005499; −0.000000; 0.000000; −0.000000; −0.000000; 0.000000; 0.013702; −0.023018; . . .
0.004206; −0.000613; −0.006070; 0.002362; −0.000000; 0.000000; −0.000000; 0.000000; . . .
0.000000; −0.000000; 0.002959; 0.005215; −0.011921; 0.004080; 0.002284; −0.002241; . . .
0.000920] . . . ];

HOA Reference Decode Matrix for HOA Order 1, ACN Channel Ordering, N3D Scaling, for Rendering to Speaker Configuration F: 3+7+0

HOA_Ref_HOA1_Cfg6=[ . . .
[0.126322; 0.000000; −0.058662; 0.149430], . . .
[0.078806; 0.055260; −0.063265; 0.064915], . . .

[0.078806; −0.055260; −0.063265; 0.064915], . . .
[0.120639; 0.132007; −0.058779; 0.004762], . . .
[0.120639; −0.132007; −0.058779; 0.004762], . . .
[0.206750; 0.151618; −0.058141; −0.174832], . . .
[0.206750; −0.151618; −0.058141; −0.174832], . . .
[0.161248; 0.126829; 0.127687; 0.100924], . . .
[0.161248; −0.126829; 0.127687; 0.100924], . . .
[0.122331; 0.000000; 0.120164; −0.103179] . . . ];

HOA Reference Decode Matrix for HOA Order 2, ACN Channel Ordering, N3D Scaling, for Rendering to Speaker Configuration F: 3+7+0

HOA_Ref_HOA2_Cfg6=[ . . .
[0.111177; −0.000000; −0.048477; 0.136135; −0.000000; 0.000000; −0.016115; −0.036444; . . . 0.104760], . . .
[0.088057; 0.062723; −0.069783; 0.077150; 0.071124; −0.044261; 0.004973; −0.053230; . . . 0.014976], . . .
[0.088057; −0.062723; −0.069783; 0.077150; −0.071124; 0.044261; 0.004973; −0.053230; . . . 0.014976], . . .
[0.129910; 0.148207; −0.054006; 0.005056; 0.009195; −0.037394; 0.005733; −0.010179; . . . −0.107517], . . .
[0.129910; −0.148207; −0.054006; 0.005056; −0.009195; 0.037394; 0.005733; −0.010179; . . . −0.107517], . . .
[0.187602; 0.143840; −0.067646; −0.161820; −0.139987; −0.015989; −0.016165; 0.043431; . . . 0.013391], . . .
[0.187602; −0.143840; −0.067646; −0.161820; 0.139987; 0.015989; −0.016165; 0.043431; . . . 0.013391], . . .
[0.136546; 0.105036; 0.125434; 0.091411; 0.080279; 0.090648; 0.031363; 0.078525; . . . −0.010383], . . .
[0.136546; −0.105036; 0.125434; 0.091411; −0.080279; −0.090648; 0.031363; 0.078525; . . . −0.010383], . . .
[0.136711; 0.000000; 0.126845; −0.128202; 0.000000; −0.000000; 0.053601; −0.103945; . . . 0.072684] . . . ];

HOA Reference Decode Matrix for HOA Order 3, ACN Channel Ordering, N3D Scaling, for Rendering to Speaker Configuration F: 3+7+0

HOA_Ref_HOA3_Cfg6=[ . . .
[0.108736; −0.000000; −0.049883; 0.134503; −0.000000; −0.000000; −0.015916; −0.038466; . . . 0.108119; −0.000000; 0.000000; 0.000000; −0.009986; −0.016595; −0.019682; 0.076293], . . .
[0.090665; 0.067398; −0.069885; 0.080322; 0.079597; −0.044586; 0.001919; −0.053848; . . . 0.013629; 0.048466; −0.045201; −0.001236; 0.006782; 0.000603; −0.008048; −0.028800], . . .
[0.090665; −0.067398; −0.069885; 0.080322; −0.079597; 0.044586; 0.001919; −0.053848; . . . 0.013629; −0.048466; 0.045201; 0.001236; 0.006782; 0.000603; −0.008048; −0.028800], . . .
[0.140024; 0.164814; −0.052799; 0.003118; 0.005924; −0.034642; −0.001784; −0.009526; . . . −0.124903; −0.083544; −0.013747; 0.003558; −0.012816; −0.004716; 0.012643; −0.007017], . . .
[0.140024; −0.164814; −0.052799; 0.003118; −0.005924; 0.034642; −0.001784; −0.009526; . . . −0.124903; 0.083544; 0.013747; −0.003558; −0.012816; −0.004716; 0.012643; −0.007017], . . .
[0.167854; 0.125641; −0.074590; −0.147207; −0.133917; −0.020487; −0.006597; 0.053869; . . . 0.017840; 0.061499; 0.015985; −0.001374; −0.009622; 0.002017; −0.028908; 0.045810], . . .
[0.167854; −0.125641; −0.074590; −0.147207; 0.133917; 0.020487; −0.006597; 0.053869; . . . 0.017840; −0.061499; −0.015985; 0.001374; −0.009622; 0.002017; −0.028908; 0.045810], . . .
[0.122015; 0.089458; 0.124527; 0.081677; 0.071690; 0.092301; 0.042468; 0.081369; . . . −0.003599; 0.024480; 0.064100; 0.040309; −0.006996; 0.029535; −0.003470; −0.026013], . . .
[0.122015; −0.089458; 0.124527; 0.081677; −0.071690; −0.092301; 0.042468; 0.081369; . . . −0.003599; −0.024480; −0.064100; −0.040309; −0.006996; 0.029535; −0.003470; −0.026013], . . .
[0.148426; −0.000000; 0.134686; −0.146822; −0.000000; −0.000000; 0.048255; −0.119745; . . . 0.087802; −0.000000; 0.000000; −0.000000; 0.003853; −0.050097; 0.047830; −0.049150]];

HOA Reference Decode Matrix for HOA Order 4, ACN Channel Ordering, N3D Scaling, for Rendering to Speaker Configuration F: 3+7+0

HOA_Ref_HOA4_Cfg6=[ . . .
[0.103864; −0.000000; −0.047740; 0.127994; −0.000000; 0.000000; −0.010952; −0.034752; . . . 0.105889; −0.000000; 0.000000; −0.000000; −0.012483; −0.010929; −0.016187; 0.080129; . . . −0.000000; −0.000000; 0.000000; −0.000000; 0.007834; −0.010742; −0.006592; −0.004821; . . . 0.054867], . . .
[0.094637; 0.070454; −0.070021; 0.086328; 0.085713; −0.044872; −0.001893; −0.053968; . . . 0.017548; 0.055446; −0.045983; −0.003685; 0.006598; −0.003780; −0.007858; −0.028978; . . . 0.015945; −0.023965; −0.008517; 0.006228; 0.011601; 0.005703; −0.000869; 0.015416; . . . −0.035623], . . .
[0.094637; −0.070454; −0.070021; 0.086328; −0.085713; 0.044872; −0.001893; −0.053968; . . . 0.017548; −0.055446; 0.045983; 0.003685; 0.006598; −0.003780; −0.007858; −0.028978; . . . −0.015945; 0.023965; 0.008517; −0.006228; 0.011601; 0.005703; −0.000869; 0.015416; . . . −0.035623], . . .
[0.138372; 0.163315; −0.053495; 0.002917; 0.005785; −0.035660; −0.001054; −0.010085; . . . −0.126128; −0.087806; −0.014894; 0.003352; −0.012302; −0.005058; 0.013215; −0.007235; . . . −0.005895; 0.002216; −0.008664; −0.004806; 0.004842; 0.000077; −0.001399; 0.014697; . . . 0.052778], . . .
[0.138372; −0.163315; −0.053495; 0.002917; −0.005785; 0.035660; −0.001054; −0.010085; . . . −0.126128; 0.087806; 0.014894; −0.003352; −0.012302; −0.005058; 0.013215; −0.007235; . . . 0.005895; −0.002216; 0.008664; 0.004806; 0.004842; 0.000077; −0.001399; 0.014697; . . . 0.052778], . . .
[0.166423; 0.124718; −0.075434; −0.146422; −0.135200; −0.020733; −0.006060; 0.055375; . . .

0.018182; 0.064544; 0.016462; −0.001288; −0.008775; 0.002770; −0.030590; 0.048164; . . .
−0.001388; −0.012962; 0.003702; −0.003961; 0.007960; −0.001690; −0.006376; 0.019321; . . .
−0.036996], . . .
[0.166423; −0.124718; −0.075434; −0.146422; 0.135200; 0.020733; −0.006060; 0.055375; . . .
0.018182; −0.064544; −0.016462; 0.001288; −0.008775; 0.002770; −0.030590; 0.048164; . . .
0.001388; 0.012962; −0.003702; 0.003961; 0.007960; −0.001690; −0.006376; 0.019321; . . .
−0.036996], . . .
[0.116938; 0.085902; 0.123812; 0.075851; 0.068392; 0.093635; 0.046893; 0.080080; . . .
−0.005422; 0.023784; 0.066744; 0.044318; −0.006163; 0.032921; −0.005761; −0.026733; . . .
−0.002321; 0.020724; 0.023194; 0.004002; −0.007198; −0.002838; −0.004507; −0.017906; . . .
−0.016628], . . .
[0.116938; −0.085902; 0.123812; 0.075851; −0.068392; −0.093635; 0.046893; 0.080080; . . .
−0.005422; −0.023784; −0.066744; −0.044318; −0.006163; 0.032921; −0.005761; −0.026733; . . .
0.002321; −0.020724; −0.023194; −0.004002; −0.007198; −0.002838; −0.004507; −0.017906; . . .
−0.016628], . . .
[0.147145; −0.000000; 0.135130; −0.145330; 0.000000; 0.000000; 0.050125; −0.120803; . . .
0.088198; −0.000000; −0.000000; −0.000000; 0.003563; −0.052460; 0.049666; −0.051804; . . .
0.000000; −0.000000; 0.000000; −0.000000; −0.002747; −0.008308; 0.009619; −0.010556; . . .
0.031924] . . . ];

HOA Reference Decode Matrix for HOA Order 5, ACN Channel Ordering, N3D Scaling, for Rendering to Speaker Configuration F: 3+7+0

HOA_Ref_HOA5_Cfg6=[ . . .
[0.095077; −0.000000; −0.047484; 0.115818; −0.000000; −0.000000; −0.005673; −0.034768; . . .
0.097979; −0.000000; 0.000000; −0.000000; −0.011940; −0.007044; −0.016401; 0.078440; . . .
−0.000000; −0.000000; 0.000000; −0.000000; 0.006795; −0.010166; −0.005664; −0.004947; . . .
0.059190; −0.000000; 0.000000; 0.000000; 0.000000; −0.000000; 0.006805; −0.001381; . . .
−0.004119; −0.005118; −0.000098; 0.041145], . . .
[0.099220; 0.072228; −0.069243; 0.093883; 0.090940; −0.044577; −0.004581; −0.052177; . . .
0.024914; 0.063982; −0.045243; −0.004375; 0.004834; −0.006272; −0.005638; −0.025005; . . .
0.024335; −0.022489; −0.010309; 0.005702; 0.011920; 0.003378; −0.002119; 0.017901; . . .
−0.036789; 0.000763; −0.001110; −0.009425; 0.008246; 0.004606; −0.000902; 0.004536; . . .
−0.002302; 0.005084; 0.016762; −0.023411], . . .
[0.099220; −0.072228; −0.069243; 0.093883; −0.090940; 0.044577; −0.004581; −0.052177; . . .
0.024914; −0.063982; 0.045243; 0.004375; 0.004834; −0.006272; −0.005638; −0.025005; . . .
−0.024335; 0.022489; 0.010309; −0.005702; 0.011920; 0.003378; −0.002119; 0.017901; . . .
−0.036789; −0.000763; 0.001110; 0.009425; −0.008246; −0.004606; −0.000902; 0.004536; . . .
−0.002302; 0.005084; 0.016762; −0.023411], . . .

[0.137172; 0.162105; −0.053902; 0.002850; 0.005852; −0.036308; −0.000266; −0.010505; . . .
−0.126835; −0.090923; −0.015732; 0.003616; −0.011861; −0.005330; 0.013604; −0.007645; . . .
−0.006671; 0.002124; −0.009382; −0.004476; 0.004739; 0.000350; −0.000613; 0.015762; . . .
0.057631; 0.030143; 0.010626; 0.000793; −0.000690; −0.003089; 0.003947; 0.001675; . . .
−0.003203; 0.008920; 0.003255; 0.003939], . . .
[0.137172; −0.162105; −0.053902; 0.002850; −0.005852; 0.036308; −0.000266; −0.010505; . . .
−0.126835; 0.090923; 0.015732; −0.003616; −0.011861; −0.005330; 0.013604; −0.007645; . . .
0.006671; −0.002124; 0.009382; 0.004476; 0.004739; 0.000350; −0.000613; 0.015762; . . .
0.057631; −0.030143; −0.010626; −0.000793; 0.000690; 0.003089; 0.003947; 0.001675; . . .
−0.003203; 0.008920; 0.003255; 0.003939], . . .
[0.165241; 0.123604; −0.075981; −0.145930; −0.135986; −0.020869; −0.005422; 0.056425; . . .
0.018905; 0.067072; 0.016794; −0.000853; −0.008109; 0.003279; −0.031829; 0.049913; . . .
−0.001298; −0.013586; 0.004778; −0.004037; 0.008192; −0.002469; −0.007570; 0.020650; . . .
−0.041335; −0.015526; 0.010701; −0.010919; −0.002227; −0.001685; 0.001517; 0.000830; . . .
0.005157; 0.004251; −0.011333; 0.005753], . . .
[0.165241; −0.123604; −0.075981; −0.145930; 0.135986; 0.020869; −0.005422; 0.056425; . . .
0.018905; −0.067072; −0.016794; 0.000853; −0.008109; 0.003279; −0.031829; 0.049913; . . .
0.001298; 0.013586; −0.004778; 0.004037; 0.008192; −0.002469; −0.007570; 0.020650; . . .
−0.041335; 0.015526; −0.010701; 0.010919; 0.002227; 0.001685; 0.001517; 0.000830; . . .
0.005157; 0.004251; −0.011333; 0.005753], . . .
[0.113815; 0.083867; 0.123260; 0.071854; 0.066121; 0.093988; 0.049919; 0.079080; . . .
−0.007672; 0.021971; 0.067631; 0.046681; −0.005230; 0.035766; −0.007098; −0.028654; . . .
−0.005189; 0.021304; 0.026129; 0.004226; −0.009519; −0.001692; −0.003691; −0.020163; . . .
−0.018401; −0.010271; 0.000622; 0.006367; −0.004590; −0.005725; 0.003625; −0.007034; . . .
−0.002999; 0.003537; −0.010731; −0.001753], . . .
[0.113815; −0.083867; 0.123260; 0.071854; −0.066121; −0.093988; 0.049919; 0.079080; . . .
−0.007672; −0.021971; −0.067631; −0.046681; −0.005230; 0.035766; −0.007098; −0.028654; . . .
0.005189; −0.021304; −0.026129; −0.004226; −0.009519; −0.001692; −0.003691; −0.020163; . . .
−0.018401; 0.010271; −0.000622; −0.006367; 0.004590; 0.005725; 0.003625; −0.007034; . . .
−0.002999; 0.003537; −0.010731; −0.001753], . . .
[0.145669; 0.000000; 0.135263; −0.143535; 0.000000; 0.000000; 0.051964; −0.121261; . . .
0.088304; −0.000000; 0.000000; −0.000000; 0.003650; −0.054596; 0.050954; −0.054225; . . .
0.000000; −0.000000; 0.000000; 0.000000; −0.004566; −0.008289; 0.010531; −0.012711; . . .
0.035796; −0.000000; 0.000000; −0.000000; 0.000000; 0.000000; 0.000678; 0.004313; . . .
−0.008272; 0.011424; 0.001236; −0.023253] . . .

HOA Reference Decode Matrix for HOA Order 6, ACN Channel Ordering, N3D Scaling, for Rendering to Speaker Configuration F: 3+7+0

HOA_Ref_HOA6_Cfg6=[ . . .
[0.094499; −0.000000; −0.047644; 0.115085; −0.000000; −0.000000; −0.005287; −0.035021; . . .
0.097792; −0.000000; −0.000000; −0.000000; −0.011780; −0.006822; −0.016558; 0.079088; . . .
−0.000000; −0.000000; 0.000000; −0.000000; 0.006754; −0.010073; −0.005816; −0.004932; . . .
0.060726; −0.000000; 0.000000; 0.000000; 0.000000; −0.000000; 0.006860; −0.001261; . . .
−0.004162; −0.005569; 0.000099; 0.043380; −0.000000; 0.000000; 0.000000; −0.000000; . . .
0.000000; 0.000000; −0.001344; 0.009594; −0.004725; 0.001653; −0.003417; 0.001591; . . .
0.028193], . . .
[0.101780; 0.075153; −0.068387; 0.097165; 0.095869; −0.043438; −0.007018; −0.050778; . . .
0.025557; 0.068518; −0.043145; −0.006462; 0.003105; −0.008574; −0.005197; −0.027862; . . .
0.026124; −0.020475; −0.013171; 0.003977; 0.013476; 0.001237; −0.002426; 0.016877; . . .
−0.041894; −0.000790; −0.000216; −0.011594; 0.005557; 0.005714; 0.001181; 0.005655; . . .
−0.002900; 0.006565; 0.014761; −0.028151; −0.005461; 0.006370; −0.003446; 0.002371; . . .
0.001913; 0.003634; −0.005907; 0.006606; −0.001277; −0.005453; 0.011001; 0.004167; . . .
−0.011195], . . .
[0.101780; −0.075153; −0.068387; 0.097165; −0.095869; 0.043438; −0.007018; −0.050778; . . .
0.025557; −0.068518; 0.043145; 0.006462; 0.003105; −0.008574; −0.005197; −0.027862; . . .
−0.026124; 0.020475; 0.013171; −0.003977; 0.013476; 0.001237; −0.002426; 0.016877; . . .
−0.041894; 0.000790; 0.000216; 0.011594; −0.005557; −0.005714; 0.001181; 0.005655; . . .
−0.002900; 0.006565; 0.014761; −0.028151; 0.005461; −0.006370; 0.003446; −0.002371; . . .
−0.001913; −0.003634; −0.005907; 0.006606; −0.001277; −0.005453; 0.011001; 0.004167; . . .
−0.011195], . . .
[0.136588; 0.161426; −0.054098; 0.002802; 0.005844; −0.036633; 0.000144; −0.010689; . . .
−0.126860; −0.091864; −0.016107; 0.003830; −0.011625; −0.005477; 0.013827; −0.007761; . . .
−0.006912; 0.002134; −0.009776; −0.004270; 0.004653; 0.000483; −0.000351; 0.016248; . . .
0.059261; 0.031919; 0.011095; 0.001402; −0.000533; −0.002999; 0.003913; 0.001935; . . .
−0.003253; 0.009532; 0.003502; 0.004192; 0.000832; 0.005972; 0.008042; −0.003846; . . .
0.000440; 0.007909; −0.001209; 0.000236; 0.006308; 0.002220; −0.001152; −0.004729; . . .
−0.012053], . . .
[0.136588; −0.161426; −0.054098; 0.002802; −0.005844; 0.036633; 0.000144; −0.010689; . . .
−0.126860; 0.091864; 0.016107; −0.003830; −0.011625; −0.005477; 0.013827; −0.007761; . . .
0.006912; −0.002134; 0.009776; 0.004270; 0.004653; 0.000483; −0.000351; 0.016248; . . .
0.059261; −0.031919; −0.011095; −0.001402; 0.000533; 0.002999; 0.003913; 0.001935; . . .
−0.003253; 0.009532; 0.003502; 0.004192; −0.000832; −0.005972; −0.008042; 0.003846; . . .

−0.000440; −0.007909; −0.001209; 0.000236; 0.006308; 0.002220; −0.001152; −0.004729; . . .
−0.012053], . . .
[0.164888; 0.123374; −0.076206; −0.145644; −0.136124; −0.020929; −0.005258; 0.056865; . . .
0.018877; 0.067617; 0.016934; −0.000772; −0.007800; 0.003439; −0.032344; 0.050448; . . .
−0.001310; −0.013832; 0.005096; −0.004027; 0.008353; −0.002844; −0.007981; 0.021205; . . .
−0.042547; −0.016465; 0.011074; −0.011591; −0.002209; −0.001653; 0.001398; 0.000352; . . .
0.005482; 0.004358; −0.011878; 0.006613; 0.002302; −0.006395; 0.010210; 0.001601; . . .
0.004158; 0.005450; −0.002134; −0.005461; −0.001272; −0.001569; 0.001447; 0.006215; . . .
0.009231], . . .
[0.164888; −0.123374; −0.076206; −0.145644; 0.136124; 0.020929; −0.005258; 0.056865; . . .
0.018877; −0.067617; −0.016934; 0.000772; −0.007800; 0.003439; −0.032344; 0.050448; . . .
0.001310; 0.013832; −0.005096; 0.004027; 0.008353; −0.002844; −0.007981; 0.021205; . . .
−0.042547; 0.016465; −0.011074; 0.011591; 0.002209; 0.001653; 0.001398; 0.000352; . . .
0.005482; 0.004358; −0.011878; 0.006613; −0.002302; 0.006395; −0.010210; −0.001601; . . .
−0.004158; −0.005450; −0.002134; −0.005461; −0.001272; −0.001569; 0.001447; 0.006215; . . .
0.009231], . . .
[0.109938; 0.079878; 0.122566; 0.066906; 0.059975; 0.093247; 0.053859; 0.077890; . . .
−0.009022; 0.016751; 0.066250; 0.050000; −0.003805; 0.039651; −0.007738; −0.026180; . . .
−0.007620; 0.019807; 0.030566; 0.005535; −0.012648; 0.000129; −0.002954; −0.019943; . . .
−0.013875; −0.009680; −0.000522; 0.009649; −0.002538; −0.008194; 0.001814; −0.009802; . . .
−0.002298; 0.001741; −0.009710; 0.002755; −0.000075; −0.003574; 0.007573; −0.001633; . . .
−0.008217; −0.003795; 0.008061; −0.001161; −0.003448; 0.012001; 0.002426; 0.000976; . . .
0.008326], . . .
[0.109938; −0.079878; 0.122566; 0.066906; −0.059975; −0.093247; 0.053859; 0.077890; . . .
−0.009022; −0.016751; −0.066250; −0.050000; −0.003805; 0.039651; −0.007738; −0.026180; . . .
0.007620; −0.019807; −0.030566; −0.005535; −0.012648; 0.000129; −0.002954; −0.019943; . . .
−0.013875; 0.009680; 0.000522; −0.009649; 0.002538; 0.008194; 0.001814; −0.009802; . . .
−0.002298; 0.001741; −0.009710; 0.002755; 0.000075; 0.003574; −0.007573; 0.001633; . . .
0.008217; 0.003795; 0.008061; −0.001161; −0.003448; 0.012001; 0.002426; 0.000976; . . .
0.008326], . . .
[0.145241; −0.000000; 0.135296; −0.142951; 0.000000; −0.000000; 0.052517; −0.121357; . . .
0.088142; −0.000000; −0.000000; 0.000000; 0.003667; −0.055313; 0.051211; −0.054704; . . .
0.000000; −0.000000; −0.000000; −0.000000; −0.005198; −0.008317; 0.010957; −0.013201; . . .
0.036871; −0.000000; 0.000000; 0.000000; −0.000000; −0.000000; 0.000497; 0.005108; . . .
−0.008406; 0.011389; 0.001903; −0.024651; 0.000000; −0.000000; 0.000000; −0.000000; . . .

−0.000000; 0.000000; 0.005137; 0.004536; −0.004835; 0.014471; −0.010277; 0.001434; . . . 0.014596] . . . ];

HOA Reference Decode Matrix for HOA Order 1, ACN Channel Ordering, N3D Scaling, for Rendering to Speaker Configuration G: 4+9+0

HOA_Ref_HOA1_Cfg7=[ . . .
[0.115634; 0.000000; −0.049198; 0.139299], . . .
[0.021497; 0.005383; −0.020292; 0.019200], . . .
[0.021497; −0.005383; −0.020292; 0.019200], . . .
[0.075230; 0.054856; −0.058511; 0.062730], . . .
[0.075230; −0.054856; −0.058511; 0.062730], . . .
[0.107667; 0.118626; −0.072230; 0.008879], . . .
[0.107667; −0.118626; −0.072230; 0.008879], . . .
[0.209738; 0.139672; −0.061306; −0.189592], . . .
[0.209738; −0.139672; −0.061306; −0.189592], . . .
[0.149471; 0.115889; 0.114875; 0.103617], . . .
[0.149471; −0.115889; 0.114875; 0.103617], . . .
[0.088366; 0.060333; 0.097849; −0.040061], . . .
[0.088366; −0.060333; 0.097849; −0.040061] . . . ];

HOA Reference Decode Matrix for HOA Order 2, ACN Channel Ordering, N3D Scaling, for Rendering to Speaker Configuration G: 4+9+0

HOA_Ref_HOA2_Cfg7=[ . . .
[0.100560; −0.000000; −0.038496; 0.126149; 0.000000; −0.000000; −0.020210; −0.028647; . . . 0.098709], . . .
[0.025512; 0.007378; −0.025175; 0.023790; 0.010113; −0.006622; 0.010214; −0.020790; . . . 0.014815], . . .
[0.025512; −0.007378; −0.025175; 0.023790; −0.010113; 0.006622; 0.010214; −0.020790; . . . 0.014815], . . .
[0.081106; 0.061311; −0.061669; 0.071085; 0.069296; −0.042651; 0.000900; −0.045852; . . . 0.011359], . . .
[0.081106; −0.061311; −0.061669; 0.071085; −0.069296; 0.042651; 0.000900; −0.045852; . . . 0.011359], . . .
[0.110162; 0.125320; −0.073542; 0.010135; 0.016379; −0.063502; 0.001367; −0.003872; . . . −0.092085], . . .
[0.110162; −0.125320; −0.073542; 0.010135; −0.016379; 0.063502; 0.001367; −0.003872; . . . −0.092085], . . .
[0.192839; 0.128496; −0.071039; −0.182432; −0.131407; −0.033231; −0.024879; 0.035202; . . . 0.045925], . . .
[0.192839; −0.128496; −0.071039; −0.182432; 0.131407; 0.033231; −0.024879; 0.035202; . . . 0.045925], . . .
[0.123433; 0.094658; 0.108151; 0.093257; 0.082485; 0.075276; 0.019166; 0.081388; . . . −0.004278], . . .
[0.123433; −0.094658; 0.108151; 0.093257; −0.082485; −0.075276; 0.019166; 0.081388; . . . −0.004278], . . .
[0.099337; 0.074942; 0.110691; −0.047619; −0.034395; 0.084453; 0.050148; −0.059631; . . . −0.023721], . . .
[0.099337; −0.074942; 0.110691; −0.047619; 0.034395; −0.084453; 0.050148; −0.059631; . . . −0.023721] . . . ];

HOA Reference Decode Matrix for HOA Order 3, ACN Channel Ordering, N3D Scaling, for Rendering to Speaker Configuration G: 4+9+0

HOA_Ref_HOA3_Cfg7=[ . . .
[0.087775; −0.000000; −0.036092; 0.110348; −0.000000; 0.000000; −0.014739; −0.025842; . . . 0.091869; −0.000000; 0.000000; 0.000000; −0.009192; −0.015002; −0.012975; 0.068539], . . .
[0.032595; 0.010851; −0.027341; 0.033841; 0.016578; −0.007114; 0.006410; −0.023528; . . . 0.022855; 0.017888; −0.008501; 0.001034; −0.002152; 0.004680; −0.012853; 0.012741],
[0.032595; −0.010851; −0.027341; 0.033841; −0.016578; 0.007114; 0.006410; −0.023528; . . . 0.022855; −0.017888; 0.008501; −0.001034; −0.002152; 0.004680; −0.012853; 0.012741], . . .
[0.083847; 0.065992; −0.061749; 0.074458; 0.077751; −0.042907; −0.002353; −0.046419; . . . 0.010137; 0.046742; −0.042959; −0.002021; 0.006897; −0.003695; −0.003518; −0.030702], . . .
[0.083847; −0.065992; −0.061749; 0.074458; −0.077751; 0.042907; −0.002353; −0.046419; . . . 0.010137; −0.046742; 0.042959; 0.002021; 0.006897; −0.003695; −0.003518; −0.030702], . . .
[0.117690; 0.138010; −0.074659; 0.008426; 0.013817; −0.065213; −0.005711; −0.002960; . . . −0.105611; −0.071526; −0.003828; −0.010140; −0.003491; −0.001365; 0.036292; −0.014895], . . .
[0.117690; −0.138010; −0.074659; 0.008426; −0.013817; 0.065213; −0.005711; −0.002960; . . . −0.105611; 0.071526; 0.003828; 0.010140; −0.003491; −0.001365; 0.036292; −0.014895], . . .
[0.180963; 0.114615; −0.073488; −0.178283; −0.130587; −0.035618; −0.019736; 0.037985; . . . 0.058730; 0.070864; 0.023069; −0.011814; −0.016665; 0.008400; 0.003456; 0.011566],
[0.180963; −0.114615; −0.073488; −0.178283; 0.130587; 0.035618; −0.019736; 0.037985; . . . 0.058730; −0.070864; −0.023069; 0.011814; −0.016665; 0.008400; 0.003456; 0.011566],
[0.106779; 0.076944; 0.104297; 0.083661; 0.074212; 0.073239; 0.028116; 0.084517; . . . 0.004253; 0.028124; 0.068644; 0.023457; −0.011878; 0.032473; 0.009819; −0.028430], . . .
[0.106779; −0.076944; 0.104297; 0.083661; −0.074212; −0.073239; 0.028116; 0.084517; . . . 0.004253; −0.028124; −0.068644; −0.023457; −0.011878; 0.032473; 0.009819; −0.028430], . . .
[0.101322; 0.078109; 0.114888; −0.048000; −0.035517; 0.092435; 0.053177; −0.061987; . . . −0.026104; −0.012082; −0.044932; 0.050210; −0.001078; −0.040738; −0.026345; 0.014038], . . .
[0.101322; −0.078109; 0.114888; −0.048000; 0.035517; −0.092435; 0.053177; −0.061987; . . . −0.026104; 0.012082; 0.044932; −0.050210; −0.001078; −0.040738; −0.026345; 0.014038] . . .
];

HOA Reference Decode Matrix for HOA Order 4, ACN Channel Ordering, N3D Scaling, for Rendering to Speaker Configuration G: 4+9+0

HOA_Ref_HOA4_Cfg7=[ . . .
[0.074091; −0.000000; −0.032712; 0.092093; −0.000000; 0.000000; −0.008766; −0.021459; . . .
0.080214; −0.000000; 0.000000; −0.000000; −0.010749; −0.012103; −0.009988; 0.065679; . . .
−0.000000; 0.000000; 0.000000; −0.000000; 0.008949; −0.007950; −0.008225; −0.003051; . . .
0.050286], . . .
[0.041856; 0.014509; −0.027140; 0.047027; 0.023327; −0.007121; 0.002765; −0.022228; . . .
0.033970; 0.026577; −0.008124; 0.000468; −0.003950; 0.003294; −0.010953; 0.020745; . . .
0.024974; −0.006109; 0.000156; −0.000995; 0.000747; −0.003915; 0.001949; −0.003813; . . .
0.009404], . . .
[0.041856; −0.014509; −0.027140; 0.047027; −0.023327; 0.007121; 0.002765; −0.022228; . . .
0.033970; −0.026577; 0.008124; −0.000468; −0.003950; 0.003294; −0.010953; 0.020745; . . .
−0.024974; 0.006109; −0.000156; 0.000995; 0.000747; −0.003915; 0.001949; −0.003813; . . .
0.009404], . . .
[0.084053; 0.067179; −0.061998; 0.074646; 0.080270; −0.043251; −0.002989; −0.046894; . . .
0.009008; 0.049047; −0.043937; −0.003369; 0.007214; −0.004577; −0.003786; −0.034408; . . .
0.009690; −0.022240; −0.007895; 0.006153; 0.011032; 0.006414; −0.001127; 0.017455; . . .
−0.038351], . . .
[0.084053; −0.067179; −0.061998; 0.074646; −0.080270; 0.043251; −0.002989; −0.046894; . . .
0.009008; −0.049047; 0.043937; 0.003369; 0.007214; −0.004577; −0.003786; −0.034408; . . .
−0.009690; 0.022240; 0.007895; −0.006153; 0.011032; 0.006414; −0.001127; 0.017455; . . .
−0.038351], . . .
[0.115996; 0.136347; −0.075630; 0.008423; 0.014079; −0.066947; −0.005157; −0.003158; . . .
−0.106397; −0.075097; −0.004176; −0.010909; −0.002475; −0.001446; 0.038007; −0.015732; . . .
−0.012875; 0.018571; −0.001701; −0.000852; 0.013563; 0.000249; 0.012727; 0.003785; . . .
0.045694], . . .
[0.115996; −0.136347; −0.075630; 0.008423; −0.014079; 0.066947; −0.005157; −0.003158; . . .
−0.106397; 0.075097; 0.004176; 0.010909; −0.002475; −0.001446; 0.038007; −0.015732; . . .
0.012875; −0.018571; 0.001701; 0.000852; 0.013563; 0.000249; 0.012727; 0.003785; . . .
0.045694], . . .
[0.176410; 0.109423; −0.076341; −0.175411; −0.127966; −0.039418; −0.017908; 0.040987; . . .
0.062017; 0.074072; 0.027309; −0.011455; −0.013785; 0.009135; 0.004745; 0.009056; . . .
−0.016125; −0.003041; 0.012428; −0.003866; 0.011792; 0.006770; 0.004792; −0.013745; . . .
−0.015134], . . .
[0.176410; −0.109423; −0.076341; −0.175411; 0.127966; 0.039418; −0.017908; 0.040987; . . .
0.062017; −0.074072; −0.027309; 0.011455; −0.013785; 0.009135; 0.004745; 0.009056; . . .
0.016125; 0.003041; −0.012428; 0.003866; 0.011792; 0.006770; 0.004792; −0.013745; . . .
−0.015134], . . .
[0.101372; 0.073002; 0.103127; 0.078127; 0.071395; 0.073831; 0.032280; 0.083694; . . .
0.002762; 0.027751; 0.072126; 0.026688; −0.010884; 0.036284; 0.008313; −0.029619; . . .
−0.003874; 0.027500; 0.029153; −0.004823; −0.004875; −0.001112; 0.010389; −0.023734; . . .
−0.018480], . . .
[0.101372; −0.073002; 0.103127; 0.078127; −0.071395; −0.073831; 0.032280; 0.083694; . . .
0.002762; −0.027751; −0.072126; −0.026688; −0.010884; 0.036284; 0.008313; −0.029619; . . .
0.003874; −0.027500; −0.029153; 0.004823; −0.004875; −0.001112; 0.010389; −0.023734; . . .
−0.018480], . . .
[0.103430; 0.080539; 0.116450; −0.051583; −0.040573; 0.094809; 0.052245; −0.065433; . . .
−0.026708; −0.011477; −0.050133; 0.050284; −0.003285; −0.041349; −0.027334; 0.018419; . . .
0.011255; −0.010992; −0.030710; 0.003793; −0.012026; −0.009276; −0.009479; 0.018486; . . .
0.008834], . . .
[0.103430; −0.080539; 0.116450; −0.051583; 0.040573; −0.094809; 0.052245; −0.065433; . . .
−0.026708; 0.011477; 0.050133; −0.050284; −0.003285; −0.041349; −0.027334; 0.018419; . . .
−0.011255; 0.010992; 0.030710; −0.003793; −0.012026; −0.009276; −0.009479; 0.018486; . . .
0.008834] . . . ];

HOA Reference Decode Matrix for HOA Order 5, ACN Channel Ordering, N3D Scaling, for Rendering to Speaker Configuration G: 4+9+0

HOA_Ref_HOA5_Cfg7=[ . . .
[0.072812; −0.000000; −0.033165; 0.090590; −0.000000; 0.000000; −0.008100; −0.022169; . . .
0.080146; −0.000000; 0.000000; −0.000000; −0.010351; −0.012014; −0.010448; 0.067706; . . .
−0.000000; 0.000000; 0.000000; −0.000000; 0.009201; −0.007787; −0.008960; −0.003085; . . .
0.054458; −0.000000; 0.000000; 0.000000; 0.000000; −0.000000; 0.005252; 0.003265; . . .
−0.003657; −0.006424; 0.000280; 0.041016], . . .
[0.040952; 0.014163; −0.027193; 0.045813; 0.023001; −0.007290; 0.003446; −0.022226; . . .
0.033349; 0.026881; −0.008415; 0.000549; −0.004064; 0.003886; −0.010782; 0.020790; . . .
0.026390; −0.006408; 0.000056; −0.000980; 0.000456; −0.004279; 0.002205; −0.003475; . . .
0.009702; 0.022588; −0.003551; −0.000704; −0.000944; −0.000774; 0.003267; −0.003308; . . .
−0.001724; 0.001161; −0.000313; 0.000992], . . .
[0.040952; −0.014163; −0.027193; 0.045813; −0.023001; 0.007290; 0.003446; −0.022226; . . .
0.033349; −0.026881; 0.008415; −0.000549; −0.004064; 0.003886; −0.010782; 0.020790; . . .
−0.026390; 0.006408; −0.000056; 0.000980; 0.000456; −0.004279; 0.002205; −0.003475; . . .
0.009702; −0.022588; 0.003551; 0.000704; 0.000944; 0.000774; 0.003267; −0.003308; . . .
−0.001724; 0.001161; −0.000313; 0.000992], . . .
[0.084950; 0.067409; −0.061123; 0.076702; 0.082519; −0.042867; −0.003512; −0.045227; . . .

0.011530; 0.053578; −0.043148; −0.003492; 0.005874; −0.005331; −0.001923; −0.034082; . . .
0.013581; −0.020839; −0.008980; 0.005771; 0.010993; 0.004728; −0.001598; 0.019471; . . .
−0.041710; −0.008957; −0.000162; −0.007944; 0.008404; 0.004679; −0.002176; 0.005138; . . .
−0.001459; 0.005160; 0.017300; −0.024822], . . .
[0.084950; −0.067409; −0.061123; 0.076702; −0.082519; 0.042867; −0.003512; −0.045227; . . .
0.011530; −0.053578; 0.043148; 0.003492; 0.005874; −0.005331; −0.001923; −0.034082; . . .
−0.013581; 0.020839; 0.008980; −0.005771; 0.010993; 0.004728; −0.001598; 0.019471; . . .
−0.041710; 0.008957; 0.000162; 0.007944; −0.008404; −0.004679; −0.002176; 0.005138; . . .
−0.001459; 0.005160; 0.017300; −0.024822], . . .
[0.114594; 0.134853; −0.076472; 0.008520; 0.014452; −0.068444; −0.004603; −0.003288; . . .
−0.106743; −0.077743; −0.004395; −0.011344; −0.001522; −0.001546; 0.039431; −0.016577; . . .
−0.014212; 0.019640; −0.001947; −0.000012; 0.014262; 0.000356; 0.014453; 0.003944; . . .
0.050016; 0.026437; 0.000785; 0.012087; 0.000934; 0.006386; 0.003984; 0.000336; . . .
−0.002637; 0.000573; −0.006925; 0.009416], . . .
[0.114594; −0.134853; −0.076472; 0.008520; −0.014452; 0.068444; −0.004603; −0.003288; . . .
−0.106743; 0.077743; 0.004395; 0.011344; −0.001522; −0.001546; 0.039431; −0.016577; . . .
0.014212; −0.019640; 0.001947; 0.000012; 0.014262; 0.000356; 0.014453; 0.003944; . . .
0.050016; −0.026437; −0.000785; −0.012087; −0.000934; −0.006386; 0.003984; 0.000336; . . .
−0.002637; 0.000573; −0.006925; 0.009416], . . .
[0.171877; 0.103550; −0.079260; −0.172385; −0.123609; −0.043855; −0.015766; 0.044145; . . .
0.065682; 0.075744; 0.032733; −0.010691; −0.009990; 0.009457; 0.006809; 0.004740; . . .
−0.019609; −0.004076; 0.014246; −0.000271; 0.013232; 0.004441; 0.004241; −0.019245; . . .
−0.015232; −0.003421; −0.010922; −0.006268; −0.001766; 0.004486; 0.003566; 0.000370; . . .
0.000965; −0.012772; 0.007603; −0.003568], . . .
[0.171877; −0.103550; −0.079260; −0.172385; 0.123609; 0.043855; −0.015766; 0.044145; . . .
0.065682; −0.075744; −0.032733; 0.010691; −0.009990; 0.009457; 0.006809; 0.004740; . . .
0.019609; 0.004076; −0.014246; 0.000271; 0.013232; 0.004441; 0.004241; −0.019245; . . .
−0.015232; 0.003421; 0.010922; 0.006268; 0.001766; −0.004486; 0.003566; 0.000370; . . .
0.000965; −0.012772; 0.007603; −0.003568], . . .
[0.097693; 0.070384; 0.101980; 0.074209; 0.069528; 0.073311; 0.035197; 0.082877; . . .
0.000935; 0.026514; 0.073628; 0.028393; −0.009526; 0.039370; 0.007781; −0.032005; . . .
−0.006953; 0.029104; 0.032598; −0.004631; −0.006622; 0.000190; 0.012089; −0.026758; . . .
−0.020727; −0.011298; −0.003021; 0.014174; −0.000149; −0.004952; 0.007745; −0.007331; . . .
0.007988; −0.004846; −0.014635; −0.000628], . . .
[0.097693; −0.070384; 0.101980; 0.074209; −0.069528; −0.073311; 0.035197; 0.082877; . . .
0.000935; −0.026514; −0.073628; −0.028393; −0.009526; 0.039370; 0.007781; −0.032005; . . .
0.006953; −0.029104; −0.032598; 0.004631; −0.006622; 0.000190; 0.012089; −0.026758; . . .
−0.020727; 0.011298; 0.003021; −0.014174; 0.000149; 0.004952; 0.007745; −0.007331; . . .
0.007988; −0.004846; −0.014635; −0.000628], . . .
[0.105333; 0.082677; 0.118322; −0.054461; −0.044992; 0.097777; 0.051697; −0.068398; . . .
−0.027102; −0.010121; −0.055264; 0.050888; −0.006048; −0.041585; −0.028927; 0.022670; . . .
0.014213; −0.010800; −0.032075; 0.000896; −0.013637; −0.007042; −0.010619; 0.023788; . . .
0.006385; 0.000108; 0.013048; −0.004570; −0.003798; −0.011372; 0.004373; 0.007273; . . .
0.004964; 0.008975; 0.009301; −0.009800], . . .
[0.105333; −0.082677; 0.118322; −0.054461; 0.044992; −0.097777; 0.051697; −0.068398; . . .
−0.027102; 0.010121; 0.055264; −0.050888; −0.006048; −0.041585; −0.028927; 0.022670; . . .
−0.014213; 0.010800; 0.032075; −0.000896; −0.013637; −0.007042; −0.010619; 0.023788; . . .
0.006385; −0.000108; −0.013048; 0.004570; 0.003798; 0.011372; 0.004373; 0.007273; . . .
0.004964; 0.008975; 0.009301; −0.009800] . . . ];

HOA Reference Decode Matrix for HOA Order 6, ACN Channel Ordering, N3D Scaling, for Rendering to Speaker Configuration G: 4+9+0

HOA_Ref_HOA6_Cfg7=[ . . .
[0.072388; −0.000000; −0.033303; 0.090049; −0.000000; 0.000000; −0.007740; −0.022420; . . .
0.080057; 0.000000; −0.000000; −0.000000; −0.010143; −0.011719; −0.010668; 0.068351; . . .
−0.000000; −0.000000; 0.000000; −0.000000; 0.009014; −0.007545; −0.009023; −0.003197; . . .
0.055936; −0.000000; 0.000000; 0.000000; 0.000000; 0.000000; 0.005139; 0.003155; . . .
−0.003522; −0.006880; 0.000322; 0.043219; −0.000000; 0.000000; −0.000000; 0.000000; . . .
−0.000000; −0.000000; −0.003680; 0.006757; −0.000806; 0.000481; −0.003801; 0.001840; . . .
0.031182], . . .
[0.040543; 0.013989; −0.027211; 0.045223; 0.022758; −0.007327; 0.003783; −0.022230; . . .
0.032950; 0.026774; −0.008471; 0.000612; −0.004097; 0.004221; −0.010732; 0.020649; . . .
0.026626; −0.006446; 0.000074; −0.000991; 0.000281; −0.004393; 0.002390; −0.003366; . . .
0.009727; 0.023274; −0.003535; −0.000815; −0.001016; −0.000778; 0.003404; −0.003471; . . .
−0.001873; 0.001255; −0.000167; 0.000963; 0.017948; −0.001216; −0.001363; −0.000350; . . .
−0.002572; 0.001995; 0.000900; 0.005545; −0.004313; 0.000530; 0.001707; 0.000567; . . .
−0.004995], . . .
[0.040543; −0.013989; −0.027211; 0.045223; −0.022758; 0.007327; 0.003783; −0.022230; . . .
0.032950; −0.026774; 0.008471; −0.000612; −0.004097; 0.004221; −0.010732; 0.020649; . . .
−0.026626; 0.006446; −0.000074; 0.000991; 0.000281; −0.004393; 0.002390; −0.003366; . . .
0.009727; −0.023274; 0.003535; 0.000815; 0.001016; 0.000778; 0.003404; −0.003471; . . .
−0.001873; 0.001255; −0.000167; 0.000963; −0.017948; 0.001216; 0.001363; 0.000350; . . .
0.002572; −0.001995; 0.000900; 0.005545; −0.004313; 0.000530; 0.001707; 0.000567; . . .
−0.004995], . . .

[0.087554; 0.070384; −0.060240; 0.080017; 0.087498; −0.041685; −0.005976; −0.043788; . . .
0.012110; 0.058067; −0.040964; −0.005595; 0.004106; −0.007634; −0.001481; −0.037110; . . .
0.015134; −0.018727; −0.011827; 0.004001; 0.012552; 0.002558; −0.001863; 0.018379; . . .
−0.047036; −0.010977; 0.000796; −0.010036; 0.005652; 0.005779; −0.000079; 0.006257; . . .
−0.002038; 0.006693; 0.015160; −0.029713; −0.013903; 0.006702; −0.002007; 0.002380; . . .
0.002532; 0.003059; −0.006222; 0.004490; 0.000074; −0.005193; 0.010471; 0.004156; . . .
−0.010078], . . .
[0.087554; −0.070384; −0.060240; 0.080017; −0.087498; 0.041685; −0.005976; −0.043788; . . .
0.012110; −0.058067; 0.040964; 0.005595; 0.004106; −0.007634; −0.001481; −0.037110; . . .
−0.015134; 0.018727; 0.011827; −0.004001; 0.012552; 0.002558; −0.001863; 0.018379; . . .
−0.047036; 0.010977; −0.000796; 0.010036; −0.005652; −0.005779; −0.000079; 0.006257; . . .
−0.002038; 0.006693; 0.015160; −0.029713; 0.013903; −0.006702; 0.002007; −0.002380; . . .
−0.002532; −0.003059; −0.006222; 0.004490; 0.000074; −0.005193; 0.010471; 0.004156; . . .
−0.010078], . . .
[0.113975; 0.134117; −0.076795; 0.008568; 0.014613; −0.069038; −0.004277; −0.003311; . . .
−0.106665; −0.078519; −0.004433; −0.011367; −0.001105; −0.001601; 0.040014; −0.016917; . . .
−0.014721; 0.020089; −0.002082; 0.000411; 0.014462; 0.000393; 0.015056; 0.003953; . . .
0.051447; 0.028030; 0.000697; 0.013132; 0.000996; 0.006979; 0.003906; 0.000406; . . .
−0.002828; 0.000772; −0.007145; 0.009965; 0.004588; 0.000496; 0.001029; −0.002253; . . .
−0.001067; 0.010379; −0.006800; −0.000450; 0.000334; 0.000097; −0.008571; 0.002633; . . .
−0.010616], . . .
[0.113975; −0.134117; −0.076795; 0.008568; −0.014613; 0.069038; −0.004277; −0.003311; . . .
−0.106665; 0.078519; 0.004433; 0.011367; −0.001105; −0.001601; 0.040014; −0.016917; . . .
0.014721; −0.020089; 0.002082; −0.000411; 0.014462; 0.000393; 0.015056; 0.003953; . . .
0.051447; −0.028030; −0.000697; −0.013132; −0.000996; −0.006979; 0.003906; 0.000406; . . .
−0.002828; 0.000772; −0.007145; 0.009965; −0.004588; −0.000496; −0.001029; 0.002253; . . .
0.001067; −0.010379; −0.006800; −0.000450; 0.000334; 0.000097; −0.008571; 0.002633; . . .
−0.010616], . . .
[0.171435; 0.102884; −0.079602; −0.172262; −0.123381; −0.044430; −0.015627; 0.044456; . . .
0.066358; 0.076422; 0.033338; −0.010712; −0.009541; 0.009685; 0.007219; 0.004380; . . .
−0.020140; −0.003978; 0.014759; 0.000184; 0.013579; 0.004241; 0.004158; −0.019991; . . .
−0.015860; −0.003911; −0.011622; −0.006676; −0.001976; 0.005025; 0.003446; −0.000068; . . .
0.000694; −0.013379; 0.007838; −0.002874; −0.000018; 0.008608; −0.002937; 0.001553; . . .
0.001011; 0.006225; −0.004829; −0.007730; −0.005837; −0.001215; 0.008575; 0.005297; . . .
0.013226], . . .
[0.171435; −0.102884; −0.079602; −0.172262; 0.123381; 0.044430; −0.015627; 0.044456; . . .
0.066358; −0.076422; −0.033338; 0.010712; −0.009541; 0.009685; 0.007219; 0.004380; . . .
0.020140; 0.003978; −0.014759; −0.000184; 0.013579; 0.004241; 0.004158; −0.019991; . . .
−0.015860; 0.003911; 0.011622; 0.006676; 0.001976; −0.005025; 0.003446; −0.000068; . . .
0.000694; −0.013379; 0.007838; −0.002874; 0.000018; −0.008608; 0.002937; −0.001553; . . .
−0.001011; −0.006225; −0.004829; −0.007730; −0.005837; −0.001215; 0.008575; 0.005297; . . .
0.013226], . . .
[0.093665; 0.066152; 0.101140; 0.069346; 0.063486; 0.072275; 0.039146; 0.081791; . . .
−0.000144; 0.021547; 0.072410; 0.031600; −0.007947; 0.043303; 0.007516; −0.029610; . . .
−0.009457; 0.028004; 0.037172; −0.003174; −0.009596; 0.001978; 0.013054; −0.026697; . . .
−0.016399; −0.010869; −0.004325; 0.017779; 0.001941; −0.007164; 0.005953; −0.010170; . . .
0.008621; −0.006836; −0.013969; 0.003972; 0.000859; −0.005633; 0.002622; 0.002734; . . .
−0.007120; 0.001632; 0.009427; −0.002870; 0.000368; 0.004111; −0.001455; 0.003479; . . .
0.009133], . . .
[0.093665; −0.066152; 0.101140; 0.069346; −0.063486; −0.072275; 0.039146; 0.081791; . . .
−0.000144; −0.021547; −0.072410; −0.031600; −0.007947; 0.043303; 0.007516; −0.029610; . . .
0.009457; −0.028004; −0.037172; 0.003174; −0.009596; 0.001978; 0.013054; −0.026697; . . .
−0.016399; 0.010869; 0.004325; −0.017779; −0.001941; 0.007164; 0.005953; −0.010170; . . .
0.008621; −0.006836; −0.013969; 0.003972; −0.000859; 0.005633; −0.002622; −0.002734; . . .
0.007120; −0.001632; 0.009427; −0.002870; 0.000368; 0.004111; −0.001455; 0.003479; . . .
0.009133], . . .
[0.104839; 0.081997; 0.118312; −0.054432; −0.044989; 0.097824; 0.052256; −0.068736; . . .
−0.026777; −0.010190; −0.055930; 0.051624; −0.006060; −0.042059; −0.029133; 0.022875; . . .
0.014729; −0.011162; −0.032989; 0.000853; −0.014327; −0.006962; −0.011170; 0.024684; . . .
0.006599; 0.000138; 0.014032; −0.004959; −0.003821; −0.012351; 0.004278; 0.007886; . . .
0.005047; 0.009984; 0.009693; −0.010506; −0.003523; 0.002862; 0.003809; 0.000278; . . .
0.007326; −0.000264; 0.012270; 0.004385; 0.005769; −0.002779; 0.007782; −0.008916; . . .
0.003783], . . .
[0.104839; −0.081997; 0.118312; −0.054432; 0.044989; −0.097824; 0.052256; −0.068736; . . .
−0.026777; 0.010190; 0.055930; −0.051624; −0.006060; −0.042059; −0.029133; 0.022875; . . .
−0.014729; 0.011162; 0.032989; −0.000853; −0.014327; −0.006962; −0.011170; 0.024684; . . .
0.006599; −0.000138; −0.014032; 0.004959; 0.003821; 0.012351; 0.004278; 0.007886; . . .
0.005047; 0.009984; 0.009693; −0.010506; 0.003523; −0.002862; −0.003809; −0.000278; . . .
−0.007326; 0.000264; 0.012270; 0.004385; 0.005769; −0.002779; 0.007782; −0.008916; . . .
0.003783] . . . ];

HOA Reference Decode Matrix for HOA Order 1, ACN Channel Ordering, N3D Scaling, for Rendering to Speaker Configuration H: 9+10+3

HOA_Ref_HOA1_Cfg8=[ . . .
[0.078185; −0.000000; −0.006640; 0.110910], . . .

[0.021132; 0.017763; −0.003148; 0.026393], . . .
[0.021132; −0.017763; −0.003148; 0.026393], . . .
[0.040642; 0.052884; −0.013510; 0.024038], . . .
[0.040642; −0.052884; −0.013510; 0.024038], . . .
[0.065420; 0.085108; −0.031393; −0.003519], . . .
[0.065420; −0.085108; −0.031393; −0.003519], . . .
[0.131451; 0.114352; −0.055925; −0.117794], . . .
[0.131451; −0.114352; −0.055925; −0.117794], . . .
[0.077598; 0.000000; −0.056952; −0.088842], . . .
[0.009565; 0.000000; 0.008878; 0.011528], . . .
[0.110312; 0.092533; 0.077781; 0.090907], . . .
[0.110312; −0.092533; 0.077781; 0.090907], . . .
[0.023957; 0.030685; 0.018810; 0.000000], . . .
[0.023957; −0.030685; 0.018810; 0.000000], . . .
[0.094698; 0.072478; 0.077165; −0.077257], . . .
[0.094698; −0.072478; 0.077165; −0.077257], . . .
[0.018754; 0.000000; 0.013199; −0.024898], . . .
[0.114572; −0.000000; 0.156701; 0.000000], . . .
[0.047522; −0.000000; −0.054380; 0.040469], . . .
[0.102044; 0.063217; −0.111507; 0.050458], . . .
[0.102044; −0.063217; −0.111507; 0.050458] . . .
];

HOA Reference Decode Matrix for HOA Order 2, ACN Channel Ordering, N3D Scaling, for Rendering to Speaker Configuration H: 9+10+3

HOA_Ref_HOA2_Cfg8=[ . . .
[0.061310; 0.000000; 0.000000; 0.092714; −0.000000; −0.000000; −0.046366; −0.000000; . . . 0.077481], . . .
[0.021055; 0.018251; −0.002193; 0.027736; 0.028138; −0.002746; −0.017559; −0.003065; . . . 0.012187], . . .
[0.021055; −0.018251; −0.002193; 0.027736; −0.028138; 0.002746; −0.017559; −0.003065; . . . 0.012187], . . .
[0.039856; 0.054278; −0.013097; 0.023547; 0.038206; −0.019016; −0.023998; −0.006879; . . . −0.034557], . . .
[0.039856; −0.054278; −0.013097; 0.023547; −0.038206; 0.019016; −0.023998; −0.006879; . . . −0.034557], . . .
[0.063204; 0.084565; −0.033384; −0.005085; −0.005137; −0.041332; −0.016182; 0.007229; . . . −0.068672], . . .
[0.063204; −0.084565; −0.033384; −0.005085; 0.005137; 0.041332; −0.016182; 0.007229; . . . −0.068672], . . .
[0.116923; 0.108690; −0.054452; −0.106338; −0.108959; −0.042002; −0.035416; 0.046802; . . . −0.004947], . . .
[0.116923; −0.108690; −0.054452; −0.106338; 0.108959; 0.042002; −0.035416; 0.046802; . . . −0.004947], . . .
[0.087680; −0.000000; −0.061997; −0.105701; −0.000000; 0.000000; −0.001544; 0.067021; . . . 0.077865], . . .
[0.028045; −0.000000; 0.026044; 0.035253; −0.000000; 0.000000; 0.001989; 0.037285; . . . 0.026512], . . .
[0.088243; 0.080401; 0.066115; 0.077389; 0.076448; 0.064029; −0.012544; 0.062972; . . . −0.003666], . . .
[0.088243; −0.080401; 0.066115; 0.077389; −0.076448; −0.064029; −0.012544; 0.062972; . . . −0.003666], . . .
[0.032257; 0.041881; 0.027530; 0.000000; −0.000000; 0.040116; −0.001343; −0.000000; . . . −0.032675], . . .
[0.032257; −0.041881; 0.027530; 0.000000; 0.000000; −0.040116; −0.001343; −0.000000; . . . −0.032675], . . .
[0.076219; 0.064541; 0.065315; −0.065934; −0.057929; 0.062232; −0.002025; −0.062665; . . . 0.001678], . . .
[0.076219; −0.064541; 0.065315; −0.065934; 0.057929; −0.062232; −0.002025; −0.062665; . . . 0.001678], . . .
[0.034610; −0.000000; 0.028261; −0.045449; 0.000000; 0.000000; −0.003131; −0.041365; . . . 0.035704], . . .
[0.107454; −0.000000; 0.154588; 0.000000; 0.000000; −0.000000; 0.134693; −0.000000; . . . 0.000232], . . .
[0.053609; −0.000000; −0.059013; 0.050551; −0.000000; −0.000000; 0.026568; −0.055318; . . . 0.035169], . . .
[0.098297; 0.062120; −0.111001; 0.050911; 0.047562; −0.072991; 0.054990; −0.049232; . . . 0.002868], . . .
[0.098297; −0.062120; −0.111001; 0.050911; −0.047562; 0.072991; 0.054990; −0.049232; . . . 0.002868] . . . ];

HOA Reference Decode Matrix for HOA Order 3, ACN Channel Ordering, N3D Scaling, for Rendering to Speaker Configuration H: 9+10+3

HOA_Ref_HOA3_Cfg8=[ . . .
[0.057803; −0.000000; 0.000000; 0.089728; −0.000000; −0.000000; −0.047261; −0.000000; . . . 0.079408; −0.000000; −0.000000; 0.000000; 0.000000; −0.048752; −0.000000; 0.058817], . . .
[0.021438; 0.019343; −0.001729; 0.028693; 0.031117; −0.002265; −0.019225; −0.002491; . . . 0.012647; 0.028581; −0.003611; −0.012300; 0.002742; −0.018484; −0.000328; −0.005892], . . .
[0.021438; −0.019343; −0.001729; 0.028693; −0.031117; 0.002265; −0.019225; −0.002491; . . . 0.012647; −0.028581; 0.003611; 0.012300; 0.002742; −0.018484; −0.000328; −0.005892], . . .
[0.043522; 0.059510; −0.012178; 0.028510; 0.047368; −0.018289; −0.028963; −0.005493; . . . −0.036429; −0.008567; −0.010330; −0.023795; 0.009633; −0.015876; 0.013258; −0.047055], . . .
[0.043522; −0.059510; −0.012178; 0.028510; −0.047368; 0.018289; −0.028963; −0.005493; . . . −0.036429; 0.008567; 0.010330; 0.023795; 0.009633; −0.015876; 0.013258; −0.047055],
[0.067390; 0.092206; −0.034396; −0.009263; −0.012679; −0.043591; −0.021228; 0.008421; . . . −0.077699; −0.058975; 0.008829; −0.013821; 0.010625; −0.004796; 0.031856; 0.012840], . . .
[0.067390; −0.092206; −0.034396; −0.009263; 0.012679; 0.043591; −0.021228; 0.008421; . . . −0.077699; 0.058975; −0.008829; 0.013821; 0.010625; −0.004796; 0.031856; 0.012840],
[0.103217; 0.094845; −0.054299; −0.097004; −0.105630; −0.042565; −0.026750; 0.047197; . . . 0.000021; 0.048757; 0.040896; −0.014115; 0.009584; 0.009013; −0.000962; 0.049923],
[0.103217; −0.094845; −0.054299; −0.097004; 0.105630; 0.042565; −0.026750; 0.047197; . . .

0.000021; −0.048757; −0.040896; 0.014115; 0.009584; 0.009013; −0.000962; 0.049923],
[0.091829; −0.000000; −0.064687; −0.112991; 0.000000; −0.000000; −0.005269; 0.071877; . . .
0.086669; −0.000000; −0.000000; 0.000000; 0.008661; −0.002557; −0.043627; −0.061091], . . .
[0.035838; −0.000000; 0.034477; 0.045133; −0.000000; −0.000000; 0.004010; 0.050334; . . .
0.034480; −0.000000; 0.000000; 0.000000; −0.016541; 0.021735; 0.040916; 0.023452], . . .
[0.069855; 0.064627; 0.058602; 0.062321; 0.065347; 0.061167; −0.005603; 0.059617; . . .
−0.002616; 0.026022; 0.063561; 0.014796; −0.034914; 0.015500; −0.001976; −0.029472], . . .
[0.069855; −0.064627; 0.058602; 0.062321; −0.065347; −0.061167; −0.005603; 0.059617; . . .
−0.002616; −0.026022; −0.063561; −0.014796; −0.034914; 0.015500; −0.001976; −0.029472], . . .
[0.042543; 0.053881; 0.038663; 0.000000; −0.000000; 0.055120; 0.002339; −0.000000; . . .
−0.041516; −0.028713; 0.000000; 0.019663; −0.017169; 0.000000; −0.043776; −0.000000], . . .
[0.042543; −0.053881; 0.038663; 0.000000; 0.000000; −0.055120; 0.002339; −0.000000; . . .
−0.041516; 0.028713; 0.000000; −0.019663; −0.017169; 0.000000; −0.043776; −0.000000], . . .
[0.062925; 0.056080; 0.056928; −0.055321; −0.055218; 0.058650; 0.000621; −0.057588; . . .
−0.000624; 0.021957; −0.060324; 0.020320; −0.032147; −0.020024; −0.001276; 0.022142], . . .
[0.062925; −0.056080; 0.056928; −0.055321; 0.055218; −0.058650; 0.000621; −0.057588; . . .
−0.000624; −0.021957; 0.060324; −0.020320; −0.032147; −0.020024; −0.001276; 0.022142], . . .
[0.045662; −0.000000; 0.038007; −0.060389; 0.000000; −0.000000; −0.004101; −0.057016; . . .
0.047962; −0.000000; 0.000000; −0.000000; −0.022207; −0.013261; 0.047457; −0.033400], . . .
[0.092805; −0.000000; 0.138709; 0.000000; 0.000000; 0.000000; 0.131465; −0.000000; . . .
0.001602; −0.000000; 0.000000; −0.000000; 0.093567; 0.000000; 0.003010; −0.000000],
[0.051574; −0.000000; −0.058689; 0.048296; −0.000000; −0.000000; 0.028439; −0.055979; . . .
0.035093; −0.000000; 0.000000; 0.000000; −0.002842; 0.028351; −0.041970; 0.023832], . . .
[0.095231; 0.060515; −0.110512; 0.048255; 0.048022; −0.074768; 0.057660; −0.049331; . . .
0.002675; 0.024505; −0.053912; 0.046055; −0.009717; 0.015218; 0.001855; −0.014176],
[0.095231; −0.060515; −0.110512; 0.048255; −0.048022; 0.074768; 0.057660; −0.049331; . . .
0.002675; −0.024505; 0.053912; −0.046055; −0.009717; 0.015218; 0.001855; −0.014176]];

HOA Reference Decode Matrix for HOA Order 4, ACN Channel Ordering, N3D Scaling, for Rendering to Speaker Configuration H: 9+10+3

HOA_Ref_HOA4_Cfg8=[ . . .
[0.044749; −0.000000; 0.002087; 0.071290; −0.000000; −0.000000; −0.038296; 0.003848; . . .
0.067462; −0.000000; −0.000000; 0.000000; −0.003323; −0.042044; 0.003430; 0.056352; . . .
−0.000000; 0.000000; 0.000000; 0.000000; 0.019171; −0.004149; −0.029704; 0.002037; . . .
0.041666], . . .
[0.024261; 0.020522; −0.001618; 0.033743; 0.034506; −0.002198; −0.022569; −0.002374; . . .
0.017926; 0.034453; −0.003627; −0.013967; 0.002746; −0.023144; −0.000270; −0.002222; . . .
0.022943; −0.002787; −0.018996; 0.002632; 0.014406; 0.002809; −0.010101; 0.002252; . . .
−0.015887], . . .
[0.024261; −0.020522; −0.001618; 0.033743; −0.034506; 0.002198; −0.022569; −0.002374; . . .
0.017926; −0.034453; 0.003627; 0.013967; 0.002746; −0.023144; −0.000270; −0.002222; . . .
−0.022943; 0.002787; 0.018996; −0.002632; 0.014406; 0.002809; −0.010101; 0.002252; . . .
−0.015887], . . .
[0.043755; 0.060648; −0.011520; 0.028646; 0.049102; −0.017386; −0.029973; −0.004797; . . .
−0.038531; −0.010064; −0.009351; −0.025729; 0.008892; −0.016972; 0.013014; −0.051432; . . .
−0.038344; 0.006482; −0.021011; 0.006711; 0.013712; 0.004731; 0.008459; 0.010620; . . .
−0.010956], . . .
[0.043755; −0.060648; −0.011520; 0.028646; −0.049102; 0.017386; −0.029973; −0.004797; . . .
−0.038531; 0.010064; 0.009351; 0.025729; 0.008892; −0.016972; 0.013014; −0.051432; . . .
0.038344; −0.006482; 0.021011; −0.006711; 0.013712; 0.004731; 0.008459; 0.010620; . . .
−0.010956], . . .
[0.065584; 0.090180; −0.034674; −0.009377; −0.012989; −0.044382; −0.020661; 0.008874; . . .
−0.077616; −0.061355; 0.009633; −0.014384; 0.011198; −0.005092; 0.033270; 0.013580; . . .
0.012081; 0.022720; −0.003882; 0.005195; 0.007860; 0.004030; 0.009506; −0.007418; . . .
0.044101], . . .
[0.065584; −0.090180; −0.034674; −0.009377; 0.012989; 0.044382; −0.020661; 0.008874; . . .
−0.077616; 0.061355; −0.009633; 0.014384; 0.011198; −0.005092; 0.033270; 0.013580; . . .
−0.012081; −0.022720; 0.003882; −0.005195; 0.007860; 0.004030; 0.009506; −0.007418; . . .
0.044101], . . .
[0.097806; 0.091922; −0.055301; −0.090038; −0.103006; −0.043906; −0.023043; 0.048593; . . .
−0.005082; 0.046782; 0.043002; −0.013713; 0.010962; 0.006071; −0.001156; 0.056042; . . .
0.005557; −0.016970; 0.011446; 0.003062; 0.011614; 0.001728; 0.002630; −0.016914; . . .
−0.043601], . . .
[0.097806; −0.091922; −0.055301; −0.090038; 0.103006; 0.043906; −0.023043; 0.048593; . . .
−0.005082; −0.046782; −0.043002; 0.013713; 0.010962; 0.006071; −0.001156; 0.056042; . . .
−0.005557; 0.016970; −0.011446; −0.003062; 0.011614; 0.001728; 0.002630; −0.016914; . . .
−0.043601], . . .
[0.097717; 0.000000; −0.065175; −0.122308; 0.000000; 0.000000; −0.010879; 0.072801; . . .
0.095014; −0.000000; −0.000000; 0.000000; 0.008831; 0.004314; −0.045091; −0.067149; . . .
0.000000; 0.000000; −0.000000; −0.000000; 0.010916; −0.000210; −0.010524; 0.025440; . . .
0.041625], . . .
[0.041297; 0.000000; 0.041738; 0.051103; −0.000000; −0.000000; 0.007789; 0.060742; . . .
0.038319; −0.000000; −0.000000; −0.000000; −0.019114; 0.030951; 0.048777; 0.025911; . . .

−0.000000; −0.000000; −0.000000; 0.000000; −0.019796; −0.002622; 0.030741; 0.033642; . . . 0.015775], . . .
[0.057213; 0.052974; 0.048046; 0.054632; 0.060047; 0.051844; −0.006029; 0.052480; . . . 0.002274; 0.031257; 0.061271; 0.013375; −0.032087; 0.011971; 0.001198; −0.027335; . . . 0.002576; 0.030865; 0.023366; −0.012598; −0.017124; −0.014303; −0.001156; −0.028562; . . . −0.024729], . . .
[0.057213; −0.052974; 0.048046; 0.054632; −0.060047; −0.051844; −0.006029; 0.052480; . . . 0.002274; −0.031257; −0.061271; −0.013375; −0.032087; 0.011971; 0.001198; −0.027335; . . . −0.002576; −0.030865; −0.023366; 0.012598; −0.017124; −0.014303; −0.001156; −0.028562; . . . −0.024729], . . .
[0.052374; 0.065661; 0.049794; 0.000000; 0.000000; 0.071484; 0.005672; −0.000000; . . . −0.049994; −0.034121; 0.000000; 0.029817; −0.022304; 0.000000; −0.056999; −0.000000; . . . 0.000000; −0.039123; 0.000000; −0.005561; −0.017086; −0.000000; −0.029400; 0.000000; . . . 0.020588], . . .
[0.052374; −0.065661; 0.049794; 0.000000; −0.000000; −0.071484; 0.005672; −0.000000; . . . −0.049994; 0.034121; −0.000000; −0.029817; −0.022304; 0.000000; −0.056999; −0.000000; . . . 0.000000; 0.039123; −0.000000; 0.005561; −0.017086; −0.000000; −0.029400; 0.000000; . . . 0.020588], . . .
[0.052163; 0.047199; 0.046782; −0.048704; −0.051719; 0.050058; −0.001349; −0.050661; . . . 0.002055; 0.025609; −0.058404; 0.017303; −0.029841; −0.016020; 0.001148; 0.022114; . . . −0.002234; 0.028838; −0.027977; −0.010321; −0.020115; 0.011983; −0.001006; 0.026633; . . . −0.018145], . . .
[0.052163; −0.047199; 0.046782; −0.048704; 0.051719; −0.050058; −0.001349; −0.050661; . . . 0.002055; −0.025609; 0.058404; −0.017303; −0.029841; −0.016020; 0.001148; 0.022114; . . . 0.002234; −0.028838; 0.027977; 0.010321; −0.020115; 0.011983; −0.001006; 0.026633; . . . −0.018145], . . .
[0.050609; −0.000000; 0.045245; −0.065754; 0.000000; −0.000000; −0.000112; −0.067578; . . . 0.051679; −0.000000; 0.000000; −0.000000; −0.025158; −0.022452; 0.055826; −0.036332; . . . −0.000000; −0.000000; 0.000000; 0.000000; −0.015979; 0.010969; 0.024996; −0.039553; . . . 0.022624], . . .
[0.086277; −0.000000; 0.131397; 0.000000; 0.000000; −0.000000; 0.129708; −0.000000; . . . 0.003518; 0.000000; 0.000000; −0.000000; 0.099180; 0.000000; 0.006767; −0.000000; . . . −0.000000; 0.000000; 0.000000; 0.000000; 0.057246; −0.000000; 0.008412; 0.000000; . . . −0.000256], . . .
[0.050275; −0.000000; −0.058242; 0.046762; −0.000000; −0.000000; 0.029462; −0.055777; . . . 0.034791; −0.000000; 0.000000; 0.000000; −0.003391; 0.029736; −0.043349; 0.024837; . . . −0.000000; 0.000000; 0.000000; −0.000000; −0.002096; −0.001375; 0.025945; −0.032149; . . . 0.015999], . . .
[0.095717; 0.060464; −0.111111; 0.049721; 0.049224; −0.076005; 0.057468; −0.050629; . . . 0.005150; 0.027515; −0.056856; 0.047742; −0.008494; 0.014554; 0.000781; −0.012421; . . . 0.010226; −0.028484; 0.029460; −0.011281; −0.004420; 0.012710; −0.009526; 0.017143; . . . −0.013474], . . .
[0.095717; −0.060464; −0.111111; 0.049721; −0.049224; 0.076005; 0.057468; −0.050629; . . . 0.005150; −0.027515; 0.056856; −0.047742; −0.008494; 0.014554; 0.000781; −0.012421; . . . −0.010226; 0.028484; −0.029460; 0.011281; −0.004420; 0.012710; −0.009526; 0.017143; . . . −0.013474] . . . ];

HOA Reference Decode Matrix for HOA Order 5, ACN Channel Ordering, N3D Scaling, for Rendering to Speaker Configuration H: 9+10+3

HOA_Ref_HOA5_Cfg8=[ . . .
[0.038705; −0.000000; 0.000000; 0.062876; −0.000000; 0.000000; −0.034964; −0.000000; . . . 0.062059; −0.000000; −0.000000; 0.000000; 0.000000; −0.040793; −0.000000; 0.055441; . . . −0.000000; −0.000000; 0.000000; 0.000000; 0.020498; −0.000000; −0.031459; 0.000000; . . . 0.045199; −0.000000; 0.000000; 0.000000; −0.000000; −0.000000; −0.000000; 0.019102; . . . −0.000000; −0.022046; 0.000000; 0.033408], . . .
[0.026861; 0.021874; 0.000603; 0.038089; 0.037930; −0.000610; −0.024902; 0.001702; . . . 0.022130; 0.040091; −0.000391; −0.015075; −0.000800; −0.025841; 0.003380; 0.000318; . . . 0.029535; 0.001450; −0.021181; 0.001030; 0.015757; −0.001638; −0.011765; 0.004652; . . . −0.016520; 0.013735; 0.004059; −0.018462; 0.000975; 0.008239; 0.000209; 0.013581; . . . −0.002988; 0.000707; 0.004084; −0.022570], . . .
[0.026861; −0.021874; 0.000603; 0.038089; −0.037930; 0.000610; −0.024902; 0.001702; . . . 0.022130; −0.040091; 0.000391; 0.015075; −0.000800; −0.025841; 0.003380; 0.000318; . . . −0.029535; −0.001450; 0.021181; −0.001030; 0.015757; −0.001638; −0.011765; 0.004652; . . . −0.016520; −0.013735; −0.004059; 0.018462; −0.000975; −0.008239; 0.000209; 0.013581; . . . −0.002988; 0.000707; 0.004084; −0.022570], . . .
[0.042193; 0.058991; −0.011638; 0.027658; 0.048530; −0.017818; −0.029427; −0.004757; . . . −0.038333; −0.010413; −0.009615; −0.026060; 0.009301; −0.017364; 0.013781; −0.052738; . . . −0.041444; 0.007266; −0.022664; 0.007446; 0.014676; 0.005042; 0.008982; 0.011510; . . . −0.011899; −0.021563; 0.009884; −0.003854; 0.006468; 0.011959; −0.003178; 0.007248; . . . −0.001822; 0.017838; −0.001262; 0.023291], . . .
[0.042193; −0.058991; −0.011638; 0.027658; −0.048530; 0.017818; −0.029427; −0.004757; . . . −0.038333; 0.010413; 0.009615; 0.026060; 0.009301; −0.017364; 0.013781; −0.052738; . . . 0.041444; −0.007266; 0.022664; −0.007446; 0.014676; 0.005042; 0.008982; 0.011510; . . . −0.011899; 0.021563; −0.009884; 0.003854; −0.006468; −0.011959; −0.003178; 0.007248; . . . −0.001822; 0.017838; −0.001262; 0.023291], . . .
[0.063974; 0.088152; −0.035137; −0.009443; −0.013238; −0.045325; −0.019757; 0.009076; . . .

−0.077039; −0.062872; 0.010059; −0.014191; 0.011817; −0.005090; 0.034490; 0.014203; . . .
0.013220; 0.024195; −0.003807; 0.005935; 0.008256; 0.003884; 0.010484; −0.008021; . . .
0.047636; 0.032988; −0.005216; 0.007846; 0.002956; 0.008452; −0.000692; −0.003016; . . .
−0.002921; 0.000676; −0.015591; −0.010820], . . .
[0.063974; −0.088152; −0.035137; −0.009443; 0.013238; 0.045325; −0.019757; 0.009076; . . .
−0.077039; 0.062872; −0.010059; 0.014191; 0.011817; −0.005090; 0.034490; 0.014203; . . .
−0.013220; −0.024195; 0.003807; −0.005935; 0.008256; 0.003884; 0.010484; −0.008021; . . .
0.047636; −0.032988; 0.005216; −0.007846; −0.002956; −0.008452; −0.000692; −0.003016; . . .
−0.002921; 0.000676; −0.015591; −0.010820], . . .
[0.096095; 0.090400; −0.056137; −0.088861; −0.103182; −0.045025; −0.022211; 0.049702; . . .
−0.004782; 0.048761; 0.044707; −0.013824; 0.012024; 0.006294; −0.001180; 0.057951; . . .
0.005950; −0.018181; 0.013251; 0.003828; 0.012328; 0.000888; 0.002638; −0.017974; . . .
−0.048112; −0.020335; 0.000658; −0.008558; −0.001913; 0.007756; 0.001049; −0.011293; . . .
0.000134; −0.008757; 0.011938; 0.014547], . . .
[0.096095; −0.090400; −0.056137; −0.088861; 0.103182; 0.045025; −0.022211; 0.049702; . . .
−0.004782; −0.048761; −0.044707; 0.013824; 0.012024; 0.006294; −0.001180; 0.057951; . . .
−0.005950; 0.018181; −0.013251; −0.003828; 0.012328; 0.000888; 0.002638; −0.017974; . . .
−0.048112; 0.020335; −0.000658; 0.008558; 0.001913; −0.007756; 0.001049; −0.011293; . . .
0.000134; −0.008757; 0.011938; 0.014547], . . .
[0.096122; −0.000000; −0.065983; −0.120411; 0.000000; 0.000000; −0.010034; 0.074374; . . .
0.094798; −0.000000; 0.000000; 0.000000; 0.009967; 0.004374; −0.046888; −0.069091; . . .
0.000000; 0.000000; −0.000000; −0.000000; 0.011543; −0.001578; −0.012023; 0.027297; . . .
0.045168; −0.000000; 0.000000; −0.000000; 0.000000; −0.000000; 0.000102; −0.013995; . . .
0.006787; 0.013637; −0.015134; −0.024517], . . .
[0.039700; 0.000000; 0.040916; 0.049332; −0.000000; −0.000000; 0.008417; 0.060469; . . .
0.037604; −0.000000; −0.000000; 0.000000; −0.019307; 0.032531; 0.049995; 0.026269; . . .
−0.000000; −0.000000; −0.000000; −0.000000; −0.021680; −0.002390; 0.033482; 0.036259; . . .
0.016838; −0.000000; −0.000000; −0.000000; −0.000000; 0.000000; −0.008637; −0.015248; . . .
0.007527; 0.026264; 0.023500; 0.009661], . . .
[0.053398; 0.050291; 0.046338; 0.050699; 0.057639; 0.051159; −0.004268; 0.051393; . . .
0.000533; 0.029811; 0.062392; 0.014649; −0.032079; 0.014289; 0.000458; −0.029049; . . .
0.000310; 0.032482; 0.026677; −0.013194; −0.019766; −0.014036; −0.000099; −0.031728; . . .
−0.026885; −0.010788; 0.000251; 0.015580; −0.003998; −0.011993; 0.000400; −0.012839; . . .
−0.000767; −0.015323; −0.027921; −0.010752], . . .
[0.053398; −0.050291; 0.046338; 0.050699; −0.057639; −0.051159; −0.004268; 0.051393; . . .
0.000533; −0.029811; −0.062392; −0.014649; −0.032079; 0.014289; 0.000458; −0.029049; . . .
−0.000310; −0.032482; −0.026677; 0.013194; −0.019766; −0.014036; −0.000099; −0.031728; . . .
−0.026885; 0.010788; −0.000251; −0.015580; 0.003998; 0.011993; 0.000400; −0.012839; . . .
−0.000767; −0.015323; −0.027921; −0.010752], . . .
[0.050240; 0.063709; 0.048394; −0.000011; −0.000022; 0.071281; 0.005600; −0.000006; . . .
−0.049610; −0.035190; −0.000013; 0.030995; −0.023539; 0.000008; −0.058992; 0.000030; . . .
0.000032; −0.042852; 0.000012; −0.006568; −0.019513; 0.000009; −0.032271; 0.000020; . . .
0.022554; 0.012553; 0.000024; −0.025227; 0.000019; −0.011855; −0.004508; −0.000003; . . .
−0.003457; −0.000013; 0.027653; −0.000029], . . .
[0.050240; −0.063709; 0.048394; −0.000011; 0.000022; −0.071281; 0.005600; −0.000006; . . .
−0.049610; 0.035190; 0.000013; −0.030995; −0.023539; 0.000008; −0.058992; 0.000030; . . .
−0.000032; 0.042852; −0.000012; 0.006568; −0.019513; 0.000009; −0.032271; 0.000020; . . .
0.022554; −0.012553; −0.000024; 0.025227; −0.000019; 0.011855; −0.004508; −0.000003; . . .
−0.003457; −0.000013; 0.027653; −0.000029], . . .
[0.050105; 0.045737; 0.045668; −0.047283; −0.051362; 0.049819; −0.001003; −0.050661; . . .
0.002080; 0.026480; −0.060430; 0.018006; −0.030773; −0.016990; 0.001416; 0.022904; . . .
−0.002344; 0.031741; −0.030656; −0.011290; −0.022222; 0.012930; −0.000745; 0.029035; . . .
−0.020043; −0.004903; −0.001809; 0.017703; 0.001647; −0.014114; −0.001105; 0.014777; . . .
−0.001792; 0.018274; −0.025142; 0.007279], . . .
[0.050105; −0.045737; 0.045668; −0.047283; 0.051362; −0.049819; −0.001003; −0.050661; . . .
0.002080; −0.026480; 0.060430; −0.018006; −0.030773; −0.016990; 0.001416; 0.022904; . . .
0.002344; −0.031741; 0.030656; 0.011290; −0.022222; 0.012930; −0.000745; 0.029035; . . .
−0.020043; 0.004903; 0.001809; −0.017703; −0.001647; 0.014114; −0.001105; 0.014777; . . .
−0.001792; 0.018274; −0.025142; 0.007279], . . .
[0.048884; −0.000000; 0.044509; −0.063924; 0.000000; −0.000000; 0.000472; −0.067622; . . .
0.051226; −0.000000; 0.000000; −0.000000; −0.025807; −0.023801; 0.057639; −0.037324; . . .
0.000000; −0.000000; −0.000000; 0.000000; −0.017729; 0.011768; 0.027370; −0.043026; . . .
0.024564; −0.000000; 0.000000; −0.000000; −0.000000; 0.000000; −0.002115; 0.012265; . . .
−0.000588; −0.022507; 0.028476; −0.014077], . . .
[0.083664; −0.000000; 0.128991; 0.000000; −0.000000; −0.000000; 0.130645; −0.000000; . . .
0.003029; −0.000000; 0.000000; 0.000000; 0.104209; 0.000000; 0.006128; −0.000000; . . .
−0.000000; −0.000000; 0.000000; −0.000000; 0.064395; −0.000000; 0.008199; 0.000000; . . .
−0.000317; −0.000000; −0.000000; −0.000000; 0.000000; 0.000000; 0.025737; −0.000000; . . .
0.008101; −0.000000; −0.000730; −0.000000], . . .
[0.048952; 0.000000; −0.057778; 0.045028; −0.000000; 0.000000; 0.030508; −0.055386; . . .
0.033933; −0.000000; 0.000000; 0.000000; −0.003941; 0.031131; −0.044120; 0.024989; . . .
−0.000000; 0.000000; −0.000000; −0.000000; −0.002779; −0.001887; 0.028041; −0.034272; . . .
0.016901; −0.000000; 0.000000; −0.000000; 0.000000; 0.000000; −0.001916; −0.007302; . . .
−0.004660; 0.024640; −0.023885; 0.010295], . . .

[0.094235; 0.059672; −0.110877; 0.047922; 0.048614; −0.076604; 0.058794; −0.050314; . . .
0.004458; 0.027932; −0.058374; 0.049350; −0.008548; 0.015623; 0.001237; −0.012821; . . .
0.011104; −0.030732; 0.031866; −0.011377; −0.005782; 0.013079; −0.010038; 0.018502; . . .
−0.014560; 0.002390; −0.010567; 0.013433; −0.002086; −0.007561; −0.000440; −0.011849; . . .
0.010253; −0.013804; 0.017859; −0.009508], . . .
[0.094235; −0.059672; −0.110877; 0.047922; −0.048614; 0.076604; 0.058794; −0.050314; . . .
0.004458; −0.027932; 0.058374; −0.049350; −0.008548; 0.015623; 0.001237; −0.012821; . . .
−0.011104; 0.030732; −0.031866; 0.011377; −0.005782; 0.013079; −0.010038; 0.018502; . . .
−0.014560; −0.002390; 0.010567; −0.013433; 0.002086; 0.007561; −0.000440; −0.011849; . . .
0.010253; −0.013804; 0.017859; −0.009508] . . . ];

HOA Reference Decode Matrix for HOA Order 6, ACN Channel Ordering, N3D Scaling, for Rendering to Speaker Configuration H: 9+10+3

HOA_Ref_HOA6_Cfg8=[ . . .
[0.037954; −0.000000; 0.000005; 0.061919; −0.000000; 0.000000; −0.034794; 0.000009; . . .
0.061628; −0.000000; −0.000000; 0.000000; −0.000008; −0.041208; 0.000008; 0.055793; . . .
−0.000000; −0.000000; 0.000000; −0.000000; 0.021161; −0.000011; −0.032471; 0.000004; . . .
0.046396; −0.000000; 0.000000; 0.000000; −0.000000; −0.000000; 0.000007; 0.020316; . . .
−0.000007; −0.023485; −0.000001; 0.035309; −0.000000; 0.000000; 0.000000; 0.000000; . . .
−0.000000; 0.000000; −0.008063; 0.000006; 0.012202; −0.000003; −0.015178; −0.000008; . . .
0.024244], . . .
[0.029523; 0.025252; 0.001783; 0.041346; 0.043348; 0.001147; −0.027754; 0.003504; . . .
0.022241; 0.044712; 0.002695; −0.017691; −0.003143; −0.028753; 0.003537; −0.003326; . . .
0.031055; 0.004070; −0.024812; −0.001478; 0.018089; −0.004368; −0.012409; 0.002569; . . .
−0.022264; 0.011806; 0.004674; −0.021411; −0.002694; 0.009834; 0.002931; 0.015720; . . .
−0.003399; 0.002089; 0.000900; −0.027741; −0.003077; 0.004240; −0.012322; −0.003167; . . .
0.011364; 0.001142; −0.008107; 0.003140; 0.005380; −0.001926; 0.009689; −0.000815; . . .
−0.021627], . . .
[0.029523; −0.025252; 0.001783; 0.041346; −0.043348; −0.001147; −0.027754; 0.003504; . . .
0.022241; −0.044712; −0.002695; 0.017691; −0.003143; −0.028753; 0.003537; −0.003326; . . .
−0.031055; −0.004070; 0.024812; 0.001478; 0.018089; −0.004368; −0.012409; 0.002569; . . .
−0.022264; −0.011806; −0.004674; 0.021411; 0.002694; −0.009834; 0.002931; 0.015720; . . .
−0.003399; 0.002089; 0.000900; −0.027741; 0.003077; −0.004240; 0.012322; 0.003167; . . .
−0.011364; −0.001142; −0.008107; 0.003140; 0.005380; −0.001926; 0.009689; −0.000815; . . .
−0.021627], . . .
[0.041568; 0.058309; −0.011725; 0.027206; 0.048171; −0.018050; −0.029132; −0.004746; . . .
−0.038260; −0.010612; −0.009706; −0.026121; 0.009487; −0.017363; 0.014144; −0.053115; . . .
−0.042597; 0.007649; −0.023138; 0.007754; 0.014985; 0.005117; 0.009318; 0.011833; . . .
−0.012220; −0.022912; 0.010432; −0.003794; 0.006710; 0.012651; −0.003380; 0.007611; . . .
−0.002069; 0.018875; −0.001457; 0.024545; 0.008264; 0.002336; 0.009916; 0.002069; . . .
0.008215; −0.001608; −0.006648; −0.001532; −0.004190; −0.005109; 0.009406; −0.006768; . . .
0.021769], . . .
[0.041568; −0.058309; −0.011725; 0.027206; −0.048171; 0.018050; −0.029132; −0.004746; . . .
−0.038260; 0.010612; 0.009706; 0.026121; 0.009487; −0.017363; 0.014144; −0.053115; . . .
0.042597; −0.007649; 0.023138; −0.007754; 0.014985; 0.005117; 0.009318; 0.011833; . . .
−0.012220; 0.022912; −0.010432; 0.003794; −0.006710; −0.012651; −0.003380; 0.007611; . . .
−0.002069; 0.018875; −0.001457; 0.024545; −0.008264; −0.002336; −0.009916; −0.002069; . . .
−0.008215; 0.001608; −0.006648; −0.001532; −0.004190; −0.005109; 0.009406; −0.006768; . . .
0.021769], . . .
[0.063422; 0.087426; −0.035395; −0.009368; −0.013158; −0.045831; −0.019421; 0.009092; . . .
−0.076751; −0.063249; 0.010101; −0.014087; 0.012181; −0.005140; 0.035074; 0.014259; . . .
0.013551; 0.024810; −0.003835; 0.006367; 0.008360; 0.003870; 0.010853; −0.008098; . . .
0.048692; 0.034530; −0.005333; 0.008667; 0.002931; 0.008892; −0.000820; −0.002992; . . .
−0.003247; 0.000588; −0.016189; −0.011486; −0.008494; −0.009580; −0.002266; −0.001422; . . .
−0.002090; 0.001836; −0.003285; 0.000840; −0.004771; −0.000514; −0.006620; 0.002831; . . .
−0.021971], . . .
[0.063422; −0.087426; −0.035395; −0.009368; 0.013158; 0.045831; −0.019421; 0.009092; . . .
−0.076751; 0.063249; −0.010101; 0.014087; 0.012181; −0.005140; 0.035074; 0.014259; . . .
−0.013551; −0.024810; 0.003835; −0.006367; 0.008360; 0.003870; 0.010853; −0.008098; . . .
0.048692; −0.034530; 0.005333; −0.008667; −0.002931; −0.008892; −0.000820; −0.002992; . . .
−0.003247; 0.000588; −0.016189; −0.011486; 0.008494; 0.009580; 0.002266; 0.001422; . . .
0.002090; −0.001836; −0.003285; 0.000840; −0.004771; −0.000514; −0.006620; 0.002831; . . .
−0.021971], . . .
[0.095456; 0.089874; −0.056547; −0.088311; −0.103073; −0.045597; −0.021935; 0.050200; . . .
−0.004816; 0.049276; 0.045434; −0.013975; 0.012597; 0.006355; −0.001083; 0.058510; . . .
0.005946; −0.018501; 0.013982; 0.004299; 0.012720; 0.000468; 0.002766; −0.018438; . . .
−0.049583; −0.021508; 0.000595; −0.009265; −0.002265; 0.008475; 0.000851; −0.011885; . . .
0.000109; −0.009662; 0.012254; 0.015809; 0.008719; 0.001939; 0.000114; 0.004406; . . .
−0.006012; 0.004206; −0.005613; −0.001662; 0.000270; 0.000336; 0.010544; −0.003593; . . .
0.001667], . . .
[0.095456; −0.089874; −0.056547; −0.088311; 0.103073; 0.045597; −0.021935; 0.050200; . . .
−0.004816; −0.049276; −0.045434; 0.013975; 0.012597; 0.006355; −0.001083; 0.058510; . . .
−0.005946; 0.018501; −0.013982; −0.004299; 0.012720; 0.000468; 0.002766; −0.018438; . . .

−0.049583; 0.021508; −0.000595; 0.009265; 0.002265; −0.008475; 0.000851; −0.011885; . . . 0.000109; −0.009662; 0.012254; 0.015809; −0.008719; −0.001939; −0.000114; −0.004406; . . . 0.006012; −0.004206; −0.005613; −0.001662; 0.000270; 0.000336; 0.010544; −0.003593; . . . 0.001667], . . .

[0.095578; −0.000000; −0.066280; −0.119724; 0.000000; 0.000000; −0.009674; 0.074960; . . . 0.094636; −0.000000; −0.000000; 0.000000; 0.010454; 0.004241; −0.047526; −0.069681; . . . 0.000000; 0.000000; −0.000000; −0.000000; 0.011602; −0.002227; −0.012418; 0.027899; . . . 0.046436; −0.000000; 0.000000; −0.000000; 0.000000; −0.000000; −0.000243; −0.014421; . . . 0.007326; 0.014537; −0.015642; −0.026110; 0.000000; −0.000000; −0.000000; 0.000000; . . . 0.000000; 0.000000; −0.006735; −0.002678; 0.004092; −0.009077; −0.010595; 0.007561; . . . 0.010447], . . .

[0.042483; −0.000000; 0.043347; 0.053268; −0.000000; −0.000000; 0.007594; 0.065039; . . . 0.040561; −0.000000; −0.000000; 0.000000; −0.022762; 0.033745; 0.054160; 0.027889; . . . −0.000000; −0.000000; −0.000000; 0.000000; −0.024489; −0.005542; 0.035913; 0.038996; . . . 0.017213; −0.000000; −0.000000; −0.000000; −0.000000; 0.000000; −0.008342; −0.019535; . . . 0.006473; 0.028593; 0.024457; 0.009162; −0.000000; −0.000000; −0.000000; −0.000000; . . . 0.000000; −0.000000; 0.002805; −0.009716; −0.008308; 0.008734; 0.018575; 0.012734; . . . 0.003751], . . .

[0.047654; 0.045321; 0.043959; 0.043446; 0.050195; 0.049310; −0.000030; 0.047721; . . . −0.002401; 0.023304; 0.059562; 0.017737; −0.028968; 0.017674; −0.002113; −0.027690; . . . −0.003420; 0.029500; 0.030775; −0.011250; −0.021836; −0.010709; −0.000309; −0.033364; . . . −0.023129; −0.011453; −0.002952; 0.018237; −0.001237; −0.013928; −0.001972; −0.014021; . . . 0.000462; −0.018889; −0.028663; −0.006640; −0.005550; −0.012797; −0.000434; 0.003241; . . . −0.009369; −0.002705; 0.004706; −0.003189; −0.000274; −0.002505; −0.017724; −0.008792; . . . 0.003129], . . .

[0.047654; −0.045321; 0.043959; 0.043446; −0.050195; −0.049310; −0.000030; 0.047721; . . . −0.002401; −0.023304; −0.059562; −0.017737; −0.028968; 0.017674; −0.002113; −0.027690; . . . 0.003420; −0.029500; −0.030775; 0.011250; −0.021836; −0.010709; −0.000309; −0.033364; . . . −0.023129; 0.011453; 0.002952; −0.018237; 0.001237; 0.013928; −0.001972; −0.014021; . . . 0.000462; −0.018889; −0.028663; −0.006640; 0.005550; 0.012797; 0.000434; −0.003241; . . . 0.009369; 0.002705; 0.004706; −0.003189; −0.000274; −0.002505; −0.017724; −0.008792; . . . 0.003129], . . .

[0.049142; 0.062419; 0.047820; −0.000020; −0.000041; 0.070837; 0.006008; −0.000008; . . . −0.049081; −0.035526; −0.000018; 0.031552; −0.023517; 0.000016; −0.059442; 0.000056; . . . 0.000061; −0.044300; 0.000026; −0.006777; −0.020169; 0.000013; −0.033216; 0.000028; . . . 0.023525; 0.013749; 0.000034; −0.026759; 0.000026; −0.012962; −0.004659; −0.000010; . . . −0.003211; −0.000031; 0.029744; −0.000055; −0.000039; 0.017469; −0.000030; −0.004668; . . . −0.000014; −0.001825; 0.000047; −0.000015; 0.004956; −0.000036; 0.018599; −0.000033; . . . −0.006489], . . .

[0.049142; −0.062419; 0.047820; −0.000020; 0.000041; −0.070837; 0.006008; −0.000008; . . . −0.049081; 0.035526; 0.000018; −0.031552; −0.023517; 0.000016; −0.059442; 0.000056; . . . −0.000061; 0.044300; −0.000026; 0.006777; −0.020169; 0.000013; −0.033216; 0.000028; . . . 0.023525; −0.013749; −0.000034; 0.026759; −0.000026; 0.012962; −0.004659; −0.000010; . . . −0.003211; −0.000031; 0.029744; −0.000055; 0.000039; −0.017469; 0.000030; 0.004668; . . . 0.000014; 0.001825; 0.000047; −0.000015; 0.004956; −0.000036; 0.018599; −0.000033; . . . −0.006489], . . .

[0.047931; 0.044580; 0.044102; −0.044584; −0.049978; 0.049037; −0.000241; −0.048298; . . . 0.000254; 0.025185; −0.059547; 0.018273; −0.029215; −0.016998; −0.000733; 0.024420; . . . −0.000702; 0.030638; −0.030984; −0.010838; −0.021785; 0.011471; −0.001649; 0.031565; . . . −0.021310; −0.006790; 0.000452; 0.017553; 0.001154; −0.014233; −0.001754; 0.013803; . . . −0.001114; 0.020281; −0.027632; 0.007730; 0.002606; −0.009891; 0.001769; 0.002183; . . . 0.009534; −0.003135; 0.004767; 0.002559; 0.000126; 0.004320; −0.018409; 0.009503; . . . −0.000449], . . .

[0.047931; −0.044580; 0.044102; −0.044584; 0.049978; −0.049037; −0.000241; −0.048298; . . . 0.000254; −0.025185; 0.059547; −0.018273; −0.029215; −0.016998; −0.000733; 0.024420; . . . 0.000702; −0.030638; 0.030984; 0.010838; −0.021785; 0.011471; −0.001649; 0.031565; . . . −0.021310; 0.006790; −0.000452; −0.017553; −0.001154; 0.014233; −0.001754; 0.013803; . . . −0.001114; 0.020281; −0.027632; 0.007730; −0.002606; 0.009891; −0.001769; −0.002183; . . . −0.009534; 0.003135; 0.004767; 0.002559; 0.000126; 0.004320; −0.018409; 0.009503; . . . −0.000449], . . .

[0.051330; −0.000000; 0.046843; −0.067390; 0.000000; −0.000000; −0.000128; −0.072066; . . . 0.053895; −0.000000; 0.000000; −0.000000; −0.029224; −0.025179; 0.061794; −0.038928; . . . 0.000000; −0.000000; 0.000000; 0.000000; −0.020603; 0.015041; 0.029830; −0.045934; . . . 0.025184; −0.000000; 0.000000; −0.000000; 0.000000; 0.000000; −0.001588; 0.016632; . . . −0.001973; −0.024788; 0.029785; −0.013985; 0.000000; −0.000000; 0.000000; −0.000000; . . . −0.000000; 0.000000; 0.002465; 0.001454; −0.007298; −0.002249; 0.016547; −0.016068; . . . 0.005901], . . .

[0.082539; −0.000000; 0.127775; 0.000000; −0.000000; 0.000000; 0.130526; −0.000000; . . . 0.003129; −0.000000; 0.000000; 0.000000; 0.105600; 0.000000; 0.006312; −0.000000; . . . 0.000000; 0.000000; 0.000000; −0.000000; 0.066768; −0.000000; 0.008400; 0.000000; . . . −0.000291; −0.000000; −0.000000; 0.000000; −0.000000; −0.000000; 0.027950; −0.000000; . . . 0.008212; −0.000000; −0.000674; −0.000000; 0.000000; 0.000000; 0.000000; −0.000000; . . .

0.000000; −0.000000; −0.000428; 0.000000; 0.005634; 0.000000; −0.001012; 0.000000; . . . −0.000041], . . .

[0.048397; −0.000000; −0.057474; 0.044316; −0.000000; 0.000000; 0.030827; −0.054999; . . . 0.033603; −0.000000; 0.000000; 0.000000; −0.004260; 0.031439; −0.044166; 0.025144; . . . −0.000000; 0.000000; 0.000000; −0.000000; −0.002896; −0.002140; 0.028515; −0.034933; . . . 0.017479; −0.000000; 0.000000; −0.000000; 0.000000; 0.000000; −0.001791; −0.007607; . . . −0.004810; 0.025527; −0.025099; 0.011131; −0.000000; 0.000000; −0.000000; −0.000000; . . . 0.000000; −0.000000; 0.002651; 0.001005; −0.006049; −0.008176; 0.019609; −0.016197; . . . 0.006341], . . .

[0.093791; 0.059448; −0.110856; 0.047293; 0.048334; −0.076812; 0.059300; −0.050235; . . . 0.004090; 0.027869; −0.058823; 0.049868; −0.008601; 0.016156; 0.001449; −0.013000; . . . 0.011290; −0.031375; 0.032745; −0.011364; −0.006323; 0.013018; −0.010047; 0.018989; . . . −0.014838; 0.002585; −0.011198; 0.014284; −0.002103; −0.008191; −0.000310; −0.012410; . . . 0.010349; −0.014435; 0.018742; −0.010042; 0.000205; −0.001656; 0.003516; 0.001944; . . . −0.006478; 0.008227; 0.003485; −0.002978; −0.001732; 0.004022; −0.011249; 0.011703; . . . −0.005205], . . .

[0.093791; −0.059448; −0.110856; 0.047293; −0.048334; 0.076812; 0.059300; −0.050235; . . . 0.004090; −0.027869; 0.058823; −0.049868; −0.008601; 0.016156; 0.001449; −0.013000; . . . −0.011290; 0.031375; −0.032745; 0.011364; −0.006323; 0.013018; −0.010047; 0.018989; . . . −0.014838; −0.002585; 0.011198; −0.014284; 0.002103; 0.008191; −0.000310; −0.012410; . . . 0.010349; −0.014435; 0.018742; −0.010042; −0.000205; 0.001656; −0.003516; −0.001944; . . . 0.006478; −0.008227; 0.003485; −0.002978; −0.001732; 0.004022; −0.011249; 0.011703; . . . −0.005205] . . .

The invention claimed is:

1. A method of rendering input audio for playback in a playback environment, wherein the input audio includes at least one audio object and associated metadata, wherein the associated metadata indicates at least a location of the audio object, the method comprising:

determining, based on the metadata, whether the audio object is to be rendered with non-zero divergence;

in accordance with determining that the audio object is to be rendered with non-zero divergence:

creating two additional audio objects associated with the audio object such that respective locations of the two additional audio objects are evenly spaced, by an angular distance indicated by the metadata, from the location of the audio object, on opposite sides of the location of the audio object when seen from an intended listener's position in the playback environment;

determining respective weight factors for application to the audio object and the two additional audio objects; and rendering the audio object and the two additional audio objects to two or more speaker feeds in accordance with the determined weight factors.

2. A non-transitory computer-readable storage medium comprising a sequence of instructions, wherein, when executed by a processing device, the sequence of instructions cause the processing device to perform the method of claim 1.

3. An apparatus for rendering input audio for playback in a playback environment, wherein the input audio includes at least one audio object and associated metadata, wherein the associated metadata indicates at least a location of the audio, the apparatus comprising:

a metadata processing unit configured to:

determine, based on the metadata, whether the audio object is to be rendered with non-zero divergence;

in accordance with a determination that the audio object is to be rendered with non-zero divergence:

create two additional audio objects associated with the audio object such that respective locations of the two additional audio objects are evenly spaced, by an angular distance indicated by the metadata, from the location of the audio object, on opposite sides of the location of the audio object when seen from an intended listener's position in the playback environment; and determine respective weight factors for application to the audio object and the two additional audio objects; and a rendering unit configured to render the audio object and the two additional audio objects to two or more speaker feeds in accordance with the determined weight factors.

* * * * *